United States Patent [19]

Nakayama

[11] Patent Number: 5,715,376
[45] Date of Patent: Feb. 3, 1998

[54] DATA TRANSFORMATION APPARATUS

[75] Inventor: Tadayoshi Nakayama, Tokyo, Japan

[73] Assignee: Canon Kabushiki Kaisha, Tokyo, Japan

[21] Appl. No.: 380,797

[22] Filed: Jan. 30, 1995

[30] Foreign Application Priority Data

Jan. 31, 1994 [JP] Japan ................. 6-010077
Feb. 17, 1994 [JP] Japan ................. 6-020686

[51] Int. Cl.$^6$ .................................................. H04N 1/56
[52] U.S. Cl. ......................... 395/109; 358/523; 358/525
[58] Field of Search ........................... 395/109; 364/723; 358/523, 525, 518, 519

[56] References Cited

U.S. PATENT DOCUMENTS 4,837,722  6/1989  Sara .................................. 364/723
5,175,701  12/1992  Newman et al. ................. 364/723

FOREIGN PATENT DOCUMENTS 063967   3/1993  Japan ............................ H04N 1/40
141489   6/1995  Japan ............................ G06F 15/66
1595122  8/1981  United Kingdom ........... H04N 1/40

Primary Examiner—Scott A. Rogers
Attorney, Agent, or Firm—Fitzpatrick, Cella, Harper & Scinto

[57] ABSTRACT

An address exchanger and a data exchanger are provided at both sides of a plurality of look-up tables (LUTs). An even number address is constantly accessed at one of the LUTs and an odd number address is constantly accessed in the other LUTs. An interpolating operation on the basis of values output from the respective LUTs may constantly cause the same results as can be obtained without address exchange. By this, for the memory to be accessed by the odd number address and the even number address, a grid point data for other transformation characteristics may be stored. Therefore, in the data transformation apparatus performing data transformation through interpolation employing a plurality of LUTs, memories of respective LUTs can be efficiently used for permitting data transformation of a plurality of kinds of transformation characteristics.

53 Claims, 91 Drawing Sheets

FIG.16

| FIG.16A |
|---|
| FIG.16B |

INITIAL STATE
- IN TABLE TO BE ACCESSED BY EX1=0,EX2=0,EX3=0, DATA OF M(MAGENTA) FOR COMMON PAPER ARE STORED
- IN TABLE TO BE ACCESSED BY EX1=1,EX2=0,EX3=0, DATA OF C(CYAN) FOR COMMON PAPER ARE STORED
- IN TABLE TO BE ACCESSED BY EX1=0,EX2=1,EX3=0, DATA OF Y(YELLOW) FOR COMMON PAPER ARE STORED
- IN TABLE TO BE ACCESSED BY EX1=1,EX2=1,EX3=0, DATA OF Bk(BLACK) FOR COMMON PAPER ARE STORED
- IN TABLE TO BE ACCESSED BY EX1=0,EX2=0,EX3=1, DATA OF M(MAGENTA) FOR OHP ARE STORED
- IN TABLE TO BE ACCESSED BY EX1=1,EX2=0,EX3=1, DATA OF C(CYAN) FOR OHP ARE STORED
- IN TABLE TO BE ACCESSED BY EX1=0,EX2=1,EX3=1, DATA OF Y(YELLOW) FOR OHP ARE STORED
- IN TABLE TO BE ACCESSED BY EX1=1,EX2=1,EX3=1, DATA OF Bk(BLACK) FOR OHP ARE STORED
- START

S1502 SENSOR DETECTION

COMMON PAPER DETECTION → S1503
- SET EX3=0

S1504
- SET EX1=0,EX2=0
RGB DATA FOR ONE PAGE IS TRANSFORMED INTO M(MAGENTA) AND TRANSFORMED IMAGE IS OUTPUT

OHP DETECTION → S1508
- SET EX3=1

S1509
- SET EX1=0,EX2=0
RGB DATA FOR ONE PAGE IS TRANSFORMED INTO M(MAGENTA) AND TRANSFORMED IMAGE IS OUTPUT

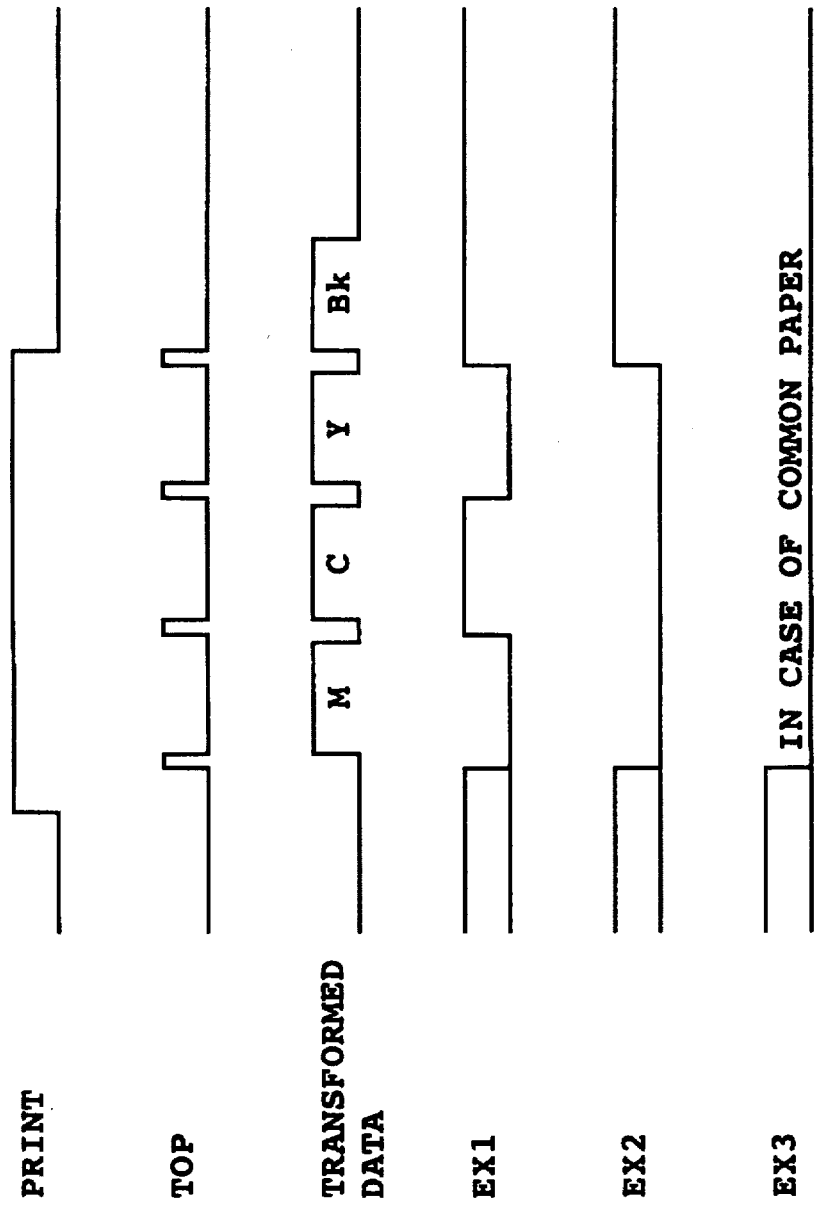

INITIAL STATE

- IN TABLE TO BE ACCESSED BY EX1=0,EX2=0,EX3=0, DATA OF M(MAGENTA) FOR COMMON PAPER ARE STORED
- IN TABLE TO BE ACCESSED BY EX1=1,EX2=0,EX3=0, DATA OF C(CYAN) FOR COMMN PAPER ARE STORED
- IN TABLE TO BE ACCESSED BY EX1=0,EX2=1,EX3=0, DATA OF Y(YELLOW) FOR COMMON PAPER ARE STORED
- IN TABLE TO BE ACCESSED BY EX1=1,EX2=1,EX3=0, Bk(BLACK) FOR COMMON PAPER ARE STORED
- IN TABLE TO BE ACCESSED BY EX1=0,EX2=0,EX3=1, DATA OF M(MAGENTA) FOR OHP ARE STORED
- IN TABLE TO BE ACCESSED BY EX1=1,EX2=0,EX3=1, DATA OF C(CYAN) FOR OHP ARE STORED
- IN TABLE TO BE ACCESSED BY EX1=0,EX2=1,EX3=1, DATA OF Y(YELLOW) FOR OHP ARE STORED
- IN TABLE TO BE ACCESSED BY EX1=1,EX2=1,EX3=1, DATA OF Bk(BLACK) FOR OHP ARE STORED
- START

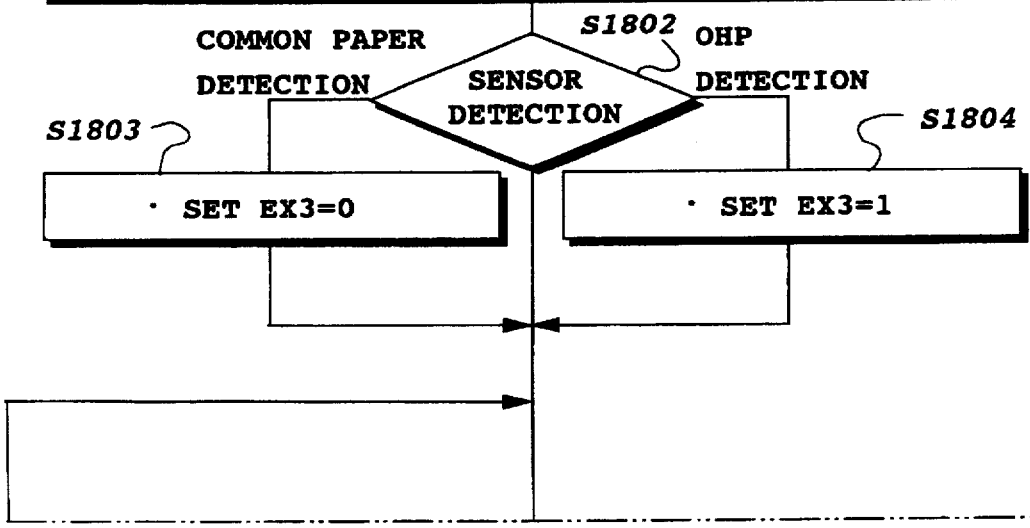

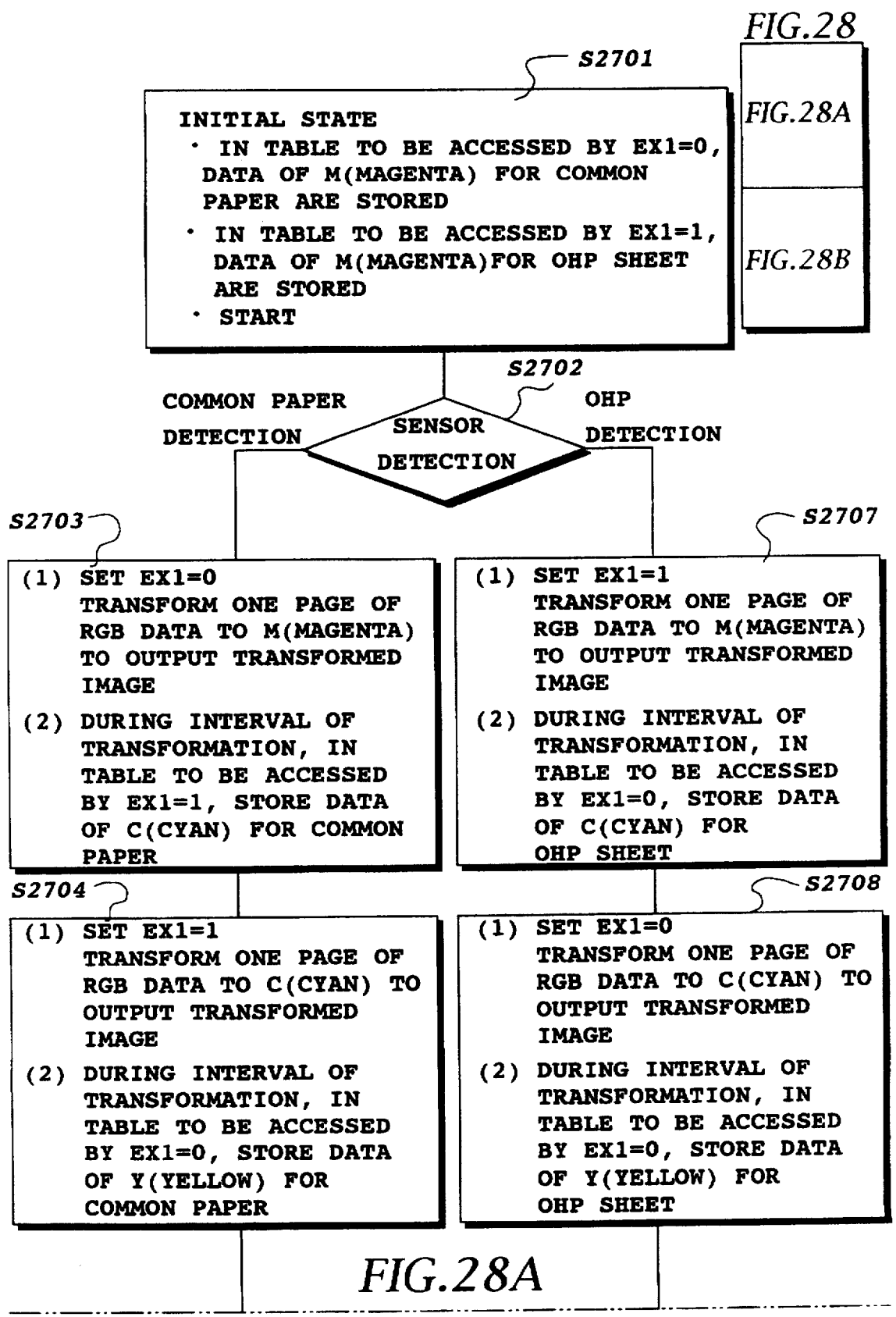

INITIAL STATE   FOUR KINDS OF DATA OF
                M(MAGENTA) ARE STORED

- IN TABLE TO BE ACCESSED BY EX1=0,EX2=0,
  DATA OF TEXT REGION ARE STORED.
  SAME FOR C, Y, Bk
- IN TABLE TO BE ACCESSED BY EX1=1,EX2=0,
  DATA OF VIDEO IMAGE REGION ARE STORED.
  SAME FOR C, Y, Bk
- IN TABLE TO BE ACCESSED BY EX1=0,EX2=1,
  DATA OF GRAPHIC REGION ARE STORED.
  SAME FOR C, Y, Bk
- IN TABLE TO BE ACCESSED BY EX1=1,EX2=1,
  DATA OF SCANNER IMAGE REGION ARE STORED.
  SAME FOR C, Y, Bk
- START

- TRANSFORM ONE PAGE OF RGB DATA
  INTO M(MAGENTA) DEPENDING UPON
  ATTRIBUTE BIT AND OUTPUT
  TRANSFORMED IMAGE                    S3402

- DURING INTERVAL OF DATA TRANSFORMATION    S3403
  STORE 4 KINDS OF C(CYAN) DATA

- TRANSFORM ONE PAGE OF RGB DATA         S3404
  INTO C(CYAN) DEPENDING UPON
  ATTRIBUTE BIT AND OUTPUT
  TRANSFORMED IMAGE

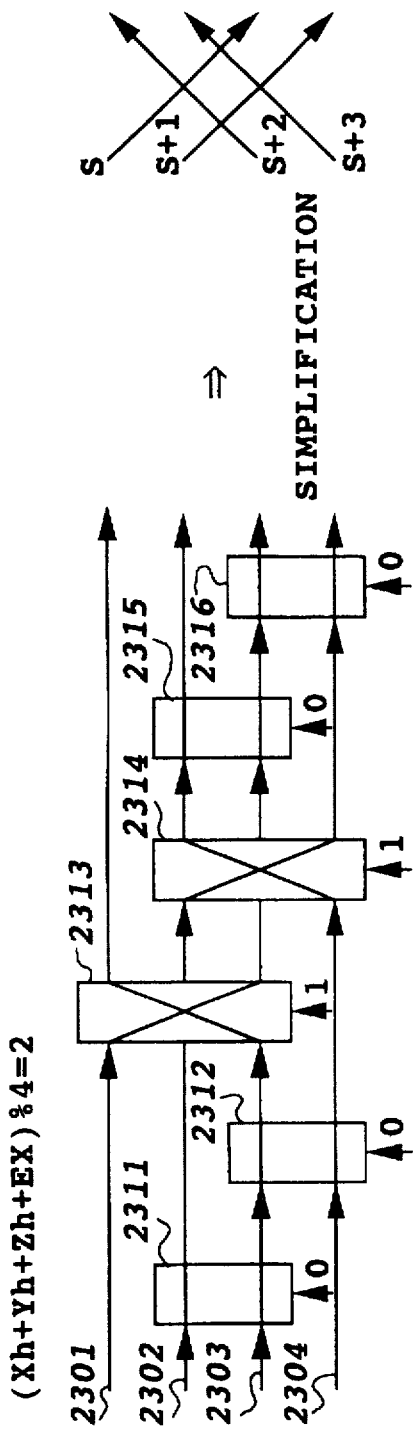
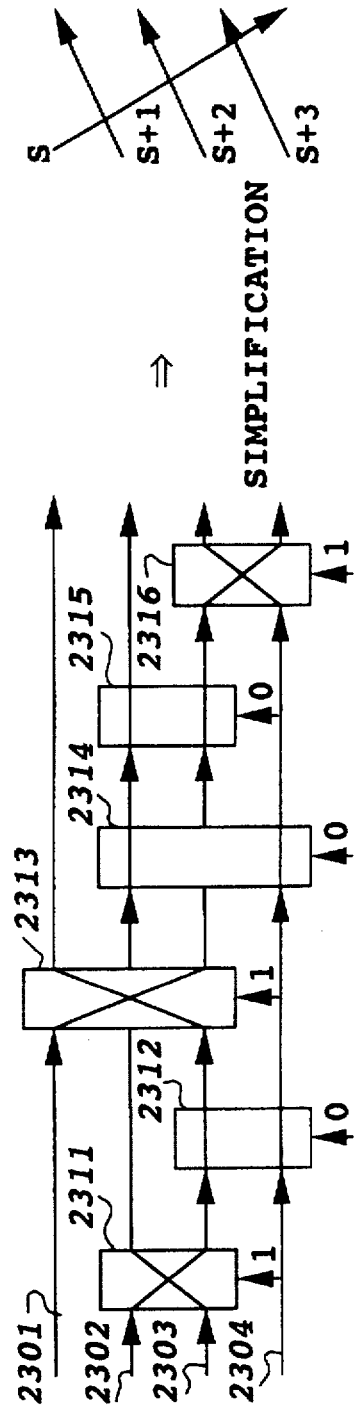
FIG.43C
FIG.43D

VALUE OF Adr%4 OF ADDRESS TO BE ACCESSED

|         | EX=0 | EX=1 | EX=2 | EX=3 |
|---------|------|------|------|------|
| LUT2321 | 0    | 3    | 2    | 1    |
| LUT2322 | 1    | 0    | 3    | 2    |
| LUT2323 | 2    | 1    | 0    | 3    |
| LUT2324 | 3    | 2    | 1    | 0    |

*FIG.44*

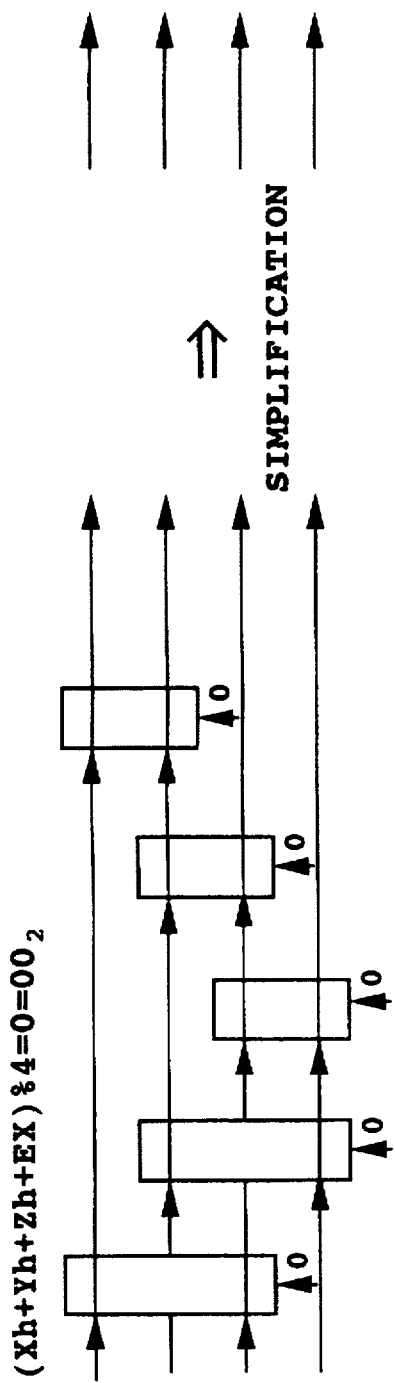
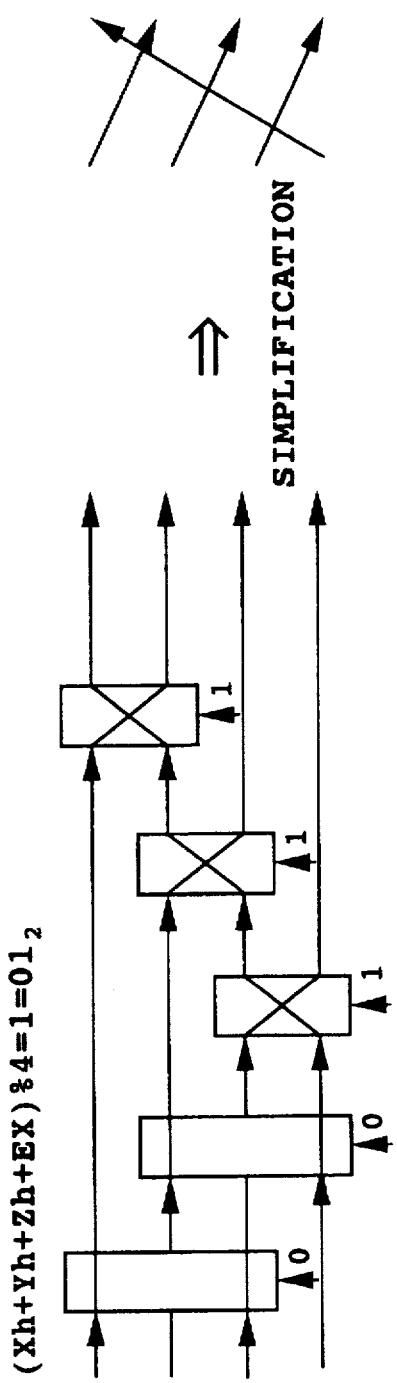
FIG.48A
FIG.48B

VALUE OF Adr%2 OF ADDRESS
INPUT TO RESPECTIVE LUTs

|         | EX1=0 | EX1=1 |
|---------|-------|-------|
| LUT2501 | 0     | 1     |
| LUT2502 | 1     | 0     |
| LUT2503 | 0     | 1     |
| LUT2504 | 1     | 0     |

*FIG.51*

VALUE OF Adr%4 OF ADDRESS
INPUT TO RESPECTIVE LUTs

|         | EX=0 | EX=1 |
|---------|------|------|
| LUT2321 | 0    | 2    |
| LUT2322 | 1    | 3    |
| LUT2323 | 2    | 0    |
| LUT2324 | 3    | 1    |

*FIG.54*

VALUE OF Adr%5 OF ADDRESS INPUT TO RESPECTIVE LUTs

|         | EX5=0 | EX5=1 | EX5=2 | EX5=3 | EX5=4 |
|---------|-------|-------|-------|-------|-------|
| LUT2841 | 0     | 4     | 3     | 2     | 1     |
| LUT2842 | 1     | 0     | 4     | 3     | 2     |
| LUT2843 | 2     | 1     | 0     | 4     | 3     |
| LUT2844 | 3     | 2     | 1     | 0     | 4     |
| LUT2845 | 4     | 3     | 2     | 1     | 0     |

FIG.65

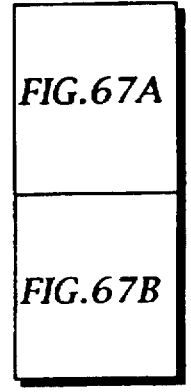
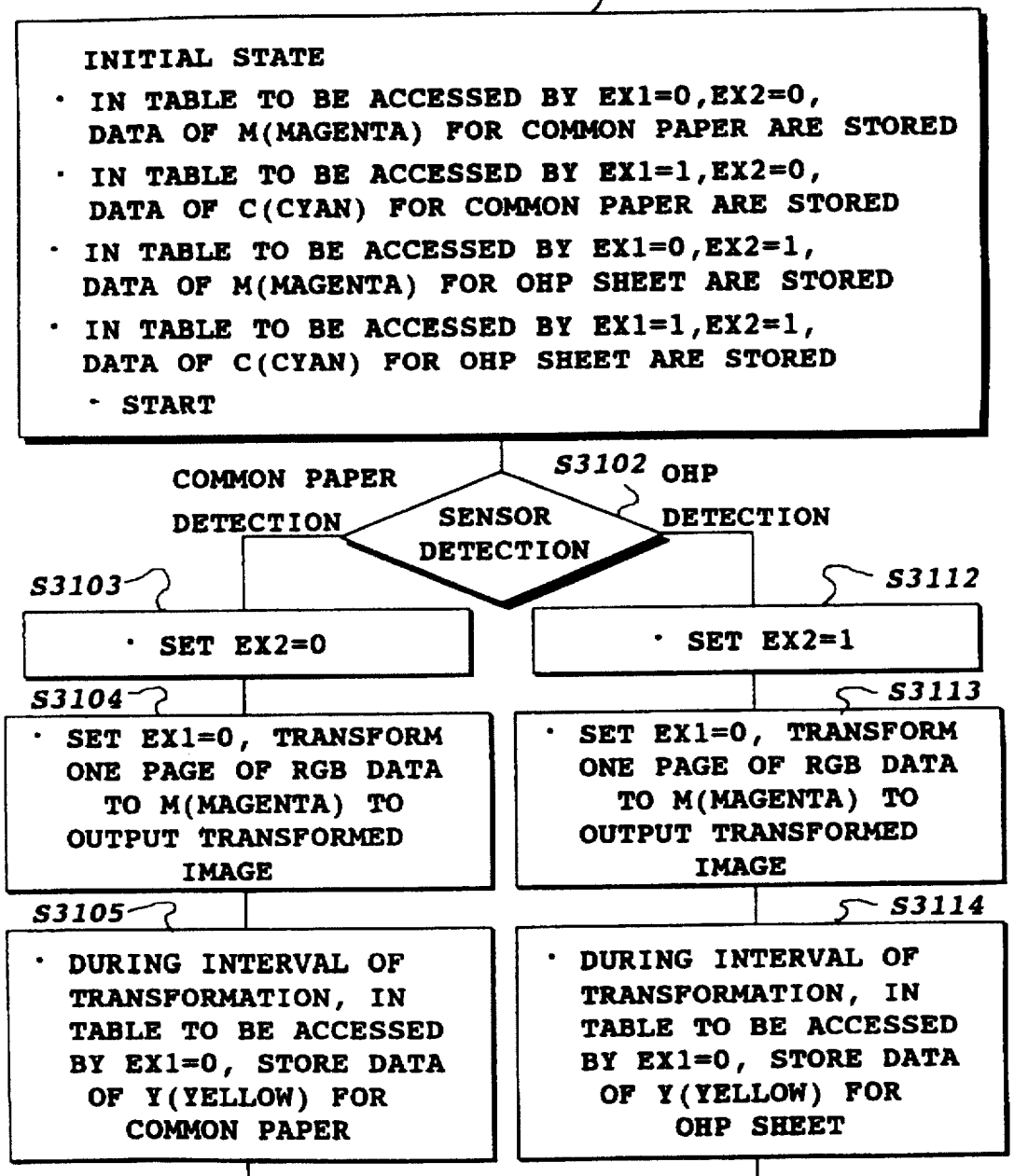
FIG.67A

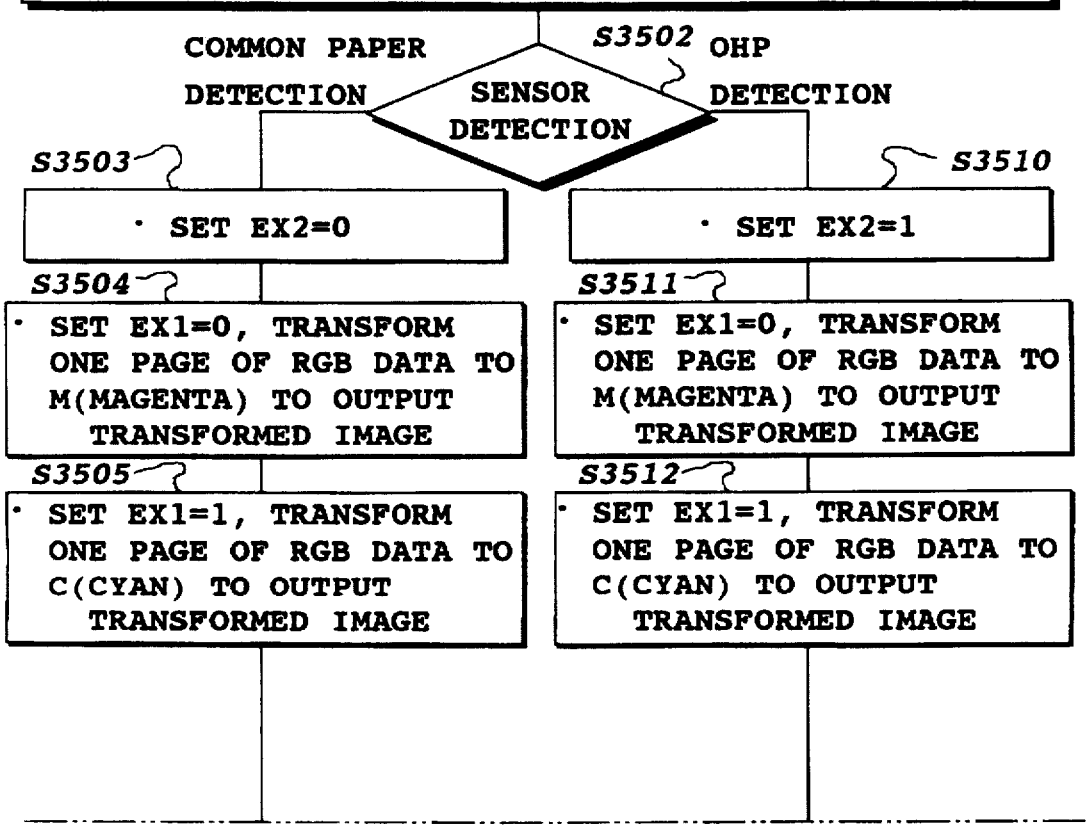

FIG. 72

| FIG. 72A |
|---|
| FIG. 72B |

FIG. 72A

S3601
INITIAL STATE
- IN TABLE TO BE ACCESSED BY EX1=0,EX2=0, DATA OF M(MAGENTA) FOR COMMON PAPER ARE STORED
- IN TABLE TO BE ACCESSED BY EX1=1,EX2=0, DATA OF C(CYAN) FOR COMMON PAPER ARE STORED
- IN TABLE TO BE ACCESSED BY EX1=0,EX2=1, DATA OF Y(YELLOW) FOR COMMON PAPER ARE STORED
- IN TABLE TO BE ACCESSED BY EX1=1,EX2=1, DATA OF Bk(BLACK) FOR COMMON PAPER ARE STORED
- START

S3602 SENSOR DETECTION?
COMMON PAPER DETECTION
OHP DETECTION

S3603
- IN TABLE TO BE ACCESSED BY EX1=0,EX2=0, STORE DATA OF M(MAGENTA) FOR OHP SHEET
- IN TABLE TO BE ACCESSED BY EX1=1,EX2=0, STORE DATA OF C(CYAN) FOR OHP SHEET
- IN TABLE TO BE ACCESSED BY EX1=0,EX2=1, STORE DATA OF Y(YELLOW) FOR OHP SHEET
- IN TABLE TO BE ACCESSED BY EX1=1,EX2=1, STORE DATA OF Bk(BLACK) FOR OHP SHEET

S3604
- SET EX1=0, EX2=0
  TRANSFORM ONE PAGE OF RGB DATA TO M(MAGENTA) TO OUTPUT TRANSFORMED IMAGE

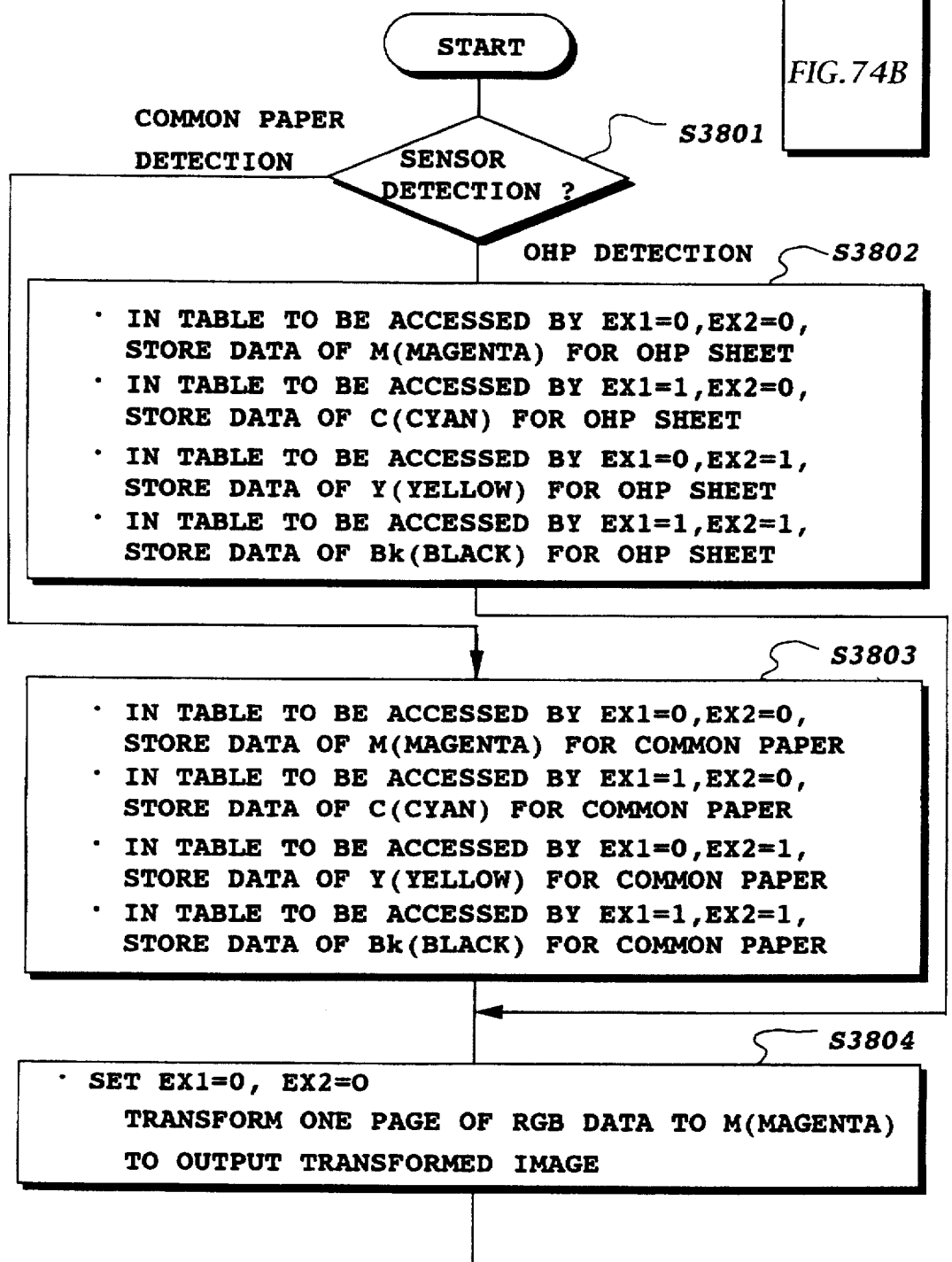

| FIG. 76A |
|---|
| FIG. 76B |

DATA TRANSFORMATION APPARATUS

BACKGROUND OF THE INVENTION

1. Field of the Invention

The present invention relates generally to a data transformation apparatus for transforming a plurality of (multi-dimensional) signals into other signals by employing an interpolation process using a look-up table (hereinafter referred to as a "LUT"). The invention relates to, for example, a data transformation system for transforming a multi-dimensional video signal of R(red), G(green), B(blue) into each of printing color signals of Y(yellow), M(magenta), C(cyan) and Bk(black).

2. Description of the Related Art

Non-linear transformation (e.g. gamma transformation or logarithmic transformation) of a digitized video signal is frequently performed employing a LUT. This is because, when such a non-linear transformation is performed by an arithmetic circuit, the arithmetic circuit becomes quite complicated and large in size. On the other hand, when a non-linear transformation is performed for an 8 bit video signal employing a LUT, the transformation can be realized by a memory having 256 bits of capacity, to be used as the LUT. The above-mentioned transformation is used to transform one type of video signal into another type of video signal, the LUT being employed is called a one-dimensional LUT.

On the other hand, due to the recent remarkable increase of use of a desk top publishing system (hereinafter referred to as a "DTP"), the opportunity of handling a color image is increasing. In such case, a device for performing color image input is mainly a scanner, video camera and so forth and an output device is mainly a color printer, such as ink-jet type, dye sublimation type, or electrophotographic type printer.

These color input and output devices respectively operate in a specific color space. Therefore, it is quite unlikely to reproduce an original color image by directly transferring a color image data obtained from a certain scanner to a color printer without color transformation processing, for outputting the image. In order to make the color of the image scanned by the scanner and the image printed by the color printer consistent, a process for transforming the color space of the input device, e.g. scanner, video camera and so forth, and the color space of the output device, i.e. various color printers set forth above, becomes necessary.

This process is hereinafter referred to as a "color transformation process".

Such color transformation process is the process to transform a three color (typically R(red), B(blue) and G(green)) image signal obtained by the input device into each of a three or four color image signal of the output device. The LUT to be employed for such transformation is referred to as a three-dimensional LUT.

However, when transformation of the above-mentioned three color image signal into one of a plurality of colors of the output device employing only a three-dimensional LUT, in the case that the image signal of one color is consisted with 8 bits, a LUT adapted for 24 bits of input and 8 bits of output becomes necessary. In such case, the necessary memory capacity for the LUT becomes 16M bytes. Furthermore, the above-mentioned capacity of memory is required for each individual color of the output device. Therefore, the practically required memory capacity becomes large, ranging 48 to 64M bytes.

In such case, employment of a sufficiently large capacity of memory is impractical in view of the cost of memory. Therefore, when the LUT is employed in the color transformation process, it is typical to reduce the required capacity of the memory to be used for the LUT by utilizing an arithmetic interpolating process. There are several kinds of interpolation methods for transforming a three color image signal into a single color employing the LUT. As one example, an eight point interpolation is well known and is described below.

In the eight point interpolation method employing a LUT, three color signals $X_i$, $Y_i$ and $Z_i$ (respective color signals having n+m bits) before transformation is divided into $X_i = X_h \cdot 2^m + X_f$, $Y_i = Y_h \cdot 2^m + y_f$ and $Z_i = Z_h \cdot 2^m + z_f$. Namely, $X_h$, $Y_h$ and $Z_h$ respectively represent the upper n bits of the color signals $X_i$, $Y_i$ and $Z_i$, and $X_f$, $Y_f$ and $Z_f$ respectively represent the lower m bits of the color signal $X_i$, $Y_i$ and $z_i$.

In the LUT, with respect to combinations ($2^{3n}$) of 2n in number of values $X_h = 0, 1, 2 \ldots 2n-1$, $Y_h = 0, 1, 2 \ldots 2^n -1$ and $Z_h = 0, 1, 2 \ldots 2n-1$, color-data after transformation (hereinafter also occasionally referred to as "grid point data") are stored. More specifically, the content of the LUT may be expressed as grid data associated with respective grid points specified by a coordinate when the combination is a coordinate of a three-dimensional space. In the practical process, the grip point data are read out with taking 3·n bit data, in which $X_h$, $Y_h$ and $Z_h$ are linked, as an address.

In the eight point interpolation process, the grid point data read out from the LUT as set forth above, are grip point data corresponding to eight coordinate positions located at respective peaks (grid points) of a cube shown in FIG. 1. Utilizing the eight grid point data, objective interpolation points, namely points represented by three color signals $X_i$, $Y_i$ and $Z_i$, interpolating calculation is performed for deriving transformed data. More specifically, in the cube (partial interpolation space) shown in FIG. 1, an arithmetic operation is performed for the objective points represented by lower bit signals $X_f$, $Y_f$, $Z_f$.

When the grid point data at respective grid points in the partial interpolation space in FIG. 1 is expressed by D(X-coordinate, Y-coordinate and Z-coordinate) and the transformed data obtained by the eight point interpolation process is expressed by $H_1(X_i, Y_i, Z_i)$, the transformed data $H_1$ is derived from the following equation (1).

$$H_1(X_i,Y_i,Z_i) = 2^{-3m} \cdot [(2^m - X_f) \cdot (2^m - Y_f) \cdot (2^m - Z_f) - D(X_h,Y_h,Z_h) \quad (1)$$
$$X_f \cdot (2m - Y_f) \cdot (2m - Z_f) \cdot D(X_h+1,Y_h,Z_h) +$$
$$(2m - X_f) \cdot Y_f \cdot (2m - Z_f) \cdot D(X_h,Y_h+1,Z_h) +$$
$$(2m - X_f) \cdot (2m - Y_f) \cdot Z_f \cdot D \cdot (X_h,Y_h,Z_h+1) +$$
$$X_f \cdot Y_f \cdot (2m - Z_f) \cdot Z_f \cdot D \cdot (X_h+1,Y_h+1,Z_h) +$$
$$(2m - X_f) \cdot Y_f \cdot Z_f \cdot D(X_h,Y_h+1,Z_h+1) +$$
$$X_f \cdot (2m - Y_f) \cdot Z_f \cdot D(X_h+1,Y_h,Z_h+1) +$$
$$X_f \cdot Y_f \cdot Z_f \cdot D(X_h+1,Y_h+1,Z_h+1)]$$

Eight grid point data necessary for performing the foregoing interpolating operation is read out from one LUT sequentially and to perform the foregoing calculation to derive the transformed data. In this case, a period required for the arithmetic operation is long. Therefore, it is not possible to obtain the transformed data at high speed. Therefore, normally, eight LUTs having the identical contents respectively are provided to read out eight grid point data D necessary for an interpolating operation in parallel, multiplying respective grid point data by coefficients determined by the lower bit data of the color signals and summing the products to obtain the result of the interpolating operation.

Other than the foregoing eight point interpolation, there are other various methods, depending upon how may grid point data read out from the LUT, used based on what relationship of grid data are to be used. While a greater number of grid point data to be used results in a higher precision in interpolation in general, an increasing of the number of the grid point data to be used inherently causes increasing of the size of the interpolation circuit.

Amongst various interpolation methods, as an interpolation method which can reduce the size of the interpolation circuit without significantly sacrificing the precision in interpolation, there is a four point interpolation method as disclosed in Japanese Patent Application Publication No. 16180/1983.

The proposed interpolation method performs interpolation employing one of six tetrahedrons (see FIG. 2) obtained by dividing the cube of FIG. 1 having eight peaks as eight grid points specified by the upper bit signals of the foregoing three color signals, by three planes.

On the other hand, an interpolating equation in the interpolating operation is defined for each of the six tetrahedrons. Therefore, mutually distinct six interpolating equations must be provided. In this case, in each of the interpolating equations, four grid point data to be used for the interpolating operation are differentiated and further multiplication coefficients for respective grid point data are differentiated. Therefore, a circuit for selecting the grid point data and arithmetic operation of the multiplication of the coefficient becomes relatively complicated.

The inventor of the present invention has proposed in Japanese Patent Application No. 285,330/1993 to unify the six interpolating equations into a single interpolating equation, to simplify reading out grid point data to be used for the interpolating operation and arithmetic operation of the multiplication of the coefficient for the read out grid point data. The unification of the interpolating equation proposed in the prior application is performed on the basis of mutually large and small relationships of the three-dimensional inputs.

As set forth above, while various interpolation methods for a color transformation process employing the LUT is known, in all of the foregoing methods, it is direct and effective way to improve transformation speed to employ a plurality of the LUTs having identical contents respectively.

In the case that eight LUTs are employed for an eight point interpolation process in the foregoing related art, and if the number of upper bit of the color signal to be transformed is n=4 and the output data width of the LUT is 8 bits, the capacity of one LUT becomes 4K bytes (12 bits—for address and 8 bits for i output) and thus a total 4K bytes× 8=32K bytes of table memory is necessary. Therefore, the conventional data transformation system encounters a problem of relatively high cost.

Also, in the four or eight point interpolation method employing four or eight LUTs as described above, when four or eight LUTs having identical contents are accessed simultaneously, the addresses to be accessed are mutually different. Namely, the grip point data to be simultaneously output are mutually different in the four or eight LUTs.

In view of this, it is a major task of the present invention to differentiate the contents of each of the LUTs for efficiently use four or eight LUTs.

Employment of a plurality of LUTs having mutually distinct contents has been disclosed in U.S. Pat. No. 4,837, 722, for example. The disclosed construction is as follows.

Instead of proving the same content of interpolation function values (grid point data) in each of a plurality of LUTs, the LUTs respectively store a part of the interpolation function values divided from the values to be stored a single LUT. More specifically, the interpolation function values which are to be originally stored in a single LUT, are stored in a plurality of sub-LUTs as fractions of the original single LUT. Associated with this construction, the sub-LUT to be accessed is differentiated depending upon the value of the lower bit of the input signal. By this, data transformation comparable with that employing a plurality of LUTs having identical contents becomes possible with a memory capacity of one original LUT.

However, in the construction employing a plurality of sub-LUTs as disclosed in the above-identified U.S. Patent may permit only one kind of data transformation with one unit. Therefore, upon data transformation for obtaining output data of Y, M, C, Bk from input data of R, G, B, four units of the above-mentioned construction becomes necessary. This is so because when output data is different, the registered content of a plurality of sub-LUT has to be differentiated.

On the other hand, in most of the output devices, such as a printer, copying machine and so forth., it is not necessary to obtain the above-mentioned Y, M, C, Bk data simultaneously. Namely, the data transformation for obtaining Y, M, C, Bk data may be performed sequentially within a given time interval. In view of this, the present invention intends to efficiently use the LUT.

Another piece of prior art employing a plurality of LUTs having different content is disclosed in Japanese Patent Application Layed-open No. 63967/1993.

The construction disclosed in the above-identified publication is also adapted to data transformation for one kind similarly to the foregoing U.S. Patent. Also, the interpolation method employing the tetrahedrons disclosed in the above-identified publication is to employ two LUT outputs (grid point data) at most for shortening a read out period. In view of this, the present invention intends to restrict lowering of the interpolation precision by performing four point interpolation employing four points.

SUMMARY OF THE INVENTION

It is an object of the present invention to provide a data transformation apparatus which efficiently uses a plurality of LUTs.

Another object of the present invention is to provide a data storage method effective for storing different data in each of a plurality of LUTs.

A further object of the present invention is to provide a data transformation apparatus which satisfactorily performs data transformation depending upon operation of an image output device.

A still further object of the present invention is to provide an image forming system which efficiently utilizes a plurality of LUTs in data transformation.

A yet further object of the present invention is to provide a data transformation apparatus which stores different kinds of transformation data respectively stored in different regions in a plurality of LUTs by constantly limiting addresses to be accessed by each LUT in a given region depending upon a sum of address data or a sum of values of address data and switching signal and can only access a table region having one transformation characteristic by the address.

A still further object of the present invention is to provide a data transformation apparatus which permits access of a table region having another kind of transformation characteristic by modifying the above-mentioned region in each of the LUTs and by modifying the content of the switching signal.

In a first aspect of the present invention, there is provided a data transformation apparatus for performing a data transformation by employing a plurality of look-up tables, the apparatus comprising:

address exchanging means for performing an exchanging operation including non-exchanging for transfer paths of a plurality of address data on the basis of an input data to be transformed so as to provide each of a plurality of address data to the look-up table corresponding to an attribute of the address data to be provided.

In a second aspect of the present invention, there is provided a data transformation apparatus for performing a data transformation by employing a plurality of look-up tables, the apparatus comprising:

address assigning means for providing each of a plurality of address data based on an input data to be transformed to one of a plurality of regions in each of the plurality of look-up tables, the one of a plurality of regions corresponding to an attribute of the address data to be provided.

In a third aspect of the present invention, there is provided a data transformation apparatus for performing a data transformation by employing a plurality of look-up tables, the apparatus comprising:

address assigning means for providing an address data, which has a same number of bits as a data input to the data transformation apparatus, to the look-up table corresponding to an attribute of the address data to be provided.

In a fourth aspect of the present invention, there is provided a data transformation apparatus for performing a data transformation through an interpolating operation employing a plurality of look-up tables, the apparatus comprising:

address generating means for generating a plurality of address data on the basis of an input data to be transformed;

logical operation means for performing an exclusive logic operation of a signal indicative of an attribute of each of the plurality of address data based on the input data and a switching control signal;

address exchanging means for performing an exchanging operation including non-exchanging for transfer paths of a plurality of address data on the basis of an input data to be transformed, so as to provide each of the plurality of address data to the look-up table corresponding to the attribute of the address data to be provided, the address exchanging means varying a mode of exchanging depending upon a result of operation of the logical operation means;

data exchanging means for performing an exchanging operation including non-exchanging for transfer paths for transferring data output from the plurality of look-up tables with respect to the address data provided by the address exchanging means so as to establish correspondence of the data output to an interpolating coefficient corresponding to the address data provided for outputting of the data output, the data exchanging means varying a mode of exchanging depending upon the result of operation of the logic operation means; and interpolation means for performing interpolation calculation on the basis of the data output from the data exchanging means and the corresponding interpolation coefficient to output a transformed data.

In a fifth aspect of the present invention, there is provided a circuit board to be employed in a data transformation apparatus for performing a data transformation through an interpolating operation employing a plurality of look-up tables, the circuit board comprising:

an address generating circuit for generating a plurality of address data on the basis of an input data to be transformed;

a logical operation circuit for performing an exclusive logic operation of a signal data of a part of the input data and a switching control signal;

an address exchanging circuit for exchanging the plurality of address data by varying a mode of exchanging depending upon a result of operation of the logical operation circuit before the plurality of address data generated by the address generating means are applied to the plurality of look-up tables so that the address data is provided to the look-up tables corresponding to an attribute of the address data;

a data exchanging circuit for exchanging grid point data by varying a mode of exchanging depending upon a result of operation of the logical operation circuit with respect to respective grid point data output from the plurality of look-up tables so that a correspondence is established between the grid point data and an interpolation coefficient corresponding to the address data by which the grid point data is output;

an interpolating operation circuit for performing an interpolating operation on the basis of the grid point data output by the data exchanging circuit; and a terminal for inputting switching control data for sequentially varying the switching control signal so as to sequentially perform a plurality of kinds of data transformation.

In a sixth aspect of the present invention, there is provided a data transformation apparatus for performing a data transformation through an interpolating operation by employing a plurality of look-up tables, the apparatus comprising:

means for switching look-up table to be used for data transformation by a switching control signal.

In a seventh aspect of the present invention, there is provided a data transformation apparatus for performing a data transformation through an interpolating operation by employing a plurality of look-up tables, the apparatus comprising:

address generating means for generating address data corresponding to each of the plurality of look-up tables, on the basis of a part of an input data to be transformed;

address exchanging means for determining the look-up tables respectively corresponding to a plurality of address data generated by the address generating means on the basis of a residue obtained when a division of a sum of the address data generated by the address generating means and a switching control signal by a number of kinds of data transformation to be switched by the switching control signal, is performed; and interpolation means for performing an exchange between data output from respective ones of a plurality of look-up tables on the basis of respective addresses determined by the address exchanging means, in symmetry to address exchange by the address exchanging means, and performing an interpolation on the basis of a combination of the data and an interpolation coefficient.

In an eighth aspect of the present invention, there is provided an image forming system for forming an image on the basis of data transformed by a data transformation apparatus, the system comprising:

the data transformation apparatus for performing a data transformation through an interpolating operation employing a plurality of look-up tables, the apparatus including:

address generating means for generating a plurality of address data on the basis of an input data to be transformed;

logical operation means for performing an exclusive logic operation of a signal indicative of an attribute of each of the plurality of address data based on the input data and a switching control signal;

address exchanging means for performing an exchanging operation including non-exchanging for transfer paths of a plurality of address data on the basis of an input data to be transformed, so as to provide each of a plurality of address data to one of a plurality of regions of each of the plurality of look-up tables, the one of regions corresponding to the attribute of the address data to be provided, the address exchanging means varying a mode of exchanging depending upon a result of operation of the logical operation means;

data exchanging means for performing an exchanging operation including non-exchanging for transfer paths for transferring data output from the plurality of look-up tables with respect to the address data provided by the address exchanging means so as to establish correspondence of the data output to an interpolating coefficient corresponding to the address data provided for outputting of the data output, the data exchanging means varying a mode of exchanging depending upon the result of operation of the logic operation means;

interpolation means for performing an interpolation calculation on the basis of the data output from the data exchanging means and the corresponding interpolation coefficient to output a transformed data;

switching control means for varying the switching control signal to vary the region to which an address exchanging means provides address data; and control means for sequentially performing a plurality of kinds of data transformation by controlling the switching control means depending upon the operation of the image forming system to sequentially vary the switching control signal.

In a ninth aspect of the present invention, there is provided a data storage method for storing a table data in a plurality of look-up tables, the method comprising the steps of:

generating address data for data to be stored in the plurality of look-up tables;

determining the look-up table corresponding to the address data generated on the basis of the generated address data and a number of kinds of data to be stored; and storing the table data into the determined look-up table.

The above and other objects, effects, features and advantages of the present invention will become more apparent from the following description of the embodiments thereof taken in conjunction with the accompanying drawings.

BRIEF DESCRIPTION OF THE DRAWINGS

The present invention is understood more fully from the detailed description given herebelow and from the accompanying drawings of the preferred embodiment of the invention, which, however, should not be taken to be limitative to the present invention, but are for explanation and understanding only.

In the drawings:

FIGS. 16A and 16B are flowcharts showing process of an access region switching and an image output control associating therewith in a thirteenth embodiment of a data transformation apparatus according to the present invention;

FIG. 17 is a timing chart of various signals in the control process of FIG. 16;

FIGS. 19A and 19B are flowcharts showing a process of an access region switching and an image output control associated therewith in a fourteenth embodiment of a data transformation apparatus according to the present invention;

FIGS. 28A and 28B are flowcharts showing a process of an access region switching and an image output control associated therewith in a seventeenth embodiment of a data transformation apparatus according to the present invention;

FIGS. 35A and 35B are flowcharts showing processes of an access region switching and an image output control associated therewith in a nineteenth embodiment of a data transformation apparatus according to the present invention;

FIGS. 43A, 43B, 43C and 43D are explanatory illustrations illustrating address change in the embodiment of FIG. 42;

FIG. 44 is an explanatory illustration showing a relationship between access regions of respective LUTs and switching control signals in the embodiment of FIG. 42;

FIGS. 48A, 48B, 48C and 48D are explanatory illustrations illustrating address change in the embodiment of FIG. 47;

FIG. 51 is an explanatory illustration showing a relationship between access regions of respective LUTs and switching control signals in the embodiment of FIG. 50;

FIG. 54 is an explanatory illustration showing a relationship between access regions of respective LUTs and switching control signals in the embodiment of FIG. 53;

FIG. 65 is an explanatory illustration showing a relationship between access regions of respective LUTs and switching control signals in the embodiment of FIG. 64;

FIGS. 67A and 67B are flowcharts showing a process of an access region switching and an image output control associated therewith in a thirty-eighth embodiment of a data transformation apparatus according to the present invention;

FIGS. 70A and 70B are flowcharts showing a process of an access region switching and an image output control associated therewith in a thirty-ninth embodiment of a data transformation apparatus according to the present invention;

FIGS. 72A and 72B are flowcharts showing a process of an access region switching and an image output control associated therewith in a fortieth embodiment of a data transformation apparatus according to the present invention;

FIGS. 74A and 74B are flowcharts showing a process of an access region switching and an image output control associated therewith in a forty-first embodiment of a data transformation apparatus according to the present invention;

DESCRIPTION OF THE PREFERRED EMBODIMENT

The present invention is discussed in detail hereinafter in terms of preferred embodiments with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to not unnecessarily obscure the present invention.

(FIRST EMBODIMENT)

Figure 3:
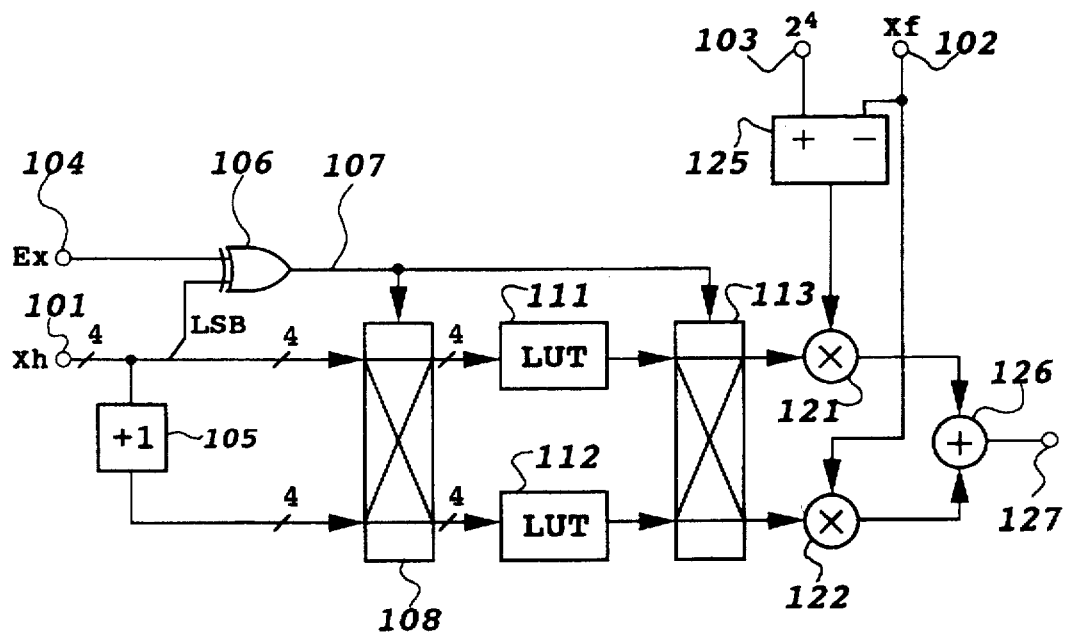
FIG. 3 is a block diagram showing a construction of a first embodiment of a data transformation apparatus according to the present invention.

FIG. 3 is a block diagram showing a construction of a first embodiment of a data transformation apparatus according to the present invention.

The shown embodiment is not adapted to transform R, G, B of three-dimensional signal, but is for transforming a one-dimensional 8 bit signal Xi (=Xh $2^4$+Xf, Xh is the upper four bits and Xf is the lower four bits) into another signal, and thus shows one of the simplest construction. When a grid point data designated by the upper four bit signal Xh is assumed as D(Xh) and a transformed data after interpolation is assumed as $H_2$(Xi), an interpolating calculation in the shown embodiment is a one-dimensional two points interpolation and thus can be expressed by:

$$H_2(Xi)=2^{-4} \cdot \{(2^4-Xf) \cdot D(Xh)+Xf \cdot D(Xh+1)\} \quad (2)$$

In FIG. 3, a reference numeral 101 denotes a terminal for inputting the upper bit signal Xh, a reference numeral 102 denotes a terminal for inputting the lower bit signal Xf, and a reference numeral 103 denotes a terminal for inputting a signal indicating a value of 24. Reference numeral 104 denotes a terminal for inputting a control signal Ex for switching two kinds of tables discussed later. A reference numeral 105 denote an adder for adding "1" to the upper bit signal Xh, a reference numeral 106 denotes an exclusive OR element (hereinafter referred to as EXOR element), and a reference numeral 107 denotes a switching control signal as output of the EXOR element 106.

A reference numeral 108 denotes an address exchanger of the first embodiment of the present invention, reference numerals 111 and 112 denote look-up tables (LUTs) for outputting a grid point data corresponding to an address from the address exchanger 108, a reference numeral 113 denotes a data exchanger for exchanging a transfer path of grid point data output from LUTs 111 and 112.

The output from the data exchanger 113 is supplied for an interpolating calculation in a following construction. Reference numerals, 121 and 122 denote multipliers, a reference numeral 125 denotes a subtracter, a reference numeral 126 denotes an adder, and a reference numeral 127 denotes a terminal for outputting a transformed data $H_2$ (Xi).

Figure 4A:
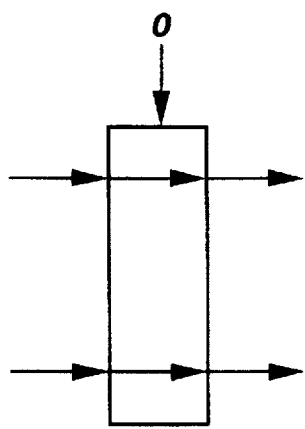
FIGS. 4A and 4B are diagrammatic illustrations showing an operational concept of a changer for an address, data and so forth to be employed in embodiments of the data transformation apparatus according to the present invention.
Figure 4B:
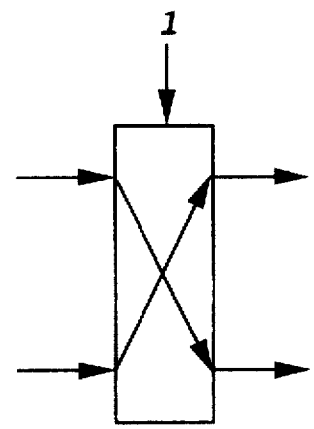

FIGS. 4A and 4B are diagrammatic illustrations showing a concept of operation in the address exchanger 108 and the data exchanger 113 shown in FIG. 3.

More specifically, when a control signal 107 indicates "0", as shown in FIG. 4A, a signal input to an upper stage is output from the upper stage and a signal input to a lower stage is output from the lower stage. Therefore, at this condition, a signal is not exchanged. In contrast, when the control signal 107 indicates "1", as shown in FIG. 4B, the signal input to the upper stage is output from the lower stage and the signal input to the lower stage is output from the upper stage. Therefore, in response to this condition, the signal is exchanged.

In further explanation, the operation of the address exchanger 108 and the data exchanger 113 is determined by an EXOR of a transformation table switching signal EX and a least significant bit (hereinafter referred to as "LSB") of the upper bit signal Xh, that is, determined by the output signal 107 from the EXOR 106. When the transformation table switching signal EX is "0" and the LSB of the upper bit signal Xh is also "0" (at this time, Xh indicates an even number), the output signal 107 becomes "0". Therefore, exchanging of the signals of the address exchanger 108 and the data exchanger 113 is not performed. Accordingly, the upper bit signal Xn indicating an even number and being input through the terminal 101 is supplied for the LUT 111 as an address signal. On the other hand, a signal Xh+1 derived by adding "1" to the signal Xh by the adder 105 is supplied to the LUT 112 as an odd number address signal. By this, from the LUTs 111 and 112, data D(Xh) and D(Xh+1) are read out, respectively and passed through the data exchanger 113 as is. Then, the data D(Xh) is input to the multiplier 121 and the data D(Xh+1) is input to the multiplier 122. On the other hand, to a multiplier 121, a signal indicating ($2^4$-Xf) calculated by a subtracter 125 is input as a coefficient. On the other hand, the lower bit signal Xf of the input signal is input to a multiplier 122 as a coefficient.

Through the above, ($2^4$-Xf)·D(Xh) is calculated in the multiplier 121 and Xf·D(Xh+1) is calculated in the multiplier 122. The results of calculations are added to each other by an adder 126 to be output from the terminal 127 as truncated or rounded values. This output becomes the result of calculation of the foregoing equation (2).

Next, when the LSB of the upper bit signal Xh indicates "1" and the transformation table switching signal EX indicates "0" (in this case, Xh indicates odd number), the control signal or the output signal 107 becomes "1". Therefore, in the address exchanger 108 and the data exchanger 113, signal exchanging as illustrated in FIG. 4B is performed. Accordingly, the signal Xn of an odd number input through the terminal 101 is exchanged by the address exchanger 108 to be supplied to the LUT 112. In contrast, an even number address derived by adding "1" to the upper bit signal Xh by the adder 105 is supplied to the LUT 111. By this, the data D(Xh) is read out from the LUT 112 and the data D(Xh+1) is read out from the LUT 111. The data D(Xh) read out from the LUT 112 is exchanged by the data exchanger 113 to be input to the multiplier 121. On the other hand, the data D(Xh+1) as read out from the LUT 111 is input to the multiplier 122. The subsequent process is the same as the foregoing case (in the case where the LSB of the upper bit signal Xh is "0").

As is clear from the discussion for the above-mentioned two cases, only an even number address is given to the LUT 111 and only an odd number address is given to the LUT 112. Accordingly, in the case that the transformation table switching signal EX is set to "0", the LUT 111 is used as the table only for the even number addresses and the LUT 112 is used as the table only for the odd number addresses.

The data transformation system shown in FIG. 3 is adapted for two point interpolation, in this case, similarly to the prior art, mutually identical contents of two LUT are employed. In addition, each of the two LUTs is provided the same memory capacity as that of the LUT to be employed in the conventional construction. According to the embodiment, respective LUTs are specifically used only for the odd number addresses and only for the even number addresses. Therefore, even when the memory capacity of respective LUTs are the same as those in the conventional construction, corresponding to the addresses of respective LUTs which are not accessed, another characteristic of grid point data is stored so that, by setting the transformation table switching signal EX to "1", another characteristic of data transformation is performed as described later with respect to FIG. 16 and subsequent drawings.

When the transformation table switching signal EX is set to "1", in the above-mentioned two cases, (i.e. the case where the transformation table switching signal EX indicates "0" and the LSB of Xh indicates "0" or "1"), the control signal 107 for the address exchanger 108 and the data exchanger 113 are inverted. Therefore, for the LUT 111, only odd number addresses are given, and for the LUT 112, only even number addresses are given to perform the foregoing data transformation process.

(SECOND EMBODIMENT)

Figure 5:
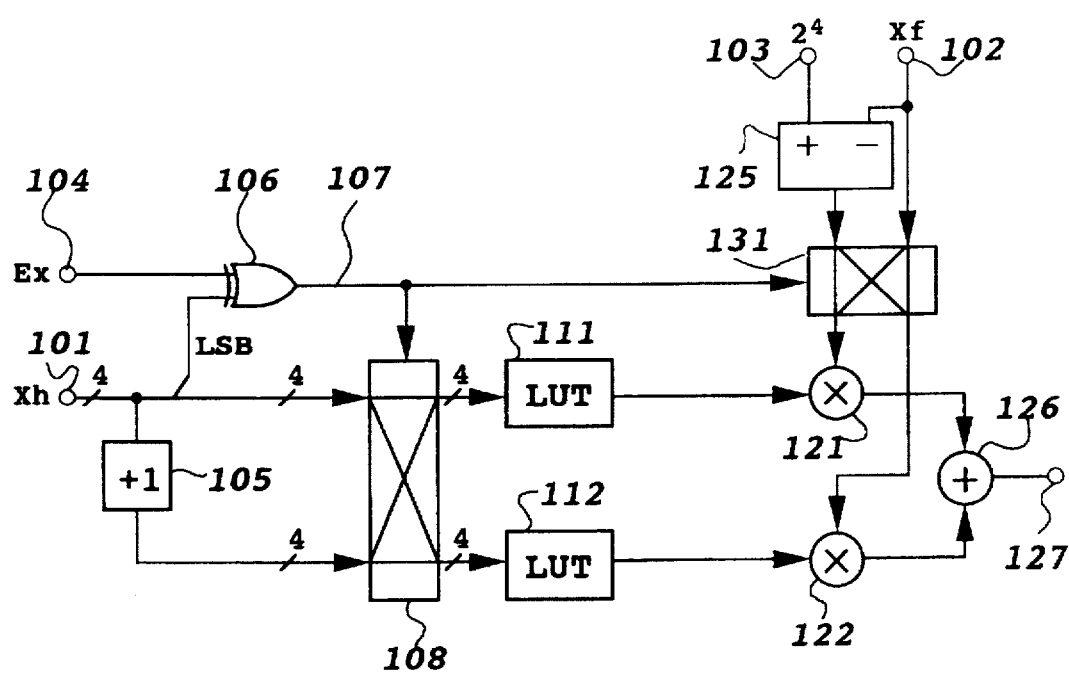
FIG. 5 is a block diagram showing a construction of a second embodiment of a data transformation apparatus according to the present invention.

FIG. 5 is a block diagram showing a construction of a second embodiment of a data transformation apparatus according to the present invention.

The difference of the shown embodiment with respect to the foregoing first embodiment is that a multiplying coefficient exchanger 131 is employed in place of the data exchanger 113.

The multiplying coefficient exchanger 131 performs the similar function to those of the address exchanger or the data exchanger in the foregoing first embodiment. Therefore, the multiplying coefficient exchanger 131 provides a coefficient Xf and (24-Xf) i to the multiplier 121 or the multiplier 122 in accordance with "0" or "1" indicated by the control signal 107. By this, if the data exchanger 113 is removed in the foregoing first embodiment, it is possible to cause an offset of correspondence between the multiplied value and the multiplying value (multiplying coefficient). However, by providing the multiplying coefficient exchanger 131, such offset is avoided to permit an identical data transformation to the first embodiment.

(THIRD EMBODIMENT)

Figure 6:
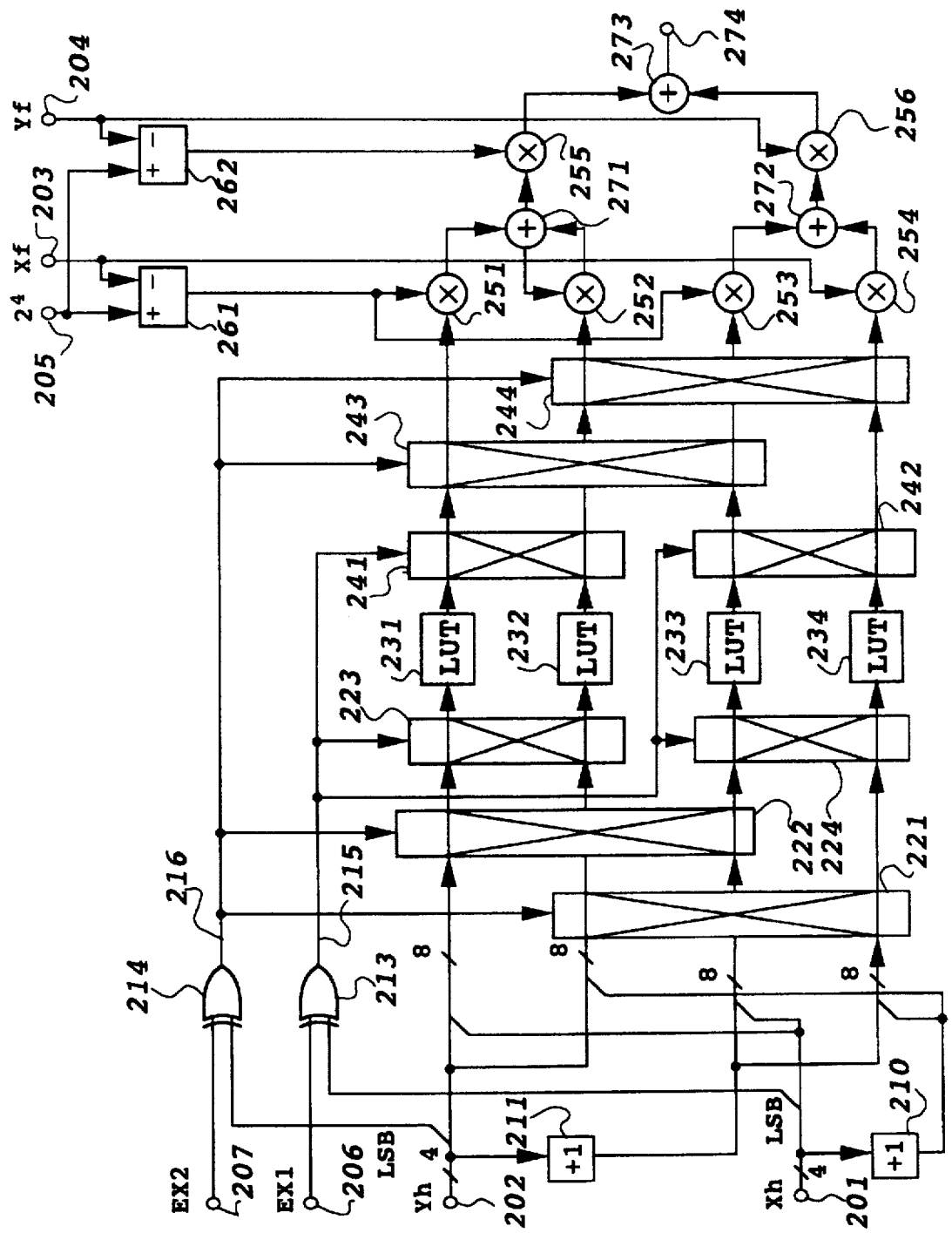
FIG. 6 is a block diagram showing a construction of a third embodiment of a data transformation apparatus according to the present invention.

FIG. 6 is a block diagram showing a construction of a third embodiment of a data transformation apparatus according to the present invention.

The shown embodiments constructed to perform a data transformation process by a four point interpolation in a two dimensional interpolation space in a data transformation of two input data. More specifically, since four grid point data are employed for the interpolating operation, four LUTs are employed as discussed with respect to the related art. In the conventional construction of the data transformation system, only one kind of data transformation is possible with employing four LUTs. In contrast to this, according to the shown embodiment, with the construction discussed later, four kinds of data transformation become possible.

When input data defining two-dimensional input space are assumed to be Xi=Xh $2^4$+Xf and Yi=Yh·24+Yf (here Xh and Yh are upper 4 bits and Xf and Yf are lower 4 bits), and the transformed data after interpolation process is assumed to be H3 (Xi, Yi), the $H_3$ (Xi, Yi) is derived from the following interpolating operation.

$$H_3(Xi,Yi) = 2^{-8} \cdot [(2^4 - Yf)\{(2^4 - Xf) \cdot D(Xh,Yh) + Xf \cdot D(Xh+1,Yh)\} + Yf \cdot \{(2^4 - Xf) \cdot D(Xh,Yh+1) + Xf \cdot D(Xh+1,Yh+1)\}] \quad (3)$$

In FIG. 6, reference numerals 201 and 202 denote terminals for inputting upper bit signals Xh and Yh, respectively, reference numerals 203 and 204 denote terminals for inputting lower bit signals Xf and Yf respectively, and reference numerals 206 and 207 denote terminals for inputting control signals EX1 and EX2 for switching four transformation tables in respective LUTs.

Reference numerals 210 and 211 denote adders for adding "1" for the upper bit signals Xh and Yh respectively, reference numerals 213 and 214 denote EXOR elements having input of LSBs of the upper bit signals Xh and Yh and of the control signals EX1 and EX2, respectively, and reference numerals 215 and 216 denote output signals of the EXOR elements 213 and 214, respectively. Reference numerals 221 to 224 denote address exchangers having functions shown in FIGS. 4A and 4B, reference numerals 241 to 244 are data exchangers having similar functions, and reference numerals 231 to 234 denote LUTs each of which outputs the grid point data. Reference numerals 251 to 256 denote multipliers performing multiplication of the signals output from the foregoing data exchangers, and output from subtracters discussed later or the signals Xf and Yf, reference numerals 261 and 262 denote a subtracter for subtracting Xf, Yf from 24, reference numerals 271 to 273 denote adders, and a reference numeral 274 denotes a terminal for outputting the transformed data H3 (Xi, Yi).

The address exchangers 221 to 224 and the data exchangers 241 to 244 perform the operation shown in the foregoing FIGS. 4A and 4B. The operation of the address exchangers 221 to 224 and the data exchangers are controlled by an EXOR of the transformation table switching signals EX1, EX2 and LSBs of the upper bit signals Xh and Yh, respectively, namely the control signals 215 and 216.

At first, a discussion is given for the case where both of the transformation table switching signals EX1 and EX2 indicate "0" and LSBs of both of the upper bit signals Xh and Yh indicate "0" (At this time, signals Xh indicate even numbers, respectively).

In this case, since both of the control signals 215 and 216 as the outputs of the EXOR elements become "0", exchanging of signals (operation shown in FIG. 4B) in the address exchangers 221 to 224 and the data exchangers 241 to 244 is not performed. Accordingly, the even number signals Xh and Yh input through the terminals 201 and 202 are coupled into 8 bits and then applied to the LUT 231 as is. It should be noted that upon mutually coupling the upper bit signals Xh and Yh, Xh may be either the upper or lower bits. In the shown embodiment, it is assumed that Xh forms the upper four bits and Yh forms the lower four bits.

On the other hand, an 8 bit signal derived by coupling Xh+1 which is obtained by adding "1" to the upper bit signal Xh by the adder 210, and Yh, is supplied to the LUT 232 as is. On the other hand, an 8 bit signal derived by coupling Yh+1 which is obtained by adding "1" to the upper bit signal Yh by the adder 211, and Xh, is supplied to the LUT 233 as is. Furthermore, an 8 bit signal derived by coupling Xh+1 and Yh+1, is supplied to the LUT 234 as is. By this, respective grid point data D(Xh, Yh), D(Xh+1, Yh), D(Xh, Yh+1) and D(Xh+1, Yh+1) are read out from the LUTs 231 to 234 and fed to the multipliers 251 to 254, respectively.

The multipliers 251 and 253 receive an input of $(2^4-Xf)$ calculated by the subtracter 261 as a coefficient, to the multipliers 252 and 254, Xf is input as a coefficient. Also, to the multiplier 255, the signal of $(2^4-Yf)$ calculated by the subtracter 262 is input as a coefficient, and to the multiplier 256, the signal Yf is input as a coefficient. Accordingly, in the multiplier 251, a calculation is performed for $(2^4-Xf) \cdot D(Xh, Yh)$, in the multiplier 252, calculation is performed for $Xf \cdot D(Xh+1, Yh)$, in the multiplier 253, a calculation is performed for $(24-Xf) \cdot D(Xh, Yh+1)$, in the multiplier 254, a calculation is performed for $Xf \cdot D(Xh+1, Yh+1)$. The outputs of the multipliers 251 and 252 are added by an adder 271 and the outputs of the multipliers 253 and 254 are added by an adder 272. The resultant sums of the adders 271 and 272 are respectively supplied to next multipliers 255 and 256. In the multiplier 255, a calculation of $(24-Yf)\{(24-Xf) \cdot D(Xh, Yh)+Xf \cdot D(Xh+1, Yh)\}$ is performed and in the multiplier 256, a calculation of $Yf\{(24-Xf) \cdot D(Xh, Yh+1)+Xf \cdot D(Xh+1, Yh+1))$ are performed. The results are fed to an adder 273 and added therein to be output from the terminal 274 with truncating or rounding the lower 8 bits. From the above, the calculation according to the foregoing equation (3) is performed.

It should be noted the 8 bit address after coupling to be applied to each LUT consists of an upper 4 bits (Xh or Yh+1) and a lower 4 bits (Yh or Yh+1). In the following discussion, the state of the 8 bit address may be expressed in the manner that when the upper 4 bits are an even number and the lower 4 bits are an odd number, the state is [Even, Odd]. Thus, those states of input addresses of the LUTs 231 to 234 are respectively [Even, Even], [Odd Even], [Even, Odd] and [Odd, Odd].

Next, discussion is given for the case, where only the LSB of the upper bit signal Xh becomes "1" from the state set forth above (at this time, the signal Xh indicates an odd number and the signal Yh indicates an even number).

In this case, since the signal 215 becomes "1", the signal exchanging (the operation shown in FIG. 4B) is performed in the address exchangers 223 and 234 and the data exchanger 241 and 242. In such case that exchanging of the address signal is performed only in the address exchangers 223 and 224, among the coupled 8 bit signal, the 8 bit signal having the even number lower 4 bit signal Yh is input to the LUTs 231 or 232, and the 8 bit signal having the odd number lower 4 bit signal Yh+1 derived by adding "1" to Yh is supplied to the LUTs 233 or 234. On the other hand, in the coupled 8 bit signal, the 8 bit signal having the odd number upper 4 bit signal Xh is exchanged by the address exchanger 223 of 224 and applied to the LUTs 232 or 234. The 8 bit signal having the even number upper bit signal (Xh+1) derived by adding "1" to the signal Xh by the adder 210 is applied to the LUTs 231 or 233.

Depending upon the inputs of the foregoing address signals, respective grid point data D(Xh+1, Yh), D(Xh, Yh), D(Xh+1, Yh+1) and D(Xh, Yh+1) are read out from the LUTs 231 to 234. These grid point data are exchanged by the data exchanger 241 or 242 so that the data D(Xh+1, Yh) is applied to the multiplier 252, the data D(Xh, Yh) is applied to the multiplier 251, the data D(Xh+1, Yh+1) is applied to the multiplier 254, and the data D(Xh, Yh+1) is applied to the multiplier 253. The positional relationship between the grid point data input to respective multipliers is the same as that where the LSB of the signal Xh is "0", therefore. The subsequent process is the same as the foregoing case where the LSB is from the signal Xh.

As is clear from the above, in the foregoing two cases (the LSBs of the upper bit signal Xh is "0" or "1"), the address state in respective ones of the LUTs 231 to 234 becomes [Even, Even], [Odd Even], [Even, Odd] and [Odd, Odd], respectively. This address state is the same in the case where the LSB of the signal Yh is "1" Therefore, the address state is unchanged while the combination of the indications of the switching control signals EX1 and EX2 is held unchanged.

Accordingly, in the foregoing transformation where the control signals EX1 and EX2 are set at "0", respectively ¼ regions of the respective LUTs are used. The remaining ¾ region is accessed by varying the combination of the control signals EX1 and EX2. The following are the address states given for the LUTs 231 to 234 depending upon combinations of the control signals EX1 and EX2.

EX1=0, EX2=0 [Even, Even], [Odd, Even], [Even, Odd], [Odd, Odd]

EX1=1, EX2=0 [Odd, Even], [Even, Even], [Odd, Odd], [Even, Odd]

EX1=0, EX2=1 [Even, Odd], [Odd, Odd], [Even, Even], [Odd, Even]

EX1=1, EX2=1 [Odd, Odd], [Even, Odd], [Odd, Even], [Even, Even]

Thus, by storing independent transformation table data for the regions to be accessed for respective combinations of the values of signals EX1 and EX2 in respective ones of the LUTs 231 to 234, four kinds of different data transformation are realized. These different kinds of data transformation are discussed in detail with respect to FIG. 16 and subsequent drawings.

(FOURTH EMBODIMENT)

Figure 7:
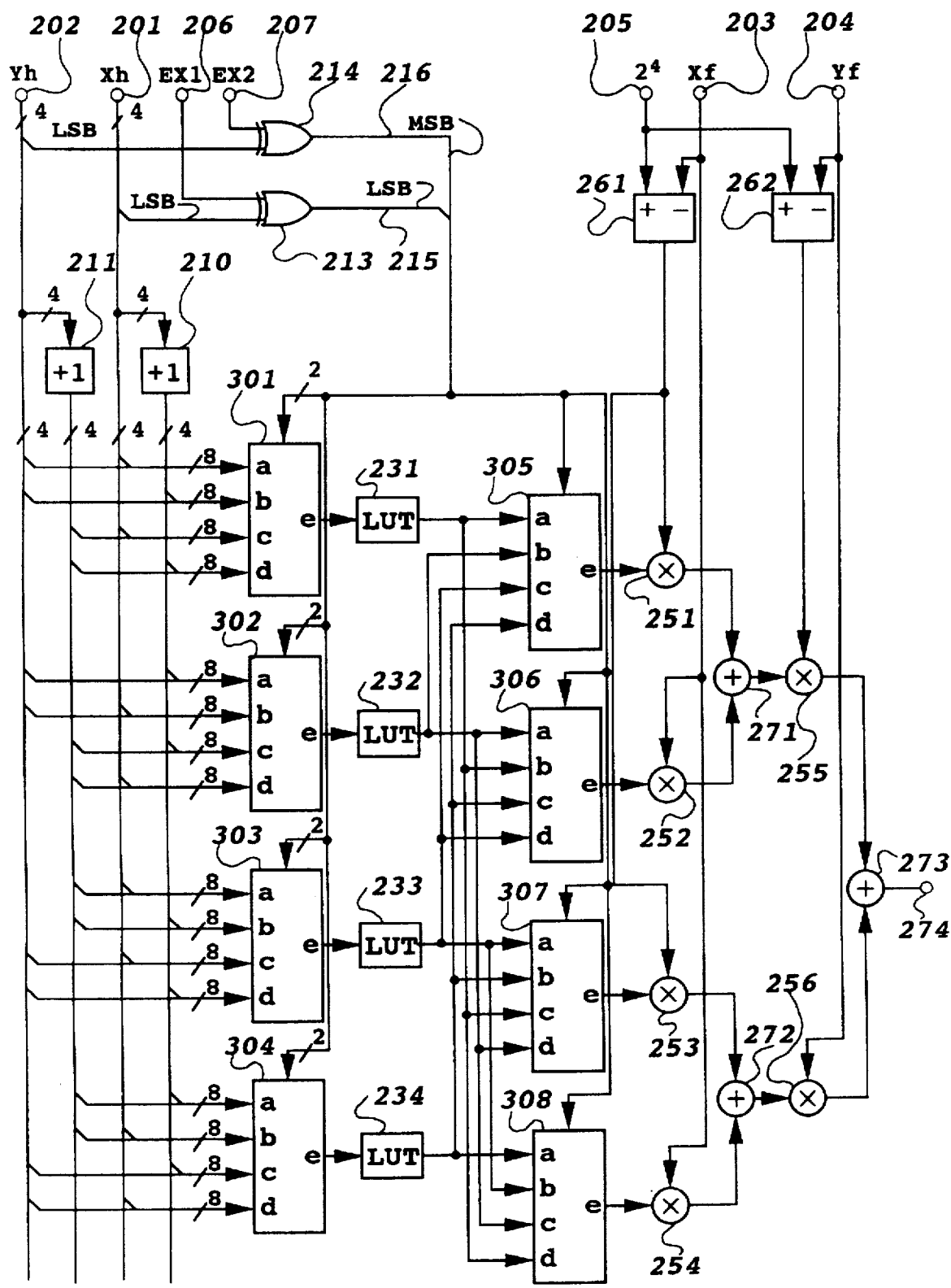
FIG. 7 is a block diagram showing a construction of a fourth embodiment of a data transformation apparatus according to the present invention.

FIG. 7 is a block diagram showing a construction of the fourth embodiment of a data transforming apparatus according to the present invention.

The difference between the shown embodiment of the foregoing third embodiment is that a plurality of bit widths of 4 inputs and one output selectors 301 to 308 are provided in place of the address exchangers 221 to 224 and the data exchangers 241 to 244.

Respective selectors are controlled by control signals 216 and 215. When the control signals 215 and 216 are "00", input a is selected. When the control signals 215 and 216 are "01", input b is selected. When the control signals 215 and 216 are "10", input c is selected. When the control signals 215 and 216 are "11", input d is selected. The input through one of the inputs a to d is output through e output. For example, when EX=1 and EX2=0, and upper bit signals Xh and Yh both indicate even number (LSB is 0), input a is selected. By this, for example, in the LUT 231, address of [Even, Even] is accessed. Similarly, in the LUT 232, [Odd, Even]; and in the LUT 234, [Odd, Odd]are accessed respectively.

As set forth above, the function of the four selectors 301 to 304 is substantially the same as that of the address exchangers 221 to 224 in the third embodiment. Also, similarly, it should be obvious that the functions of the selectors 305 to 308 are substantially the same as those of the data exchangers 241 to 244 in the third embodiment. Accordingly, in the shown embodiment, similarly to the foregoing third embodiment, four kinds of data transformation are realized.

(FIFTH EMBODIMENT)

Figure 8:
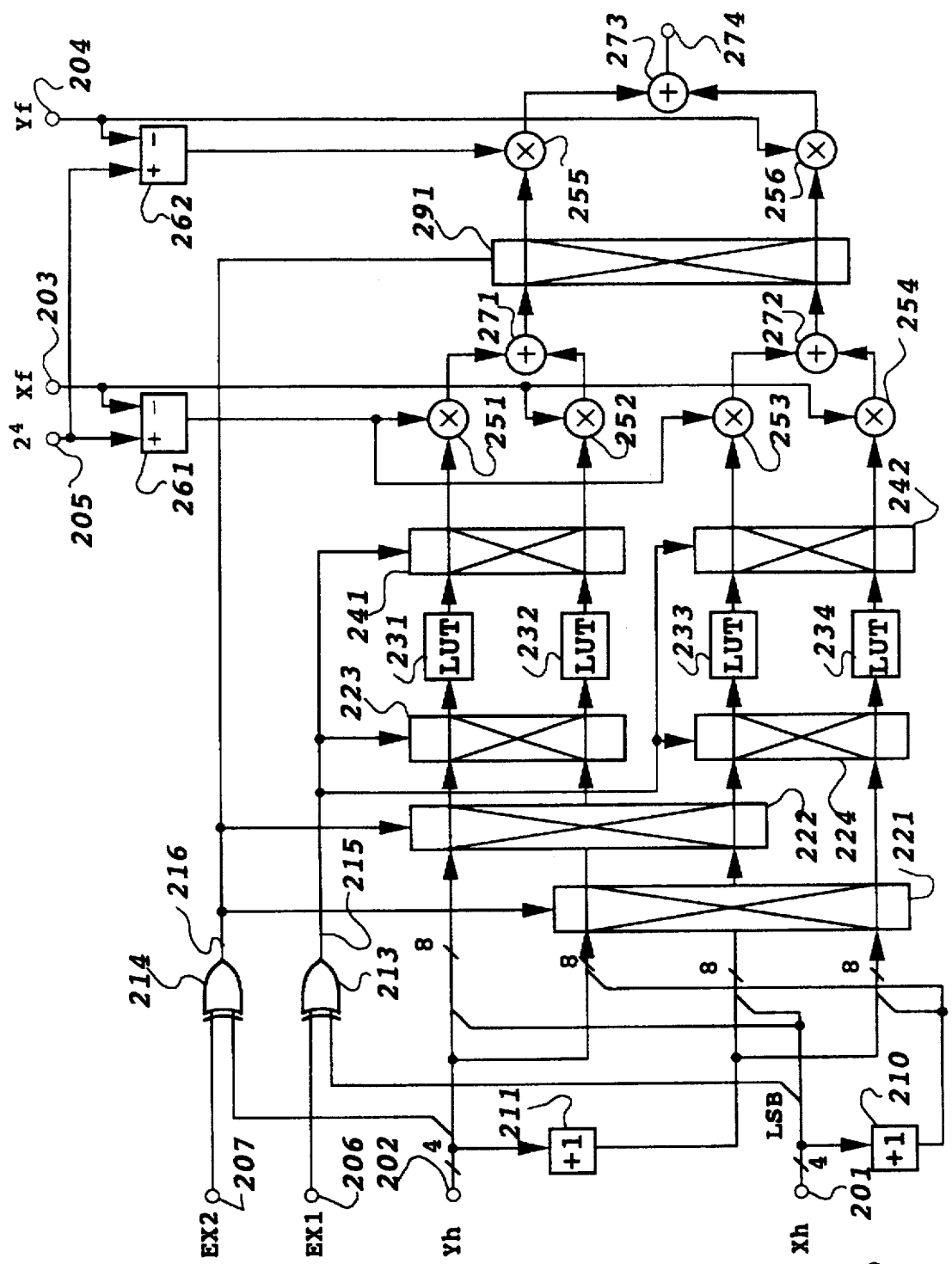
FIG. 8 is a block diagram showing a construction of a fifth embodiment of a data transformation apparatus according to the present invention.

FIG. 8 is a block diagram showing a construction of the fifth embodiment of the data transformation apparatus according to the present invention.

In the shown embodiment, two data exchangers 243 and 244 in the foregoing third embodiment of FIG. 6 are replaced with a single data exchanger 291. In this case, the data exchanger 291 is arranged at a different position to that of the data exchangers 243 and 244. Namely, the data exchanger 291 is arranged at the output side of the adders 271 and 272.

By this, the functions of the data exchangers 243 and 244 in the third embodiment are performed by the single data exchanger 291.

Accordingly, even in the shown embodiment, a data transformation function comparable with the foregoing third embodiment is performed, and thus a mutually distinct four data transformation is realized.

(SIXTH EMBODIMENT)

Figure 9:
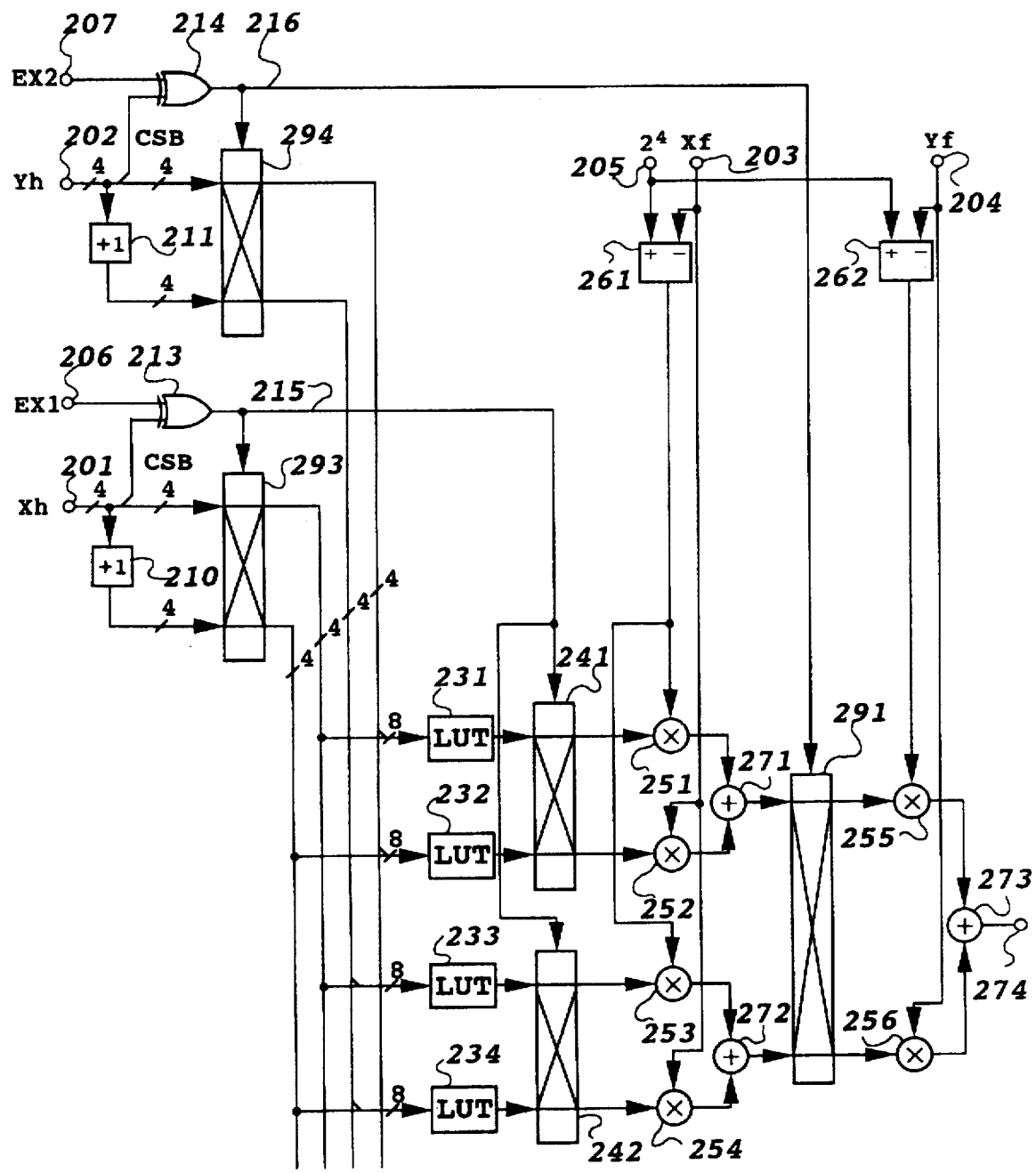
FIG. 9 is a block diagram showing a construction of a sixth embodiment of a data transformation apparatus according to the present invention.

FIG. 9 is a block diagram showing a construction of the sixth embodiment of a data transformation apparatus according to the present invention.

The shown embodiment is adapted to reduce the size of the hardware by replacing the four address exchangers 221 to 224 in the fifth embodiment with two address exchangers 293 and 294. More specifically, in the shown embodiment, address exchange is performed before composing or coupling the upper bit signals Xh and Yh. By this, while the bit width of each address exchanger in the fifth embodiment is 8 bits, the bit width of the address exchangers in the shown embodiment is 4 bits. As a result, in comparison with the foregoing fifth embodiment, the size of the hardware of the address exchanger is reduced to one fourth.

In this case, the address exchange function is comparable with that of the address exchangers of the foregoing fifth embodiment. Accordingly, even in the shown embodiment, four mutually distinct data transformation are realized. Such different kinds of data transformation are discussed with respect to FIG. 16 and subsequent drawings.

(SEVENTH EMBODIMENT)

Figure 10:
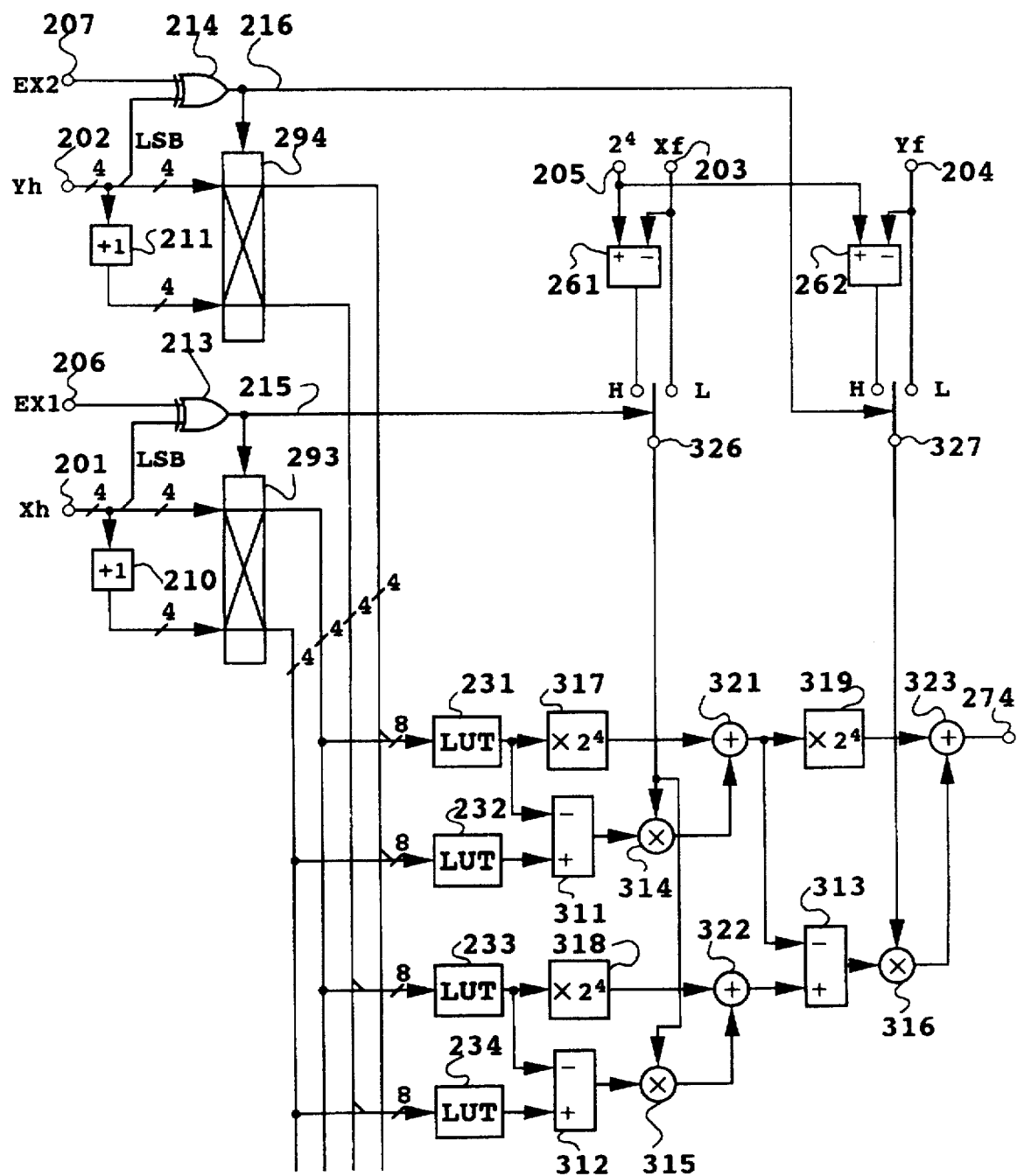
FIG. 10 is a block diagram showing a construction of a seventh embodiment of a data transformation apparatus according to the present invention.

FIG. 10 is a block diagram showing a construction of a seventh embodiment of a data transformation apparatus according to the present invention.

As shown in FIG. 10, in the shown embodiment, while the address exchangers 293 and 294 have the same function as the foregoing sixth embodiment is employed, the construction of arithmetic circuits subsequent to the outputs of the LUTs 231 to 234 are modified. More specifically, in the arithmetic circuits of the shown embodiment, instead of employing the data exchanger and the multiplying coefficient exchanger which is employed in the former embodiments, a selector for selecting the multiplying coefficient is employed.

The interpolating operation in the arithmetic circuit employing the selector is expressed by the following equation.

$$J_1 = 2^4 \cdot D(Xh,Yh) + Xf\{D(Xh+1,Yh) - D(Xh,Yh)\} \quad (4)$$

$$J_2 = 2^4 \cdot D(Xh,Yh+1) + Xf\{D(Xh+1,Yh+1) - D(Xh,Yh+1)\} \quad (5)$$

$$H_4(Xi,Yi) = 2^{-8} \cdot \{2^4 \cdot J_1 + Yf(J_2 - J_1)\} \quad (6)$$

$H_4(Xi, Yi)$ is calculated by the equations (4), (5) and (6) and is output at the terminal 274 shown in FIG. 10. It is easily confirmed that the interpolating calculating output $H_4$ (Xi, Yi) is equal to $H_3$ (Xi, Yi) in the equation (3).

The discussion of the construction for performing the calculation is discussed with reference to FIG. 10.

In FIG. 10, reference numerals 311 and 312 denote subtracters for obtaining difference of the two grid point data which are read out from pairs of two LUTs 231, 232 and 233, 234, respectively. The outputs of the subtracters 311 and 312 are multiplied by Xf or (24−Xf) selected by the selector 326 by the multipliers 314 and 315. Furthermore, the outputs of the multipliers 314 and 315 are added values derived by multiplying the outputs of the LUTs 231 and 233 by 24 respectively by the adders 321 and 322. The output of the adder 321 is subtracted from the output of the adder 322 by the subtractor 313 and the subtracted result is multiplied by Yf or ($2^4$−Yf) selected by the selector 327, by the multiplier 316. On the other hand, the output of the adder 321 is multiplied by a value of $2^4$ the multiplier 319. Then, the product is summed with the output of the multiplier 316 to be output from the terminal 274 as the result of the interpolating calculation.

In the foregoing third to sixth embodiments, by exchanging of the address to be supplied to the LUTs 231 to 234, even when the positional relationship of the read out grid point data is varied, the positional relationship of the grid point data input to the four multipliers 251 to 254 is held unchanged by the data exchange subsequent to variation of the positional relationship of the read out grid point data. Therefore, the arithmetic operation as expressed by the equation (3) is satisfactory.

However, in the shown embodiment, when the positional relationship of the grid point data read out from the LUT with address exchange, the multiplying coefficient to be selected by the selectors 326 and 327 for correction are varied to differentiate the arithmetic process.

For instance, when address exchange is effected for both of signals Xh and Yh, the arithmetic process becomes as follows:

$$J_1' = 2^4 \cdot D(Xh+1,Yh+1) + (2^4 - Xf)\{D(Xh, Yh+1) - D(Xh+1,Yh+1)\} \quad (7)$$

$$J_2' = 2^4 \cdot D(Xh+1,Yh) + (2^4 - Xf)\{D(Xh,Yh) - D(Xh+1,Yh)\} \quad (8)$$

$$H_4'(Xi,Yi) = 2^{-8} \cdot \{2^4 \cdot J_1 + (2^4 - Yf)(J_2 - J_1)\} \quad (9)$$

It should be noted that $J_1'$ in the equation (7) and $J_1$ in the equation (4) represent outputs of the adder 321, and $J_2'$ in the equation (8) and $J_2$ in the equation (5) represent outputs of the adder 322.

As set forth above, it should be easily confirmed that even when the outputs of the adders 321 and 322 are varied, the final output H4'(Xi, Yi) is the same as H4 (Xi, Yi) in the foregoing equation (3). Accordingly, even in the shown embodiment, the same data transformation process as those of the third to sixth embodiment are performed.

(EIGHTH EMBODIMENT)

Figure 11:
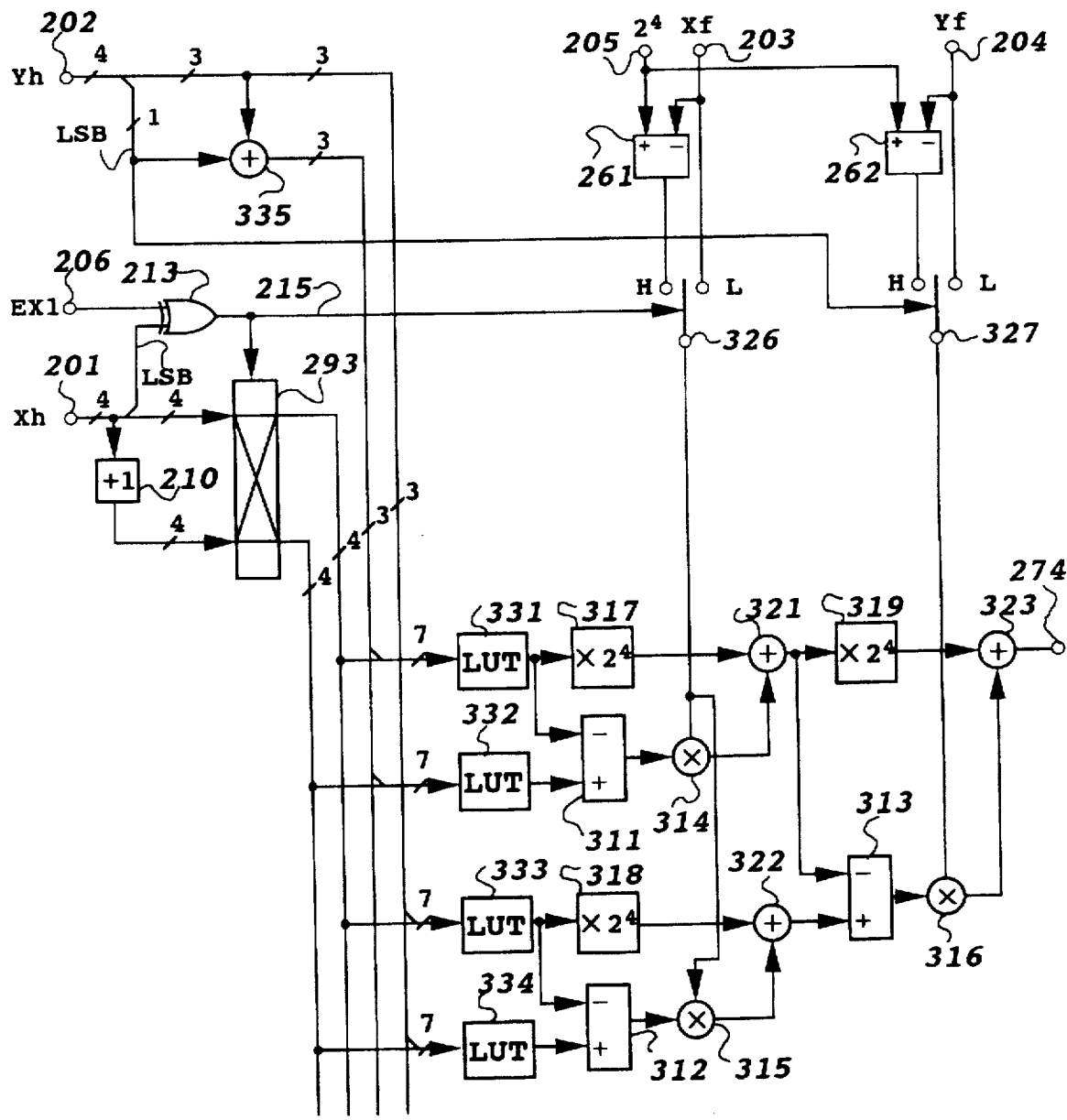
FIG. 11 is a block diagram showing a construction of an eighth embodiment of a data transformation apparatus according to the present mnvention.

FIG. 11 is a block diagram showing a construction of an eighth embodiment of a data transformation apparatus according to the present invention.

The third to seventh embodiments set forth above are directed to the construction having four LUTs and enable four mutually distinct data transformation by fixing an attribute of an address to be accessed in the respective LUTs. In contrast, the shown embodiment reduces the memory capacities of the four LUTs to be half to permit two kinds of data transformation.

In order to make the memory capacity of each LUT to be half, LUTs 331 and 332 only store the grid point data designated by the even number upper bit signal Yh and the LUTs 333 and 334 store only the grid point data designated by the odd number upper bit signal Yh. By this, the address inputs for respective ones of the LUTs 331 to 334 are reduced from 8 bits to 7 bits. The points where the shown embodiment is differentiated from the foregoing seventh embodiment is that four LUTs 331 to 334, each of which has the memory capacity in each element being half and an adder 335, and other elements having the same reference numerals are the same elements as in the construction of FIG. 10.

More specifically, the 4 bit signal Yh input through the terminal 202 is divided into an upper 3 bits and a lower 1 bit. The 3 bit signal and the 1 bit signal are added by an adder 335. The result of summing (3 bits) is coupled with the 4 bit signal Xh or Xh+1 to be supplied to the LUT 331 or 332. On the other hand, the upper 3 bits of the upper bit signal Yh is also coupled with signals Xh or Xh+1 as is and is provided to the LUTs 333 or 334. Other elements perform the same function as the foregoing seventh embodiment.

In the embodiments discussed above, when the address signal of Xh(4 bits) and Yh(4 bits) is applied to the LUT, the grid point data of D(Xh, Yh) is read out. However, in the shown embodiment, since the address signal to be applied to the LUT relating to Yh is reduced to 3 bits, the correspondence between the address to be input to the LUT and the grid point data to be read out is differentiated from that in the former embodiments.

The correspondence of the address and the grid point data in the shown embodiment is discussed hereinafter.

When the upper 3 bit signal of the Yh(4 bits) is expressed by Yh(3), in the case that the signal Yh indicates an even number, namely when the LSB of the signal Yh is "0", Yh(3) is input to all of the four LUTs. In the LUTs 331 and 332, with respect to the address of Xh, Yh(3), the grid point data of D(Xh, Yh) is read out, and in the LUTs 333, 334, with respect to the address of Xh, Yh(3), the grid point data of D(Xh, Yh+1) is read out. On the other hand, in the case that the signal Yh indicates the odd number, namely the LSB of the signal Yh is "1", for the LUTs 333 and 334, similarly to the above, Yh(3) is applied to read out the grid point data of D(Xh, Yh). However, for the LUTs 331 and 332, an address of Yh(3)+1 is applied. Then, grid point data of D(Xh, Yh+1) is read out. At this time, the signal Yh+1 indicates an even number.

Accordingly, when Xh=even number, Yh=even number and EX=0, respective of the data D(Xh, Yh), D(Xh+1, Yh), D(Xh, Yh+1) and D(Xh+1, Yh+1) are read out, and the signals Xf and Yf are selected by the selectors 326 and 327, respectively. By this, the arithmetic process shown in the foregoing equations (4), (5) and (6) are performed so that the result of the interpolating operation is output through the terminal 274.

On the other hand, when Xh=odd number, Yh=odd number and EX=0, respective of the data D(Xh+1, Yh+1), D(Xh, Yh+1), D(Xh+1, Yh) and D(Xh, Yh) are read out, and (24−Xf) and (24−Yf) are selected by the selectors 326 and 327, respectively. By this, the arithmetic process shown in the foregoing equations (7), (8) and (9) are performed so that the result of interpolating calculation is output through the terminal 274.

As set forth above, even in the shown embodiment the data transformation process similar to the foregoing third to seventh embodiments is performed. However, in this case, the kinds of data transformation to be performed is two.

It should be noted that while between the signals Xf and (2⁴−Xf) and between the signals Yf and (2⁴−Yf), switching is performed by the selector in the shown embodiment, such switching is realized by complement calculators (with through mode) for calculating the complement of 2. Here, when the signal Xf is necessary, complement calculators are set at the through mode, and when (24−Xf) is required, the complement calculators calculates the complement of 2. Such complement calculators for calculating the complement of 2 is known and is not discussed in detail.

(NINTH EMBODIMENT)

Figure 12:
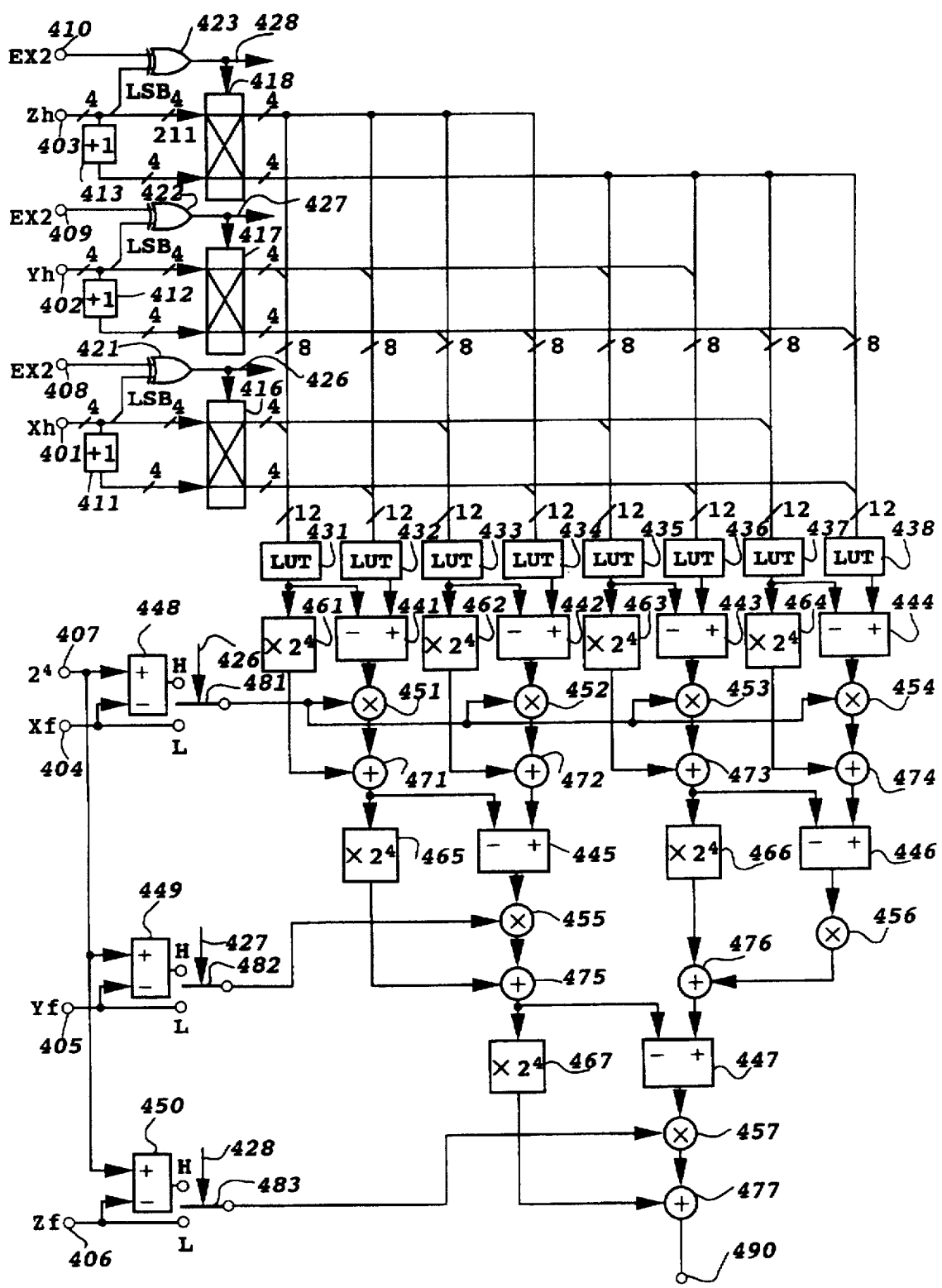
FIG. 12 is a block diagram showing a construction of a ninth embodiment of a data transformation apparatus according to the present invention.

FIG. 12 is a block diagram showing a construction of a ninth embodiment of a data transformation apparatus according to the present invention.

The shown embodiment is adapted to perform a data transformation process b performing an eight point interpolating calculation with respect to a three-dimensional input space. Namely, the interpolating calculation is performed by utilizing eight grid point data output from eight LUTs. In this case, while the data transformation for one kind of characteristic is possible while employing eight LUTs in the conventional construction, the shown embodiment enables eight mutually distinct data transformations to be performed.

For instance, assuming that a three-dimensional input data consisting of R, G, B signals are $Xi=Xh \cdot 2^4+Xf$, $Yi=Yh \cdot 2^4+Yf$, and $Zi=Zh \cdot 2^4+Zf$ (here Xh, Yh, Zh are upper 4 bits and Xf, Yf, Zf are lower 4 bits), and that the grid point data with respect to Xh, Yh and Zh is D(Xh, Yh, Zh), and the transformed data after the interpolation process is H5 (Xi, Yi, Zi), the following interpolating calculation is performed in the shown embodiment of the data transformation apparatus.

$$P_1 = 2^4 \cdot D(Xh, Yh, Zh) + Xf\{D(Xh+1, Yh, Zh) - D(Xh, Yh, Zh)\} \quad (10)$$

$$P_2 = 2^4 \cdot D(Xh, Yh+1, Zh) + Xf\{D(Xh+1, Yh+1, Zh) - D(Xh, Yh+1, Zh)\} \quad (11)$$

$$P_3 = 2^4 \cdot D(Xh, Yh, Zh+1) + Xf\{D(Xh+1, Yh, Zh+1) - D(Xh, Yh, Zh+1)\} \quad (12)$$

$$P_4 = 2^4 \cdot D(Xh, Yh+1, Zh+1) + Xf\{D(Xh+1, Yh+1, Zh+1) - D(Xh, Yh+1, Zh+1)\} \quad (13)$$

$$H_5(Xi, Yi, Zi) = 2^{-12}[2^4\{24 \cdot P_1 + Yf(P_2 - P_1)\} + Zf\{2^4 \cdot P_3 + Yf(P_4 - P_3) - 2^4 \cdot P_1 - Yf(P_2 - P_1)\}] \quad (14)$$

Namely, $H_5$ (Xi, Yi, Zi) is calculated on the basis of the equations (10) to (14) and is the result of the transformation in the shown embodiment.

The construction of the data transformation apparatus for performing the foregoing arithmetic operation is discussed with reference to FIG. 12.

In FIG. 12, reference numerals 401, 402 and 403 denote input terminals for inputting the respective upper bit signals Xh, Yh and Zh, reference numerals 404, 405 and 406 denote terminals for inputting the respective lower bit signals Xf, Yf and Zf, a reference numeral 407 denotes a terminal for inputting a signal indicative of $2^4$, and reference numerals 408, 409 and 410 denote terminals for inputting the respective control signals EX1, EX2 and EX3 for switching among eight kinds of transformation process. Also, reference numerals 411 to 413 denote adders for adding "1" to the respective of the upper bit signals Xh, Yh and Zh, reference numerals 416 to 418 denote address exchangers for exchanging paths of the upper bit signal and the signals derived by adding "1" to the upper bit signal, reference numerals 421 to 423 denote EXOR elements taking the switching control signals EX1, EX2 and EX3 and LSBs of the upper bit signals Xh, Yh and Zh, respectively, and reference numerals 426 to 428 denote control signals output from the EXOR elements for controlling the address exchangers.

Reference numerals 431 to 438 denote LUTs having address inputs of 12 bits. Reference numerals 441 to 450 denote subtracters, reference numerals 451 to 457 denote multipliers, reference numerals 461 to 467 denote shifter for performing 4 bit shifting corresponding to multiplication of $2^4$, reference numerals 471 to 477 denote adders, reference numerals 481 to 483 denote selectors, and 490 denotes a terminal for outputting the transformed data derived through the interpolating operation.

The shown embodiment has a construction extended for adapting for a three-dimensional space from the seventh embodiment discussed with respect to FIG. 10. In the overall constriction, the shown embodiment is differentiated from the foregoing seventh embodiment by the following points. Corresponding to the three-dimensional signal inputs, signals Zh and Zf are added. The kinds of transformation characteristics are increased from four to eight, and correspondingly thereto, the switching control signal EX3 is added. The LUT is increased from four to eight, and steps for unifying or coupling the two data into one data is increased from two steps to three steps. These differences are inherent in expansion of the input signal from a two-dimensional signal to the three-dimensional signal, and in essence, the operation in the shown embodiment is the same as that of the foregoing seventh embodiment.

More specifically, in the case that address exchange is not performed in the address exchangers 416 to 418, that is, all of the signals 426 to 428 indicate "0", and $P_1$ to $P_4$ shown in the foregoing equations (10) to (13) are output from the adders 471 to 474, respectively and transformed data (Xi, Yi, Zi) is output from the terminal 490 through arithmetic operation of the equation (14) in the subsequent arithmetic circuit.

On the other hand, when even one of the address exchangers 416 to 418 performs address exchange, the values to be output from the adders 471 to 474 become different from the foregoing $P_1$ to $P_4$. However, as discussed with respect to the seventh embodiment, the equation for deriving the transformed data to be output from the terminal is uniform. More specifically, while the equations in the intermediate process is differentiated by address exchange, the arithmetic process for final output is held unchanged. This is true when the transformation process for the other characteristics among eight mutually distinct characteristics is performed by varying the values of the signals EX1, EX2 and EX3.

(TENTH EMBODIMENT)

Figure 13:
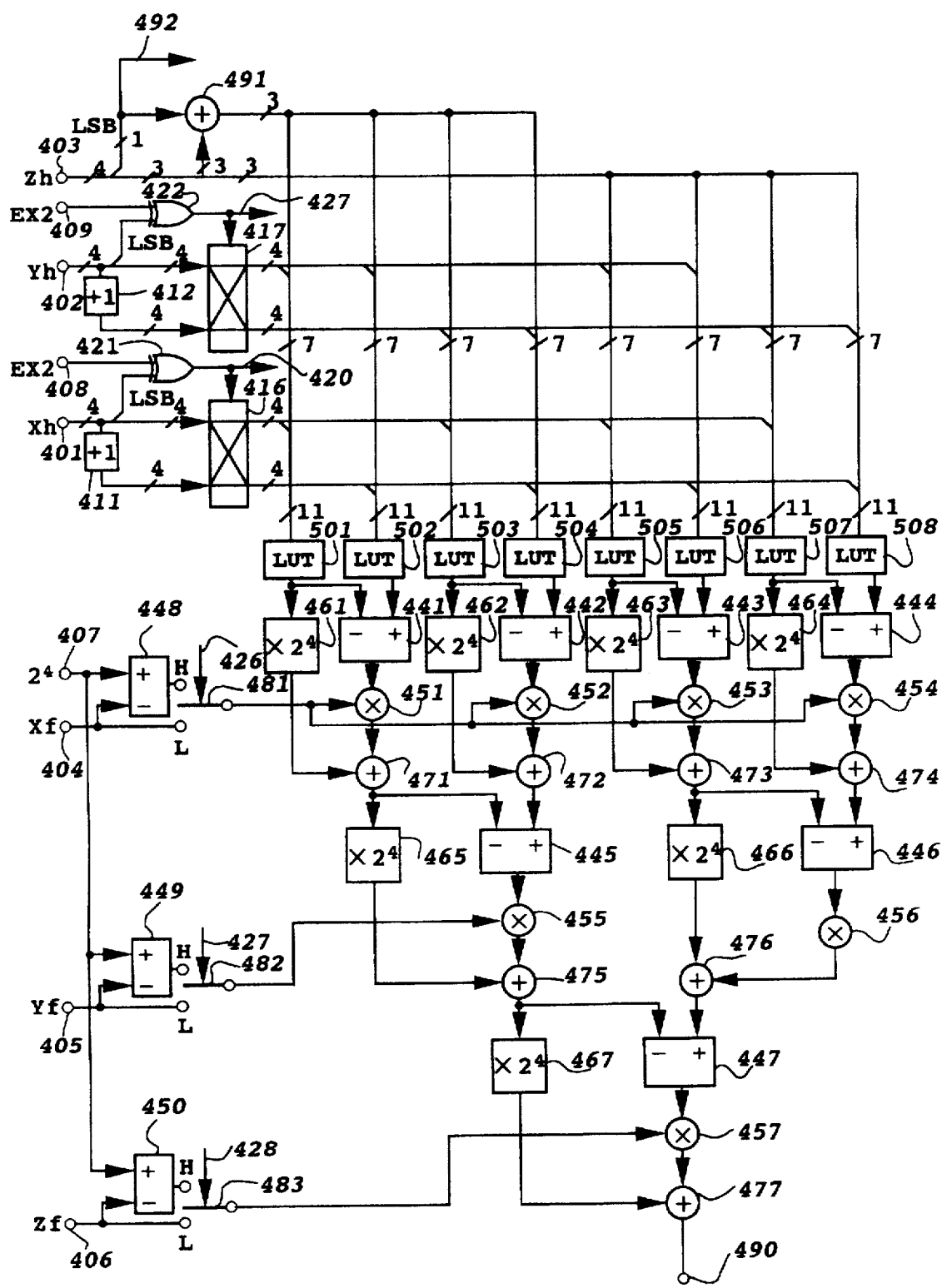
FIG. 13 is a block diagram showing a construction of a tenth embodiment of a data transformation apparatus according to the present invention.

FIG. 13 is a block diagram showing a construction of a tenth embodiment of a data transformation apparatus according to the present invention.

The foregoing ninth embodiment is adapted to perform a mutually distinct eight kinds of data transformations while employing eight LUTs, whereas the shown embodiment is adapted to perform a mutually distinct four kinds of data transformations by reducing the memory capacity of the respective ones of the eight LUTs to be half.

In FIG. 13, by reducing the memory capacity of respective LUTs to half, LUTs 501 to 504 store only the grid point data in the case where the upper bit signal Zh indicates an even number and LUTs 505 to 508 store only the grid point data in the case where the upper bit signal Zh indicates an odd number. By this, the address input to the respective LUTs 501 to 508 is reduced from 12 bits to 11 bits. In the construction of the shown embodiment, the elements different from the foregoing ninth embodiment are the eight LUTs having memory capacities of half of that in the ninth embodiment and the adder 491. Other elements are the same as those represented by the same reference numerals in FIG. 12.

The operation of the shown embodiment is substantially the same to the operational principle of the eighth embodiment as illustrated in FIG. 11. Therefore, discussion of the operation is omitted to avoid redundancy.

(ELEVENTH EMBODIMENT)

Figure 14:
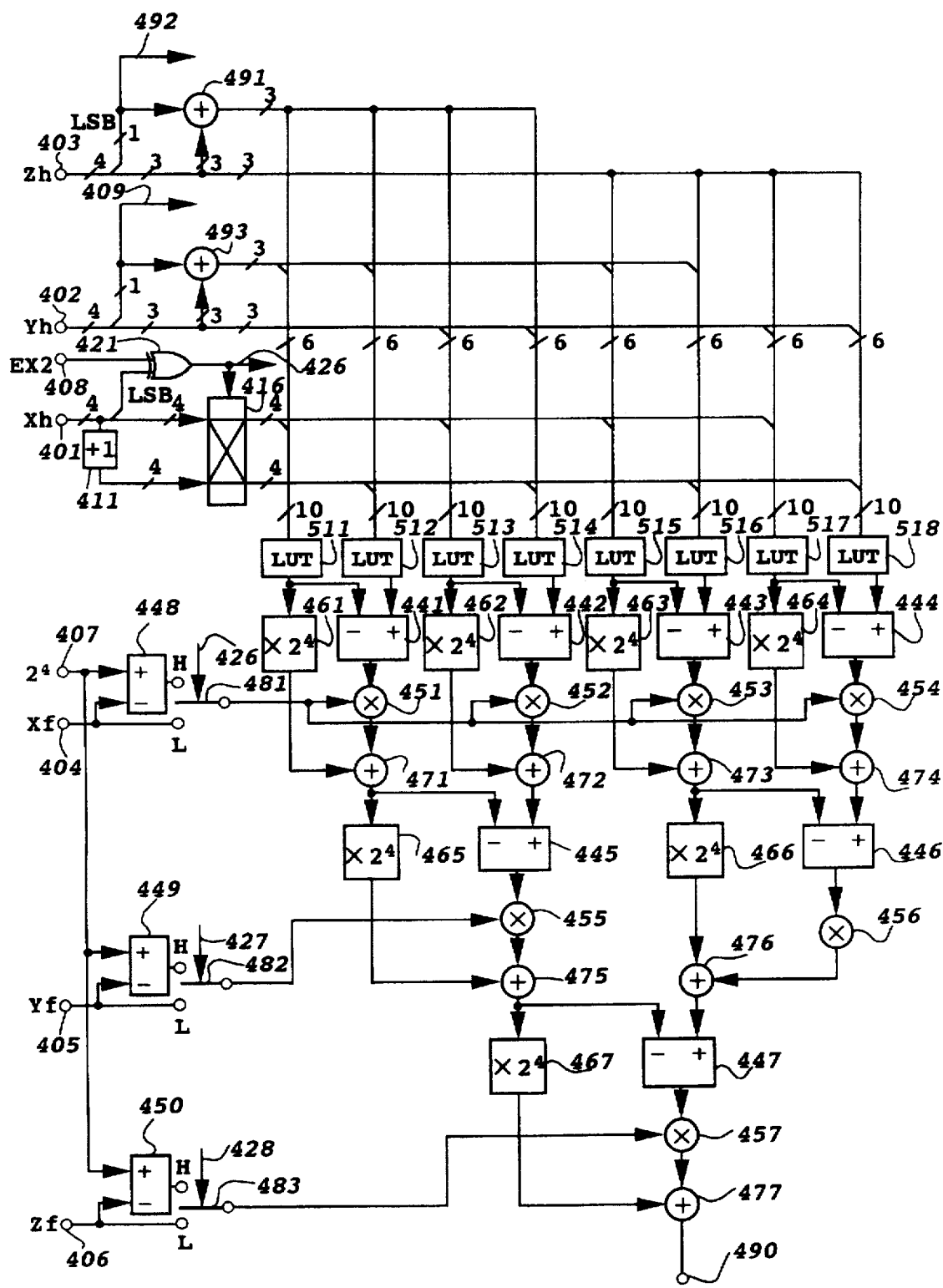
FIG. 14 is a block diagram showing a construction of an eleventh embodiment of a data transformation apparatus according to the present invention.

FIG. 14 is a block diagram showing a construction of an eleventh embodiment of a data transformation apparatus according to the present invention.

In the shown embodiment, with respect to the foregoing tenth embodiment, the memory capacity of each of the eight LUTs is further reduced to be half (i.e. the memory capacity is one fourth of the LUT in the ninth embodiment) to permit only two kinds of data transformation.

In order to reduce the memory capacity of the LUT to be half of the LUT in the tenth embodiment, the grid point data is distributed depending upon an even number and an odd number of the upper bit signal Yh in addition to the upper bit signal Zh. More specifically, LUTs 511, 512, 515, 516 are adapted to store only grid point data in the case where the signal Yh indicates an even number and LUTs 513, 512, 515, 516 are adapted to store only grid point data in the case where the signal Yh indicates an odd number. Combining the construction discussed with respect to the tenth embodiment, in the LUTs 511 and 512, only the grid point data are stored for the case where both of signals Yh and Zh indicate an even number, in the LUTs 513 and 514, only the grid point data are stored for the case where the signal Yh indicates an odd number and the signal Zh indicates an even number, in the LUTs 515 and 516, only grid point data is stored for the case where the signal Yh indicates an even number and the signal Zh indicates an odd number, and in the LUTs 517 and 518, only grid point data are stored for the case where both of the signals Yh and Zh indicate odd numbers. By this, the address input for each of the LUTs 511 to 518 becomes 10 bits.

The difference of the shown embodiment to the foregoing tenth embodiment is the above-mentioned LUTs, to which the address input is 10 bits, and an adder 493. Other elements are the same as those represented by the same reference numerals in FIG. 13 or 12.

As is apparent from the above-mentioned eighth embodiment, in the case that the LSB signal of the upper bit signal Yh indicates "1", the output data of the LUTs 511 to 518 becomes similar to the case where the address signal Yh and the address signal Yh+1 are exchanged in the embodiment of FIG. 12. This is also true for the LSB signal of the upper bit signal Zh.

Accordingly, if the "H" side is selected by the selector 482 when the LSB signal of the upper bit signal Yh indicates "1", and the "H" side is selected by the selector 483 when the LSB signal of the upper bit signal Zh indicates "1", the interpolating operation is always performed by employing the same equation even when the grid point coordinates for reading out the data from the LUTs 511 to 518 are varied.

In the shown embodiment, only two kinds of characteristics of data transformation are permitted. However, this embodiment is advantageous in comparison with the ninth embodiment illustrated in FIG. 12 since the memory capacity is one fourth of the ninth embodiment. Also, corresponding to two kinds of data transformation, only the signal EX1 is employed as a transformation process switching signal.

(TWELFTH EMBODIMENT)

Figure 15:
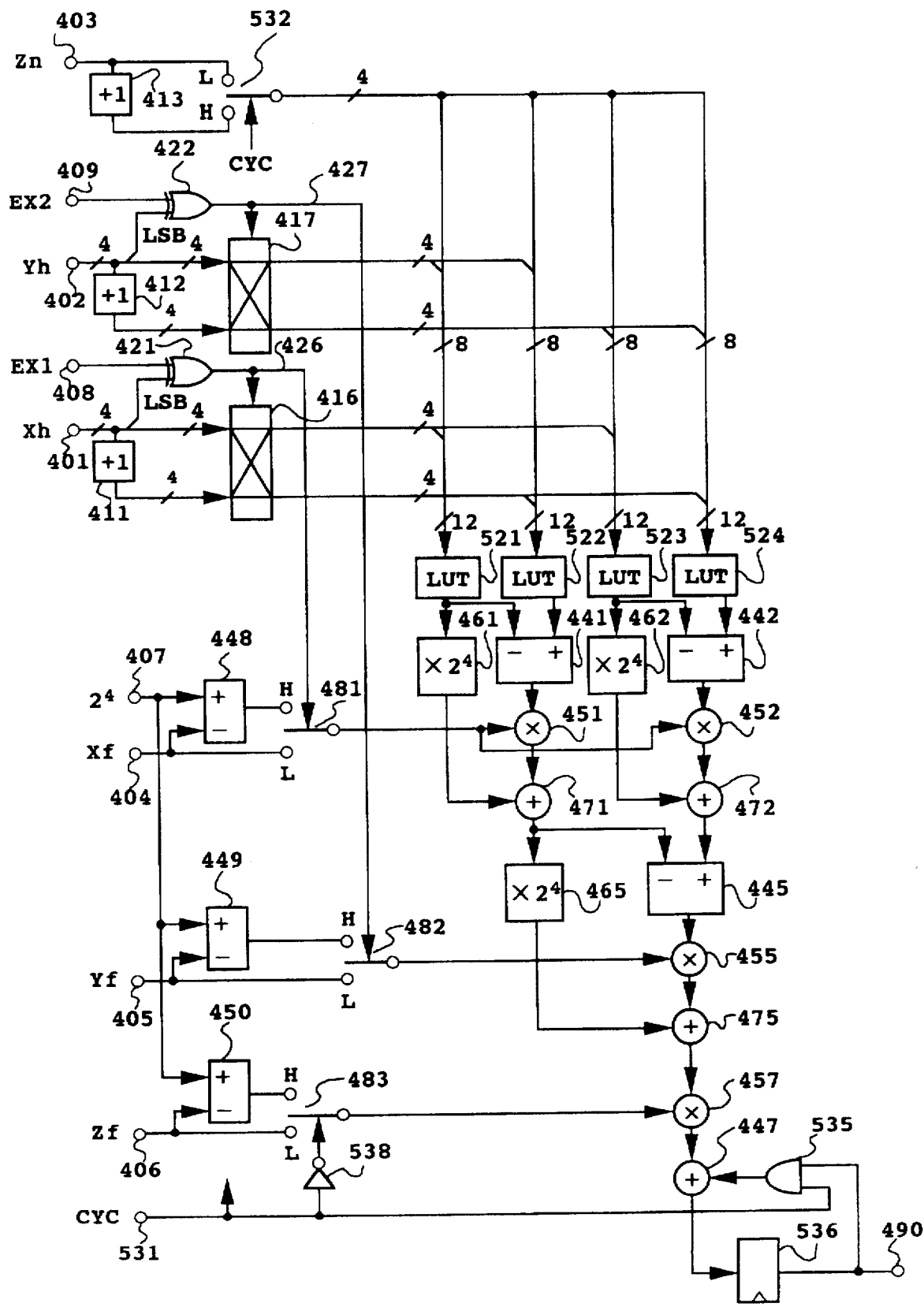
FIG. 15 is a block diagram showing a construction of a twelfth embodiment of a data transformation apparatus according to the present invention.

FIG. 15 is a block diagram showing a construction of a twelfth embodiment of a data transformation apparatus according to the present invention.

The shown embodiment employs four LUTs and performs a three-dimensional eight point interpolating operation by reading eight grid point data by accessing each LUT twice.

In FIG. 15, the four LUTs are represented by the reference numerals 521 to 524.

Since the LUTs are to be accessed twice, the arithmetic process is performed in two cycles. In order to discriminate first and second cycles in the two cycles, a CYC signal is input through a terminal 531. That is, when the CYC signal indicates "0", it means the first cycle and when the CYC signal indicates "1", it means the second cycle.

The CYC signal is fed to the selector 483 and a gate circuit 535 via a Selector 532 and an inverter 538. The gate circuit 535 gates the data output from a register 536 for providing a delay of the data for one cycle and feeds the delayed signal to the adder 447. More specifically, in the first cycle, the output data from the register 536 is blocked so as not to be fed to the adder 447, whereas, in the second cycle, the output of the register 536 is fed to the adder 447.

By utilizing the CYC signal as the switching control signal for the selector 532, the signal output from the selector 532 becomes Zh in the first cycle and Zh+1 in the second cycle. By this, in the first cycle, signals indicating $P_1$ and $P_2$ in the foregoing equations (10) and (11) are output from the adders 471 and 472, respectively, and in the second cycle, signals indicating $P_3$ and $P_4$ in the foregoing equations (12) and (13) are output, respectively. It should be noted that the address exchange control signals 426 and 427 are assumed to be "0".

The above-mentioned $P_1$, $P_2$ and $P_3$, $P_4$ are composed or coupled through the subtracter 445, the multiplier 455 and adder 475, and the following values are output from the adder 475 in the first and second cycles.

<First Cycle> $2^4 P_1+Yf(P_2-P_1)$
<Second Cycle> $2^4 \cdot P_3+Yf(P_4-P_3)$

The foregoing output value is fed to the multiplier 457 and multiplied with a coefficient selected by the selector 483. The output values of the multiplier 457 in respective cycles are as follows:

<First Cycle> $(2^4-Zf)\{2^4 \cdot P_1+Yf(P_2-P_1)\}$
<Second Cycle> $Zf\{2^4 \cdot P_3+Yf \cdot (P_4-P_3)\}$ The above-mentioned output values are added through the adder 477, the register 536 and the gate circuit 535 and at the end of the second cycle, the following value is input to the register 536.

$$2^4\{2^4 \cdot P_1+Yf(P_2-P_1)\}+Zf\{2^4 \cdot P_3+Yf(P_4-P_3)-2^4 \cdot P_1-Yf(P_2-P_1)\}$$

The result of above addition is a value of $2^{12}$ times the $H_5$ (Xi, Yi, Zi) expressed by the foregoing equation (14), and is output from the register 536 in the next cycle. By outputting this from the terminal 490 with shifting by 12 bits, the transformed data is obtained at every two cycles.

As set forth with respect to the first to twelfth embodiments, by the preferred embodiments of the present invention, when data transformation is performed by an interpolating calculation employing LUTs, a maximum n in number of kinds of characteristics of data transformation are performed. More specifically, in each of the LUTs, by switching the address (region) to be dedicatedly accessed, and by storing grid point data of different characteristics in respective regions, different kinds of data transformation are performed every time of switching of the table region.

In respective embodiments discussed later, the kind of data transformation, switching between different kinds of data transformation and printing operations associated therewith are discussed.

(THIRTEENTH EMBODIMENT)

This embodiment illustrates an application of the present invention to a printing operation in an electrophotographic type printer, a copy machine and so forth.

Figure 16B:
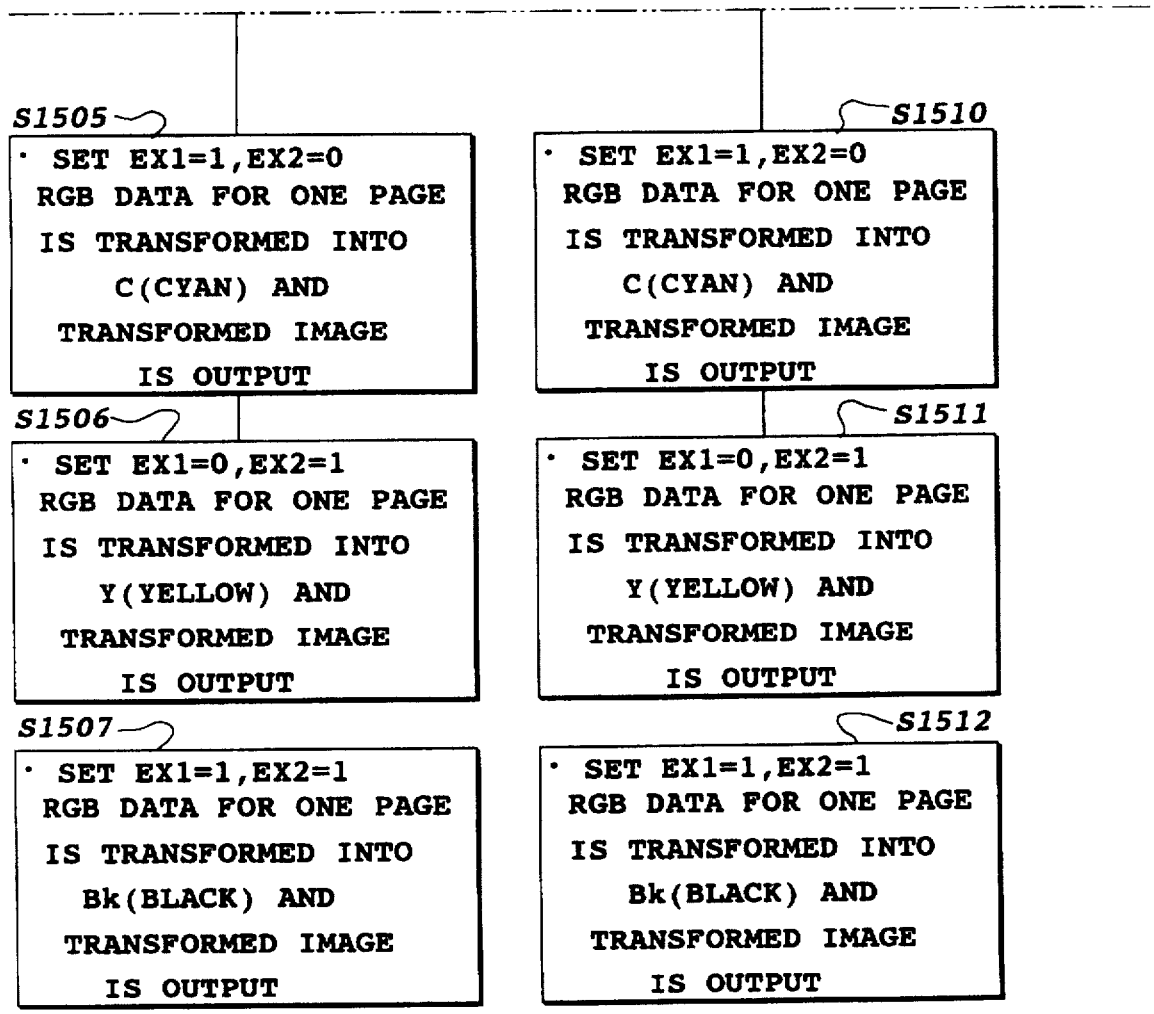
Figure 18:
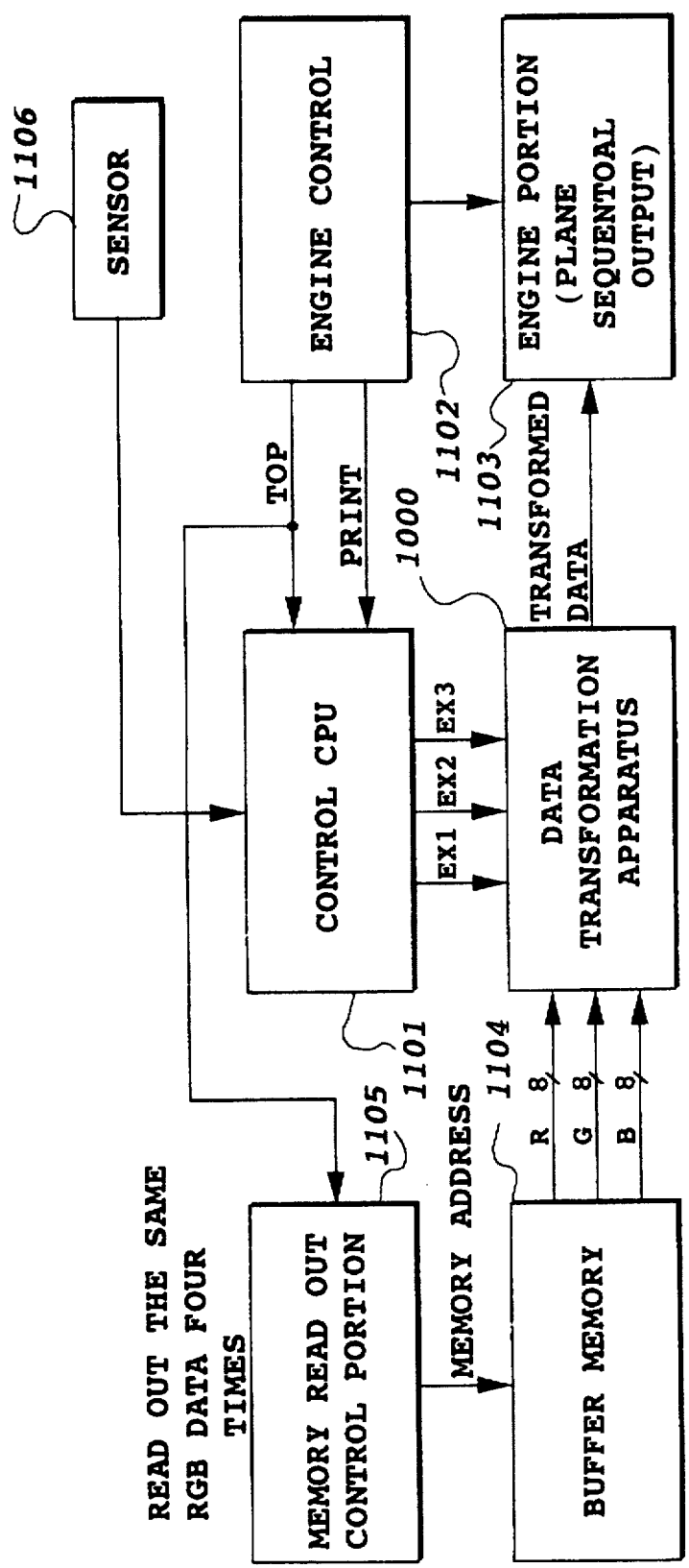
FIG. 18 is a block diagram showing a construction for executing the control process of FIG. 16.

FIG. 16 is a flowchart showing a process of control for a printing operation, FIG. 17 is a timing chart showing variation signals upon performing the control and FIG. 18 is a block diagram showing the construction for performing the control.

Hereinafter, kinds of data transformation, printing operations and table region switching control are discussed with reference to FIGS. 16 to 18.

The construction of the shown embodiment is an application of the ninth embodiment of the data transformation system employing eight LUTs for enabling eight kinds of data transformation to a printer or copy machine. In the initial state, in respective ones of the LUTs, the following 8 kinds of data are preliminarily stored in the respective regions to be accessed depending upon switching control. More specifically, as shown at step S1501 of FIG. 16, in respective regions of the LUTs respectively divided into eight, grid point data for color transformation of R(red), G(green) and B(blue) data into M(magenta) in the case where common paper is used as a printing medium, similarly into C(cyan), Y(yellow) and Bk(black) for the case where common paper is used as the printing medium, and grid point data for color transformation of the R, G, B data into respective ones of M, C, Y, Bk in the case where an OHP sheet is used as the printing medium, is stored.

A CPU 101 for control (see FIG. 18) is responsive to a print signal PRINT (see FIG. 17) from an engine control portion 1102 (see FIG. 18) to initiate printing preparation at step S1501 shown in FIG. 16. At step S1502, discrimination of the printing medium is performed so as to discriminate the printing medium between the common paper and the OHP sheet. This discrimination is performed on the basis of an output from a sensor 1106 (see FIG. 18) for discriminating the kind of the printing medium. It should be noted that it is also possible that a user of the printer and the copy machine performs setting of the printing medium instead of discriminating the kind of the printing medium by means of the sensor.

Here, when discrimination is made that the printing medium is common paper, the process is advanced to step S1503 and subsequent proesses. In the series of processes started from the step S1503, formation of a latent image on a photoreceptor drum (not shown) by means of a laser beam or an analog optical system (both are not shown), developing employing respective of M, C, Y. Bk toners, and outputting of an image by transferring onto the common paper are performed. In case of the electrophotographic type, with respect to each of the colors of toners of M, C, Y. Bk, the above-described image output is sequentially performed for one page (one sheet of the common paper) (hereinafter referred to as "plane sequential output"). That is, the formation of latent image, the development and the toner image transfer are repeated sequentially.

When a judgement is made that the printing medium is common paper, the CPU 1101 sets the switching control signals to EX1=0, EX2=0, EX3=0 (see FIG. 12) so that the region for transforming into M(magenta) in the case of common paper is accessed in the subsequent processes. In conjunction therewith, a memory reading out control portion 1105 (see FIG. 18) sequentially provides memory addresses for one page to a buffer memory 1104 in synchronism with rising of signal TOP indicating a page leading end to read out respectively 8 bits R, G, B data.

A data transforming apparatus 1000 (see FIG. 18) performs color transformation of the read out R, G, B data to output a concerted data M (see FIG. 17) relating to M(magenta). An engine portion 1103 (see FIG. 18) performs a printing operation on the basis of the transformed data M to perform outputting of an image relating to one page of M(magenta) (steps S1503 and S1504).

Next, at step S1505, similarly to the foregoing, in synchronism with rising of the signal TOP indicating next a page leading end, the switching control signals are set to be EX1=1, EX2=0 (EX3 is maintained at 0) so that the regions of the LUTs to be accessed in the subsequent process are switched. By this, in the same manner as the above, in the data transforming apparatus 1000, the R. G. B. signals are transformed into data C relating to C(cyan). Then, on the basis to this, the image of C(cyan) is transferred on common paper, on which the M(magenta) has already been transferred.

Similarly, at step S1506, the switching control signals are set to be EX1=0, EX2=1 (EX3 is still maintained at 0), the region to be accessed in the subsequent process is switched for the case of the common paper and for the grid point data of Y(yellow). Then, on the basis of the R. G. B signal, data transformation accessing these regions is performed to overlay the image of Y(yellow).

Finally, at step S1507, the switching control signals are set to be EX1=1, EX2=1 to enable access of the region relating to Bk(black) in the case of the common paper to overlay a Bk(black) image. Then, the shown process ends.

When judgement is made that the printing medium is an OHP sheet in the discrimination of the printing medium at the step S1502, the switching control signal EX3 is set to "1" at step S1508. Then, in the subsequent steps S1509 to S1512, similar control to the foregoing steps S1504 to S1507 are performed.

As set forth above, the switching control signals EX1, EX2 and EX3 are set in synchronism with the signal TOP indicating the page leading end, image formation (printing) is performed in a plane sequential output.

(FOURTEENTH EMBODIMENT)

Figure 19B:
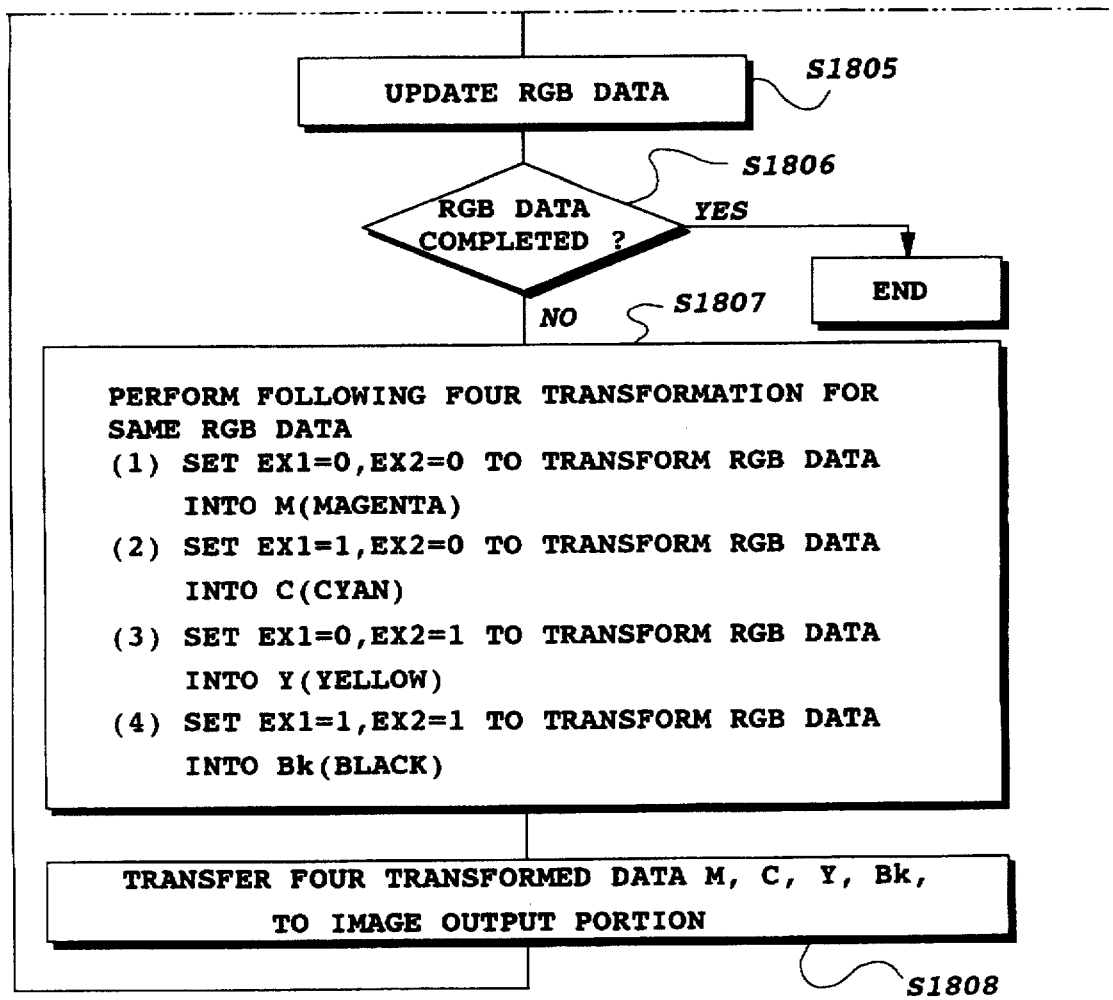
Figure 20:
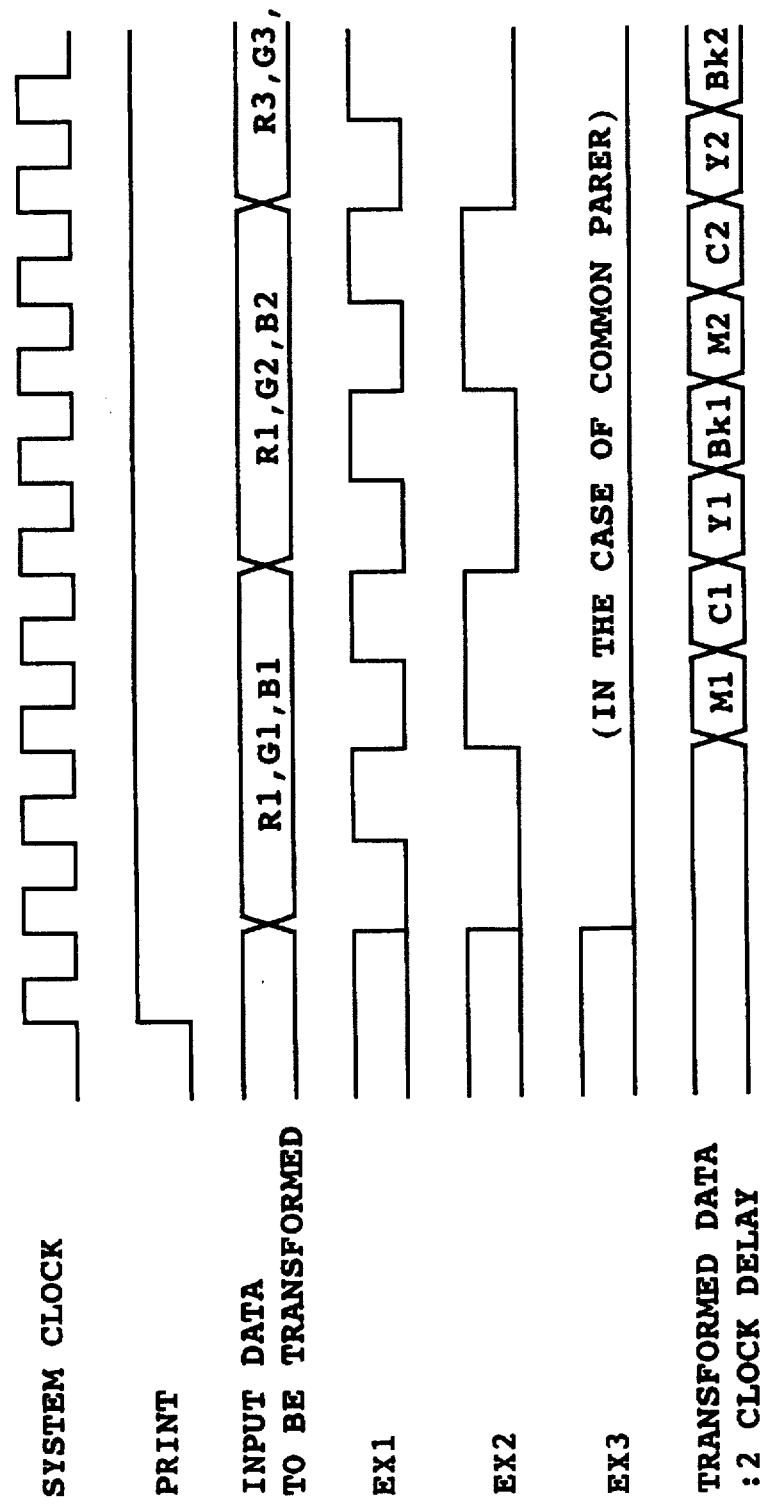
FIG. 20 is a timing chart of various signals in the control process of FIG. 19.
Figure 21:
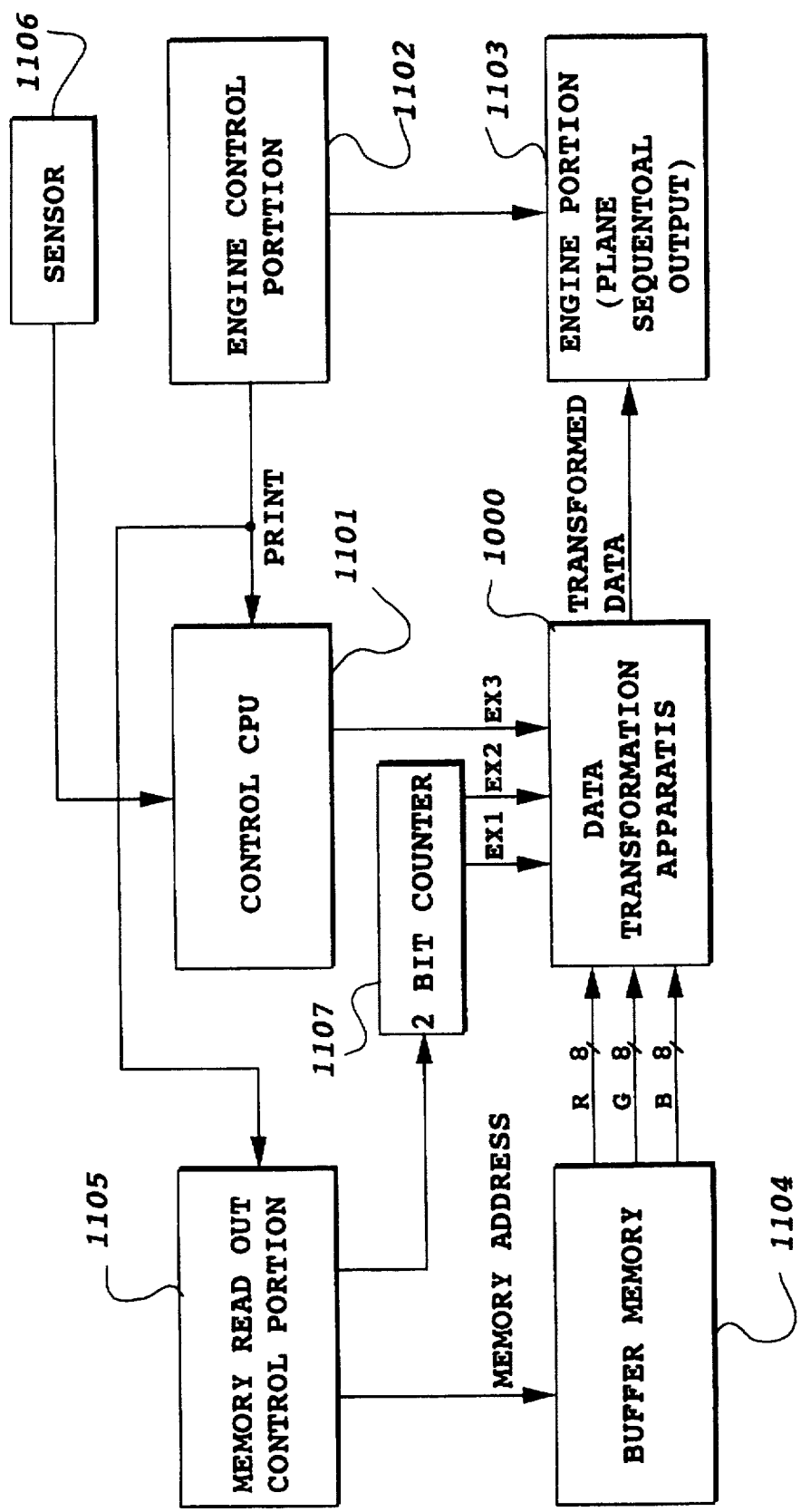
FIG. 21 is a block diagram showing a construction for executing the control process of FIG. 19.

FIGS. 19, 20 and 21 shows the construction for switching access regions and so forth in the case where a so-called serial type printing device, for example, of an ink-jet type is employed, as a device for performing printing. FIG. 19, 20 and 21 are similar to FIGS. 14, 17 and 18 relating to the thirteenth embodiment, respectively.

In the serial type printing device, a printing head is scanned with respect to a printing medium for ejecting ink during scanning to perform printing. Accordingly, from an individual ink ejecting orifice, ink of each of M, C, Y. Bk is ejected. For example, inks are ejected in the order of M, C, Y. Bk (hereinafter referred to as "point sequential output") to form one pixel. Therefore, different from the plane sequential output in the foregoing thirteenth embodiment, at every pixel, the data transformation is performed to generate transformed data of M, C, Y and Bk with respect to one set of R. G. B data.

In FIG. 19, at judgement of the printing medium at step S1802, when judgement is made that the printing medium is common paper, the CPU 1101 sets the switching control signal EX3 to "0" at step S1803. Then, at step S1805, one set of transformation input data R1, G1 and B1 (see FIG. 20) is read out from the buffer memory 1104 by the memory reading out control portion 1105. Reading out is performed in synchronism with a system clock (see FIG. 20) built-in the memory reading out control portion 1105. Upon reading out of the transformation input data, when no R. G. B data to be read out is not present, the shown control process ends (step S1806).

At the next step S1807, with respect to one set of the transformation input data R1, G1 and B1 read out from the buffer memory 1104, the setting of the values of the switching control signals EX2 and EX1 are varied at every one cycle of the system clock. This variation of setting is performed by utilizing a two i bit counter 1107 incremented by the control signal from the memory reading out control portion 1105 by taking the upper bit as the value of EX2 and the lower bit as the value of EXT. More specifically, in the data transforming apparatus 1000, the switching control signals are initially set to be EX1=0 and EX2=0. By this, switching of the access region of the respective eight LUTs is performed. Then, the transformation input data R1, G1 and B1 are transformed into the transformed data M relating to M(magenta) through interpolating operation in the construction illustrated in FIG. 12. Then, at the period of the next system clock, the switching control signals EX1 is set at "1" and the EX2 is set at "0". Thus, the transformed data C1 is attained through the similar process to that set forth above. In the subsequent step, at the period of the next system clock, the switching control signal EX1 is set at "0" and EX2 is set at "1". Thus, the transformed data Y1 is attained through the similar process to that set forth above. In the further subsequent step, at the period of the next system clock, the switching control signal EX1 is set at "1" and EX2 is set at "1". Thus, the transformed data Bk1 is attained through the similar process to that set forth above.

The one set of the transformed data M1, C1, Y1 and Bk1 obtained through the process set forth above, are transferred to the engine portion 1103. The engine portion 1103 performs control so that inks may be ejected through the printing head to form one pixel (step S1808).

By repeating the processes shown in the steps S1805 to S1808, printing is performed for one page of common paper.

It should be appreciated that the construction for the point sequential output is adapted to an application for a serial type printing head is employed. In the alternative, when the printing head of a so-called full-line printer is employed, the setting of the switching control signal is varied at every one line corresponding to the width of the common paper as set forth above.

Further more, an ink ejection method as the above-mentioned ink-jet type printing head, one, in which a bubble is generated by activating thermal energy to the ink, and associated with generation of the bubble, the ink is ejected is suitable to be used.

(FIFTEENTH EMBODIMENT)

Figure 22:
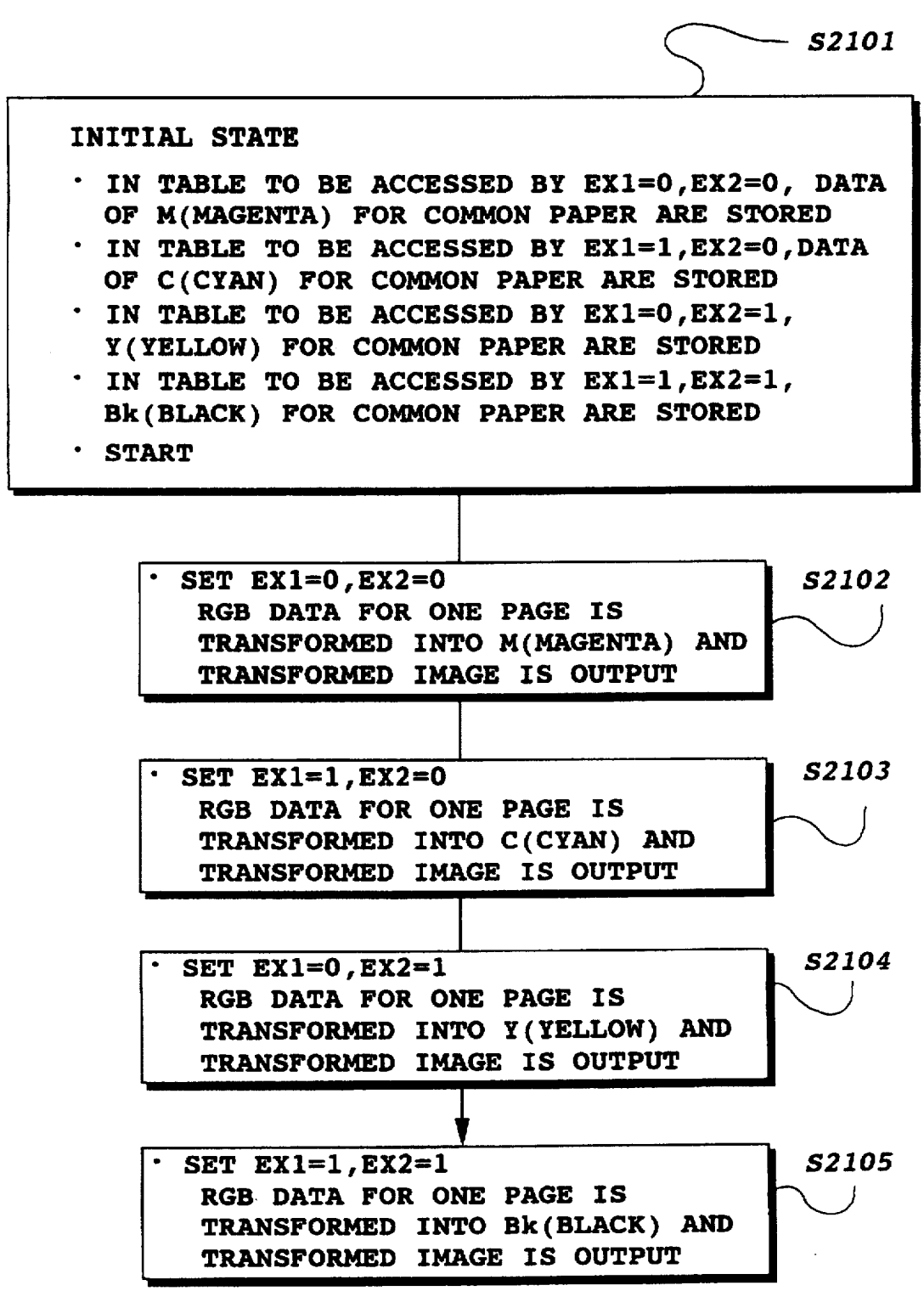
FIG. 22 is a flowchart showing a process of an access region switching and an image output control associated therewith in a fifteenth embodiment of a data transformation apparatus according to the present invention.
Figure 23:
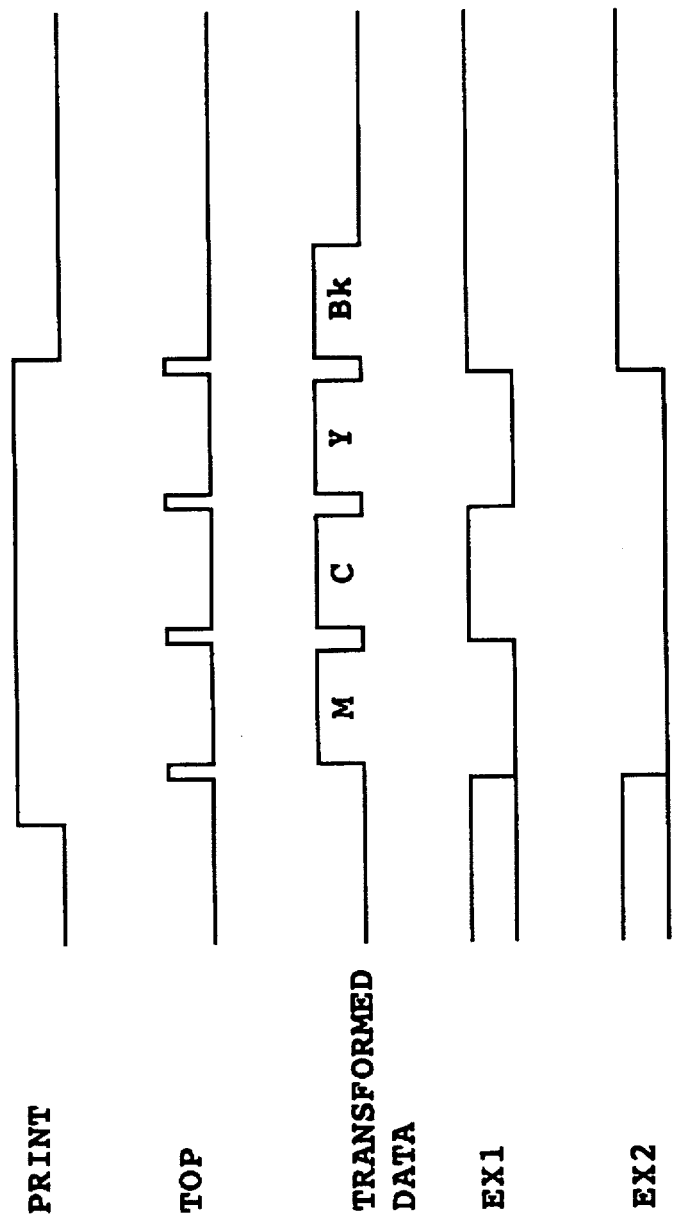
FIG. 23 is a timing chart of various signals in the control process of FIG. 22.
Figure 24:
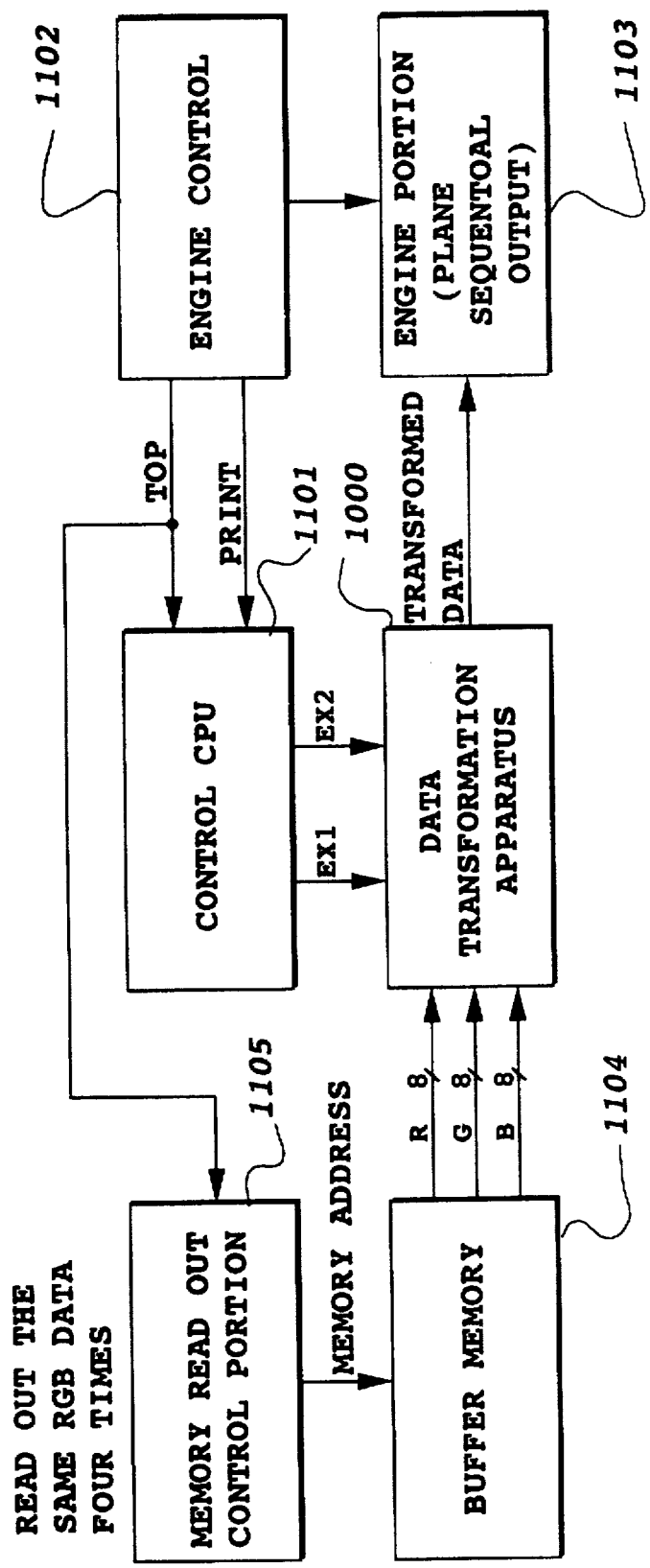
FIG. 24 is a block diagram showing a construction for executing the control process of FIG. 22.

FIGS. 22 to 24 show the fifteenth embodiment, in which as illustrated with respect to the eleventh embodiment, there is shown the setting of the access region for the plane sequential output and the printing operation associating with the setting of the access region in the data transformation apparatus capable of four kinds of data transformation employing the eight LUTs.

The kind of data transformation in the shown embodiment is four kinds to transform R, G, B data into M, C, Y, Bk data for printing on common paper. The construction of the shown embodiment as illustrated in FIGS. 22, 23 and 24 is similar to the construction for the plane sequential output as illustrated in FIGS. 16, 17 and 18. Therefore, the detailed discussion for the construction in the shown embodiment is omitted to avoid redundancy and to keep the description simple enough to facilitate an understanding of the invention.

(SIXTEENTH EMBODIMENT)

Figure 25:
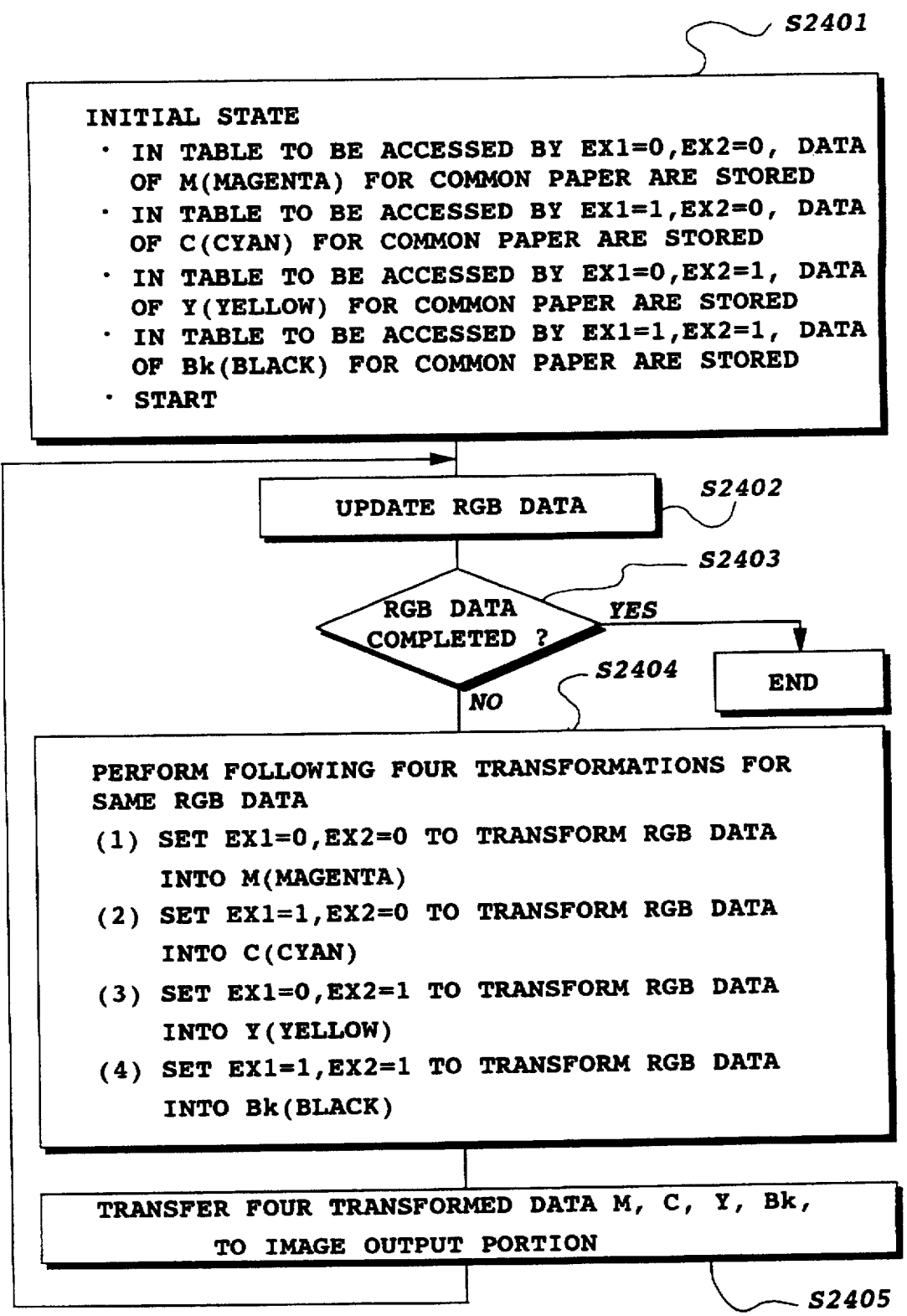
FIG. 25 is a flowchart showing a process of an access region switching and an image output control associated therewith in a sixteenth embodiment of a data transformation apparatus according to the present invention.
Figure 26:
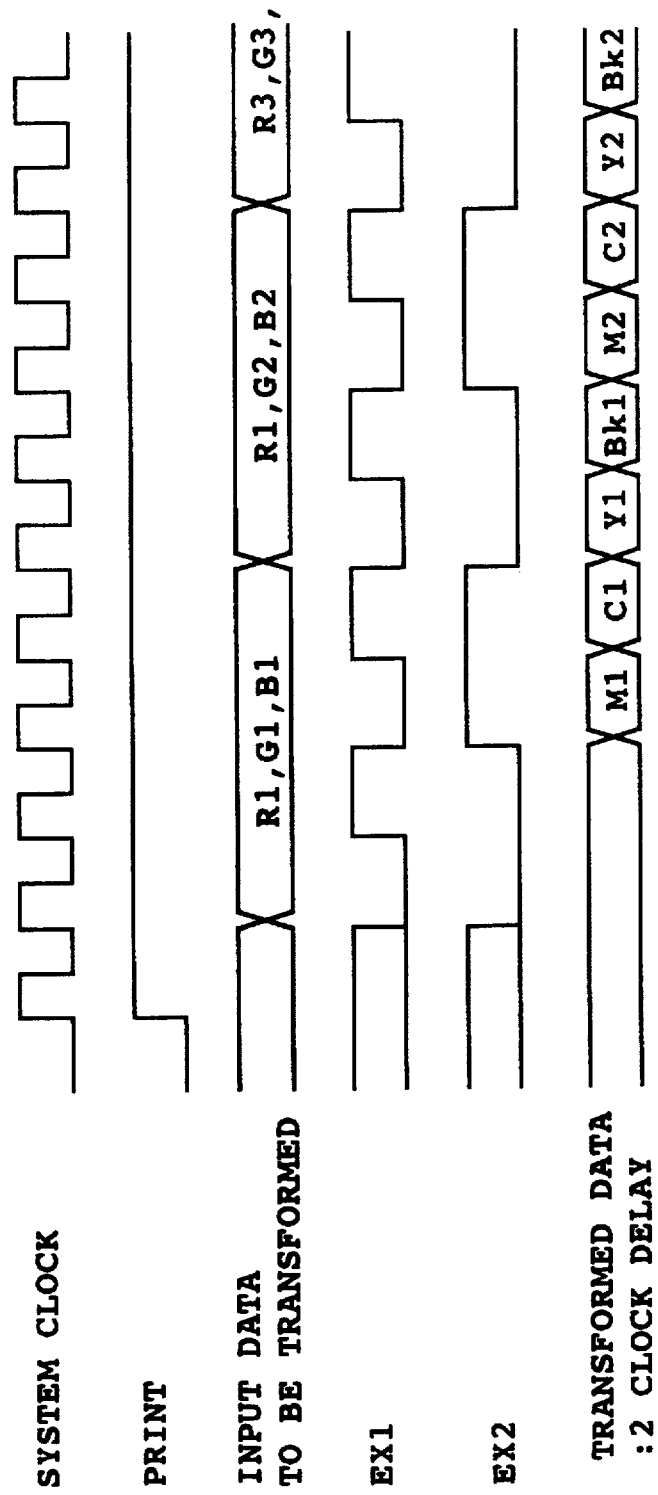
FIG. 26 is a timing chart of various signals in the control process of FIG. 25.
Figure 27:
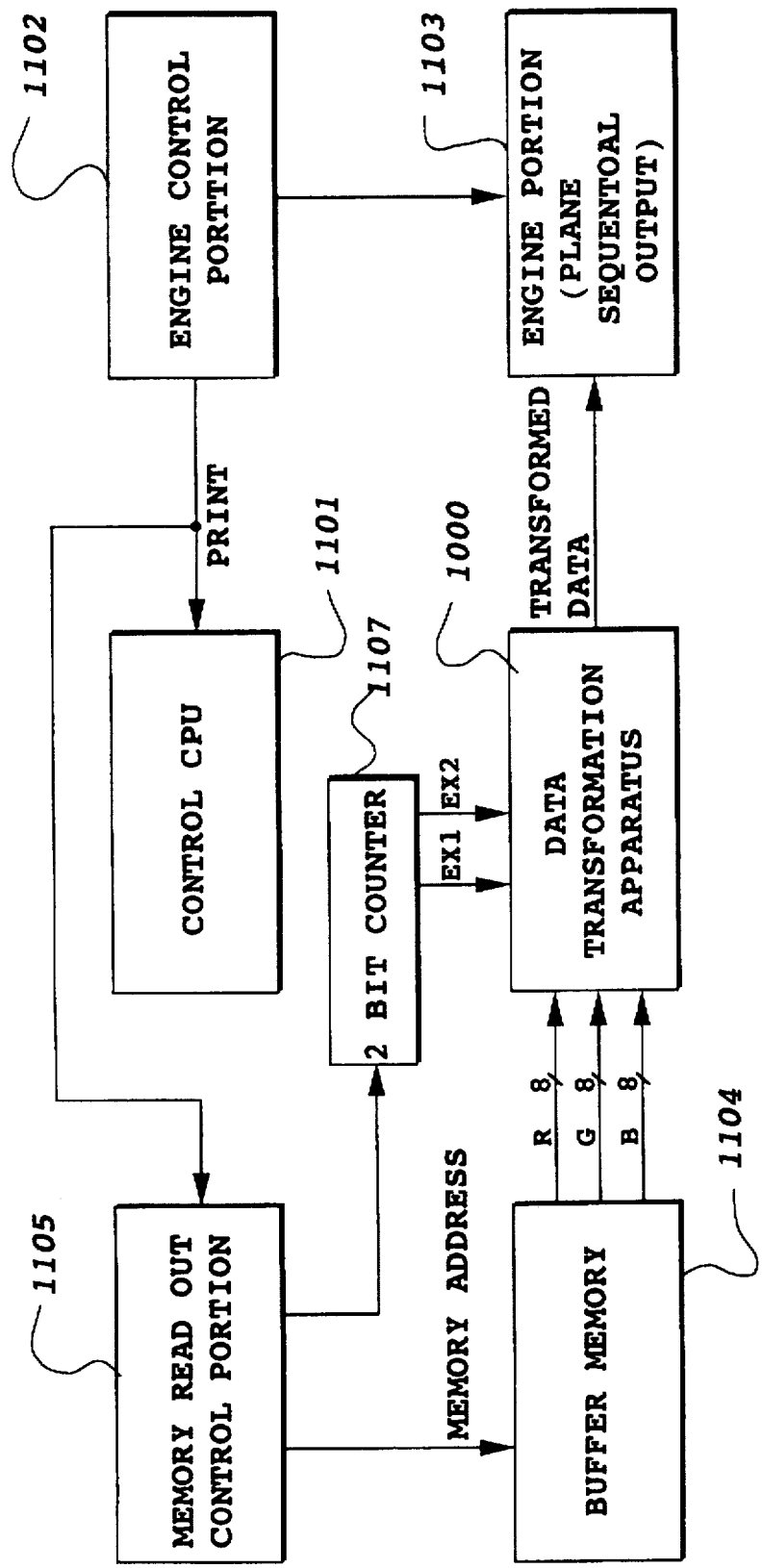
FIG. 27 is a block diagram showing a construction for executing the control process of FIG. 25.

FIGS. 25, 26 and 27 show the construction for performing four kinds of data transformation employing eight LUTs similarly to the fifteenth embodiment.

Even in the shown embodiment, similarly to the foregoing fifteenth embodiment, grid point data for generating transformed data relating to M(magenta), C(cyan), Y(Yellow), Bk(Black) for printing on common paper are stored in the regions in each of the LUTs divided into four regions for performing four kinds of data transformation. Respective regions in the LUTs are accessed depending upon the values of the switching control signals EX1 and EX2 (see step S2401 of FIG. 25).

However, different from the fifteenth embodiment, the shown embodiment is applied for an image output device which performs point sequential output, such as a serial type ink-jet printer and so forth. Therefore, the construction of the shown embodiment as illustrated in FIGS. 25 to 27 is similar to the construction illustrated in FIGS. 19 to 21 of the fourteenth embodiment.

For the foregoing thirteenth to sixteenth embodiments, the construction of the three-dimensional input as illustrated in further proceeding ninth and tenth embodiments are applied to perform eight kinds or four kinds of data conversion with the eight LUTs respectively. However, it is obvious to those skilled in the art that the application of the construction for setting of the regions as illustrated in the foregoing thirteenth to sixteenth embodiments, is not limited thereto. For instance, even for the embodiments of the present invention employing two or four LUTs with respect to linear or two-dimensional input data as illustrated in the first to eighth embodiments to appropriately perform setting of the access region, varying of the access region and data transformation corresponding thereto by establishing correspondence between the combination of the switching control signals EX1 and EX2 and various characteristics of dada transformation.

It should be noted that the foregoing thirteenth to sixteenth embodiments are adapted to employ n in number of LUTs, to divide the grid point data storage region into n for each LUT and to enable a maximum of n kinds of data transformation. However, the present invention is not restricted to such specific constructions, and can be implemented in a further wider sense to efficiently use LUTs when a plurality of LUTs are present. The followings are several embodiments of such construction.

(SEVENTEENTH EMBODIMENT)

Figure 28B:
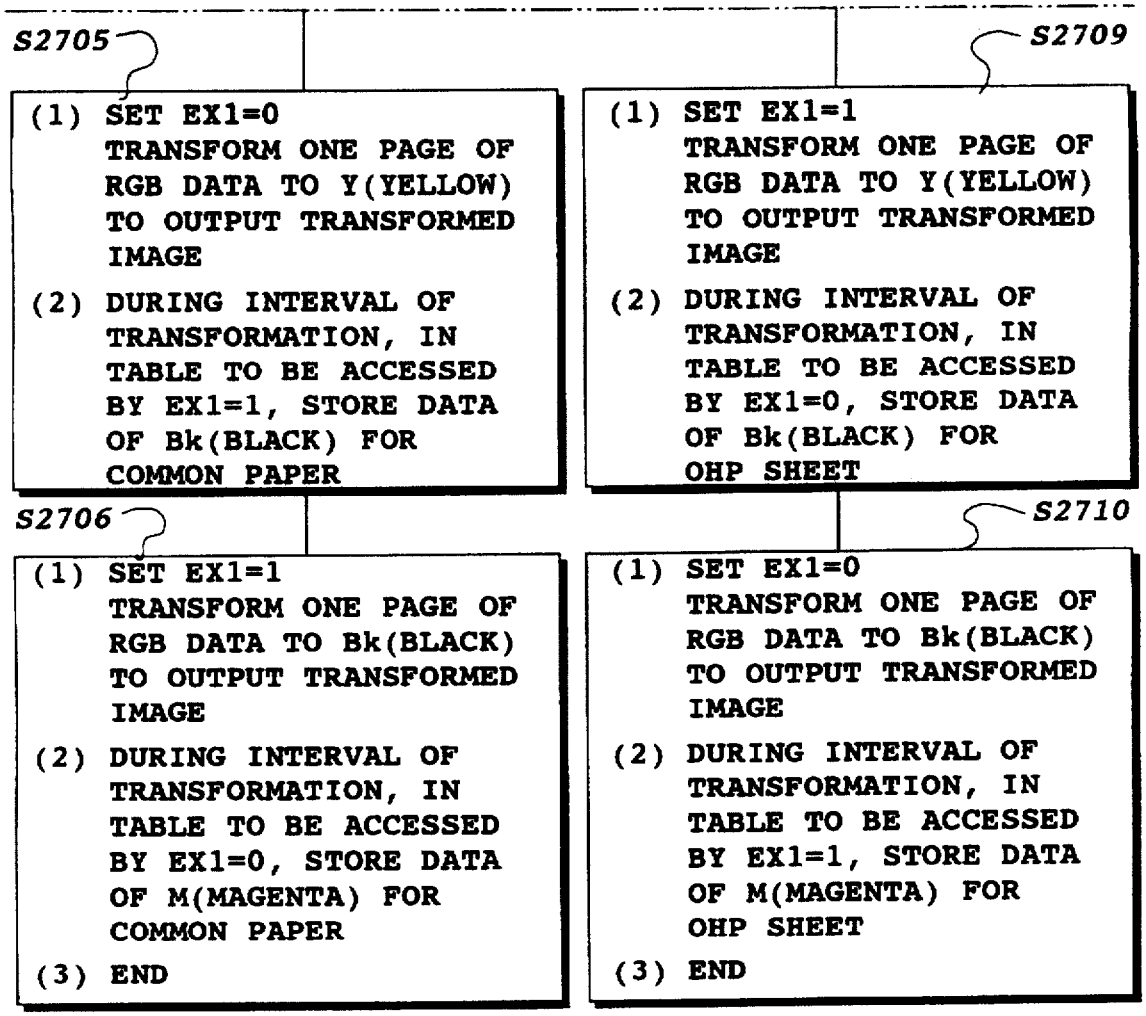
Figure 29:
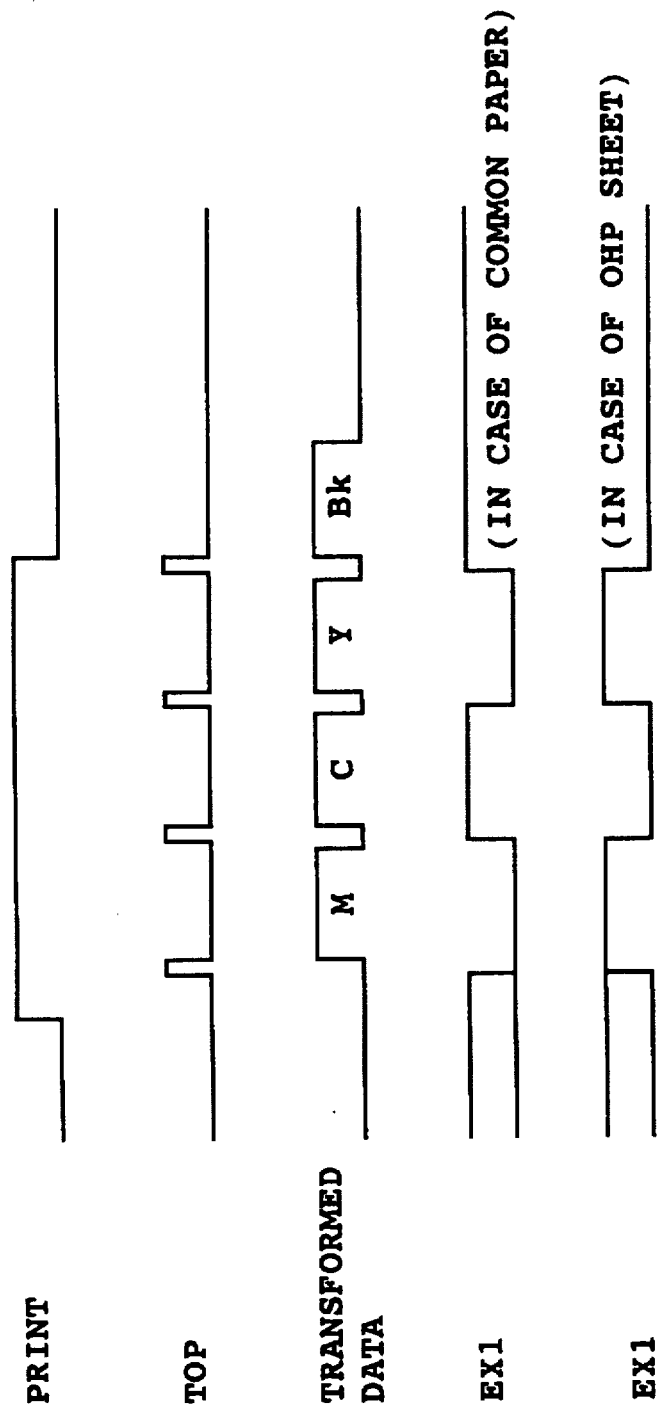
FIG. 29 is a timing chart of various signals in the control process of FIG. 28.
Figure 30:
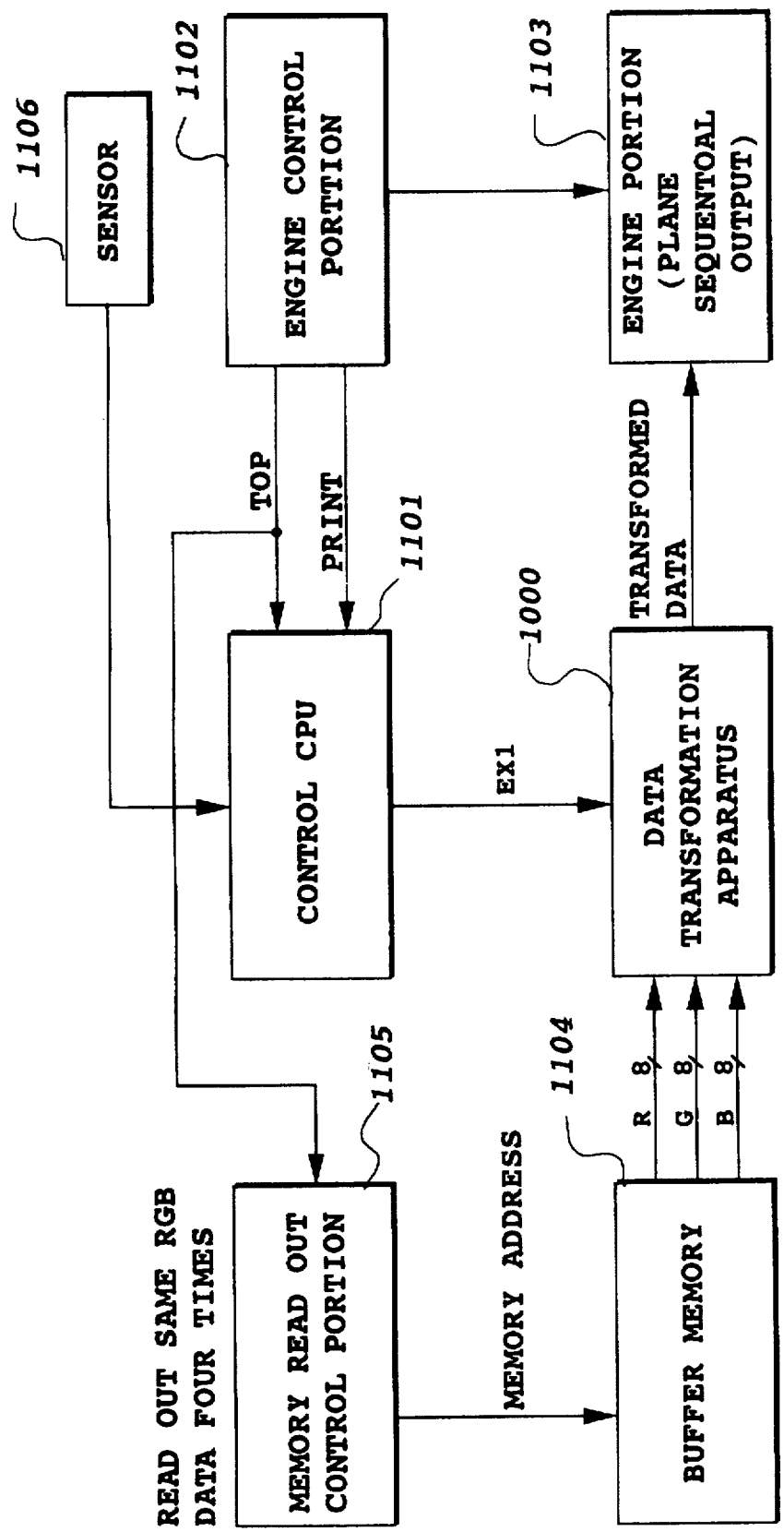
FIG. 30 is a block diagram showing a construction for executing the control process of FIG. 28.

FIGS. 28, 29 and 30 show the construction for performing a plane sequential data transformation for transforming the three-dimensional R, G, B data into M, C, Y, Bk data employing two kinds of LUTs.

Here, two kinds of LUTs means the presence of two regions each relating to one kind of data transformation, or the presence of mutually independent two kinds of LUTs. Two regions or two kinds of LUTs are discriminated by the switching control signal EX.

As shown by step S2701 of FIG. 28, at the initial state, among two kinds of LUTs, the LUT to be accessed at the switching control signal EX1=0, the grid point data are stored for transforming into M(magenta) data for printing on common paper. On the other hand, in the LUT to be accessed when EX1=1, the grid point data is stored for transforming into M(magenta) data for printing on the OHP paper.

When a printing signal PRINT is generated and printing operating is initiated, discrimination for the printing medium to be used for printing is performed at step S2702. For instance, when a judgement is made that the printing medium is common paper, the switching control signal EX is set to "0". By this, using the set kind of LUT, R, G, B date are transformed into M(magenta) data. At the same time, for the LUT of the kind to be accessed when EX1=1, during an interval of access of the LUT used for transformation, that is, while access is not made, the grid point data is loaded for obtaining the transformed data of C(cyan) for printing on the plate paper.

Then, at next step S2704, by setting EX1 at "1", the transformed data of C(cyan) is output by utilizing the LUT of the kind which is to be accessed when EX1=1. Simultaneously, for the other LUT, similarly to the process at the step S2703, the grid point data is loaded for next transformation for Y(yellow).

Subsequently, in steps S2705, S2706, by repeating the processes similar to those at the steps S2703, the transformed data of Y(yellow) and Bk(Black) are obtained in order in plane sequence.

When discrimination of the printing medium to be used as the printing medium is the OHP sheet at the step S2702, a similar process to the steps S2702 to S2710 is performed to obtain the image output by attaining M, C, Y, Bk data corresponding to the OHP sheet.

(EIGHTEENTH EMBODIMENT)

FIGS. 31, 32, 33 and 34 show the construction of the eighteenth embodiment of the data transforming system according to the present invention.

Figure 34:
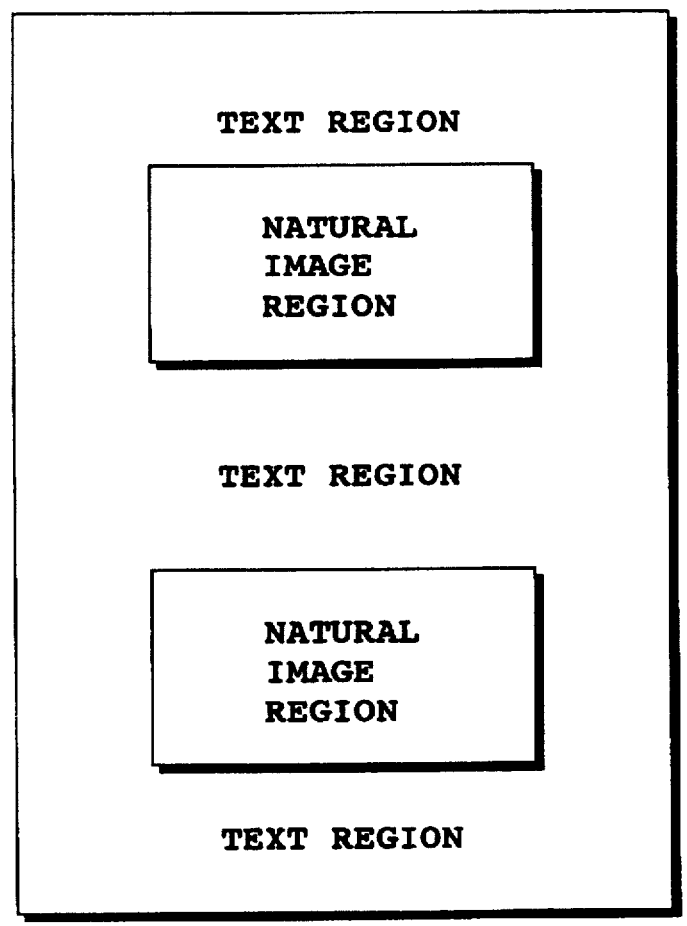
FIG. 34 is a diagrammatic illustration showing one example of an image output in the embodiment of FIG. 31.

As shown in FIG. 34, the shown embodiment is designed for enabling data transformation adapted to respective images when the image to be printed contains different kinds of images, such as "text" and "natural image" on one page, for example. More specifically, in the two kinds of LUTs, grid point data are stored for obtaining optimal transformed data of M, C, Y, Bk in the case where the "text" and "natural image" are output.

Figure 31:
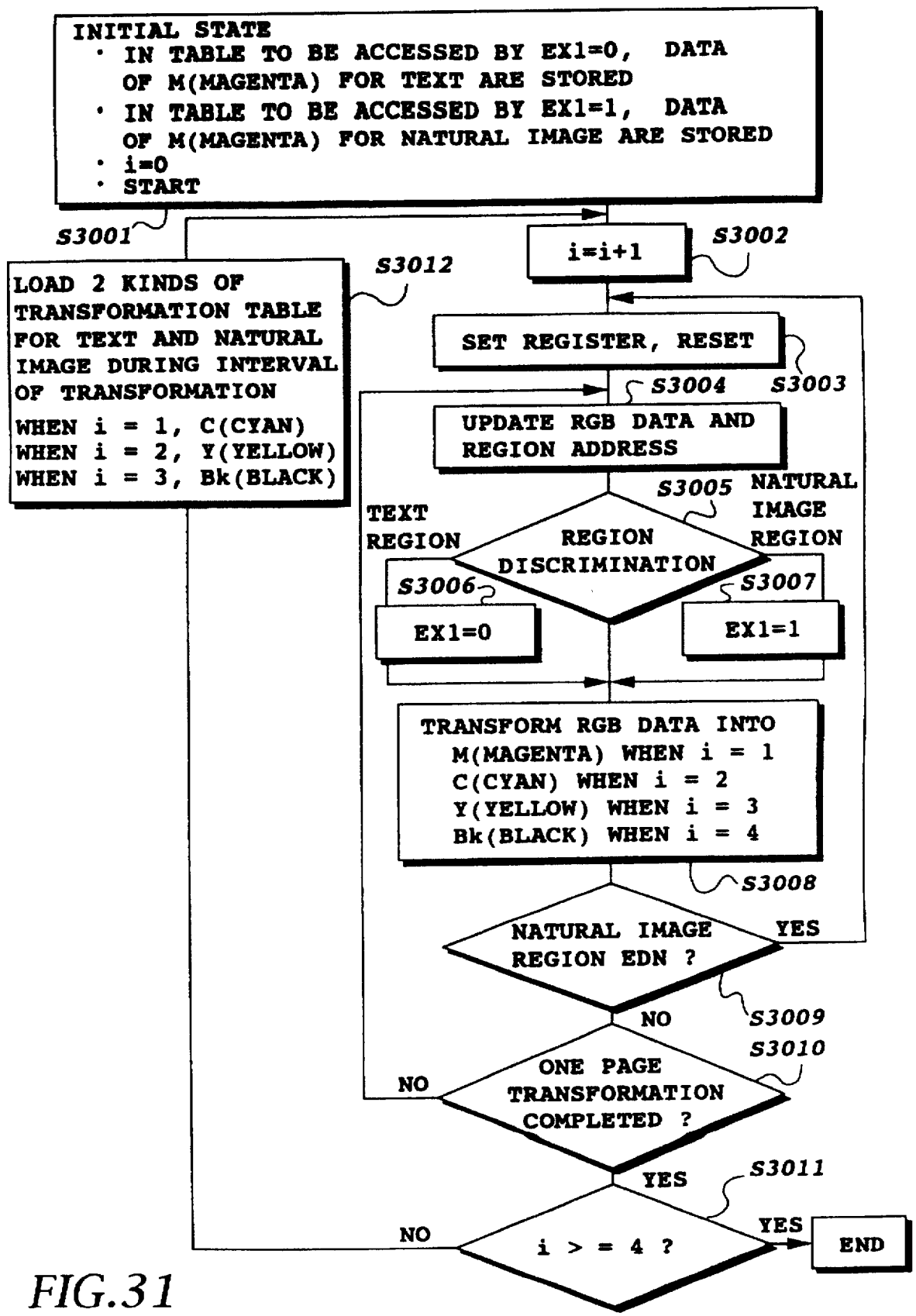
FIG. 31 is a flowchart showing a process of an access region switching and an image output control associated therewith in an eighteenth embodiment of a data transformation apparatus according to the present invention.
Figure 32:
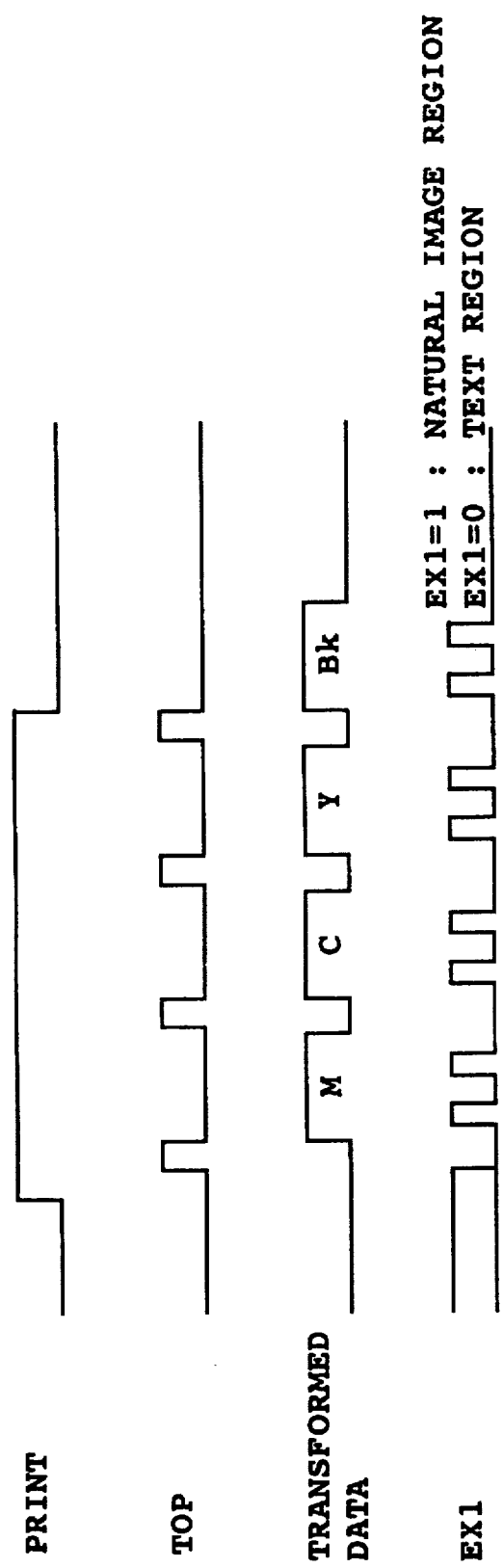
FIG. 32 is a timing chart of various signals in the control process of FIG. 31.
Figure 33:
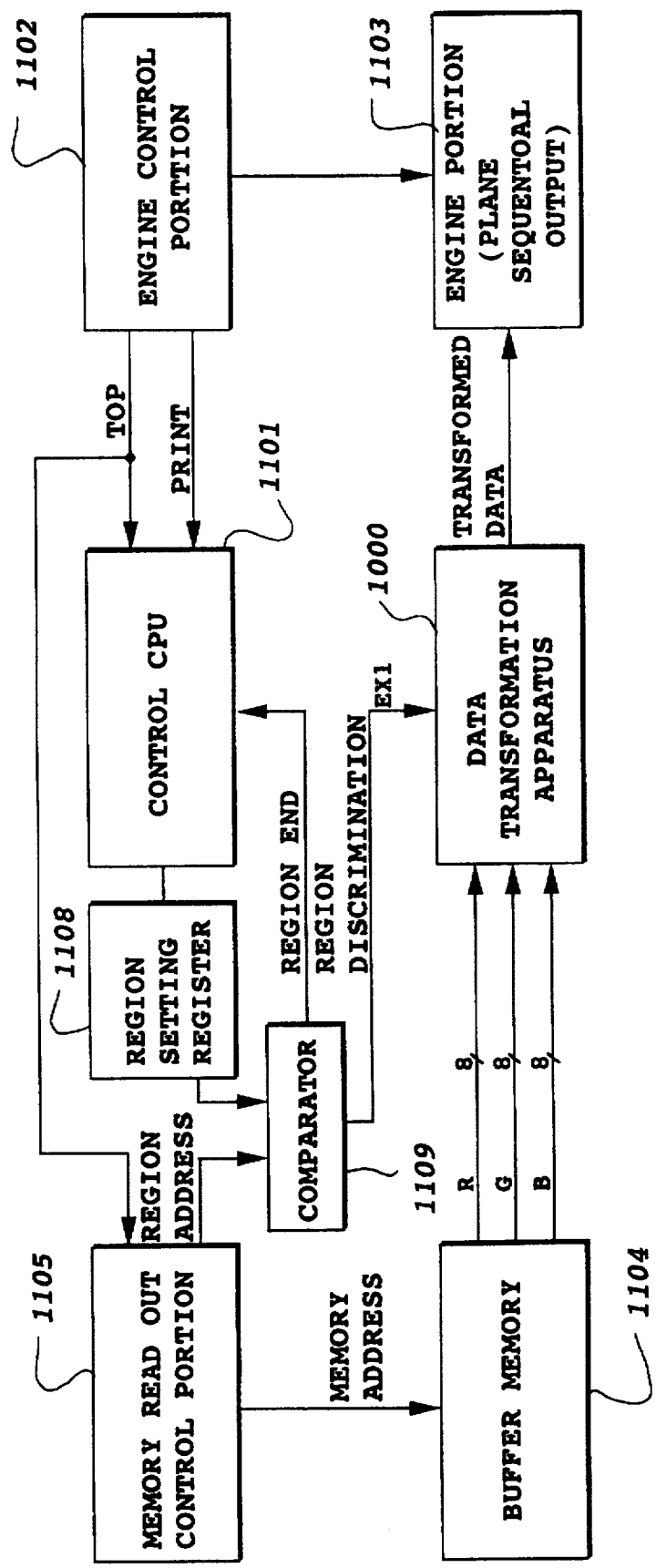
FIG. 33 is a block diagram showing a construction for executing the control process of FIG. 31.

As shown in FIG. 31, in the initial state at the step S3001, in the LUT of the kind which is to be accessed when the switching control signal EX1 is "0", the grid point data is stored for obtaining the transformed data of M(magenta) for the text. On the other hand, in the LUT of the kind to be accessed when the switching control signal EX1 is "1", the grid point data is stored for obtaining the transformed data of M(magenta) for the natural image.

When the printing operation is initiated, at step S3002, a counter value "i" indicative of what is to be transformed among M, C, Y, Bk, is incremented by "1". Then, at step S3003, a region of the natural image is set in a region setting register 1108 (see FIG. 33) by addresses in the longitudinal and lateral directions. Then, at step S3004, R, G, B data for one pixel is read out from the buffer memory 1104 (see FIG. 33) and the position address thereof is set. By this, at a next step S3005, the position address is checked whether it is within a range set in the region setting register 1108 by a comparator 1109 (see FIG. 33). That is, a check is performed whether or not the current position address is within the region for the natural image.

In this judgement, when judgement is made that the current position address is in a region for text, the switching control signal EX1 is set at "0" at step S3006, and then at step S3008, by the data transformation apparatus 1000 (see FIG. 33), the transformed data of the color indicated by the counter value i is obtained. For example, when i=1, the transformed data of M(magenta) is obtained.

As set forth above, for instance, until printing for one page for M (magenta) is completed, the processes through the steps S3003 to S3010 are repeated. When judgement is made that printing for one page is completed at step S3010, then at step S3012, in order to change the color to be represented by the counter value i, for example, after outputting the transformed data for magenta at i=1 is completed, in order to obtain the transformed data of cyan, the grid point data for respective of the "text" and the "natural image" of cyan are read out from a predetermined memory (not shown) to set in two kinds of LUTs.

As set forth above, with the shown embodiment, an optimal data transformation depending on the kind of the image while efficiently utilizing the LUT to obtain good image quality is obtained.

(NINETEENTH EMBODIMENT)

FIGS. 35, 36, 37 and 38 show the construction of the nineteenth embodiment of the data transforming system according to the present invention.

Figure 38:
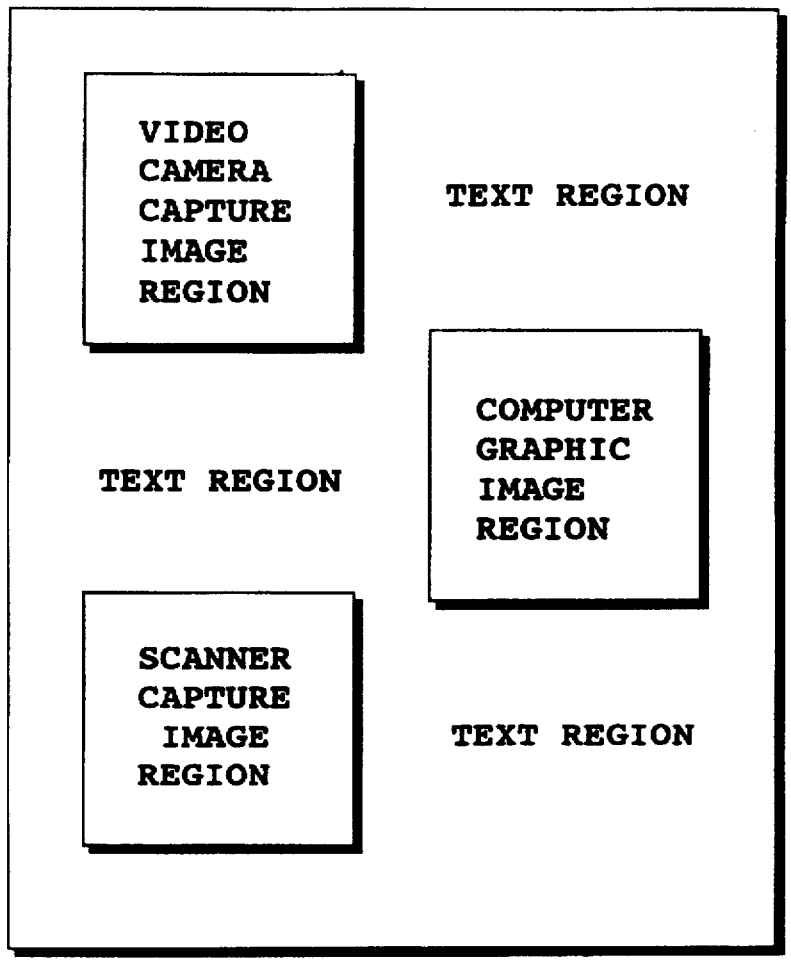
FIG. 38 is a diagrammatic illustration showing one example of an image output in the embodiment of FIG. 37.

In the shown embodiment, as shown in FIG. 38, in addition to "text", another three kinds of images, i.e. "video camera captured image", "computer graphic image" and "scanner captured image" are mixedly present in one page of an image, and data transformation is performed while employing four kinds of LUTs. Therefore, per every one pixel of R. G. B data read out from the buffer memory 1104 (see FIG. 37), an attribute bit indicative of the values of the switching control signals EX1 and EX2 is added so that the R. G. B data may be discriminated among the above-mentioned four kinds of images.

Figure 35B:
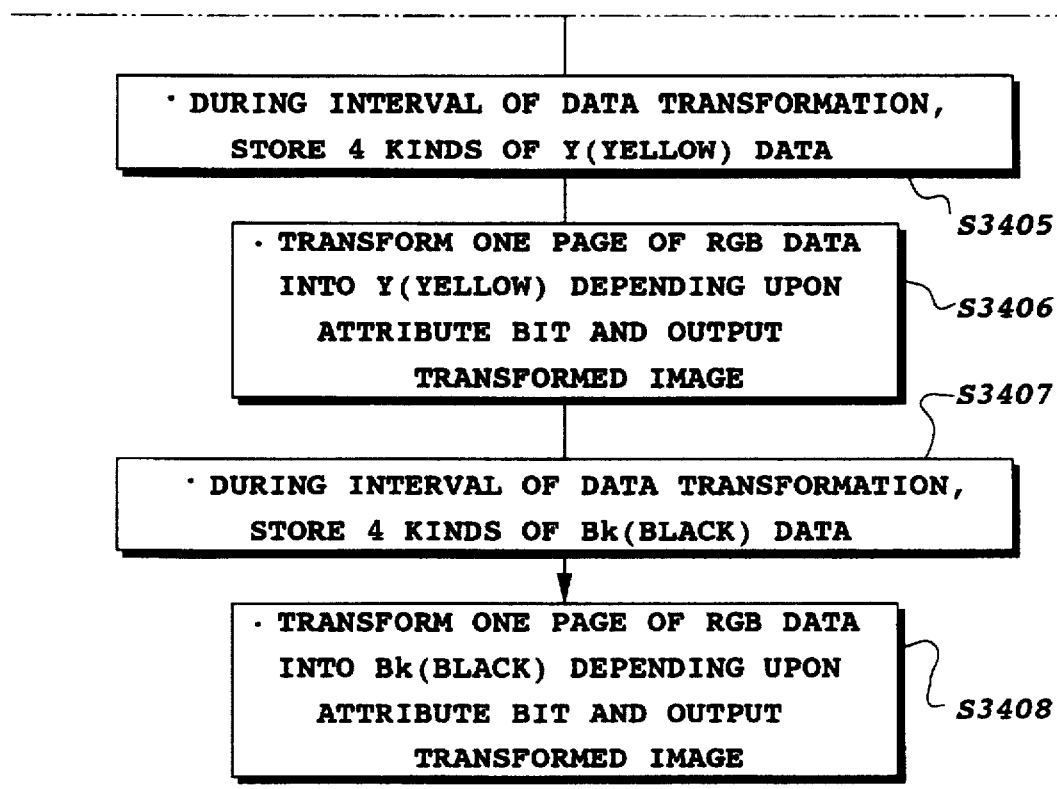
Figure 36:
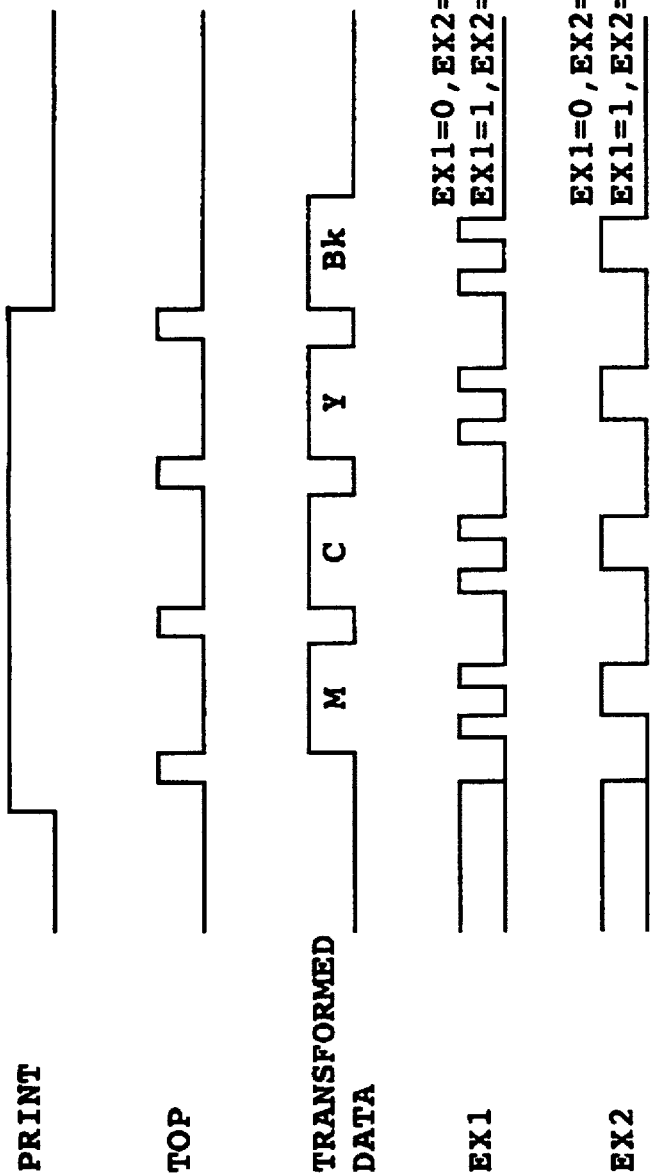
FIG. 36 is a timing chart of various signals in the control process of FIG. 35.
Figure 37:
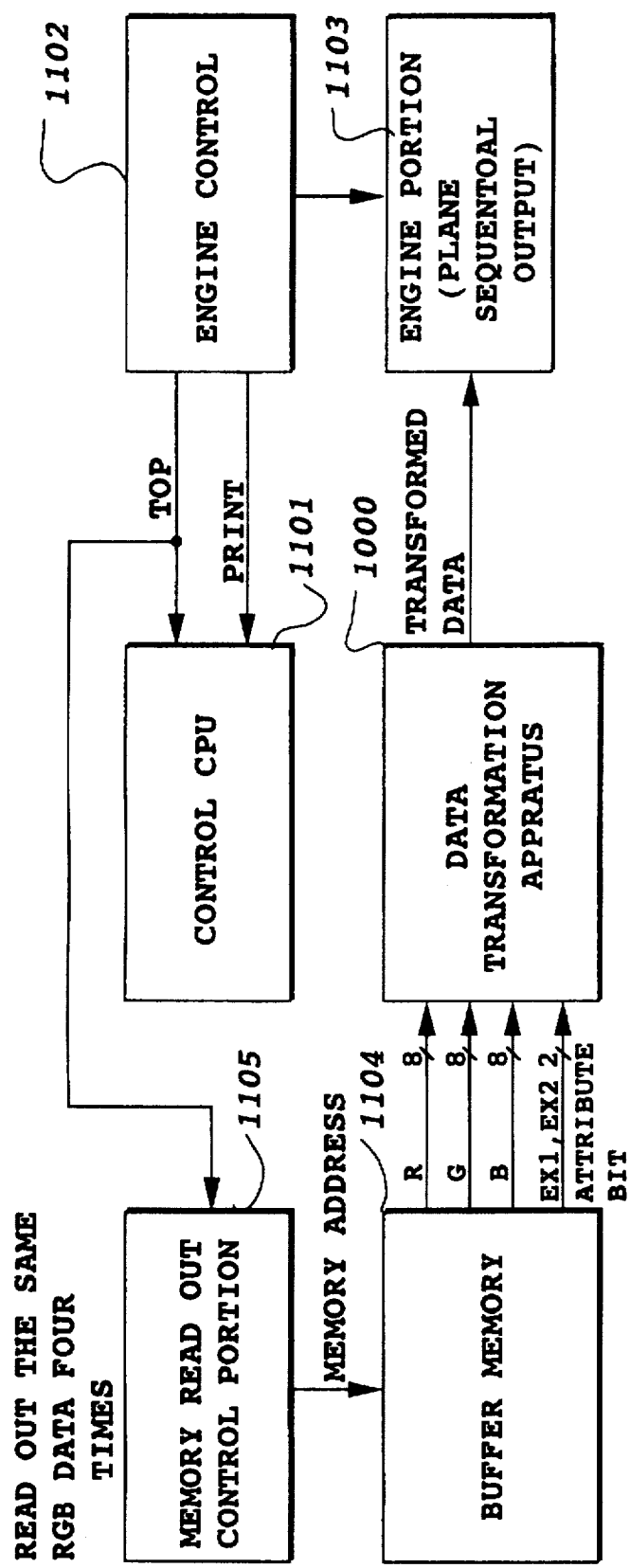
FIG. 37 is a block diagram showing a construction for executing the control process of FIG. 35.

In FIG. 35, in the initial state illustrated in step S3401, for the four kinds of LUTs to be accessed depending upon combinations of the values of EX1 and EX2, the grid point data for obtaining transformed data of M(magenta) relating to "text", "video image", "graphic" and "scanner image" are stored. Upon initiation of a printing operation, at step S3402, the grid point data is obtained by accessing the LUT of the kind corresponding to the combination of the attribute bits (EX1, EX2) added to the R. G. B date for every one pixel. Then, on the basis of this, the interpolating calculation is performed to obtain the transformed data. Then, on the basis of the obtained transformed data, the image is sequentially output to perform printing for one page. Next, at step S3403, while data transformation is not performed during the printing operation, with respect to the abovementioned four kinds of image, the grid point data is loaded for obtaining the transformed data of C(cyan).

Subsequently, similar operations are performed throughout the steps S3404 to S3408. Thereafter, the shown process ends.

(TWENTIETH EMBODIMENT)

Figure 39:
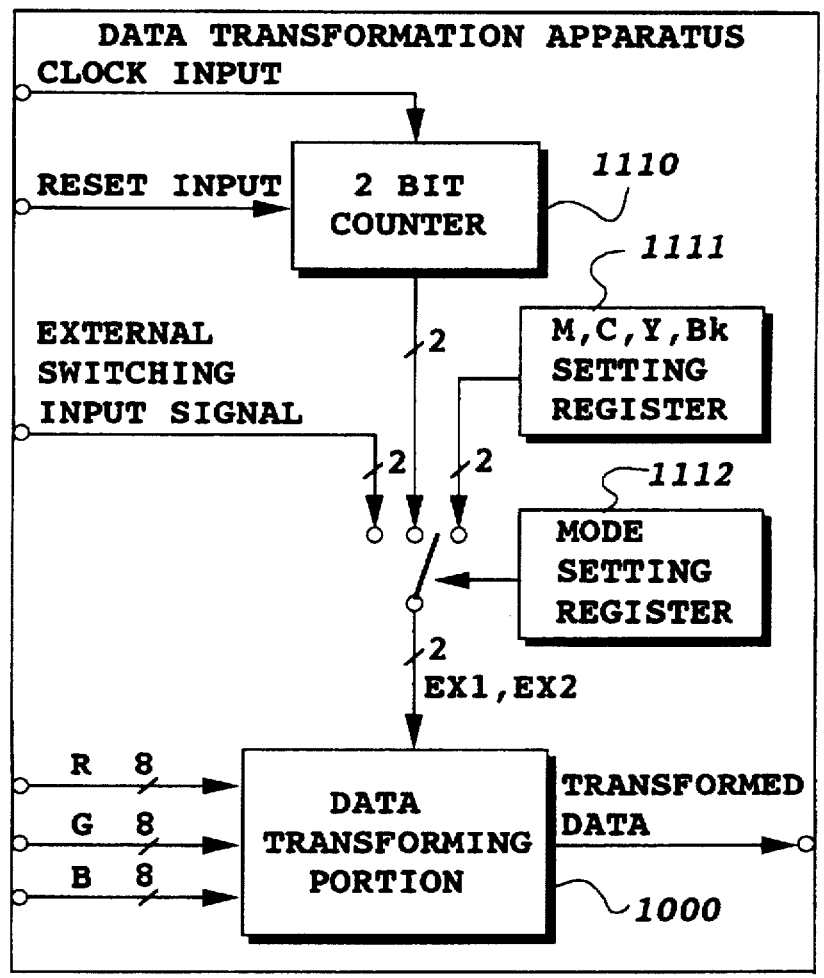
FIG. 39 is a block diagram showing a construction for switching a kind of an access LUT in the twentieth embodiment of a data transformation apparatus according to the present invention.

While the kind of LUT to be accessed is determined on the basis of the attribute bit of the switching control signals EX1 and EX2 added to the R. G. B data for every pixel in the above-mentioned nineteenth embodiment, the shown embodiment enables setting of the values of the switching control signal EX1 and EX2 depending upon the content of an external input signal, a built-in 2 bit counter or a register set by the CPU. FIG. 39 is a block diagram showing the construction for implementing this.

More specifically, as shown in FIG. 39, the selector 113 selects one of the external switching input signals, the value of the 2 bit counter 1110 or the value of the setting register 1111 depending upon the content of a mode setting register 1112, and the selected values are taken as the content of the switching control signals EX1 and EX2.

When the external switching input signal is employed, it becomes possible to apply both for the plane sequential output and the point sequential output. When the 2 bit counter is employed, in the case that it is operated at every system clock relating to reading out of the R. G. B data, it is applicable for the point sequential output, and in the case that it is operated at every line clock, it is applicable for a line sequential output. Furthermore, employment of the content of the setting register is suitable for the plane sequential output.

As set forth, with the above-mentioned embodiments, at the predetermined switching control signal condition, the region to be accessed in the look-up table is constantly limited to a partial region of addresses. By this, a plurality of the look-up tables can be stored at different regions to permit access only to selected ones of the look-up tables relating to one transformation characteristic.

On the other hand, by changing the content of the switching signal, the above-mentioned regions in each of the look-up tables are switched. Therefore, the look-up tables for different transformation characteristics are used.

As a result, the redundancy of the LUTs, which has been a problem in the prior art upon performing data transformation is successfully avoided. Therefore, a LUT is utilized in a 100% efficient manner.

Also, according to the present invention, an image forming system with a built-in look-up table is provided.

In the foregoing first to twelfth embodiments, basically, with respect to an n dimensional input, a $2^n$ points interpolating calculation employing $2^n$ in number of LUTs has been discussed. In the following embodiments, a discussion is given for four points interpolation with a three dimensional input, which permits reduction of the size of the interpolation circuit without significantly sacrificing accuracy in interpolation.

In advance of the discussion for the following embodiments, a construction for the four point interpolation to be employed in the shown embodiment and a construction for initially performing an interpolating operation and an arithmetic operation are discussed. It should be noted that these are similar to those disclosed in the above-identified Japanese Patent Application Publication No. 16180/1984 and Japanese Patent Application No. 285,330/1993, respectively.

At first, a discussion is given for the four point interpolation method.

As set forth above, assuming that the three color signals (n+m bits in each color) are expressed as $Xi=Xh \cdot 2^m+Xf$, $Yi=Yh \cdot 2^m+yf$ and $Zi=Zh \cdot 2^m+zf$, wherein Xh, Yh and Zh represents upper n bit signals of respective color signals Xi, Yi. Zi, and Xf, Yf and Zf represents the lower m bit signals of the respective color signals Xi, Yi. Zi.

In the LUT, with respect to all combination (23n combinations) of Xh=0, 1, 2, ..., $2^n-1$. Yh=0, 1, 2, ..., $2^n-1$, Zh=0, 1, 2, ... $2^n-1$, color data (grid point data) are stored. These grid point data are read out with an address signal of 3n bits derived by coupling the signals of Xf, Yf and Zf.

When the respective lower m bits of the data (Xi, Yi, Zi) before transformation, i.e. signals Xf, Yf and Zf, are "0", the grid point data read out from the LUT with the address signal per se are taken as a color data after transformation. Otherwise, depending upon the values of Xf, Yf and Zf, the color data after transformation are obtained as results of interpolation.

Figure 1:
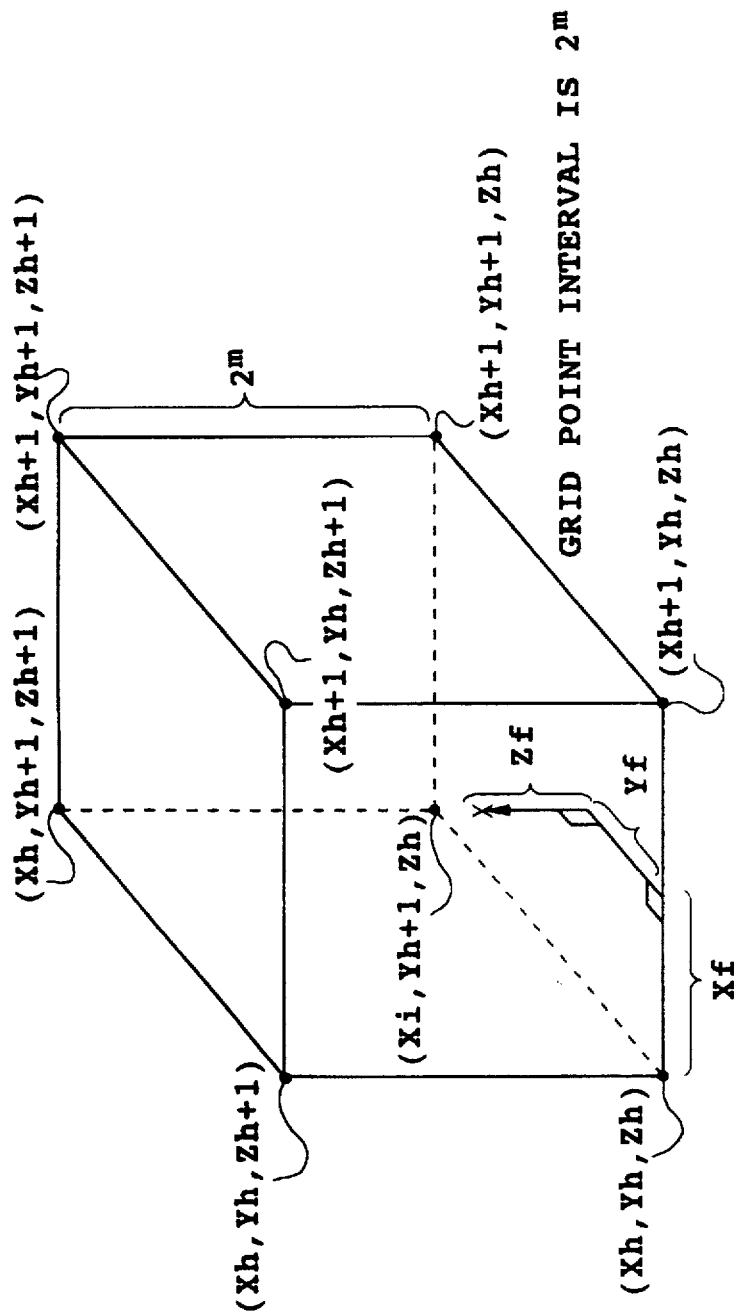
FIG. 1 is a diagrammatic illustration showing a concept of an interpolation space defined by the upper bits of three input data.

When eight grid points defined by the upper n bit signals Xh, Yh, Zh are taken as eight peaks of a cube as shown in FIG. 1, the three color signals Xi, Yi and Zi to be transformed are expressed as points (absolute coordinate thereof) in the cube. When the cube is divided by three planes (plane of Xf=Yf, plane of Yf=Zf and plane of Zf=Xf), six tetrahedrons are formed. Each of the tetrahedrons has four grid points.

Figure 2:
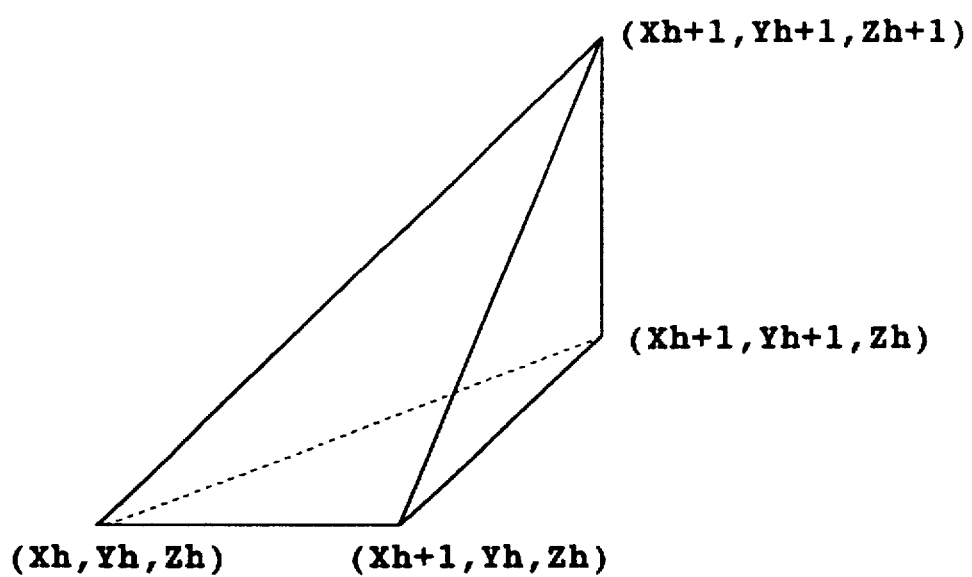
FIG. 2 is a diagrammatic illustration showing a concept of an interpolation space in a four point interpolation method.

The four points interpolation method discussed herein is used to perform interpolating employing four grid point data of such tetrahedrons. That is, the color signals to be transformed belong in any one of the six tetrahedrons (it is assumed that when the color signal is present at the boundary, it is assigned to one of the tetrahedrons having the corresponding boundary). The tetrahedron, in which the color signal to be transformed belongs, is determined depending upon the large and small relationship of Xf, Yf and Zf. For instance, when Xf>Yf>Zf is established, the color signal to be transformed is positioned within the tetrahedron illustrated in FIG. 2. Then, the coordinates of the grid point data to be used for the interpolation calculation becomes (Xh, Yh, Zh), (Xh+1, Yh, Zh), (Xh+1, Yh+1, Zh), (Xh+1, Yh+1, Zh+1).

When the grid point data are expressed by D(X-coordinate, Y-coordinate and Z-coordinate) and the transformed data are expressed by $H_6$ (Xi, Yi, Zi), the transformed data $H_6$ are derived from the following equation (15).

$$H_6(Xi,Yi,Zi) = 2^{-m} \cdot \{(2m - Xf) - D(Xh,Yh,Zh) + \quad (15)$$
$$(Xf - Yf) \cdot D(Xh+1,Yh,Zh) +$$
$$(Yf - Zf) \cdot D(Xh+1,Yh+1,Zh) +$$
$$Zf \cdot D(Xh+1,Yh+1,Zh+1)\}$$

Next, discussion is given for unification of the interpolating equation.

While the foregoing equation (15) is defined for each of the six tetrahedrons, the unified interpolating equation is expressed as follow:

$$H_7(Xi,Yi,Zi) = 2^m \cdot \{(2m - MAX) - D(Xh,Yh,Zh) + \quad (16)$$
$$(MAX - MED) - D(xh+x-MAx' \, Yh+Y-MAX,$$
$$Zh+Z-MAX) + (MED - MIN) \cdot$$
$$D(Xh + X\_MAX + X\_MED,$$
$$Yh + Y\_MAX + X\_MED, Zh + Z\_MAX + X\_MED) +$$
$$MIN \cdot D(Xh+1,Yh+1,Zh+1)\}$$

In the foregoing equation, MAX, MED, MIN respectively represent maximum value, center value and minimum value of Xf, Yf, Zf, and X_MAX, Y_MAX, Z_MAX, X_MED, Y_MED, Z_MED are respectively 1 bit signal indicative that Xf, Yf, Zf are the maximum value or the center value.

For instance, when Xf>Yf>Zf, the foregoing signals become the following values.

MAX=Xf, MED=Yf, MIN=Zf, X_MAX=1, Y_MAX=0, Z_MAX=0, X_MED=0, Y_MED=1, Z_MED=0

If these values are substituted into the equation (16), it is confirmed that the equation (16) is identical to the equation (15).

As set forth above, by employing the unified interpolation equation as expressed in the foregoing equation (16), the interpolating operation is simplified. However, when such interpolating operation is performed by utilizing only one LUT, the LUT has to be accessed a minimum of four times for outputting one transformed data. Therefore, the transformation speed is reduced.

In order to solve this problem, the inventor of the present invention has proposed in the above identified Japanese Patent Application No. 285,330/1993 four LUTs are provided and four grid point data necessary for the interpolating operation are read simultaneously to perform an interpolating process.

Figure 40:
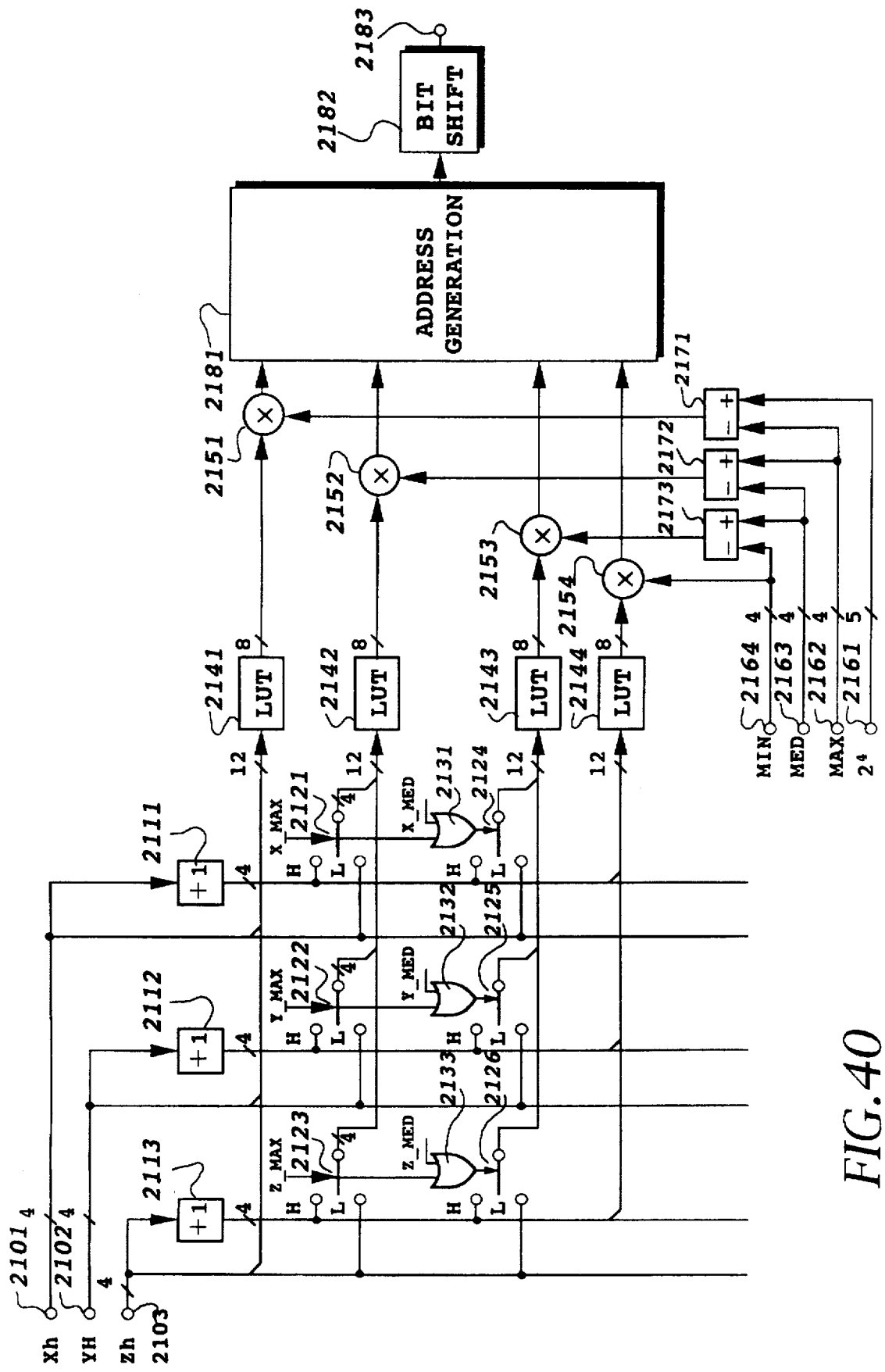
FIG. 40 is a block diagram showing a basic construction of an interpolation circuit in embodiments of the present invention.
Figure 41:
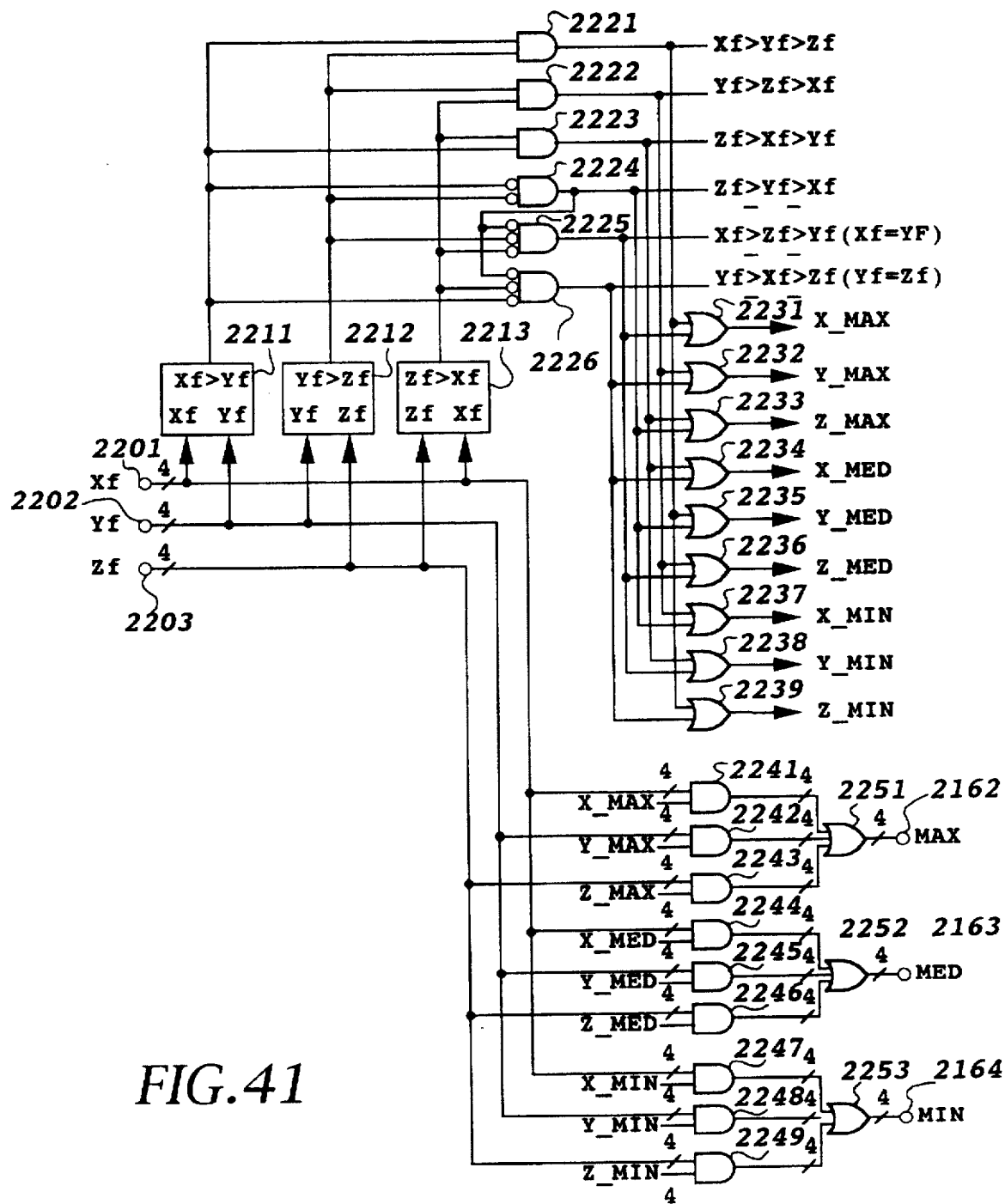
FIG. 41 is a block diagram showing a basic construction of the interpolation circuit in the embodiments.

FIGS. 40 and 41 shows one example of a construction of the data transformation apparatus to perform the interpolation at high speed as expressed by the foregoing equation (16). The examples of the construction shown in these figures illustrate the case where n=4 and m=4.

In FIG. 40, reference numerals 2101, 2102, 2103 denote input terminals for inputting the upper bit signal Xh, Yh and Zh of input data Xi, Yi, Zi, respectively, reference numerals 2111, 2112, 2113 denote adders for adding "1" for the respective upper bit signals Xh, Yh and Zh, reference numerals 2121 to 2126 denote respectively 4 bit width selectors having two inputs and one output, reference numerals 2131 to 2133 denote OR circuits having two inputs, reference numerals 2141 to 2144 denote transformation tables (LUTs) memories respectively having 4 Kbites (12 bit address and 8 bit output), reference numerals 2151 to 2154 denote multipliers, a reference numeral 2161 denotes a terminal for inputting a value of 24, reference numerals 2162, 2163, 2164 respectively denote terminals for inputting a maximum value, center value and minimum value of lower 4 bits signals Xf, Yf, Zf of the input data, reference numerals 2171 to 2173 denote subtracters, a reference numeral 2181 denotes an adder for calculating a total of the results of products of four multiplication outputs from the multipliers 2151 to 2154, a reference numeral 2182 denotes a bit shift circuit for performing a calculation corresponding to multiplication of a coefficient 2-m in the foregoing equation (16), and a reference numeral 2183 denotes a terminal for outputting an output signal of the data transformation apparatus.

FIG. 41 shows a circuit construction for generating signals for order of Xf, Yf and Zf and MAX, MED, MIN, X_MAX, Y_MAX, Z_MAX, . . . , Z_MIN and so forth.

In FIG. 41, reference numerals 2201, 2202, 2203 denote input terminals for inputting the lower 4 bit signals Xf, Yf and Zf of the input data Xi, Yi, Zi, respectively, reference numerals 2211, 2212, 2213 denote comparators for performing comparison between the lower 4 bit signals Xf, Yf and Zf, reference numerals 2221 to 2226 denote logical elements, such as AND and so forth, for generating a signal indicative of the order of Xf, Yf, Zf on the basis of the outputs from the three comparators 2211, 2212, 2213, reference numerals 2231 to 2239 denote logic OR elements generating signals (9 bit in total) indicative that the lower bit signals Xf, Yf, Zf is the maximum value, the center value or the minimum value, reference numerals 2241 to 2249 denote logic AND elements gating data (Xf, Yf or Zf) in accordance with the content of the 9 bit signals, reference numerals 2251 to 2253 denote logic OR elements for generating the maximum value (MAX), the center value (MED) and the minimum value (MIN) by OR synthesis of signals gated by the AND elements 2241 to 2249, and reference numerals 2162, 2163, 2164 denote terminals for outputting the maximum value, the center value and the minimum value, respectively, through which the maximum value, the center value and the minimum value are input to the terminals represented by the same reference numerals in FIG. 40.

Next, the operation of the circuit shown in FIG. 41 is discussed.

The upper 4 bit data (Xh, Yh, Zh) of respective 8 bit three input data (Xi, Yi, Zi) are input through the terminals 2101, 2102 and 2103 as illustrated in FIG. 40 respectively, and the lower 4 bit data (Xf, Yf, Zf) are input through the terminals 2201, 2202 and 2204 shown in FIG. 41, respectively. The three lower 4 bit data (Xf, Yf, Zf) are mutually compared with the comparators 2211 to 2213 to check whether respective relationships Xf>Yf, Yf>Zf and Zf>Xf are established or not. The resultant data is output from the comparators 2211 to 2213, respectively. The comparator output signal becomes "1", when the relationship is established and "0" otherwise. By making reference to two or more outputs of the comparators 2211 to 2213, the order of the three lower bit data is determined.

For instance, when Xf>Yf is established and Yf>Zf is also established, the order of Xf>Yf>Zf is established. In this case, the above-mentioned relationship is detected by detecting "1" of the output of the AND element 2221 because both outputs from the comparators 2211 and 2212 become "1".

Similarly, when the output of the AND element 2222 is "1", Yf>Zf>Xf is established, and when the output of the AND element 2223 is "1", Zf>Xf>Yf is established. There are six kinds of order of the foregoing three data. The remaining three are detected by AND gates 2224, 2225 and 226 with negative logical inputs (hereinafter occasionally referred to as merely "input"). For instance, the AND gate 2224 is adapted to detect the outputs of the comparators 2211 and 2212 in a state where both are "0". More specifically, when the output of the comparator 2211 is "0", $\overline{Xf>Yf}$, namely Yf≧Xf is established. When the output of the comparator 2212 is "0", Yf Zf, namely Zf≧Yf is established. Therefore, when the output of the AND element 2224 is "0", it is understood that a relationship of Zf≧Yf≧Zf is established.

Similarly, when AND elements for detecting "0" outputs of the comparators 2212 and 2213 and "0" outputs of the comparators 2211 and 2213 are provided, all of the six kinds of orders are detected. However, there is encountered a problem in that when Xf=Yf=Zf, all of the outputs of the comparators 2211 to 2213 become "0" to make all of the three signals output from the AND elements having negative logical inputs in the foregoing construction to be "1".

In such case, while MAX, MED and MIN becomes the same value, as a whole of the data transformation apparatus, the interpolating operation is performed without causing inconsistency. However, since a discrepancy may be caused in the meaning and values of the signals for all of six signals X_MAX, Y_MAX, Z_MAX, X_MED, Y_MED and Z_MED become "1", in the embodiment of FIG. 41, a construction which may not cause the above-mentioned problem is taken.

In concrete, the AND elements 2225 detecting "0" outputs of the comparators 2212 and 2213 also detects "0" output of the AND element 2224. The AND element 2226 performs a similar detection. By this, when Xf=Yf=Zf, the only output of the AND element 2224 becomes "1" and outputs of other AND elements become "0". By this, with respect to arbitrary values of Xf, Yf and Zf, only one of the AND elements 2221 to 2226 outputs "1" and the remaining five AND elements output "0". Therefore, the order of the Xf, Yf and Zf is classified into six variations.

On the basis of the six signals indicative of the order of Xf, Yf and Zf derived as set forth above, nine signals X_MAX, Y_MAX, Z_MAX, X_MED, Y_MED, Z_MED, X_MIN, Y_MIN and Z_MIN are generated.

Here, X_MIN, Y_MIN, Z_MIN are signals indicative of whether or not the corresponding data Xf, Yf and Zf are a minimum value, and are used for generating the minimum value MIN.

Next, on the basis of the order (large and small relationship) of Xf, Yf and Zf, X_MAX, X_MED and X_MIN are generated by the following generation methods. It should be noted that the method of generating other signals relating to Y and Z are identical to that discussed below. Therefore, the discussion for the generating method is omitted.

In the following six orders of Xf, Yf, Zf
(a) Xf>Yf>Zf, (b) Yf>Zf>Xf, (c) Zf>Xf>Yf
(d) Zf≧Yf≧Xf, (e) Xf≧Zf≧Yf (Xf≠Yf)
(f) Yf≧Xf≧Zf (Yf≠Zf)
more than one of these are simultaneously established and only one of these is established. The relationship established is seen by making reference to the outputs of the AND elements 2221 to 2226. The signal MAX is the signal indicative that the signal Xf is the maximum value, and becomes "1" when the relationship (a) or (e) is established in the above six orders. Accordingly, X_MAX is derived by composing the output signals of AND elements 2221 and 2225 by OR element 2231. Similarly, X_MED is a the signal indicative that Xf is the center value, and becomes "1" when the relationship (c) or (f) is established. Accordingly, X_MED is derived by composing the output signals of AND elements 2223 and 2226 by the OR element.

Furthermore, the signal of X_MIN is the signal indicative that Xf is the minimum value and becomes "1" when the relationship of (b) and (d) is established. Therefore, X_MIN is derived by composing the output signals of the AND elements 2222 and 2224 by the OR element.

The X_MAX (Y_MAX, Z_MAX) signals thus generated is fed to the selector 2121 to 2123 and the OR elements 2131 to 2133 in the construction of FIG. 40, and is used for generating the MAX signal shown in FIG. 41.

More specifically, by the X_MAX, Y_MAX, Z_MAX signals, corresponding to the lower 4 bit data Xf, Yf, Zf is gated. The gating operation is performed by AND elements 2241, 2242 and 2243 having two inputs for respective 4 bits.

The outputs of the AND elements 2241, 2242 and 2243 are composed by OR gate 2251 having a 4 bit width three inputs and one output to obtain the maximum value MAX. The maximum value MAX is output to the terminal 2162.

Similarly, the X_MED, Y_MED, Z_MED signals are fed to the OR elements 2131 to 2133 shown in FIG. 40 and are used for generating the MED signal shown in FIG. 41. The methods of generating this MED signal and a MIN signal are the same as the MAX signal generating method.

Hereafter, the operation of the construction shown in FIG. 40 on the basis of respective signals generated by the construction shown in FIG. 41 is discussed.

In FIG. 40, the upper 4 bit signals Xh, Yh and Zh of the three input data (respectively 8 bits) input through the terminals 2101 to 2103 are fed to adders 2111 to 2113 for adding "1" to Xh, Yh and Zh and to L-side terminals of the selectors 2121 to 2126. Also, respective 4 bit upper bit signals Xh, Yh and Zh are coupled into 12 bits to be supplied to the LUT 2141 for storing the grid point data as the address signal.

From the LUT 2141, the value D(Xh, Yh, Zh) in the foregoing equation (16) is read out. On the other hand, the signal to be output from the adders 2111 to 2113 are Xh+1, Yh+1 and Zh+1. These signals are fed to the H-side terminal of the selectors 2121 to 2126. Also, these signals are coupled into a 12 bit signal to be applied to the LUT 2144 as an address signal.

From this LUT, the value D(Xh+1, YH+1, Zh+1) in the foregoing equation (16) are read out. The selectors 2121 to 2123 are controlled by the X_MAX, Y_MAX, Z_MAX generated in the circuit shown in FIG. 41 so that when these signals are "1", the H-side is selected and when these signals are "0", the L-side is selected. When the H-side is selected, a value derived by adding "1" to one of the upper 4 bit signals Xh, Yh, Zh is output from the selector. When the L-side is selected, the upper 4 bit signal is output from the selector as is. Accordingly, when X_MAX is "1", Xh+1 when Y_MAX is "1", Yh+1 and When $Z_{13}$MAX is "1", Zh+1 is output from corresponding selector 2121 to 2123, respectively. Respective 4 bit signals output from the selectors are coupled into 12 bits to be applied to the LUT 2142 as an address signal. Accordingly, from the LUT 2142, the value D(Xh+X_MAX, Yh+Y_MAX, ZH+Z_MAX) of the foregoing equation (16) is read out.

Similarly, the selectors 2124 to 2126 are controlled by an OR operation between corresponding signals of X_MAX, Y_MAX, Z_MAX signals and X_MED, Y_MED, Z_MED signals. Respective 4 bits output from these selectors are coupled into 12 bits to be applied to the LUT 2143 as an address signal. Accordingly, from the LUT 2143, the value D(Xh+X_MAX+X_MED,Yh+Y_MAX+X_MED, Zh+Z_MAX+X_MED) in the foregoing equation (16) is read out.

As set forth above, four grid point data (respectively 8 bits) read from the LUTs 2141 to 2144 are applied to the respective multipliers 2151 to 2154 as multiplied values.

On the other hand, to the terminal 2161, a value $2^4$ is input and to the terminals 2162 to 2164 MAX, MED and MIN generated in the circuit show in FIG. 41 are input. These signals are fed to the subtracters 2171 to 2173. The subtracter 2171 calculates ($2^4$-MAX). Similarly, the subtracter 2172 calculates (MAX-MED) and the subtracter 2173 calculates (MED-MIN). The results of subtractions are applied to the multipliers 2151 to 2153 as multiplying values. On the other hand, the MIN signal input through the terminal 216 is directly applied to the multiplier 2154 as a multiplying value. In the four multipliers, multiplication for the four segments in the foregoing equation (16) are performed. The results of the multiplications are fed to the adder 2181.

Then, in the adder 2181, all of the four input values are added. The sum from addition in the adder 2181 is fed to a bit shifter 2182. The bit shifter 2182 performs a calculation corresponding to the first coefficient $2^{-m}$ (here m=4). The output of the bit shifter 2182 is fed to an output terminal 2183 and $H_6$ (Xi, Yi, Zi) in the foregoing equation (16) is output through the terminal 2183.

(TWENTY-FIRST EMBODIMENT)

Figure 42:
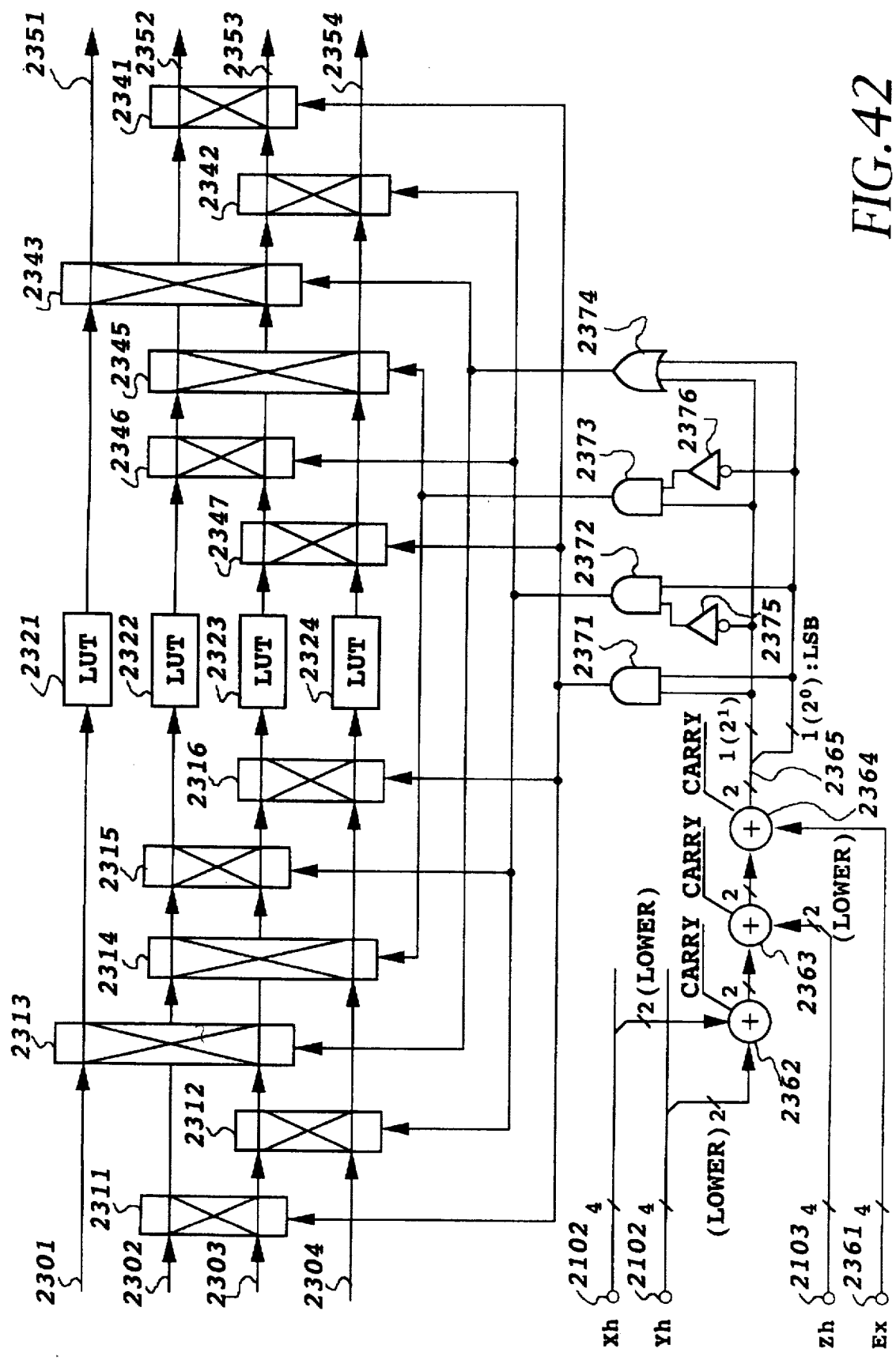
FIG. 42 is a block diagram showing a major construction of a twenty-first embodiment of a data transformation apparatus according to the present invention.

FIG. 42 is a block diagram showing the major portion of the twenty-first embodiment of the data transformation apparatus, in which are illustrated an address exchanger, data exchanger as a relocating means for relocating an address and a data and control circuit for these exchangers. The exchangers are newly added to the construction shown in FIGS. 40 and 41.

Namely, in FIG. 42, the address generating portion and the interpolating operation portion are neglected. In FIG. 42, reference numerals 2301 to 2304 denote address signals similar to the signals to be input to the LUTs 2141 to 2144 shown in FIG. 40. Reference numerals 2311 to 2316 denote address exchangers having a function for mutually exchanging the supply path of two address signals, respectively, and adapted to differentiate the LUT to be accessed depending upon the input data, to be discussed later. Reference numerals 2321 to 2324 denote LUTs. While these have the same memory capacity to those of LUTs 2141 to 2144 in FIG. 40, the content stored therein are differentiated. More specifically, the LUTs 2141 to 2144 in FIG. 40 have the identical content and thus the same content of the grid point data are stored in the four LUTs in an overlapping manner. In contrast, the LUTs in FIG. 42 store grid point data divided from the single table content.

Reference numerals 2341 to 2347 are data exchangers having functions for mutually exchanging grid point data read out from the LUTs. The grid point data 2351 to 2354 output from the data exchangers 2341 to 2347 are fed to multipliers 2151 to 2154 in FIG. 40 for subjecting the grid point data to interpolating operation.

These data exchangers become necessary, since when the address signals are relocated by the address exchangers 2311 to 2316, the grid point data read out from the LUTS 2321 to 2324 are also relocated to differentiate correspondence between the grid point data and the weighting coefficient for multiplication in the subsequent interpolation process, otherwise. The address exchangers 2311 to 2316 and the data exchangers 2341 to 2346 are symmetrically arranged with respect to the LUTs 2321 to 2324 in the sense of function. Corresponding to address exchange in respective address exchangers 2311 to 2316, data exchange is performed in respective data exchangers 2341 to 2346.

A reference numeral 2361 denotes a terminal for inputting a 2 bit control signal EX for switching the LUTs (kinds of data transformation), and reference numerals 2362 and 2363 denote adders having two 2 bit inputs. These adders calculate a residue when a sum of the upper bit signals Xh, Yh, Zh and the switching control signal EX is divided by 4 (hereinafter expressed as "(Xh+Yh+Zh+EX)%4"). The results of the calculation are output to a signal line 2365. For calculating (Xh+Yh+Zh+EX)%4, necessary signals are the respective lower 2 bits of the upper bit signals Xh, Yh, Zh and the switching control signal EX. At first, in the adder 2362, the lower 2 bits of the signal Xh and lower 2 bits of the signal Yh are added. Ignoring carry output of the result of addition, the lower 2 bits of the output of the adder 2363 is added with the lower 2 bits of the signal Zh by the adder 2363. Again, ignoring the carry output, the lower 2 bits of the resultant value in addition in the adder 2363, is added with the switching control signal EX (2 bits) in the adder 2364. Ignoring the carry output, the result of addition becomes (Xh+Yh+Zh+EX)%4.

The 2 bit signal thus obtained is input to AND elements 2371 to 2373 having two inputs, an OR element 2374 having two inputs and inverters 2375 and 2376, respectively, for generating the control signals for the address exchangers and the data exchangers.

Here, the operation of the address exchangers 2311 to 2316 and the data exchangers 2341 to 2346 are similar to the operation discussed with respect to FIGS. 4A and 4B. Therefore, a detailed discussion is omitted to keep the description simple to facilitate a clear understanding of the invention.

FIGS. 43A to 43D are explanatory illustrations showing a manner of exchanging of the address signals in the address exchangers 2311 to 2316 depending upon the value of (Xh+Yh+Zh+EX)%4.

The address signals 2301 to 2304 shown in FIG. 42 are the signals coupling X address (Xh or Xh+1), Y address (Yh or Yh+1) and Z address (Zh or Zh+1). Assuming the value upon simply adding three addresses, Xh+Yh+Zh is S, the values of the address signals 2301 to 2304 becomes S, S+1, S+2 and S+3 as is clear from FIG. 40.

Here, when the switching control signal EX is set to "0", the value of S%4 ((Xh+Yh+Zh+EX)%4) is differentiated depending upon the lower 2 bit signals of the upper bit signals Xh, Yh and Zh. As is clear from the construction in FIG. 42, FIG. 43A shows an address exchange corresponding to S%4=0, FIG. 43B shows an address exchange corresponding to S%4=1, FIG. 43C shows an address exchange corresponding to S%4=2 and FIG. 43D shows an address exchange corresponding to S%4=3.

Figure 43A:
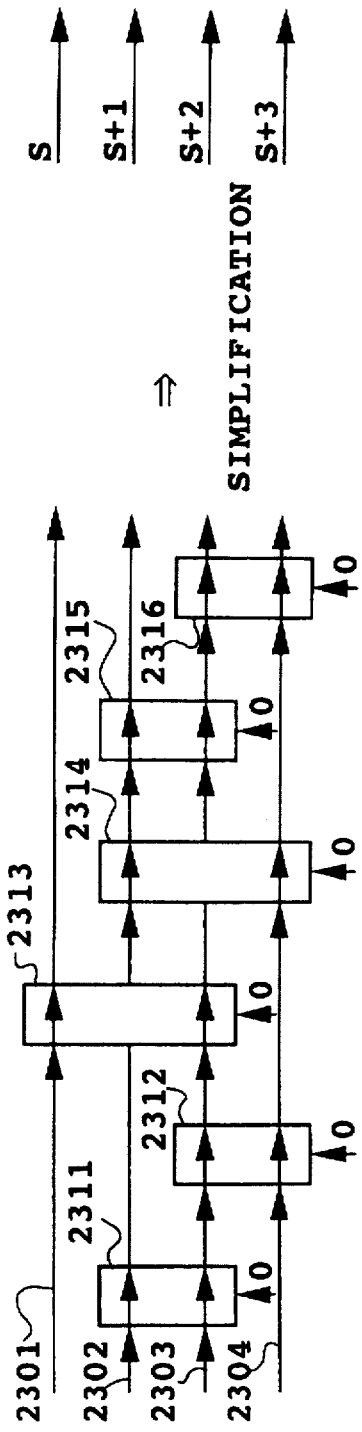
Figure 43B:
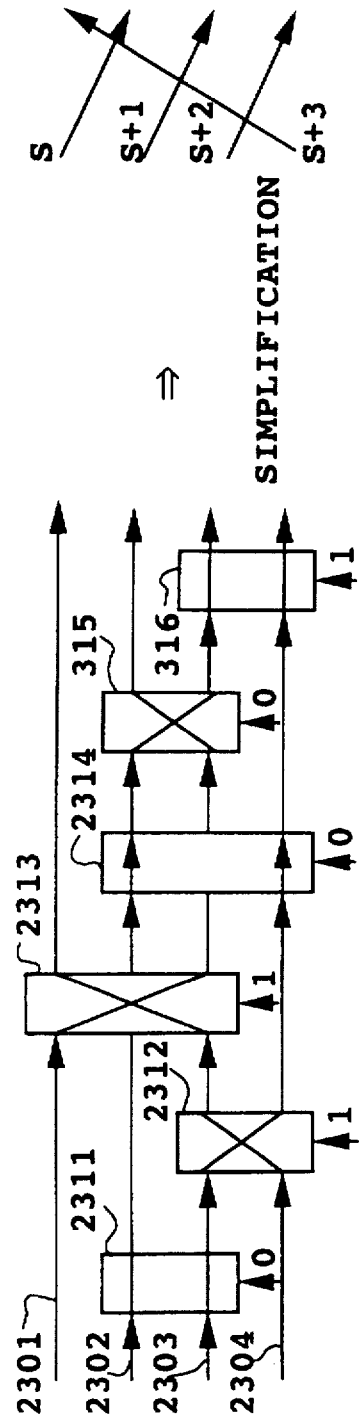

Assuming that the sum of the X, Y, Z addresses input to the respective LUTs by address exchange is Adr, the Adr through address exchange to be input to the LUT 2321 (see FIG. 42) becomes S in the case of FIG. 43A, and respectively S+3, S+2, S+1 in respective cases of FIGS. 43B to 43D.

When S%4=1 (FIG. 43B), the Adr of the address input to the LUT 2321 is S+3. Therefore, for this case, Adr%4=(S+3)%4=0. Similarly, when S%4=2 (FIG. 43C), the ADr of the address to be input to the LUT 2321 becomes S+2. Therefore, Adr%4=(S+2)%4=0 (discussion is omitted for the case of S%4=0,3). In conclusion, Adr of the address to be input to the LUT 2321 always satisfies Adr%4=0 in the case of EX=0.

Next, the Adr of the address to be input to the LUT 2322 becomes S+1 in the case of FIG. 43A and respectively S, S+3, S+2 in respective cases of FIGS. 43B to 43D. Accordingly, since when S%4=1 (FIG. 43B), the Adr of the address to be input to the LUT 2322 is S, for this case, ADr%4=S%4=1. Similarly, since the Adr of the address to be input when S%4=2 is S+3, Adr%4=(S+3)%4=1 is established. Therefore, the Adr of the address to be input to the LUT 2322 satisfies Adr%4=1 as long as EX=0.

Similarly, as long as EX=0, the Adr of address to be input to the LUT 2323 satisfies Adr%4=2, and as long as EX=0, the Adr of address to be input to the LUT 2324 satisfies Adr%4=3. As set forth above, when the switching control signal EX is 0, for the LUTs 2321 to 2324, only addresses with which Adr%4 are respectively 0, 1, 2, 3 are applied, and other addresses are never applied.

Figure 67B:
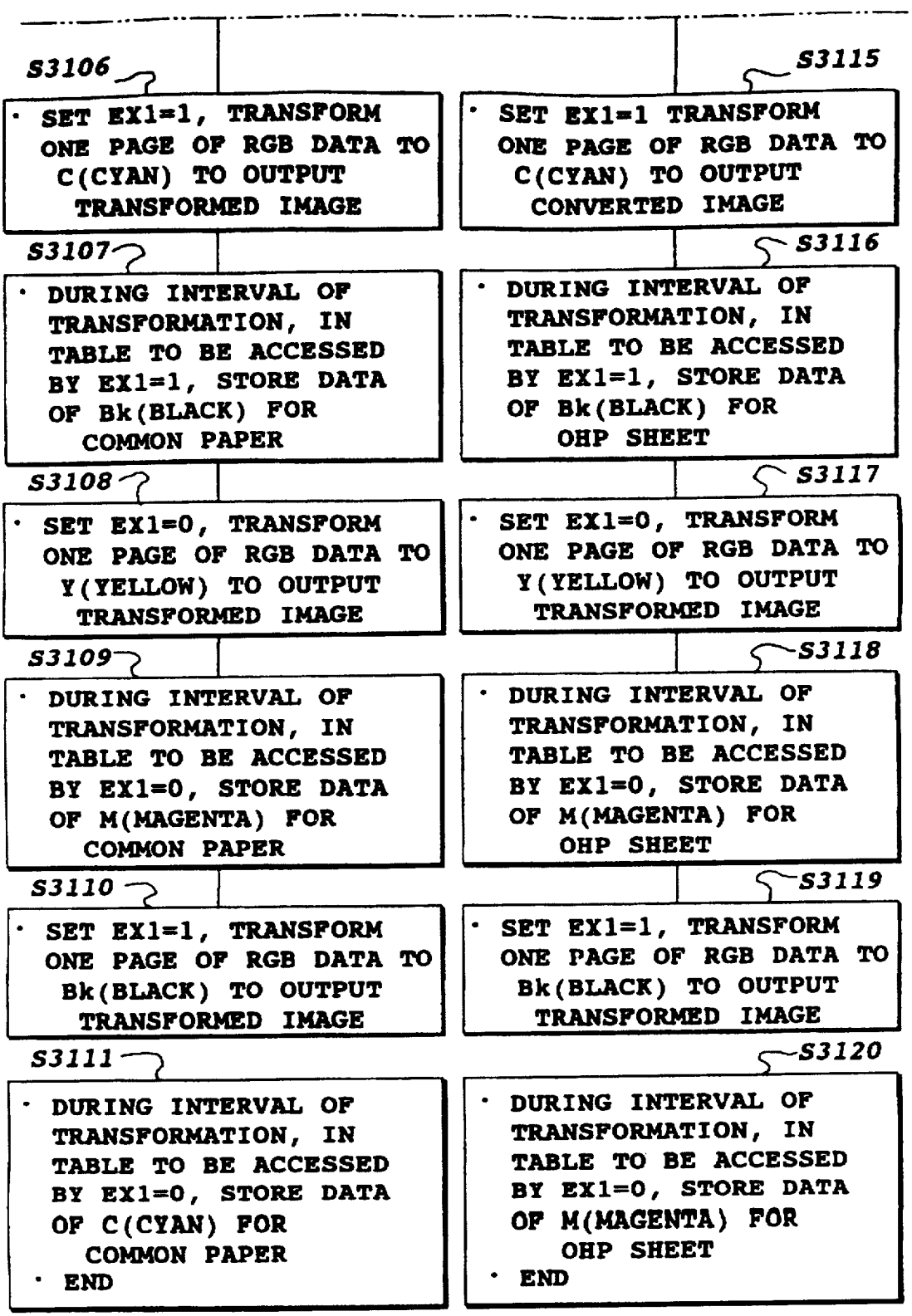

Therefore, as discussed with respect to FIG. 67 and subsequent drawings, in the LUTs 2321 to 2324, the transformation table data (grid point data) associated with the first kind of data transformation are stored at respective addresses to be accessed only when EX=0. In a similar manner, for respective addresses to be accessed only when EX=1, 2, 3, transformation table data associated with the second to fourth kinds are stored in the respective LUTs 2321 to 2324.

FIG. 44 shows values of Adr%4 of the addresses for accessing respective LUTs. As is clear from FIG. 44, with respect to different values of EX, Adr%4 of addresses for accessing the respective LUTs are completely differentiated. Therefore, four mutually distinct transformation table data are stored without causing overlapping.

While the operation of the address exchangers 2311 to 2316 is discussed here above, the operation of the data exchangers 2341 to 2347 is completely symmetric to those of the address exchangers since the address exchangers 2311 to 2316 and the data exchangers 2341 to 2347 are arranged in symmetry across the LUTs 2321 to 2324. Accordingly, by the data exchangers, 2341 to 2347, the grid point data of one of the mutually independent four transformation tables (regions) stored in the LUTs 2321 to 2324 may be read out depending upon the value of EX to feed to the interpolating operation portion with rearrangement to the order before address exchange. By this, the interpolating operation is performed satisfactorily. As a result, by the shown embodiment, four kinds of data transformation processes are selectively performed depending upon the value of EX.

(TWENTY-SECOND EMBODIMENT)

Figure 45:
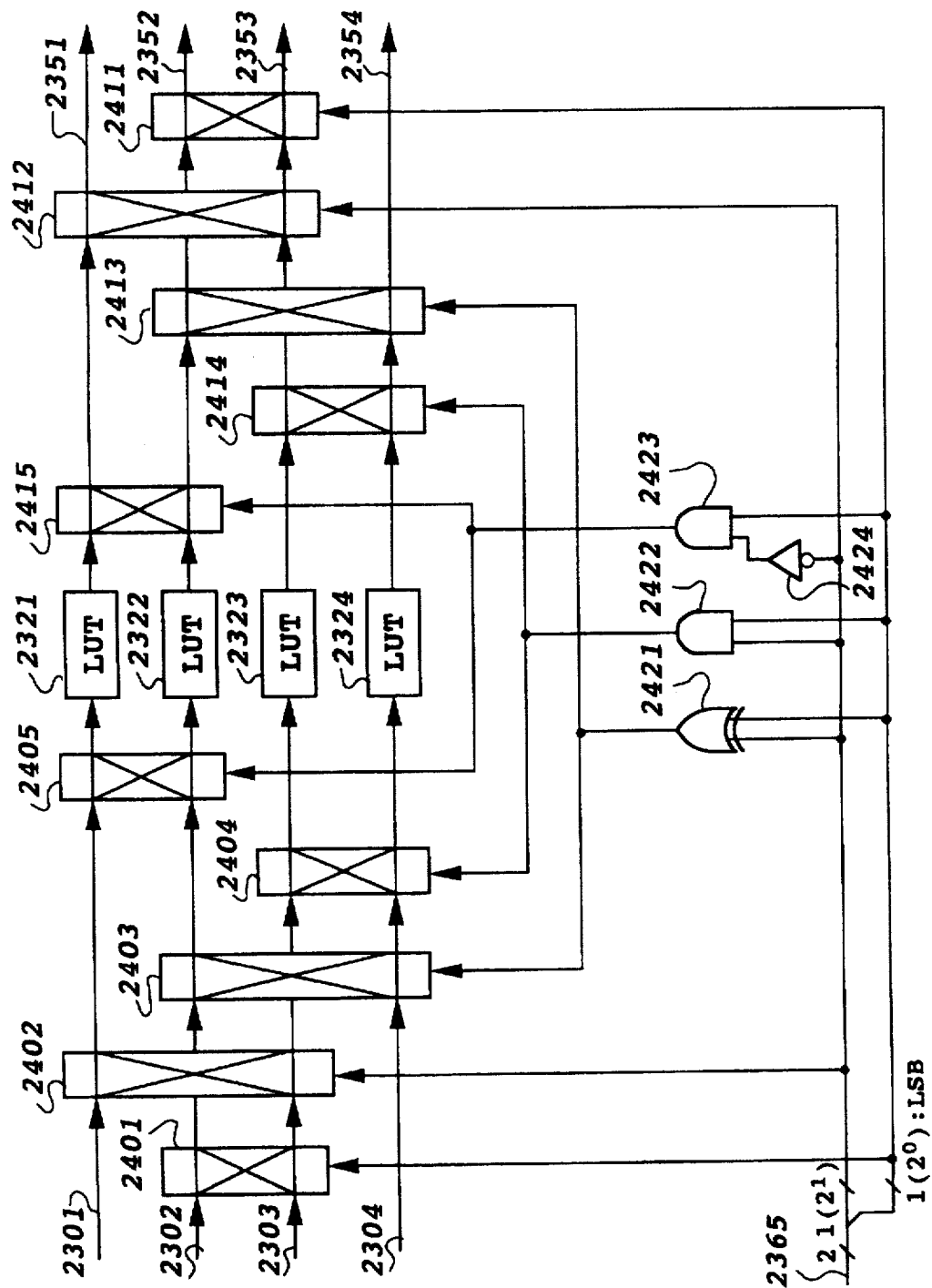
FIG. 45 is a block diagram showing a major construction of a twenty-second embodiment of a data transformation apparatus according to the present invention.
Figure 46A:
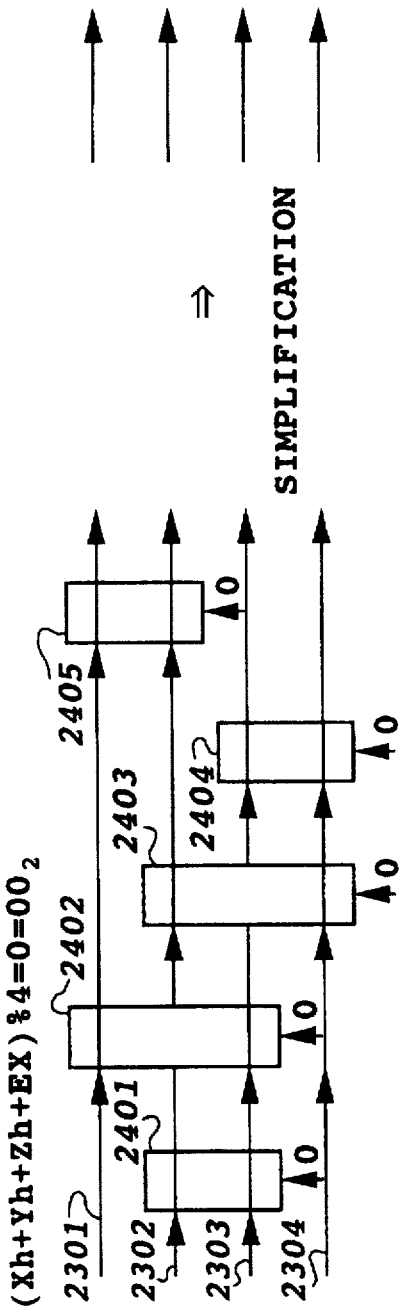
FIGS. 46A, 46B, 46C and 46D are explanatory illustrations illustrating address change in the embodiment of FIG. 45.
Figure 46B:
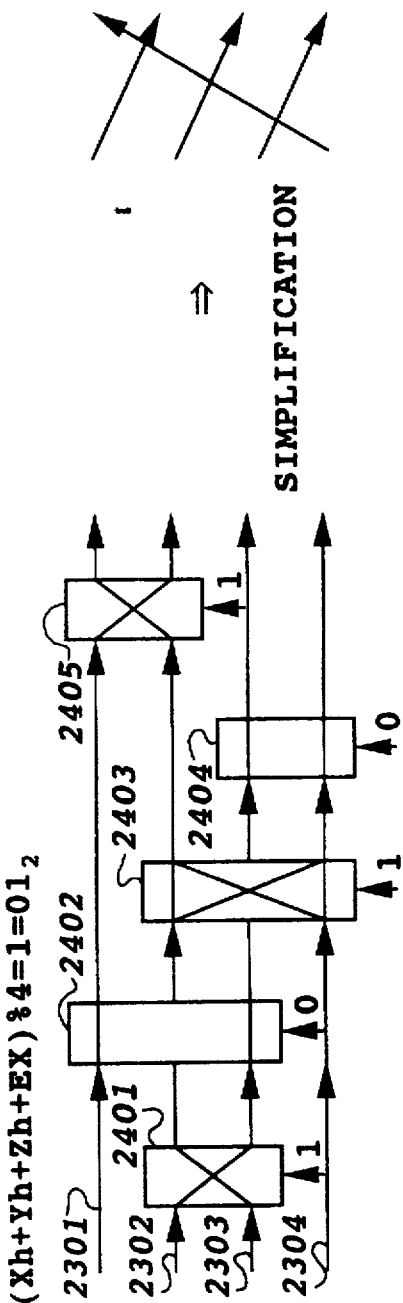
Figure 46C:
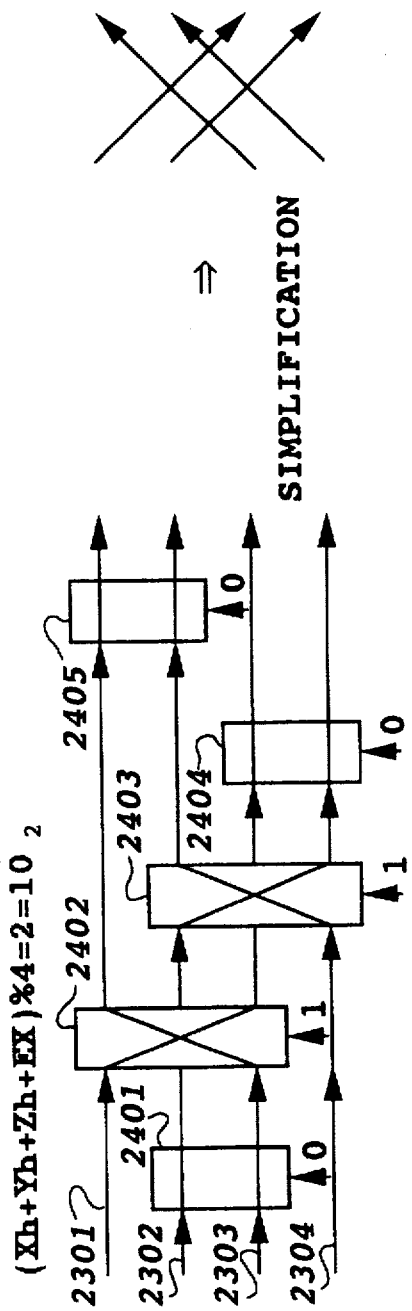
Figure 46D:
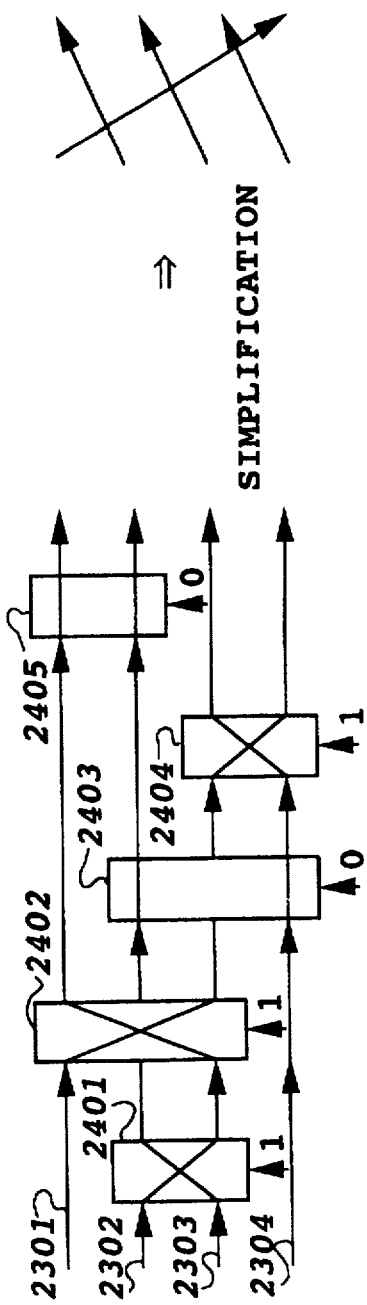

FIG. 45 is a block diagram showing a construction of a twenty-second embodiment of a data transformation apparatus according to the present invention.

While in the foregoing twenty-first embodiment, respectively six address exchangers and data exchangers having two inputs and two outputs are employed, the shown embodiment is one which reduces the number of the address exchangers and the data exchanges to five.

In FIG. 45, reference numerals 2401 to 2405 denote address exchangers, reference numerals 2411 to 2415 denote data exchangers, a reference numeral 2421 denotes an exclusive OR (hereafter referred to as "EXOR") element, reference numerals 2422 and 2423 denote AND elements having two inputs, and a reference numeral 2424 denotes an inverter. Other elements and signals are the same as those shown in FIG. 42 with the same reference numerals. Also, in the shown embodiment, while the description for the circuit calculating (Xh+Yh+Zh+EX)%4 is omitted, the circuit is the same as the calculation circuit shown in FIG. 42.

FIGS. 46A to 46D are explanatory illustrations showing address exchanging operation in respective address exchangers in accordance with the value of (Xh+Yh+Zh+EX)%4.

As is clear from comparison of FIGS. 46A to 46D with FIGS. 43A to 43D, the function for exchanging address signals in the shown embodiment is comparable with the address signal exchanging function in the twenty-first embodiment. Accordingly, the shown embodiment has a comparable data transformation function to the foregoing twenty-first embodiment.

(TWENTY-THIRD EMBODIMENT)

Figure 47:
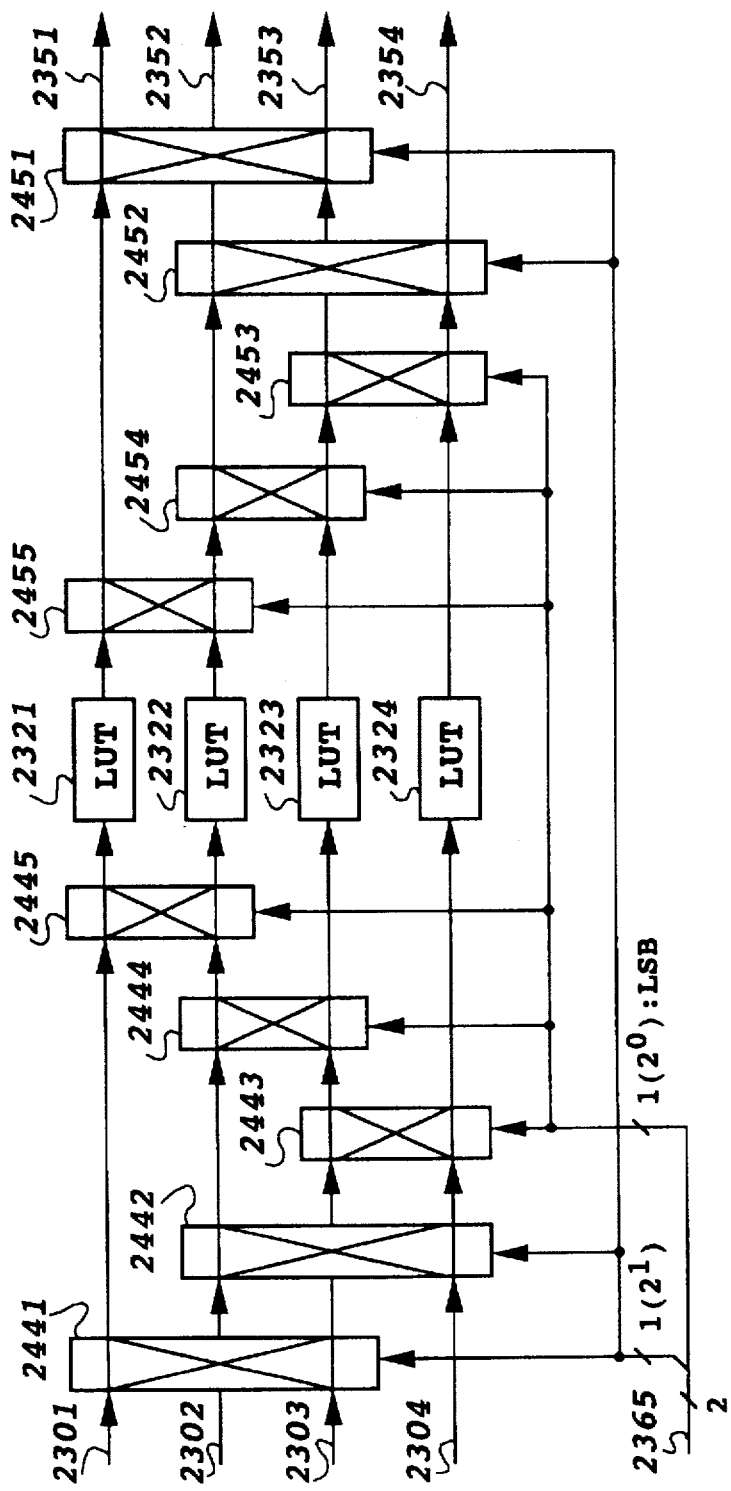
FIG. 47 is a block diagram showing a major construction of a twenty-third embodiment of a data transformation apparatus according to the present invention.
Figure 48C:
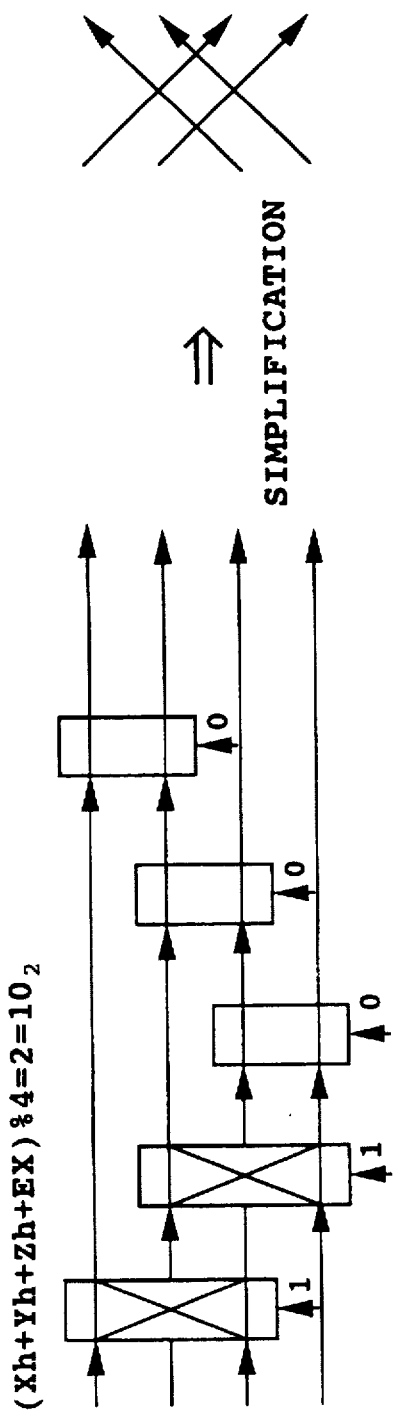
Figure 48D:
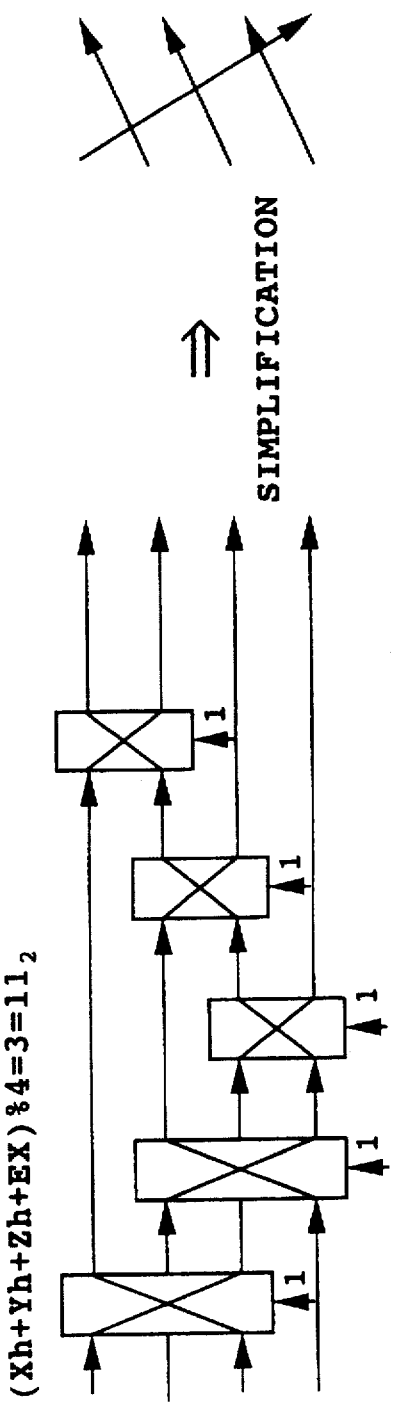

FIG. 47 is a block diagram showing a construction of a twenty-third embodiment of a data transformation apparatus according to the present invention.

The shown embodiment employs respective five address exchangers and data exchangers similarly to the foregoing twenty-second embodiment. However, the shown embodiment is one which makes the decoding circuit (logic elements 2421 to 2424 in FIG. 45 or logic elements 2371 to 2376 in FIG. 42) unnecessary. More specifically, the 2 bit signal obtained through calculation of the (Xh+Yh+Zh+EX)%4 as a control signal for the above-mentioned exchangers by inputting the upper bit signal thereof to address exchangers 2441 to 2442 and the lower bit signal thereof to address exchangers 2443 to 2945.

In FIG. 47, reference numerals 2441 to 2445 denote the address exchangers, and reference numerals 2451 to 2455 denote data exchangers. Other elements and signals are similar or the same as those in the foregoing twenty-second embodiment (FIG. 45).

FIGS. 48A to 48D are explanatory illustrations showing a manner of the address exchanging operation in respective address exchangers in accordance with the value of (Xh, Yh, Zh+EX)%4.

As is clear from FIGS. 48A to 48D, the function for exchanging address signals in the shown embodiment is comparable with the address signal exchanging function in the twenty-first and twenty-second embodiments. Accordingly, the shown embodiment has a comparable data transformation function to the foregoing twenty-first and twenty-second embodiments.

(TWENTY-FOURTH EMBODIMENT)

Figure 49:
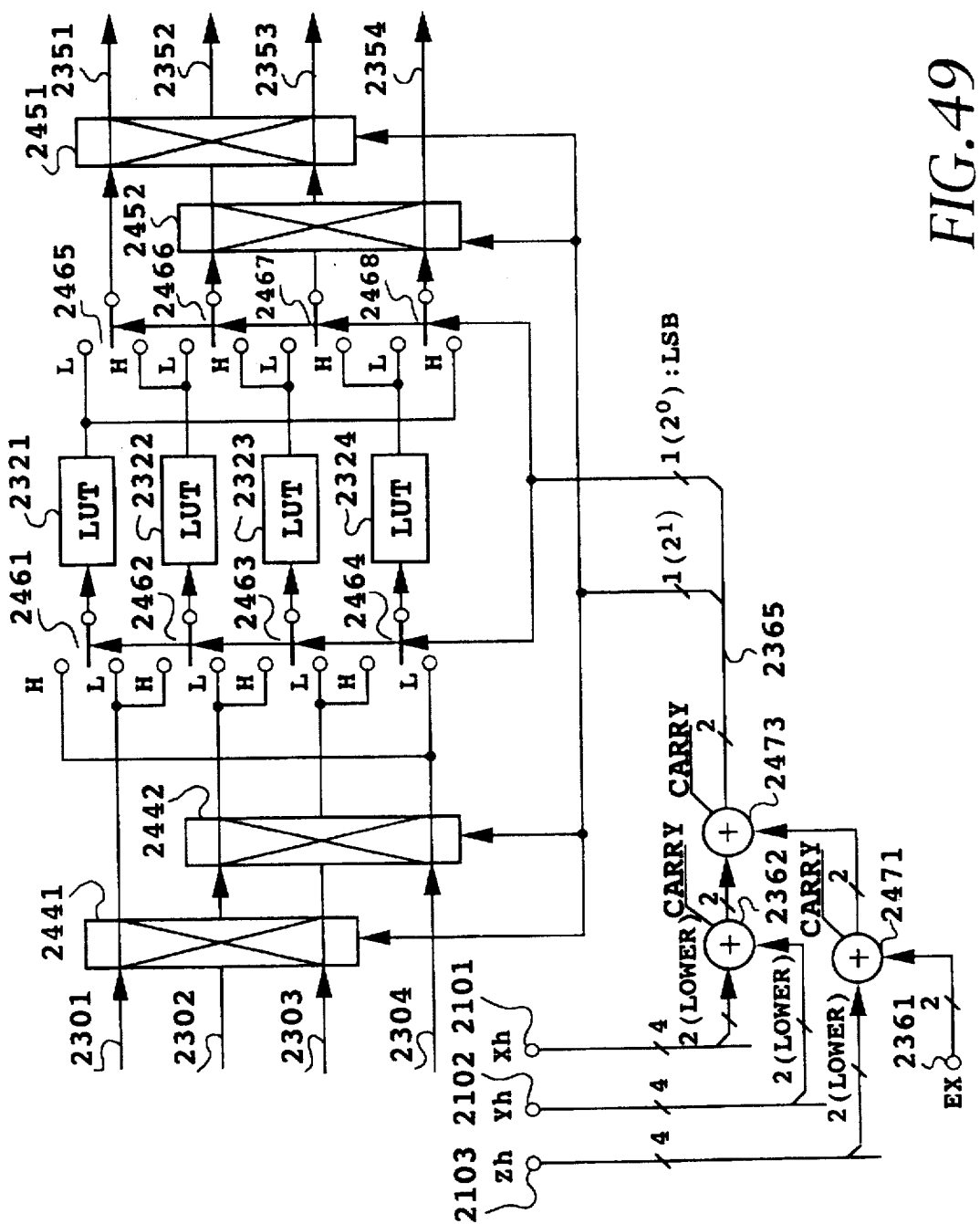
FIG. 49 is a block diagram showing a major construction of a twenty-fourth embodiment of a data transformation apparatus according to the present invention.

FIG. 49 is a block diagram showing a construction of a twenty-fourth embodiment of a data transformation apparatus according to the present invention.

In the foregoing twenty-third embodiment (FIG. 47), the address exchangers 2443 to 2445 and the data exchangers 2453 to 2455 are connected in a dependent manner with the exchangers in the preceding stages. In such a case, a resultant signal delay period in these exchangers become relatively long. In the shown embodiment, in order to reduce the delay period, the comparable function to the above-mentioned exchangers are realized by employing selectors having two inputs and one output (a plural bit width) in parallel. Also, the shown embodiment is one which is intended to speed-up the circuit for calculating (Xh+Yh+Zh+EX)%4 by modifying the order of addition with respect to the twenty-first to twenty-third embodiments.

In FIG. 49, reference numerals 2461 to 2468 denote the above-mentioned selectors, a reference numeral 2471 denotes an adder for adding the lower 2 bits of the upper bit signal Zh with the switching control signal EX (2 bits), and a reference numeral 2473 denotes an adder for adding the output signal of the lower 2 bits excluding the carry from the adders 2363 and 2471 to output the control signal 2365. Other elements and signals are the same as those shown in FIGS. 42 and 47 with the same reference numerals.

The selectors 2461 to 2468 select the L-side when the lower bit of the control signal 2365 is "0" and the H-side when the lower bit is "1". The address signal exchanging functions by the selectors 2461 to 2464 are identical to the function performed by the address exchangers 2443 to 2445 in the twenty-third embodiment (FIG. 47), similarly, the data exchanging functions by the selectors 2465 to 2468 are identical to the function performed by the data exchangers 2453 to 2455 in FIG. 47.

On the other hand, while the circuit for calculating (Xh+Yh+Zh+EX)%4 in FIG. 42 has three adders connected in a dependent manner, the circuit for calculating (Xh+Yh+Zh+EX)%4 in the shown embodiment reduces the adder to two stages, and the calculation has been speeded up.

As set forth above, the shown embodiment realizes a construction to minimize the delay period in the address exchange and the data exchange while maintaining identical data transformation function to those of the twenty-first to twenty-third embodiments set forth above.

The above-mentioned twenty-first to twenty-fourth embodiments have the address exchangers or the selectors arranged to be symmetric with the data exchangers or selectors across the LUTs. Since the address exchanging functions and the data exchanging functions in respective embodiments are equivalent, replacement is possible. Namely, the data transforming system may be constructed by a combination of the address exchangers disclosed in the Nth embodiment (N=21, 22, 23, 24) and the data exchangers disclosed in the embodiments other than the Nth embodiment.

(TWENTY-FIFTH EMBODIMENT)

Figure 50:
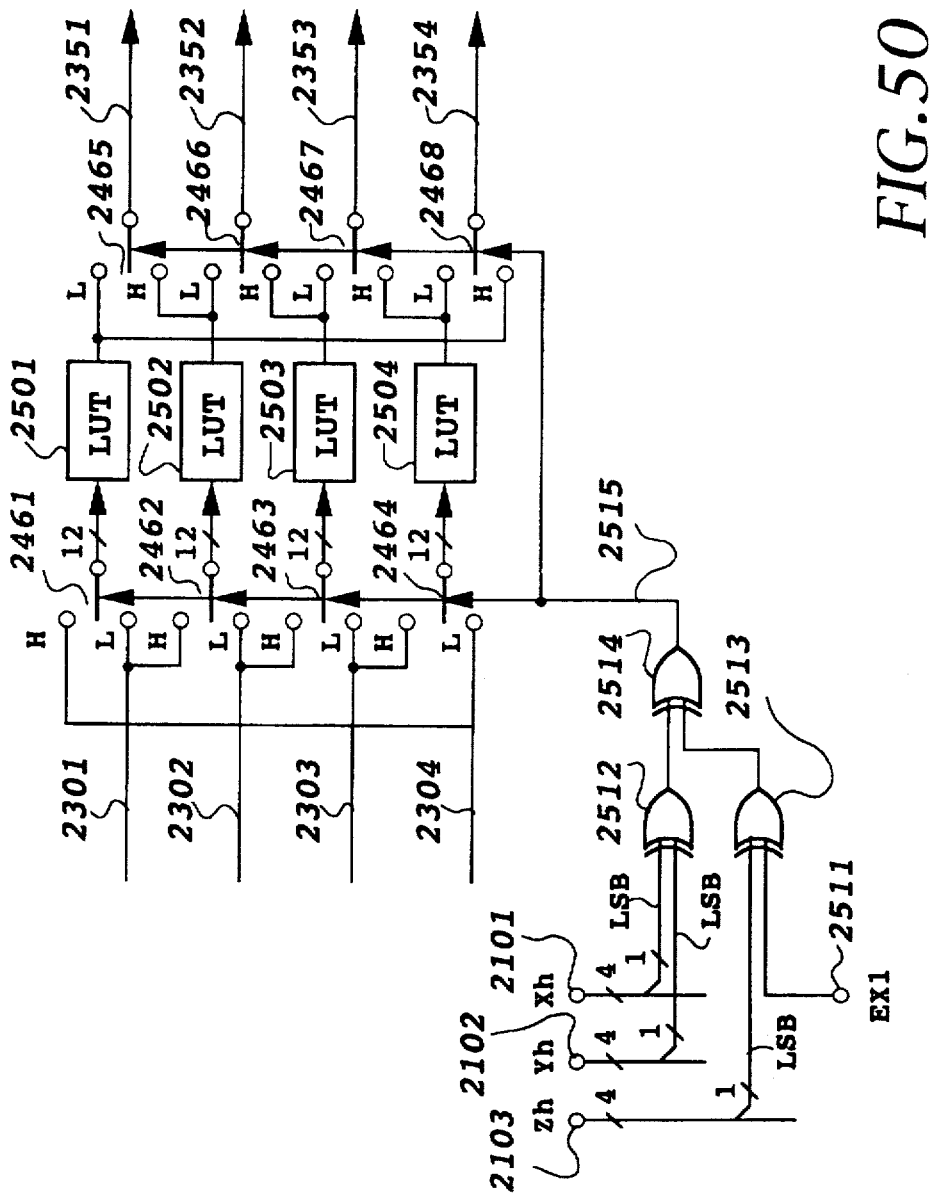
FIG. 50 is a block diagram showing a major construction of a twenty-fifth embodiment of a data transformation apparatus according to the present invention.

FIG. 50 is a block diagram showing a construction of a twenty-fifth embodiment of a data transformation apparatus according to the present invention.

The twenty-first to twenty-fourth embodiments are designed for utilizing four LUTs in the most efficient way by storing four kinds of transformation tables. Therefore, the size of the address exchanging means, the data exchanging means and the hardware for generating control signals for the exchanging means are relatively large.

The shown embodiment is one which intends to reduce the size of the address exchanging means, the data exchanging means and the hardware for generating control signals for the exchanging means by storing only two transformation tables for permitting only two kinds of data signals is fed to the selector 483 and a gate circuit 535 via a selector 532 and an inverter 538. The gate circuit 535 gates the data output from a register 536 for providing a delay for the data for one cycle and feeds to the adder 447. More specifically, in the first cycle, the output data from the register 536 is blocked so as not to be fed to the adder 447, whereas, in the second cycle, the output data is fed to the adder.

In FIG. 50, reference numerals 2501 to 2504 denote LUTs having the same memory capacity as the LUTs in the twenty-first to twenty-fourth embodiments, but store only two kinds of transformation table data. A reference numeral 2511 denotes a terminal for inputting the switching control signal EX1 (1 bit) for switching two kinds of transformation tables, a reference numeral 2512 denotes an EXOR element for calculating an exclusive OR between the LSB of the upper bit signal Xh and the LSB of the upper bit signal Yh, a reference numeral 2513 denotes an EXOR element calculating an exclusive OR between the LSB of the upper bit signal Zh and the switching control signal EX1, and a reference numeral 2514 denotes an EXOR element for calculating an exclusive OR between the outputs of the two EXOR elements 2512 and 2513.

The selectors 2461 to 2464 for exchanging of the address signals and the selectors 2465 to 2468 for exchanging data are provided with the same functions as those of the twenty-fourth embodiment. Other elements and signals are the same as those in the former embodiments.

In the twenty-first to twenty-fourth embodiments, (Xh+Yh+Zh+EX)%4 is calculated for switching four transformation tables. However, since the shown embodiment needs to perform switching between two transformation tables, it is sufficient to obtain (Xh+Yh+Zh+EX)%2. This value is easily calculated by only calculating the exclusive OR of the LSBs of the respective data. The result of the calculation is output from the EXOR element 2514 as a signal 2515 and input to the selectors 2461 to 2468. A relationship between the value of the control signal EX1 and the value of Adr%2(Adr=Xh+Yh+Zh) of the address input to the respective LUTs is shown in FIG. 51.

With the construction set forth above, the shown embodiment may store two independent transformation tables in the respective LUTs 2501 to 2594, and two kinds of data transformation are switched by the control signal EX1 (1 bit).

(TWENTY-SIXTH EMBODIMENT)

Figure 52:
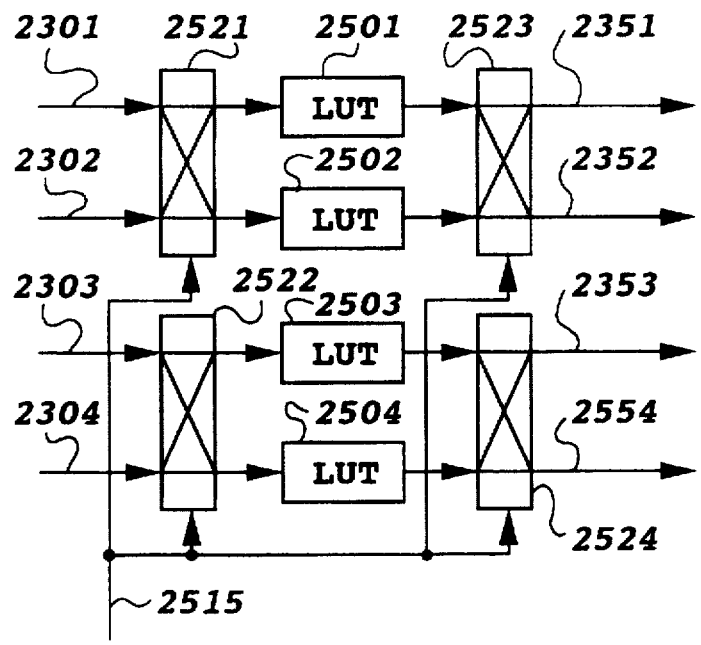
FIG. 52 is a block diagram showing a major construction of a twenty-sixth embodiment of a data transformation apparatus according to the present invention.

FIG. 52 is a block diagram showing a construction of a twenty-sixth embodiment of a data transformation apparatus according to the present invention.

From the content of FIG. 51 which is made reference to in the twenty-fifth embodiment, it is apparent that the LUTs 2501 and 2503 and the LUTs 2502 and 2504 have the data and the same contents. Accordingly, exchanging of address and data is not necessary to perform for all of four LUTs, but can be performed by dividing for exchanging between two respective LUTs.

Reference numerals 2521 and 2522 denote address exchangers for performing address exchange, reference numerals 2523 and 2524 denote data exchangers for performing data exchange. The generation method of the control signal 2515 for these exchangers is similar to that of the foregoing twenty-fifth embodiment. Therefore, description of the control signal generating portion is omitted. Other elements and signals are the same as those shown in FIG. 40 with the same reference numerals.

As is clear from the above, the shown embodiment performs two kinds of data transformation with the same function as the foregoing twenty-fifth embodiment.

(TWENTY-SEVENTH EMBODIMENT)

Figure 53:
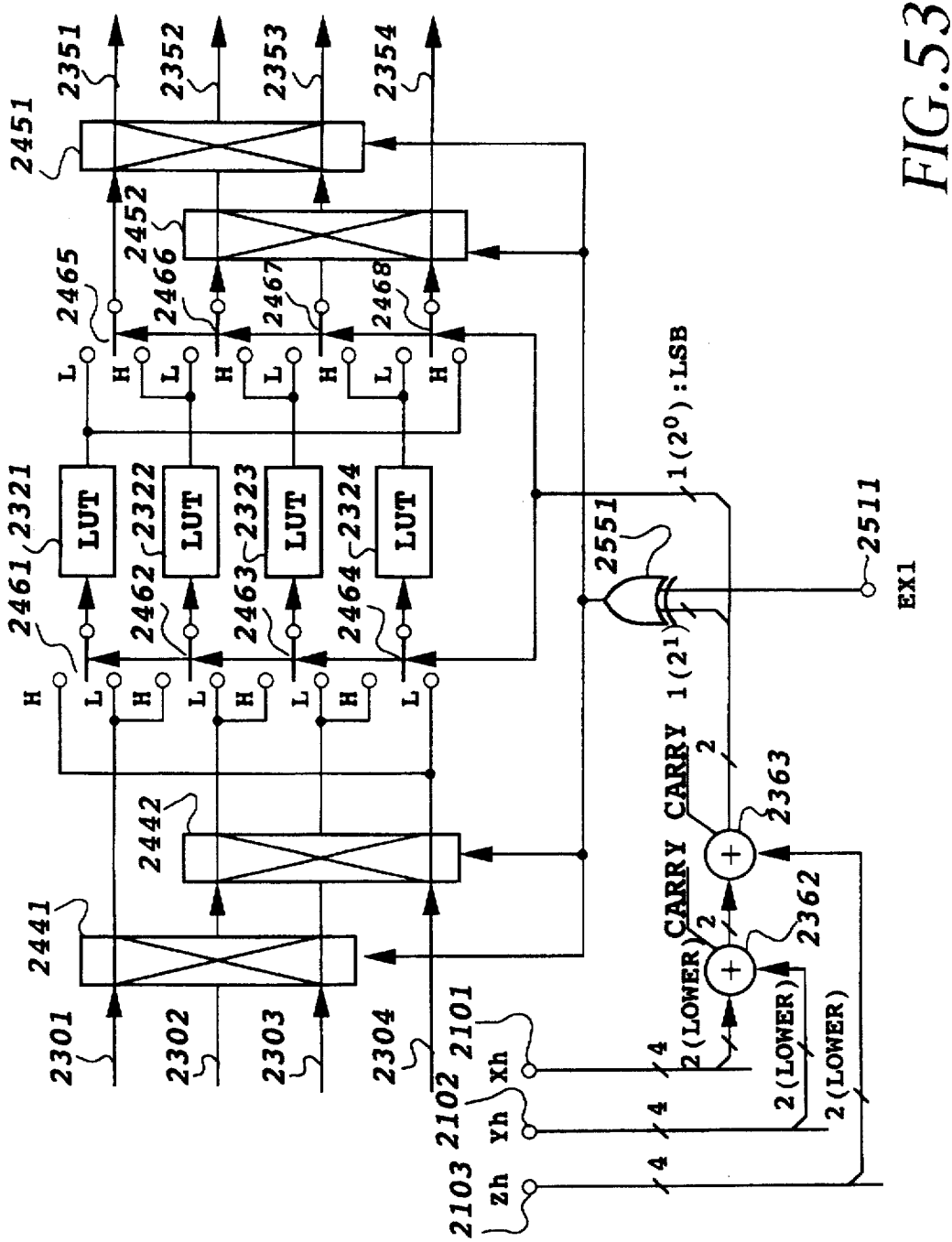
FIG. 53 is a block diagram showing a major construction of a twenty-seventh embodiment of a data transformation apparatus according to the present invention.

FIG. 53 is a block diagram showing a construction of a twenty-seventh embodiment of a data transformation apparatus according to the present invention.

In the shown embodiment, the least significant bit of the 12 bit input address to each LUT is removed to use as an 11 bit address. Associated therewith, the memory capacity of each LUT is reduced by half.

Hereinafter, a discussion is given for the meaning of removal of the least significant bit from the 12 bit address. In the foregoing twenty-fifth and twenty-sixth embodiments, despite the presence of the LUTs, each of which can store four kinds of transformation tables, only two kinds of transformation tables are stored. Therefore, the LUTs are not fully used.

Namely, when only two kinds of data transformation are required, in order to 100% efficiently use the LUTs, the memory capacity of each LUT has to be reduced by half. The novel construction for realizing this is shown in FIG. 53.

In FIG. 53, the element different from the former embodiments is only an EXOR element 2551, and the others are basically based on the twenty-fourth embodiment shown in FIG. 49. However, the construction of the circuit for calculating (Xh+Yh+Zh+EX)%4 is similar to that of the twenty-first embodiment of FIG. 42.

In the operation of the circuit shown in FIG. 53, the point to be different from the twenty-first to twenty-fourth embodiment is that the table switching control signal is only one bit. An exclusive OR of the control signal and the upper 1 bit of the value (2 bits) of the (Xh+Yh+Zh+EX)%4 is calculated and fed to the exchangers 2441, 2442, 2451 and 2452 as a switching control signal. The value of "0" and "1" of the control signal EX1 corresponds to the value "0" and "2" of the 2 bit control signal EX in FIG. 42, respectively.

Accordingly, the value of Adr%4 of the address input to each LUT has a relationship with respect to the value of the EX as illustrated in FIG. 54. By this, it should be appreciated that in the construction shown in FIG. 53, only the address of Adr%2=1 is input to the LUTs 2321 and 2323, and only the address of Adr%2=1 is input to the LUTs 2322 and 2324.

For instance, when the X address (Xh or Xh+1), the Y address (Yh or Yh+1) and Z address (Zh or Zh+1) are combined, in the case that the Z address is combined at the lowest, one of two addresses in which the Z address indicates continuous numbers to each other and corresponds to Adr%2=0, and another corresponds to Adr%2=1 (when the Z address varies from a maximum value to 0, since the X and the Y address varies, the foregoing a relationship of Adr%2 is occasionally not maintained).

In concrete, since the Z address is 4 bits, sixteen Z addresses are continuous and the address of Adr%2=0 and the address of Adr%2=1 are alternately arranged. In this arrangement, which one is first of the Adr%2=0 and Adr%2=1 is determined depending upon the X address and the Y address. In this case, in the LUTs 2321 and 2323, only addresses of Adr%2=0 arranged in every other positions are input. Similarly, in the LUTs 2322 and 2324, only addresses of Adr%2=1 arranged in every other positions are input. Therefore, redundancy is present in the address signal so that, in the respective LUTs, the least significant bit is predicted from the address of the upper 11 bits. As a result, it is appreciated that the address input for each LUT is reduced to 11 bits by eliminating the least signification bit. This means that the memory capacity of each LUT is reduced by half.

Next, with respect to the address signal of 11 bits, a new problem is encountered relative to how the transformation table is stored. This problem is solved by predicting the removed least significant bit from the 11 bits of the address signal, virtually determining the 12 bit address, and storing the grid point data corresponding to the 12 bit address signal to the position to be accessed by the 11 bit address.

(TWENTY-EIGHTH EMBODIMENT)

Figure 55:
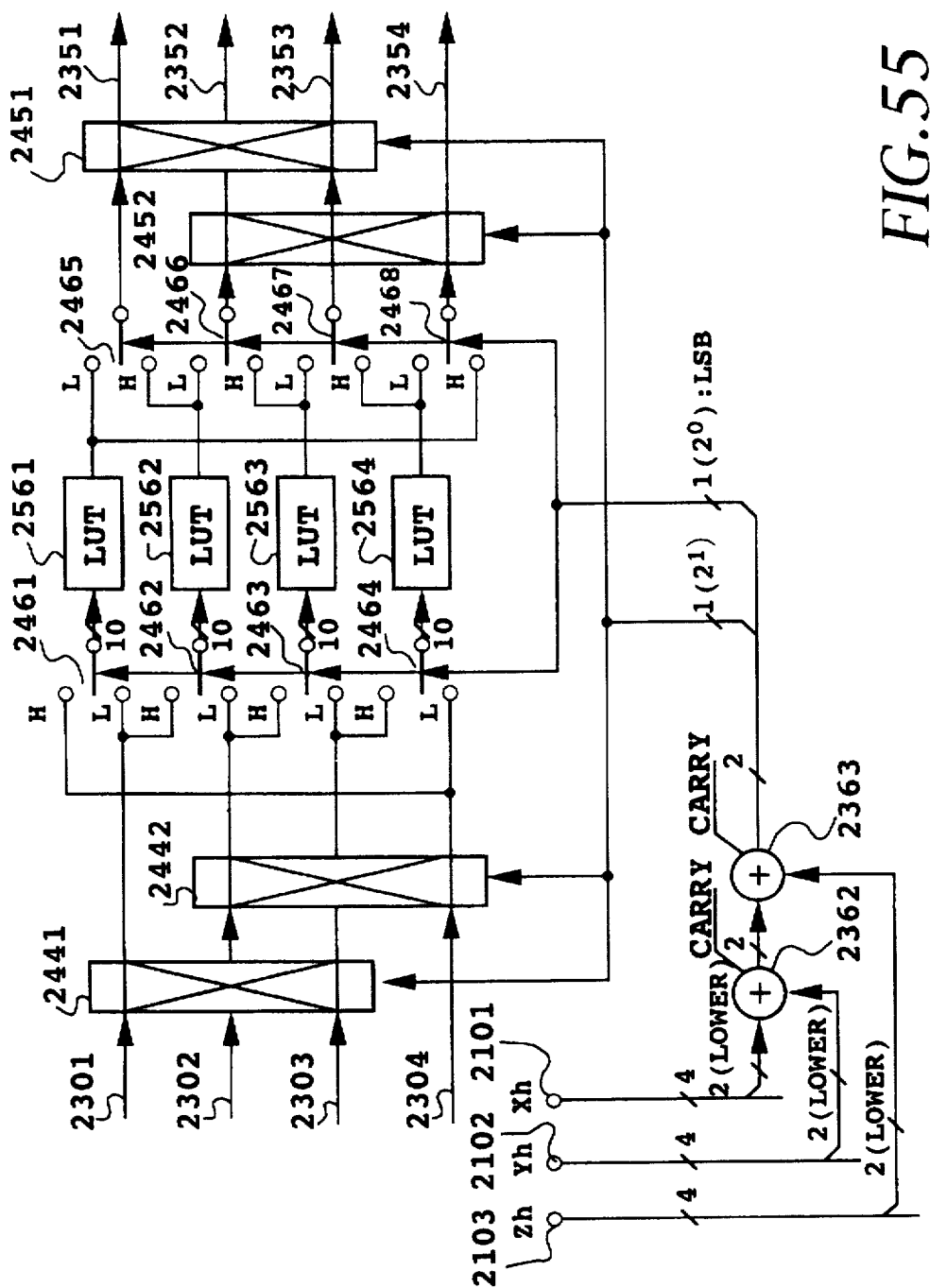
FIG. 55 is a block diagram showing a major construction of a twenty-eighth embodiment of a data transformation apparatus according to the present invention.

FIG. 55 is a block diagram showing a construction of a twenty-eighth embodiment of a data transformation apparatus according to the present invention.

While the number of bits of the 12 bit address signal is reduced to 11 bits and associating therewith, the kinds of the transformation table to be stored in the LUT is reduced to two kinds in the foregoing twenty-seventh embodiment, the present invention further reduces the address signal to be 10 bits and only one transformation table is stored in the LUT.

Accordingly, the table switching control signal is neglected, and the four address signals are relocated in accordance with the value of (Xh+Yh+Zh)%4 to be input to the four LUTs, respectively.

In FIG. 55, reference numerals 2561 to 2564 denote LUTs, each of whose address signal is 10 bits. Other elements and signals are the same as those shown in FIG. 53 with the same reference numerals.

In the shown embodiment, the value of Adr%4 of the address signal to be applied to each LUT is constant, and with respect to the LUTs 2561 to 2564, the value becomes 0, 1, 2, 3, respectively.

Accordingly, from the upper 10 bits of the 12 bit address derived by combining the X address, the Y address and the Z address, the lower 2 bits of the address are derived in straightforward manner. Therefore, for each LUT, the grid point data necessary for the interpolating operation is read out by inputting 10 bits of address signal. The problem of what grid point data is to be stored at each address of the LUT is solved by application of the concept discussed with respect to the twenty-seventh embodiment.

It should be noted that in the shown embodiment and in the foregoing twenty-seventh embodiment, as the arrangement of the exchangers or the selectors for exchanging the address and the data, the constructions shown in the foregoing twenty-first to twenty-fourth embodiments are, of course, applicable.

(TWENTY-NINTH EMBODIMENT)

All of the foregoing twenty-first to twenty-eighth embodiments are discussed under the premise that the grid point data are preliminarily stored in respective LUTs.

When the transformation table is fixed and not varied, the LUT may be formed by a ROM. However, as discussed later in connection with FIG. 67 and subsequent figures, when the content of the transformation table is to be varied, it becomes necessary to use a re-writable memory (RAM). In this case, the initial data and update data has to be loaded in the LUT. The shown embodiment is directed to a method of loading the initial data or update data in the LUT.

Figure 56:
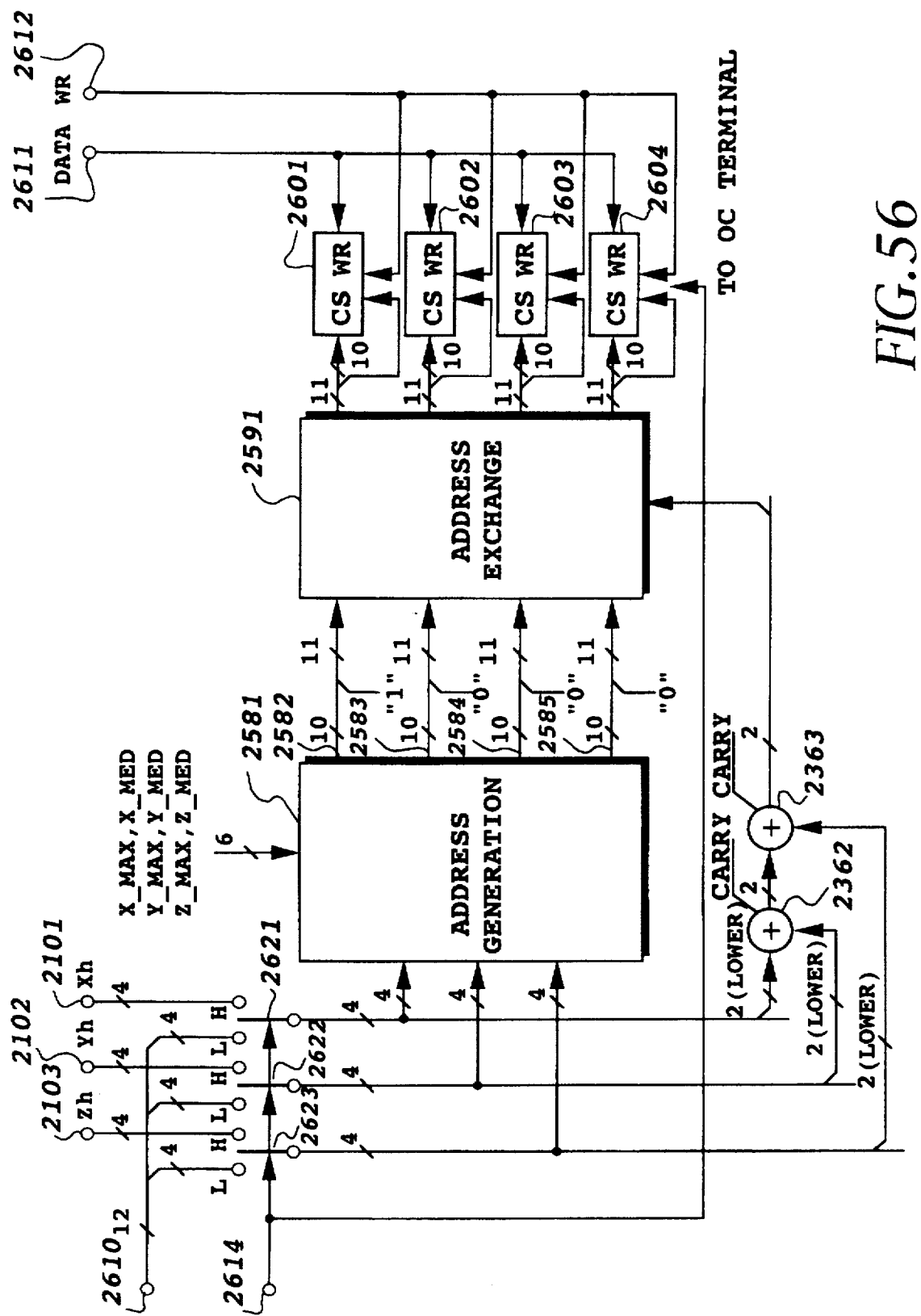
FIG. 56 is a block diagram showing a major construction of a twenty-ninth embodiment of a data transformation apparatus according to the present invention.

The construction of the twenty-ninth embodiment of a data transformation apparatus according to the present invention is illustrated in FIG. 56.

The shown embodiment is adapted to load the transformation table data from a CPU or so forth connected as an external device for the data transformation apparatus of the twenty-eighth embodiment.

In FIG. 56, a reference numeral 2581 denotes an address generating portion for generating four addresses to be provided for the four LUTs, which address generating portion is equivalent to that described in the discussion of the related art. However, the address signal is not 12 bits, but 10 bits by eliminating the lower 2 bits.

A reference numeral 2591 denotes a block for performing address exchange, which is constructed by the address exchangers 2441 and 2442 and the selectors 2461 to 2464 of the twenty-eighth embodiment. Reference numerals 2601 to 2604 denote RAMs to be used as LUTs. The RAMs have a chip select terminal (CS) for writing control, a write pulse input terminal (WR), an output control terminal (QC) and so forth in addition to the address input terminal and data input terminal. The RAMs 2601 to 2604 are designed so that data is written in an address currently input when a pulse is input to the WR terminal while the input of the CS terminal is "1", and on the other hand, while the input for the CS terminal is "0", data is not written even when the pulse is input to the WR terminal. A reference numeral 2610 denotes a terminal for inputting an address signal from an external CPU or DMA (direct memory access) controller and so forth, a reference numeral 2611 denotes a terminal inputting data to be written in the corresponding address of the memory, a reference numeral 2612 denotes a terminal for inputting a data write pulse to the WR terminal of the RAM, a reference numeral 2614 denotes a terminal for inputting the control signal for switching between a mode for loading the table data to the data transformation apparatus and an original mode for transforming the input data into other data through an interpolating operation, reference numerals 2621 to 2623 denote selectors controlled by the respective control signals. The control signals are also fed to the output control terminals (OC) of the RAMs 2601 to 2604. During the data transformation mode, this signal is set to "1" to enable reading out of data from the RAMs 2601 to 2604. Other elements and signals are the same as those discussed in the former embodiments.

Upon loading the transformation table data, the control signal to be input through the terminal 2614 is set to "0" to switch all of the selectors 2621 to 2623 to the L-side terminals. By this, the 12 bit address signal input through the terminal 2610 from the external CPU and so forth is input to the address generating block via the three selectors 2621 to 2623 (each of 4 bits width). In the address generation in the block addresses are coupled, and the upper 10 bits are output to the signal line 2582. For the address on the signal line 2582, by adding "1" for the least significant bit, and by adding "0" for the least significant bit of the address signals on the other signal lines 2583 to 2585 an 11 bit signal is formulated.

The address signals on the signal lines 2583 and 2584 are variable depending upon the value of the address generation control signals (X_MAX, Y_MAX and so forth). However, variation of the address signals depending upon the address generation control signal is ignored upon loading of the transformation table data. While the address signal of the signal line 2585 is fixed, it is similarly ignored.

The above-mentioned four 11 bit address signals are input to the address exchange block 2591, and on the basis of the output signal (2 bits) of the adder 2363, the exchange is performed. The 12 bit address signal input through the terminal 2610 is divided per 4 bits from the leading end and the 4 bit fractions are respectively assumed to be Xa, Ya and Za. Then, the output value of the adder 2636 becomes a value of (Xa+Ya+Za)%4. When this output value is "0", the address signal on the signal line 2582 is fed to the RAM 2601, and a signal "1" at the least significant bit of the address signal is input to the CS terminal of the RAM 2601. At this time, for the CS terminals of the other three RAM s 2602 to 2604, "0" is input. At this condition, by inputting write data through the terminal 2611 and inputting the write pulse from the terminal 2612, data is only written to RAM 2601.

Similarly, when (Xa+Ya+Za)%4 is "1", data is written in the RAM 2602, when (Xa+Ya+Za)%4 is "2", data is written in the RAM 2603 and when (Xa+Ya+Za)%4 is "3", data is written in the RAM 2604.

By the operation set forth above, it becomes possible to store the transformation table data for all regions of the four RAMs.

(THIRTIETH EMBODIMENT)

Figure 57:
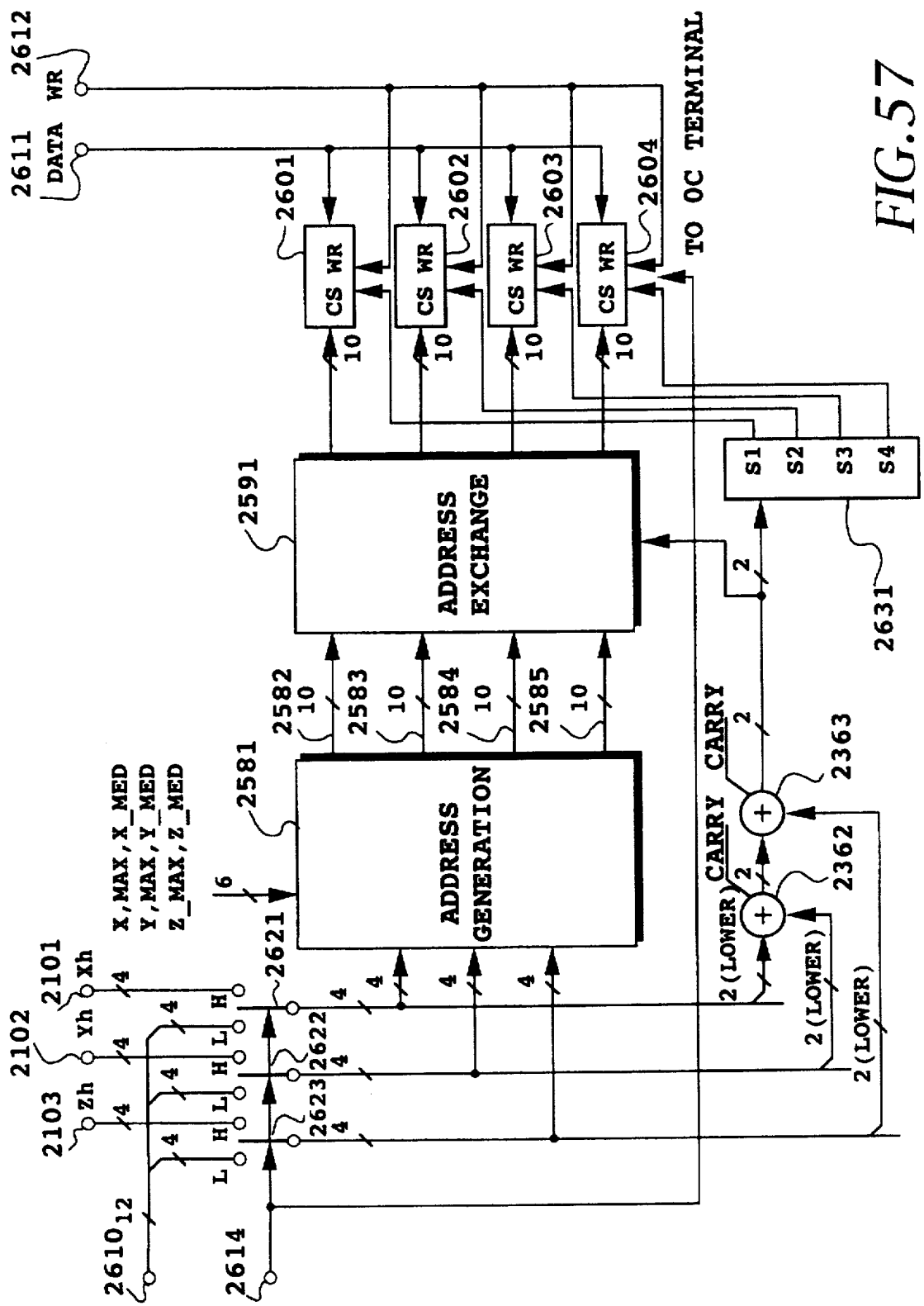
FIG. 57 is a block diagram showing a major construction of a thirtieth embodiment of a data transformation apparatus according to the present invention.

FIG. 57 is a block diagram showing a construction of the thirtieth embodiment of a data transformation apparatus according to the present invention.

The shown embodiment realizes the same function as the foregoing twenty-ninth embodiment by another construction. In concrete, the chip select signal to be applied to the four RAMs is generated by decoding a 2 bit signal output from the adder 2363. In FIG. 57, a reference numeral 2631 denotes the above-mentioned decoder, in which when the input 2 bit signal is "00", "01", "10" or "11", only outputs of S1, S2, S3, S4 become "1". These S1, S2, S3 and S4 are fed to respective RAM s 2601 to 2604. By this, the chip select signals to be input to the RAMs 2601 to 2604 are completely the same as that of the twenty ninth embodiment. Therefore, the shown embodiment has the same function as the twenty-ninth embodiment.

(THIRTY-FIRST EMBODIMENT)

Figure 58:
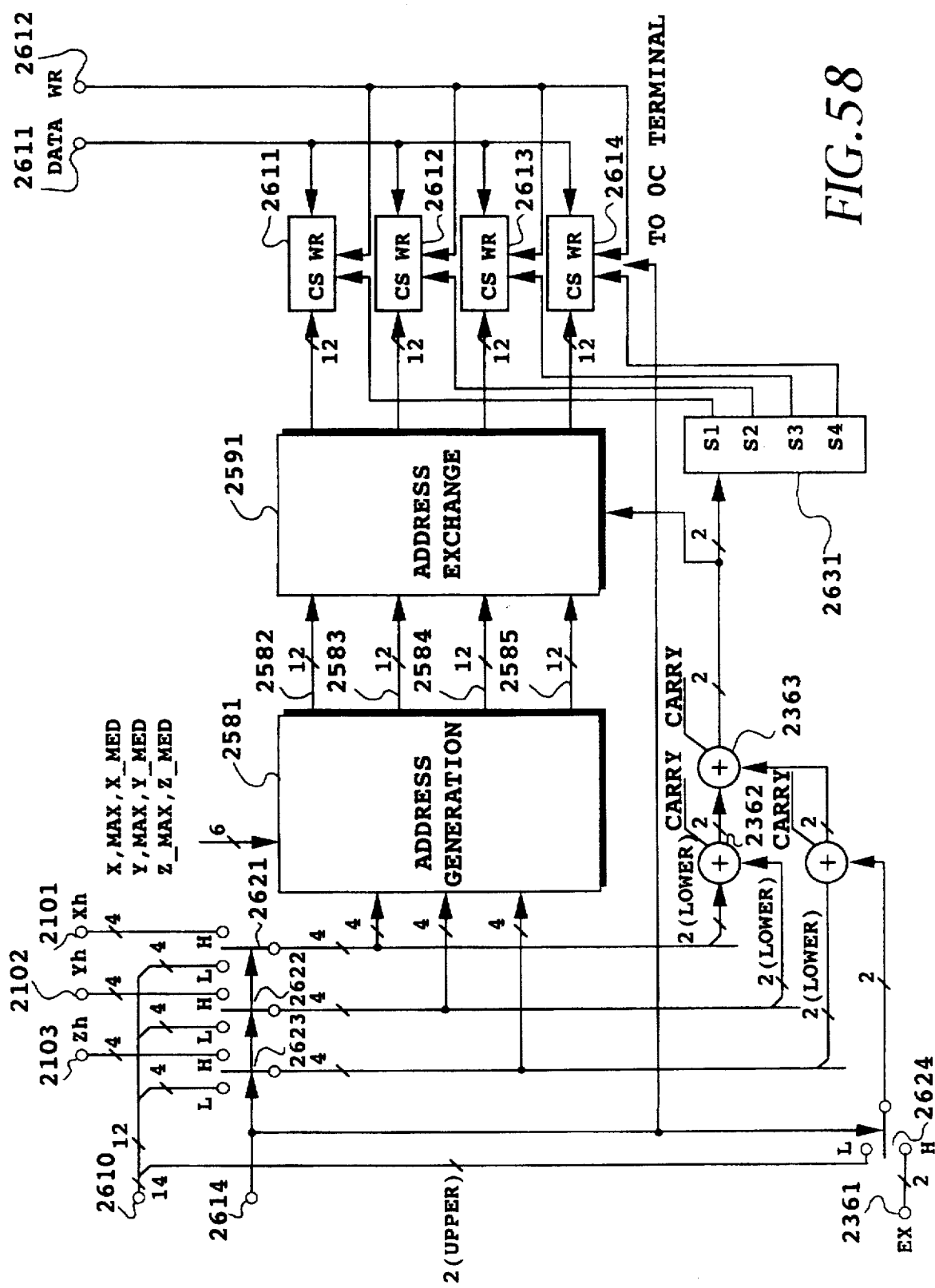
FIG. 58 is a block diagram showing a major construction of a thirty-first embodiment of a data transformation apparatus according to the present invention.

FIG. 58 is a block diagram showing a construction of a thirty-first embodiment of a data transformation apparatus according to the present invention.

The shown embodiment has a construction for loading transformation table data for the case where four kinds of transformation tables are contained as in the above-mentioned twenty-first to twenty-fourth embodiments. In FIG. 58, reference numerals 2611 to 2614 denote RAMs for loading the table data. In comparison with the twenty-ninth and thirtieth embodiments, the memory capacity of each RAM is four times greater. Also, the address input is increased from 10 bits to 12 bits. However, other control signal inputs are the same.

Since the shown embodiment has four times greater transformation table data than the twenty-ninth and thirtieth embodiments, the address signal to be input to the terminal 2610 becomes 14 bits. Among the 14 bits of the signal, the upper 2 bits serve as a table switching signal upon loading of the table data. Therefore, a selector 2624 for switching is provided to switch, the table switching signal and the transformation table switching control signal EX upon the interpolation process. On the other hand, the lower 12 bits in the 14 bit signal is divided per 4 bits as in the former embodiments and fed to the selectors 2621 to 2623. Other elements and signals and so forth are the same as those in the preceding embodiments. Therefore, a detailed description for the elements and signals common to the preceding embodiments are omitted.

For the four RAM s 2611 to 2514, four kinds of transformation table data are loaded. From the side of the CPU, there is merely the operation of loading four transformation tables in a linear address space. In response to the loading operation from the CPU side, the predetermined table data is stored in the predetermined address of respective RAMs by the operation of the address exchanging block 2591, decoder 2631 and so forth. The timing for writing such data is similar to the foregoing embodiment of FIG. 29.

(THIRTY-SECOND EMBODIMENT)

In the shown embodiment, a discussion is given for the process method equivalent to exchanging of the address signal shown in the former embodiments.

Exchanging of the address signal is performed by controlling the generating method of the address signal, as another way than directly exchanging the address signal. In the shown embodiment, upon generating an address by selection made by the selector, an exchange of address signal is performed in an equivalent manner by exchanging the selector control signal upon generation of the address signal by selecting through the selector. Before discussing the shown embodiment, an assumption is made that X_MMD=

X_MAX+X_MED, Y_MMD=Y_MAX+Y MED, Z_MMD=Z_MAX+Z MED. With employing these signals, and showing, in FIG. 59, the address generating method of the different construction to the former embodiment of FIG. 40, a discussion is given for the content of the address generating method.

Figure 59:
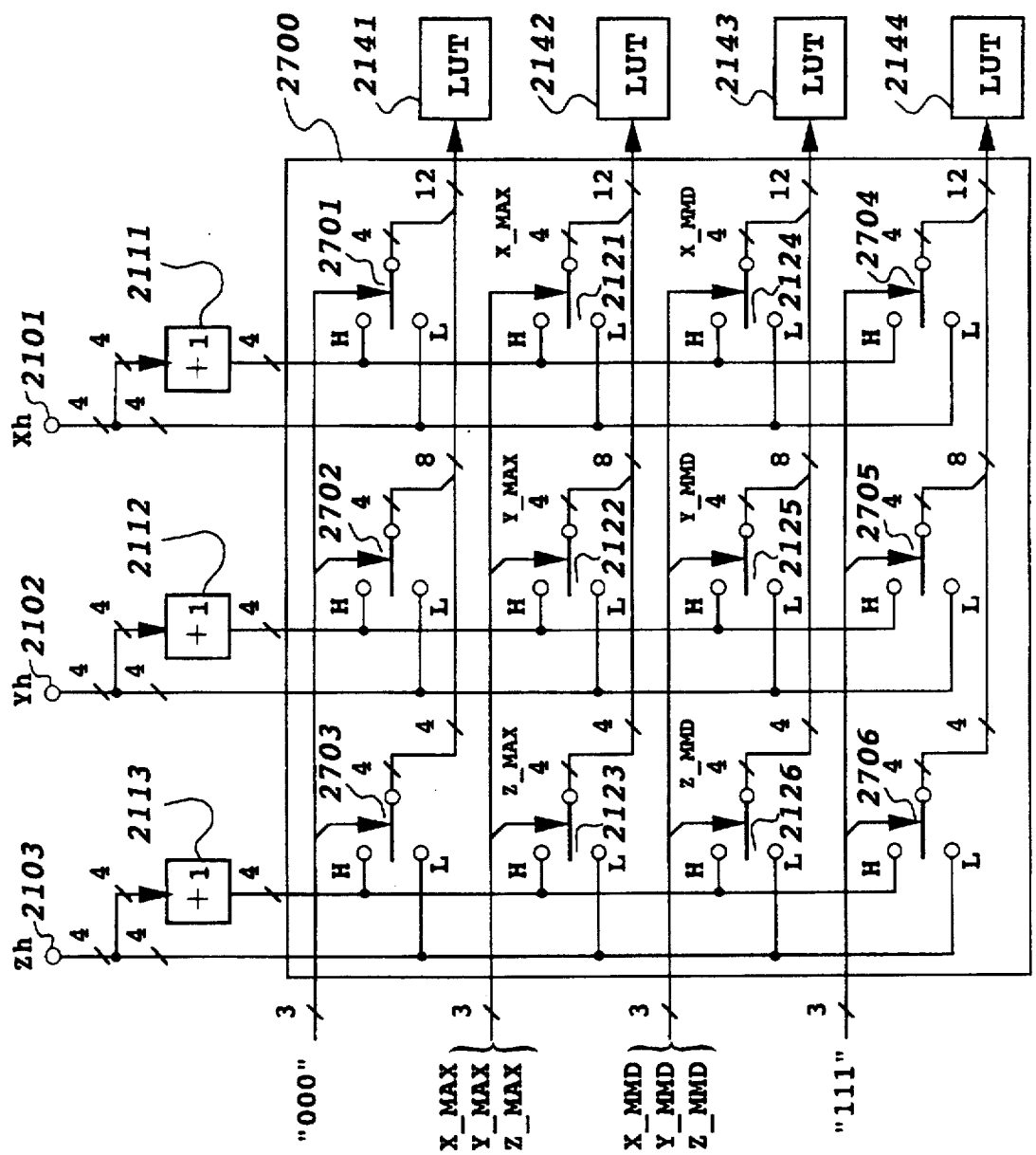
FIG. 59 is a block diagram showing a construction for address generation in a thirty-second embodiment of the present invention.

In FIG. 59, reference numerals 2701 to 2706 denote additional selectors. Respective selectors 2701 to 2706 perform the same operation as the existing selectors 2121 to 2126. Namely, when the control signal is "0", the L-side address signal is selected and when the control signal is "1", the H-side address signal is selected.

In the construction shown in FIG. 40, the address signal given for the LUT 2141 is the signal derived simply by coupling Xh, Yh and Zh (respectively 4 bits). In the shown embodiment, Xh, Yh and Zh are coupled after selection in the selectors 2701, 2702 and 2703, resulting to input the same address signal as that of FIG. 40. This is also true for the address signal to be input to the LUT 2144. Hereinafter, the selectors 2121 to 2126 and 2701 to 2706 are treated as a single function block which is referred to as the address selecting portion 2700.

Figure 60:
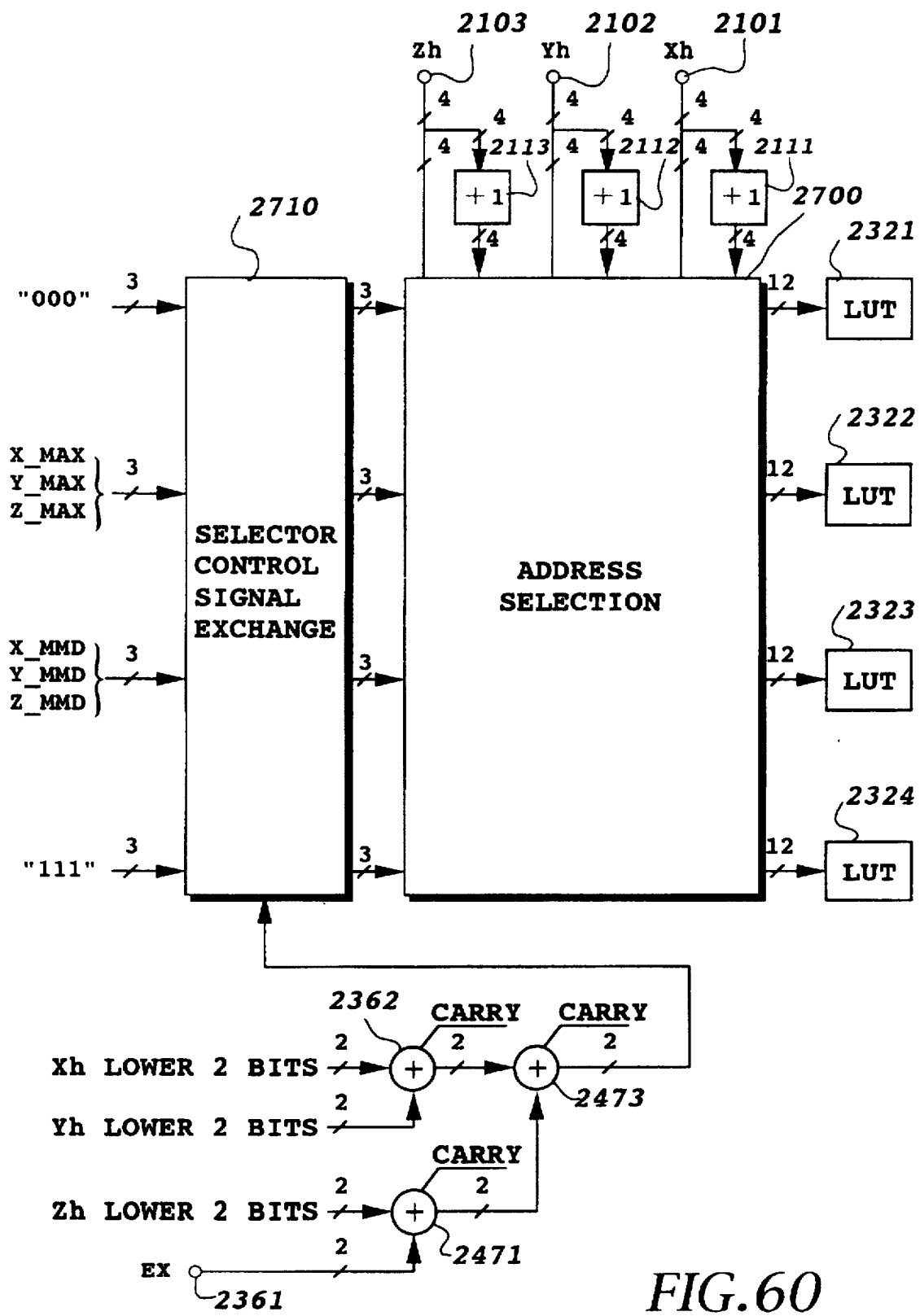
FIG. 60 is a block diagram showing a major construction of a thirty-second embodiment of a data transformation apparatus according to the present invention.

FIG. 60 is a block diagram showing a construction of a thirty-second embodiment of a data transformation apparatus according to the present invention. In the shown embodiment the above-mentioned address selecting portion 2700 is employed.

In FIG. 60, a reference numeral 2710 denotes a control signal exchanging portion for exchanging respectively four sets of selector control signals each of which has 3 bits in accordance with the value of (Xh+Yh+Zh)%4, which portion performs an identical exchanging operation as the address signal exchanging means discussed in the former embodiments. Accordingly, as the internal construction, any one of the constructions shown in the twenty-first to twenty-fourth embodiments is applicable. Other elements are the same as those in the former embodiment.

As shown in the twenty-first to twenty-eighth embodiments, it is required to perform an exchanging opposite to that for the address exchange so that the address exchange is performed to satisfactorily perform an interpolating calculation with respect to the grid point data read out from the LUTs. This is also true in the shown embodiment, however, the discussion for the interpolation process subsequent to the LUTs is omitted. Since directly exchanging the address signals and exchanging the control signal for selecting the address to result in exchanging of the address are completely equivalent, the shown embodiment has the same function to the foregoing twenty-first to twenty-fourth embodiments.

(THIRTY-THIRD EMBODIMENT)

Figure 61:
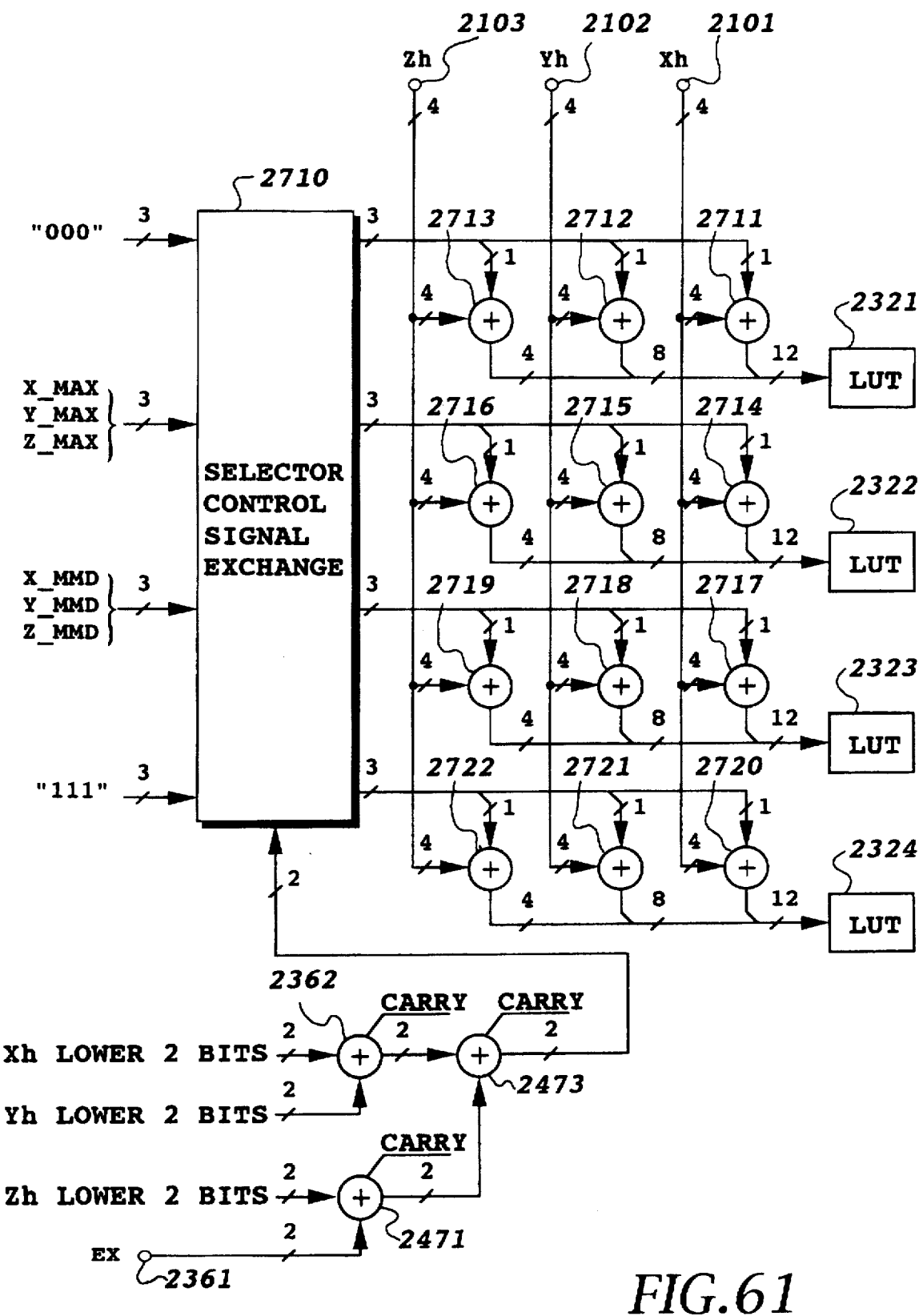
FIG. 61 is a block diagram showing a major construction of a thirty-third embodiment of a data transformation apparatus according to the present invention.

FIG. 61 is a block diagram showing a construction of a thirty-third embodiment of a data transformation apparatus-according to the present invention.

In the shown embodiment, instead of using the address selection block in the foregoing thirty-second embodiment, the address signal is generated by employing twelve adders for a 4 bit signal and a 1 bit signal. In FIG. 61, reference numerals 2711 to 2722 denote adders. In the foregoing thirty-second embodiment, each selector in the address selection block selects Xh (or Yh, Zh) when the control signal is "0" and selects Xh+1 (or Yh+1, Zh+1) when the control signal is "1". This is equivalent to adding the selector control signal to Xh for outputting. Accordingly, in the shown embodiment, the same function as the thirty-second embodiment can be realized.

(THIRTY-FOURTH EMBODIMENT)

Figure 62:
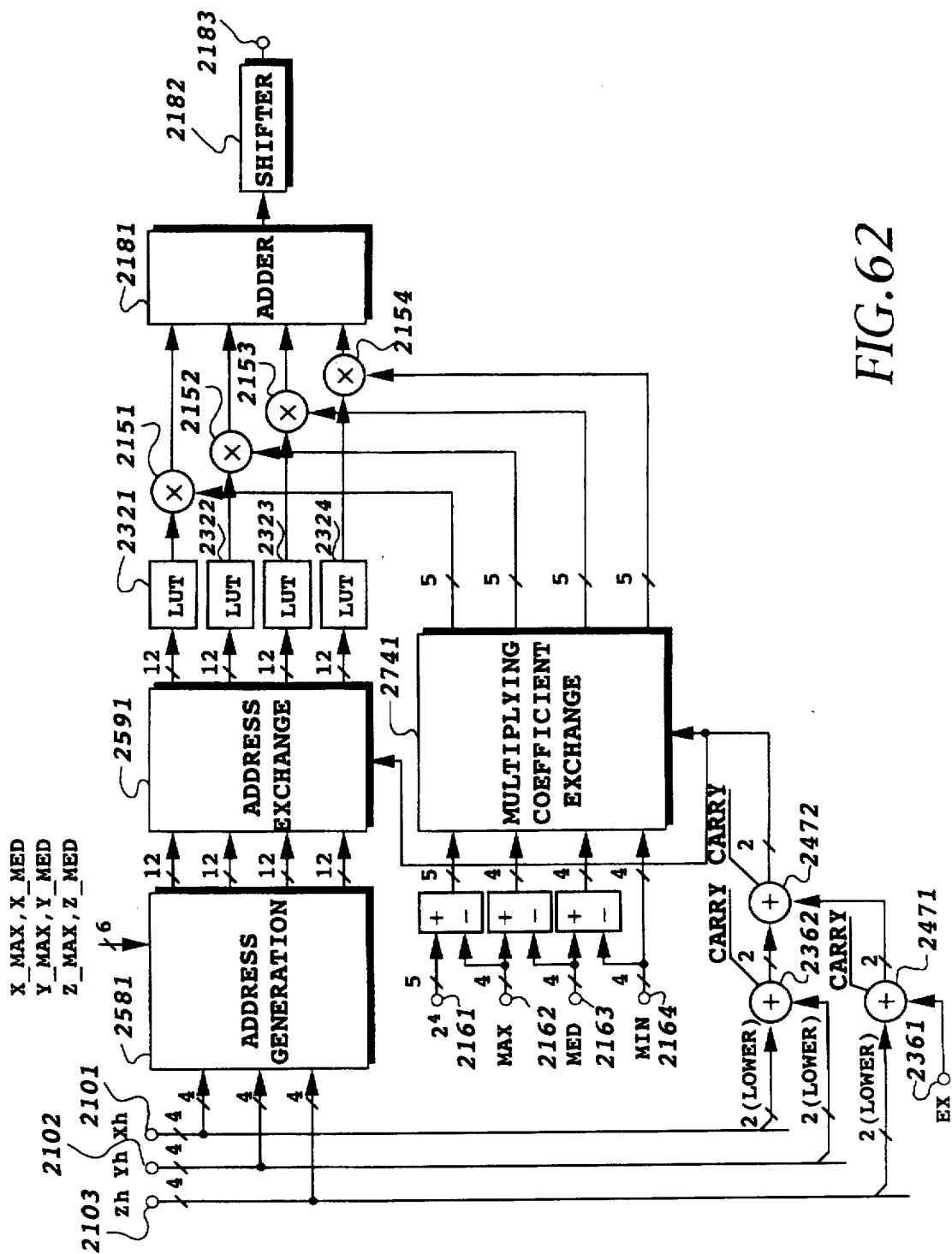
FIG. 62 is a block diagram showing a major construction of a thirty-fourth embodiment of a data transformation apparatus according to the present invention.

FIG. 62 is a block diagram showing a construction of the thirty-fourth embodiment of a data transformation apparatus according to the present invention.

In FIG. 62, the element different from the former thirty-third embodiment and so forth is a multiplying coefficient exchanging portion 2741. The block 2741 is adapted to exchange the output signal of the subtracters 2171 to 2173 and the MIN signal input through the terminals 2164 on the basis of the value of (Xh+Yh+Zh+EX)%4 to feed to the multipliers 2151 to 2154. A method of exchanging (order) is similar to exchanging of the address in the address exchanging block 2591.

The grid point data readout from the LUTs by performing exchanging of the address requires an exchange opposite to the address to satisfactorily perform the interpolating operation. However, the same result is attained by exchanging the multiplying coefficient instead of exchanging the grid point data.

That is, when the multiplying coefficients corresponding to the respective grid point data are present, the desired arithmetic process is enabled by providing correspondence through exchanging one of the grid point data or the multiplying coefficient. Accordingly, even in the shown embodiment, a similar data transforming function similar to the twenty-first to twenty-fourth, thirty-second and thirty-third embodiments is realized.

(THIRTY-FIFTH EMBODIMENT)

Figure 63:
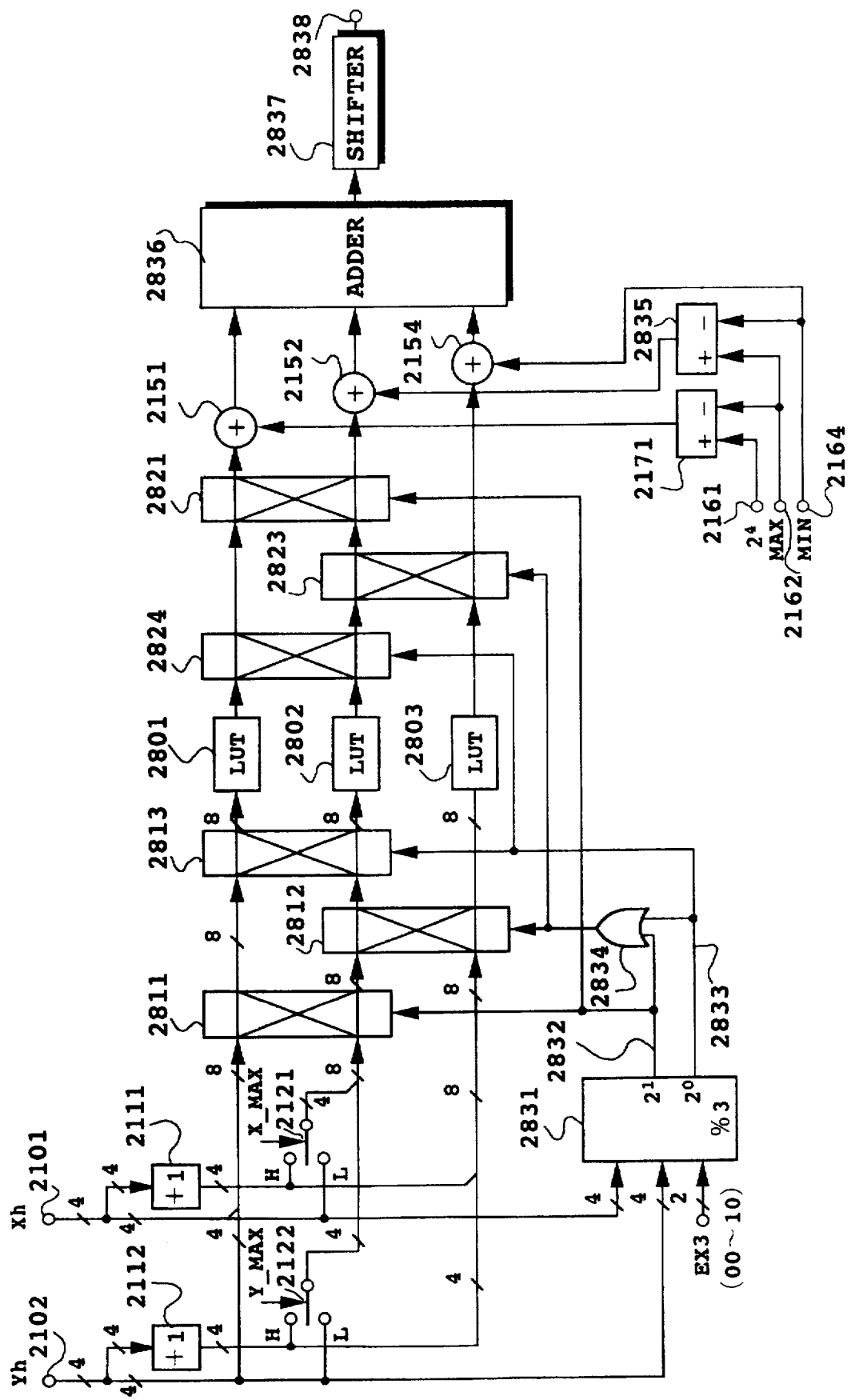
FIG. 63 is a block diagram showing a major construction of a thirty-fifth embodiment of a data transformation apparatus according to the present invention.

FIG. 63 is a block diagram showing a construction of a thirty-fifth embodiment of a data transformation apparatus according to the present invention.

The embodiments set forth above are adapted to perform a four points interpolating operation in three-dimensional space on the basis of the equation (16). In contrast to this, the shown embodiment is applied for a three point interpolation in a two-dimensional space.

The following is the interpolating equation:

$$H8(Xi, Yi)=2-m\{(2m-MAX)-D(Xh,Yh)+(MAX-MIN)\cdot D(Xh+X\_MAX, Yh+Y\_MAX)+MIN-D(Xh+1, Yh+1)\} \quad (17)$$

In the foregoing equation, Xi and Yi are two-dimensional input data(X)=Xh·2m+Xf, Yi=Yh·2m+Yf), MAX and MIN are respectively the greater value and the smaller value of Xf and Yf, X_MAX is a signal to be "1" when Xf>Yf, and otherwise to be "0", Y_MAX is a signal to be "1" when Yf>Xf, and otherwise to be "0", D (Xh, Yh) is the grid point data at the grid point address Xh, Yh.

The shown embodiment is adapted to 8 bits of input data and m=4. In FIG. 63, reference numerals 2801 to 2803 denote LUTs storing three kinds of transformation table data in respect to divided regions and having an 8 bit address, reference numerals 2811 to 2813 denote address exchangers for exchanging respective two addresses, reference numerals 2821 to 2824 denote data exchangers for mutually exchanging two grid point data, and a reference numeral 2831 denotes a residue calculator for calculating (Xh+Yh+EX3)%3.

The value output from the residue calculator 2831 is in a range of 002 to 102. Among 2 bits output from the residue calculator 2831, the upper bit is output as a signal 2832 and the lower bit is output as a signal 2833. The signal 2832 is used as a control signal for the address exchanger 2812 and the data exchanger 2821, the signal 2833 is used as a control signal for the address exchanger 2813 and the data exchanger 2822. Applied as a control signal to the address exchanger 2812 and the data exchanger 2822 is the OR of both input signals obtained by OR element 2834.

Also, a reference numeral 2835 denotes a subtracter for calculating MAX−MIN, a reference numeral 2836 denotes an adder for summing the products of multiplication outputs from three multipliers 2151, 2152 and 2154, a reference numeral 2837 denotes a shifter for performing a process corresponding to 2−m coefficients in the foregoing equation (17), and a reference numeral 2383 denotes a terminal for outputting the result of the interpolating calculation shown in the equation (17).

Applied to the LUTs 2801, 2802 and 2803, is the grid point data corresponding to the addresses at which the values of (Xh+Yh+EX3)%3 becomes 0, 1, 2, respectively. When EX3=0, the first kind of transformation tables of the respective LUTs are accessed. Then, on the basis of the grid point data read out from the first kind of transformation tables, the interpolating calculation is performed. When EX3=1, the second kind of transformation tables are accessed, and when EX3=2, the third kind of transformation tables are accessed.

The residue calculator 2831 has two 4 bit inputs and one 2 bit input. Weights of the respective bits in the 4 bit signal are 23, 22, 21, 20 in the order from the upper bit. The residue through division of the weights by 3 become 21, 20, 21 and 20.

Accordingly, a total of 10 bits of input signal is divided into 2 kinds, i.e. bits having a weight of 22P and bits having weight of 22P+1 (here P=0, 1, 2, . . . ) to add in respective kinds. Then, for the sum of addition of the bits having a weight of 22P+1' a weight of 21 is given. Then, the resultant value is added to the sum of the other kind of bits (sum of the bits having the weight of 22P). In respective addition and the process of the overall addition, if a bit signal having a weight greater than or equal to 22, such bit is replaced with the signal having a weight of 20 or 21 to continue addition.

Through the process set forth above, a 2 bit value (0 to 3) is finally obtained. Finally, by performing a process to find 3 (112) to replace with 002, the residue of division by 3 is obtained.

While the three address exchangers and the three data exchangers are employed in the shown embodiment, it is possible to construct the embodiment by employing three input and one output (multi bit width) type selectors in place of these exchanges. Also, it is possible to apply the construction of the thirty-second to thirty-fourth embodiments to the shown embodiment.

Furthermore, it is further possible to reduce the address signals for the respective LUTs to be 7 bits and to reduce the number of transformation tables to be stored in the respective LUTs to one kind. In this case, no control signal for switching the transformation table is provided and the exchanging of the address and the data is performed on the basis of the value of (Xh+Yh)%3.

Since the value of (Xh+Yh)%3 of the address signals to be input to respective LUTs becomes fixed, the 8 bit address signal may have redundancy. Therefore, it becomes possible to eliminate 1 bit. The eliminated 1 bit signal is predicted from the value of (Xh+Yh)%3 determined with respect to the respective LUTs and the 7 bit address signal. By this prediction, an 8 bit address is virtually determined from a 7 bit address, the grid point data to be read out by the 8 bit address is stored in the address to be accessed by the 7 bit address. By this, one kind of transformation table is satisfactorily read out by the 7 bit address.

(THIRTY-SIXTH EMBODIMENT)

Figure 64A:
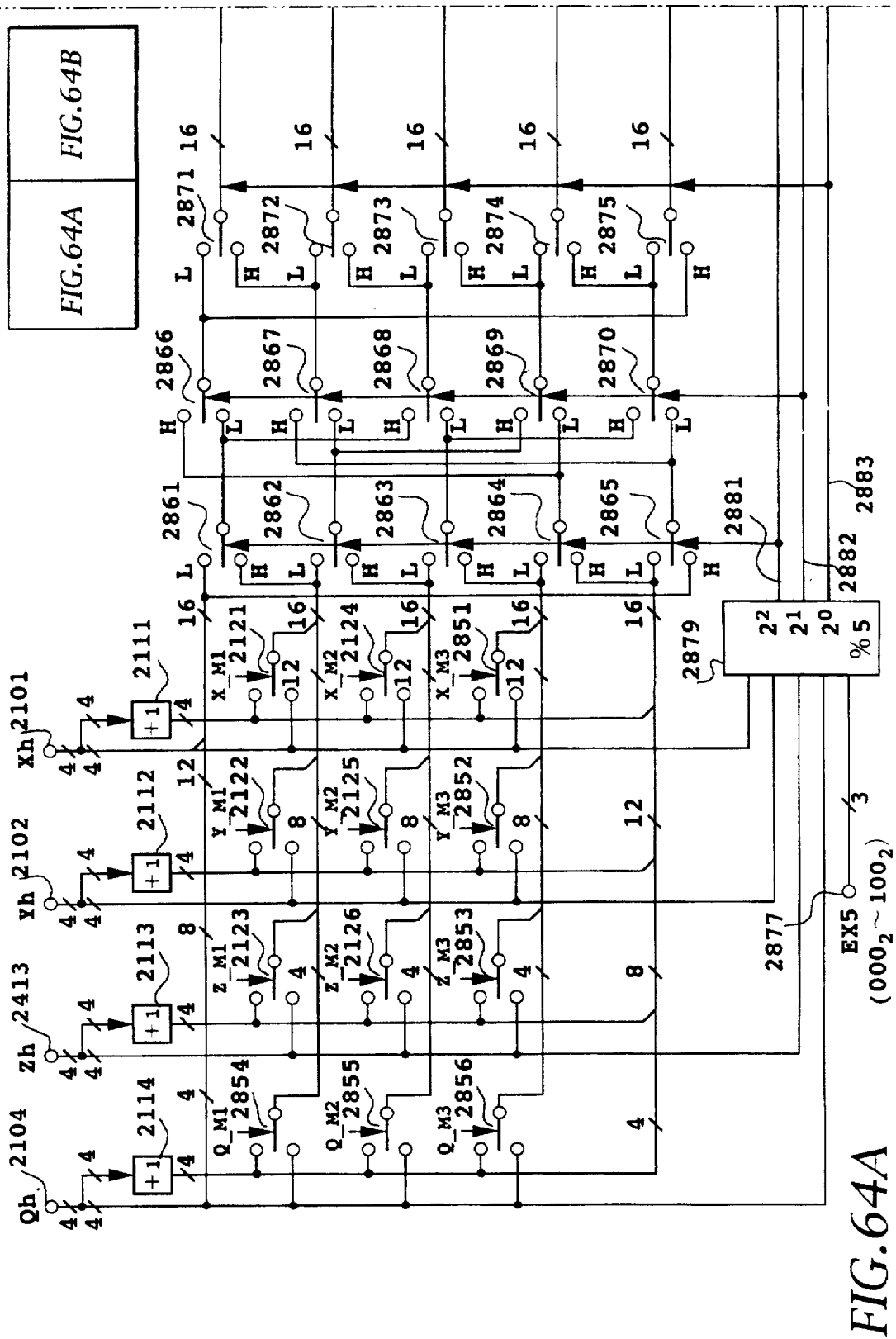
FIGS. 64A and 64B are block diagrams showing a major construction of a thirty-sixth embodiment of a data transformation apparatus according to the present invention.
Figure 64B:
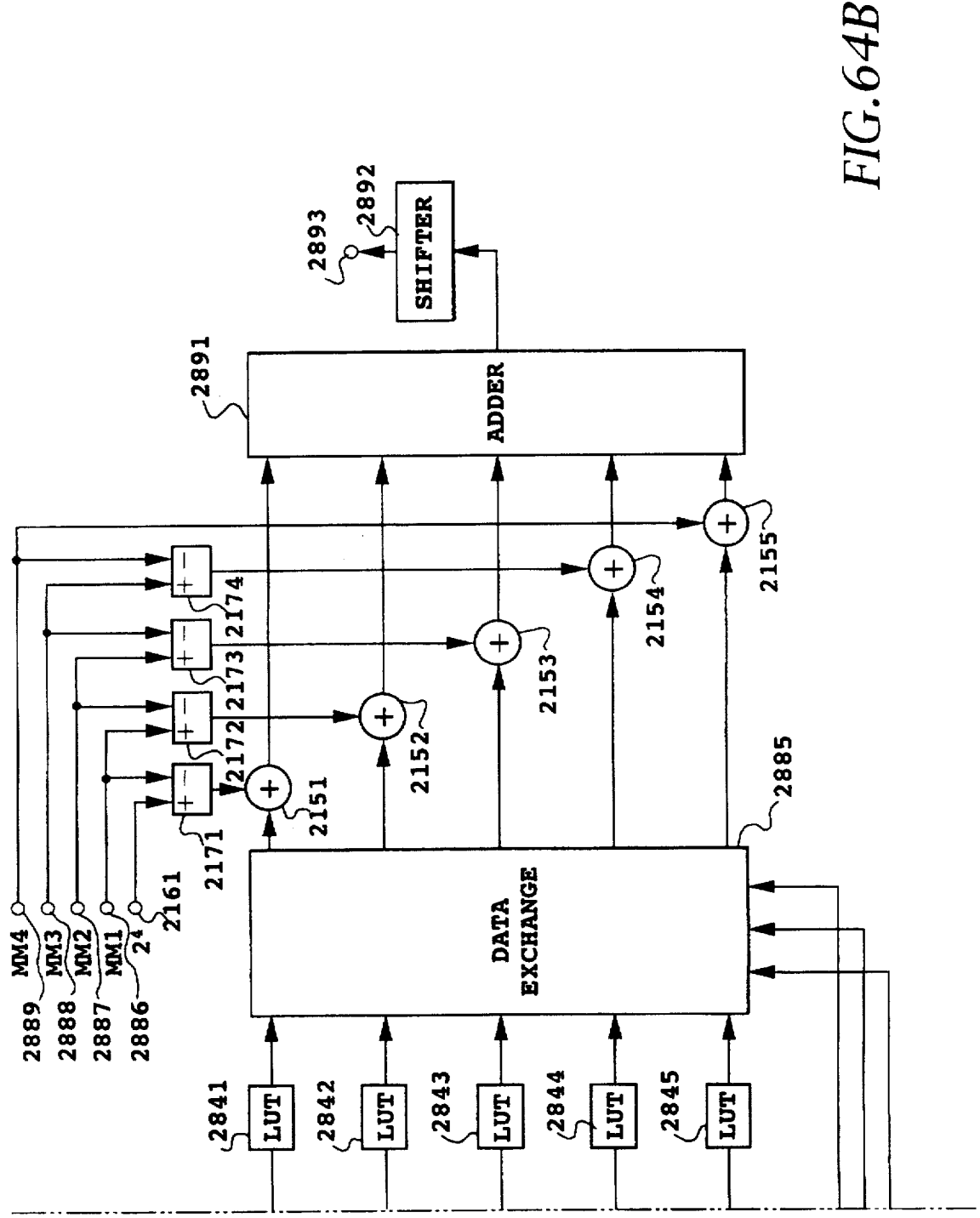

FIG. 64 is a block diagram showing a construction of a thirty-sixth embodiment of a data transformation apparatus according to the present invention.

The shown embodiment is an application of the present invention for a five points interpolation in four-dimensional space.

The following is the interpolation equation:

$$H_g(X_i, Y_i, Z_i, Q_i) = 2 - m \ \{(2m - MM1) - D(X_h, Y_h, Z_h, Q_h) + \quad (18)$$
$$(MM1 - MM2) \cdot D(X_h + X\_M1,$$
$$Y_h + Y\_M1, Z_h + Z\_M1, Q_h + Q\_M1) +$$
$$(MM2 - MM3) \cdot D(X_h + X\_M2,$$
$$Y_h + Y\_M2, Z_h + Z M2, Q_h + Q\_M2) +$$
$$(MM3 - MM4) \cdot D(X_h + X\_M3,$$
$$Y_h + Y\_M3, Z_h + Z\_M3, Q_h + Q\_M3) +$$
$$MM4 \sim (X_h + 1, Y_h + 1, Z_h + 1, Q_h + 1)$$

In the foregoing equation, Xi, Yi, Zi, Qi are four dimensional input data to be transformed, respectively expressed by Xi=Xh·2m+Xf, Yi=Yh·2m+yf, Zi=Zh·2m+zf, Qi=Qh·2m+0f. MM1, MM2, MM3 and MM4 are signals derived by re-ordering the lower bit signals Xf, Yf, Zf, Of in the order from large to small, and D(Xh, Yh, Zh, Qh) shows grid point data at the grid point address Xh, Yh, Zh, Qh. Also, X_M1, X_M2, X_M3 are 1 bit signals which become "1" when Xf 2 MM1, Xf 2 MM2, Xf 2 MM3 is established, respectively and otherwise become "0". Y_M1 to Y_M3, Z_M1 to Z_M3 and Q_M1 to Q_M3 are similar 1 bit signals.

The shown embodiment is discussed for the case where the input data is respectively 8 bits and m=4 (bits). In FIG. 64, reference numerals 2841 to 2845 denote LUTs storing five kinds of transformation tables and having 16 bit addresses, a reference numeral 2104 denotes an input terminal for inputting the upper 4 bit signal of the input data Qi when the input space is extended to four-dimensions, a reference numeral 2114 denotes a +1 circuit for adding one for the 4 bit signal, reference numerals 2851 to 2856 denote selectors for generating address signals to be input to the LUTs, reference numerals 2861 to ~2875 denote selectors for exchanging address signals, a reference numeral 2877 denotes a terminal for inputting a control signal EX5 for switching five kinds of transformation tables, and a reference numeral 2879 denotes a residue calculator for calculating (Xh+Yh+Zh+Qh+EX5)%5 for generating switching control signals 2881 to 2883 for the selectors 2861 to 2875. The value output from the residue calculator 2879 takes a value in a range of 0002 to 1002 and becomes a 3 bit signal. The most significant bit (weight: 22) is fed to the selectors 2861 to 2865, a signal having a weight of 21 is fed to the selectors 2866 to 2870, and the least significant bit (weight: 20) is fed to the selectors 2871 to 2875. The 3 bit signal is also fed to a block 2885 for exchanging grid point data to be read from the LUTs. Exchanging of data means exchanging opposite to exchanging of the address signal. The construction of this data exchanging block is symmetric to the arrangement and construction of the selector group 2861 to 2875 in construction and arrangement. Reference numerals 2886 to 2889 denote terminals for inputting Mel, MM2, MM3 and MM4. As a means for generating MM1, MM2, MM3, MM4 by sorting the lower bit signals Xf, Yf, Zf and Qf in the order from large to small, a sorting circuit may be employed. Furthermore, reference numerals 2155 and 2174 denote a multiplier and subtracter, respectively, newly required for extension from three-dimension to four-dimension, a reference numeral 2891 denotes an adder for adding the products output from the five multipliers, a reference numeral 2892 denotes a shifter, and a reference numeral 2893 denotes a terminal for outputting data transformed through an interpolation calculation. Replacing Xh+Yh+Zh+Qh as Adrs, the values of Adrs%5 of address input to respective LUTs at various values of EX5 are shown in FIG. 65. As is clear from FIG. 65, five kinds of transformation table data are appropriately stored in the five LUTs and is read out.

Even in the shown embodiment, the foregoing thirty-second to thirty-fourth embodiments are applicable. Also, it is possible to eliminate 2 bits from the address signal for each LUT to use 14 bit address signals and to store only one kind of transformation table in the LUTs. The principle of this is similar to that discussed with respect to the thirty-fifth embodiment.

(THIRTY-SEVENTH EMBODIMENT)

Figure 66:
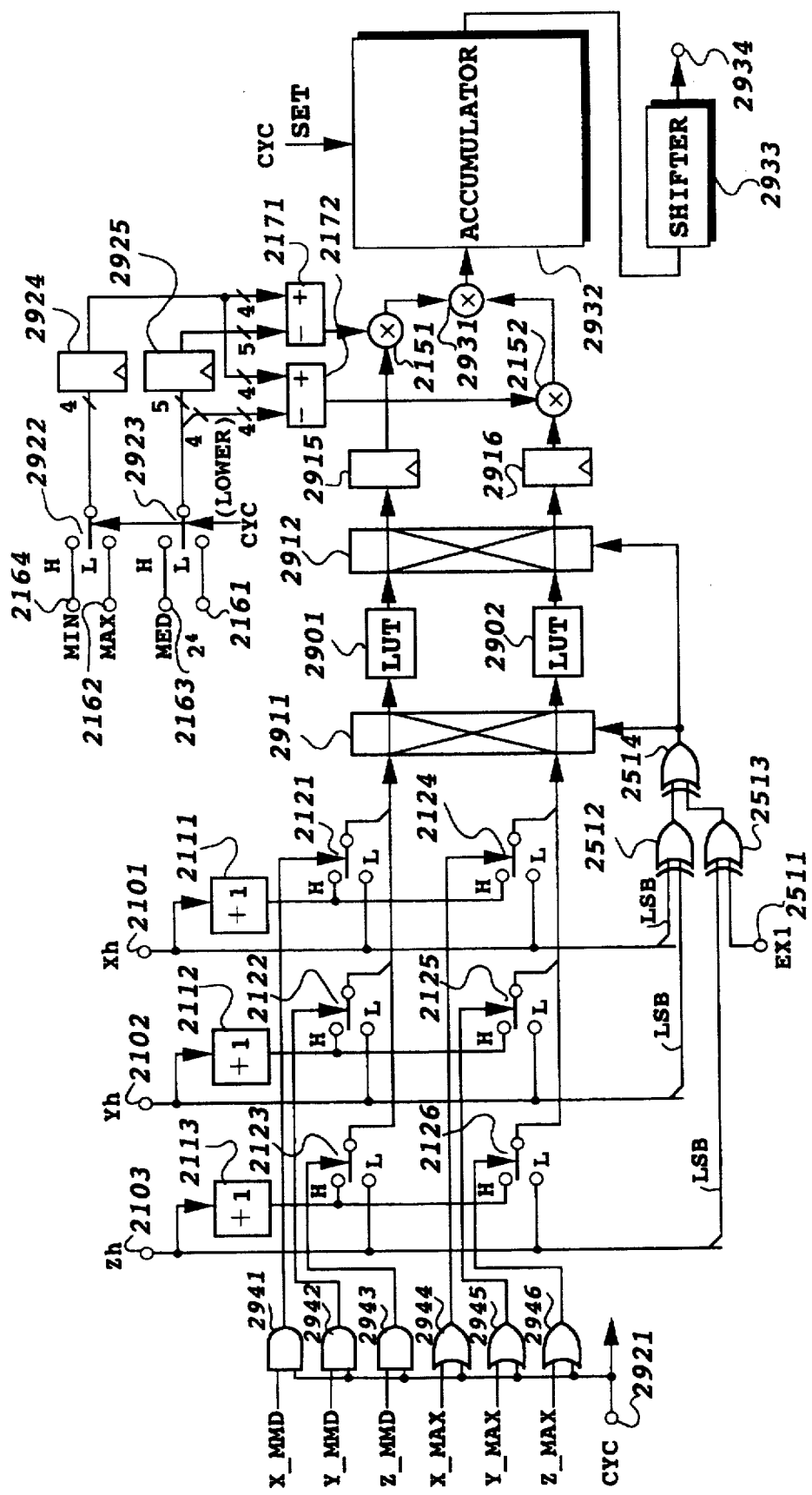
FIG. 66 is a block diagram showing major construction of a thirty-seventh embodiment of a data transformation apparatus according to the present invention.

FIG. 66 is a block diagram showing a construction of a thirty-seventh embodiment of a data transformation apparatus according to the present invention.

The shown embodiment is directed to data transformation through three-dimensional four points interpolation on the basis of the foregoing equation (16). In the shown embodiment, four grid point data necessary for four points interpolation are read out from two LUTs in two cycles. Namely, in order to obtain one data transformation output, a process period of two cycles is required.

In FIG. 66, reference numerals 2901 and 2902 denote LUTs storing two kinds of transformation tables, a reference numeral 2911 denotes an address exchanger for exchanging two address signals, a reference numeral 2912 denotes a data exchanger for exchanging two grid point data read out from the LUTs, reference numerals 2915 and 2916 denote registers for delaying data, a reference numeral 2921 denotes a terminal for inputting the CYC signal for discriminating two cycles (CYC=0 represents the first cycle and CYC=1 represents the second cycle), a reference numeral 2922 denotes a selector for selecting MAX in the first cycle and MIN in the second cycle, a reference numeral 2923 denotes a selector for selecting 24 in the first cycle and MED in the second cycle, reference numerals 2924 and 2925 denote registers for delaying the output of the selector for one cycle, a reference numeral denotes an adder, a reference numeral 2932 denotes an accumulator, a reference numeral 2933 denotes a shifter, a reference numeral 2934 denotes a terminal for outputting the transformed data derived through an interpolating calculation, reference numerals 2941 to 2943 denote AND elements having two inputs, and reference numerals 2944 to 2946 denote OR elements having two inputs. Other elements have the same functions as the elements represented by the same reference numerals in FIGS. 40 and 41.

In the LUT 2901, the grid point data of the first kind transformation table of Adrs%2=0 and the grid point data of the second kind of transformation table of Adrs%2=1 are stored, and in the LUT 2902, the grid point data of the first kind transformation table of Adrs%2=1 and the grid point data of the second kind transformation table of Adrs%2=0 are stored.

Accordingly, when the table switching control signal EX1 is "0" as input through the terminals 2511, in order to access the first transformation table, address of Adrs%2=0 is given to the LUT 2901 and the address of Adrs%2=1 is given to the LUT 2902. This control is performed as a result of a calculation of the exclusive OR (output of the EXOR element 2514) between the LSBs of the upper bit signals Xh, Yh and Zh and the control signal EXT.

More specifically, when (Xh+Yh+Zh)%2=0, the output of the EXOR 2514 also becomes "0". Then, the address exchanger 2911 becomes the through state. In the first cycle, since CYC=0, all of the outputs of the two input AND elements 2941 to 2943 are "0", and outputs of the two input OR elements 2944 to 2946 respectively become X_MAX, Y_MAX and Z_MAX. The outputs of the two input AND elements 2941 to 2943 are control signals for the selectors 2121 to 2123. By these, respective selectors selects the L side to select signals Xh, Yh, Zh and then couples these signals to feed to the address exchanger 2911.

On the other hand, since the address exchanger 2911 is held in the through state, the address derived by coupling the above-mentioned signals Xh, Yh, Zh are fed to the LUT 2901. The value of the Adrs%2 of the address is "0". On the other hand, the outputs of the two input OR elements 2944 to 2946 are the control signals for the selectors 2124 to 2126. For example, assuming that only X_MAX is "1" and remaining are "0", the selector 2124 selects Xh+1, the selectors 2125 and 2126 selects Yh and Zh, respectively. The selected signals are coupled and fed to the LUT 2902 via the address exchanger 2911. The value of Adrs%2 of this address is "1".

In the second cycle, since the value of the CYC signal becomes "1", the outputs of the two input AND elements 2941 to 2943 become X_MMD, Y_MMD, Z_MMD, respectively, and all outputs of the two input OR elements 2944 to 2946 become "1". X_MMD is an OR output of X_MAX and X_MED (similar in Y_MMD and Z_MMD) and when X_MAX is "1", X_MMD also becomes "1" and either one of Y_MMD and Z_MMD becomes "1". Here, it is assumed that Y_MMD is "1" and Z_MMD is "0" in this case. By these signals, Xh+1, Yh+1 and Zh are respectively selected by the selectors 2121 to 2123. The selected signals are coupled and applied to the LUT 2901 via the address exchanger (the state of the address exchanger is in the through state similarly to that in the first cycle). The value of the Adr% 2 is "0".

On the other hand, by the control signals of "1" output from all of the two input OR elements 2944 to 2946, Xh+1, Yh+1 and Zh+1 are selected by the selectors 2124 to 2126, respectively. The selected signals are coupled and applied to the LUT 2902 via the address exchanger 2911. The value of the Adrs%2 of this address is "1".

When (Xh+Yh+Zh)%2=1, the output of the EXOR 2514 becomes "1" and address exchange is effected by the address exchanger 2911. Then, the value of Adrs%2 of the address to be input to the LUT 2901 becomes "0" and the value of Adrs%2 of the address to be input to the LUT 2902 becomes "1". By switching the table switching signal EX1 from "0" to "1", then the Adrs%2 of the address to be input to the LUT 2901 becomes "1".

As set forth above, four grid point data of the first kind of transformation table are read out through two separate cycles. These grid point data are subject of the data exchange corresponding to the address exchanging operation of the address exchanger 2911 when the data passes the data exchanger 2912. By this, the grid point data read from LUTs corresponds to the multiplying coefficients, respectively.

The data output from the data exchanger 2912 are delayed over one cycle by the registers 2915 and 2916, respectively, and then fed to the multipliers 2151 and 2152, respectively.

To the grid point data read out in the first cycle and input to the multiplier 2151, a multiplying coefficient of (24−MAX) corresponds. This multiplying coefficient is generated in such a manner that signals indicating respective MAX and 24 which are selected in the first cycle by the selector 2922 and 2923, respectively, are delayed for one cycle by the registers 2924 and 2925, and subsequently, are input to the subtracter 2171.

Next, for the grid point data to be input to the multiplier 2152 read out in the first cycle, a multiplying coefficient (MAX RED) corresponds. This multiplying coefficient is generated by inputting the MAX selected by the selector 2922 in the first cycle, to the subtracter 2172 with a delay of one cycle by the register 2924, also MED selected by the selector 2923 in the second cycle is input to the subtracter 2172.

Multiplication of corresponding grid point data and the multiplying coefficients are performed by the multipliers 2151 and 2152, respectively. Then, the products of the multiplications are summed by the adder 2931 and set in the accumulator 2932.

Next, for the grid point data to be read out in the second cycle and applied to the multiplier 2151, a multiplying coefficient of (MED–MIN) is corresponded. This multiplying coefficient is generated in a manner similar to the multiplying coefficient of (24–MAX). However, in this case, the signals to be selected by the selectors 2922 and 2923 become respectively MED and MIN.

Similarly, the multiplying coefficient corresponding to the multiplier 2152 is MIN. This multiplying coefficient is generated by delaying the MIN signal selected by the selector 2922 in the second cycle by the register 2924 and by subtracting the lower 4 bits of the value of 24 output from the selector 2923, i.e. 00002 from the MIN signal by the subtracter 2172.

The multiplication of the grid point data read out in the second cycle and corresponding multiplying coefficients are performed by the multipliers 2151 and 2152, and the product of the multiplication is summed by the adder 2931 and fed to the accumulator 2932 to be integratingly summed with the value held in the former cycle. Then, the result of addition is output to the terminal 2934 as the transformed data via the shifter 2923.

The shown embodiment is adapted to store two kinds of transformation table data in two LUTs. However, it is possible to reduce the number of bits of the address signal to one bit and to make the number of transformation tables to be stored one. In such case, the transformation table switching control signal becomes unnecessary.

As set forth above with respect to the twenty-first to thirty-seventh embodiments, by the embodiments of the present invention, when data transformation is performed by the interpolating operation employing n as the number of LUTs, data transformation is performed for a maximum of n kinds of characteristics. Namely, by switching the addresses (regions) to be dedicatedly accessed in respective LUTs, and storing the grid point data of mutually distinct characteristics for respective regions, different kinds of data transformation are performed at every switching of the table regions.

In the embodiments discussed herebelow, switching control and a printing operation associated therewith is explained for the embodiments, in which the grid point data are loaded in the LUTs at every data transformation, instead of preliminarily providing the grid point data for the respective LUTs.

(THIRTY-EIGHTH EMBODIMENT)

The shown embodiment illustrates the application of the present invention for an electrophotographic printing operation to be employed in the printer, a copy machine and so forth.

Figure 68:
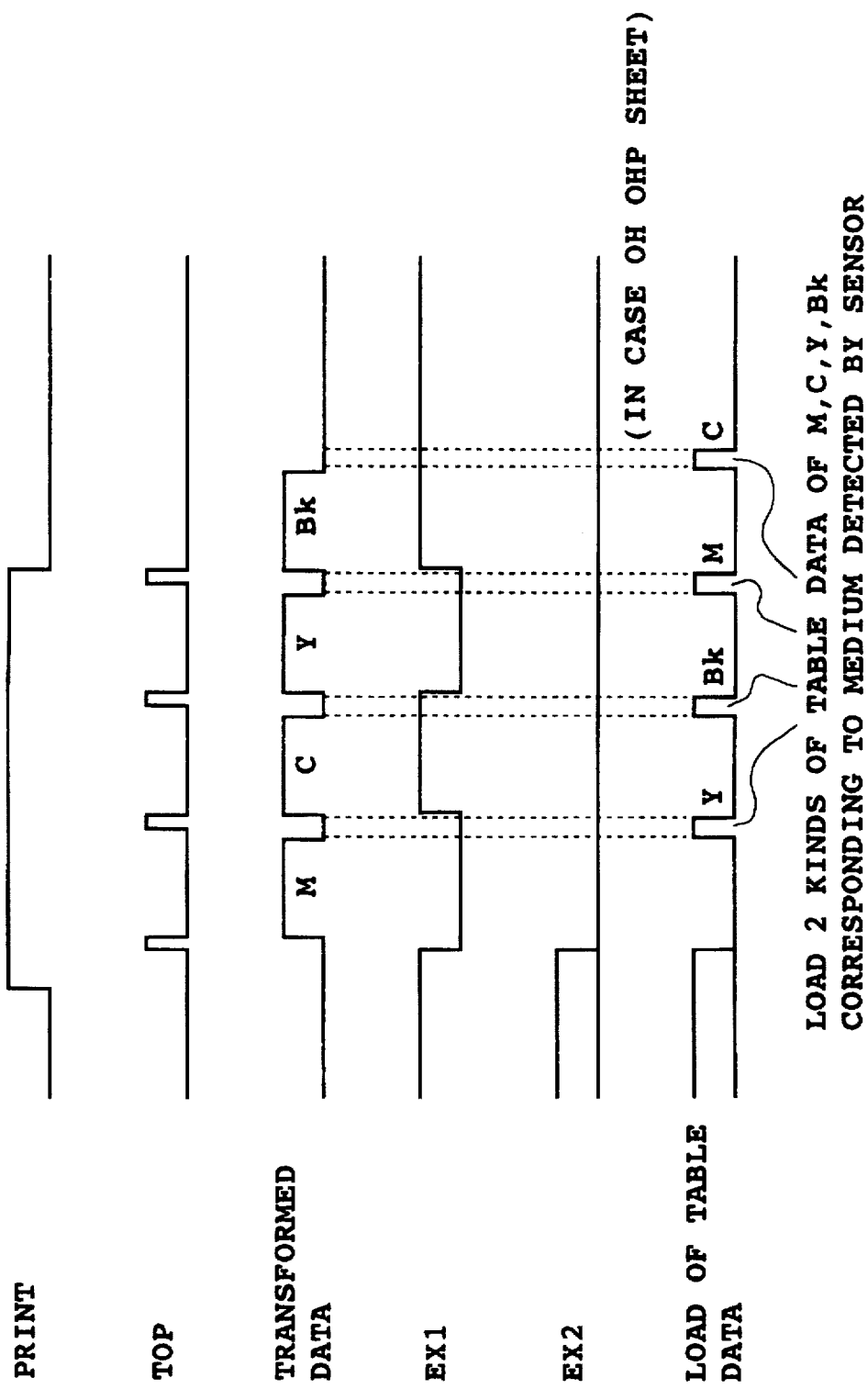
FIG. 68 is a timing chart of various signals in the control process shown in FIG. 67.
Figure 69:
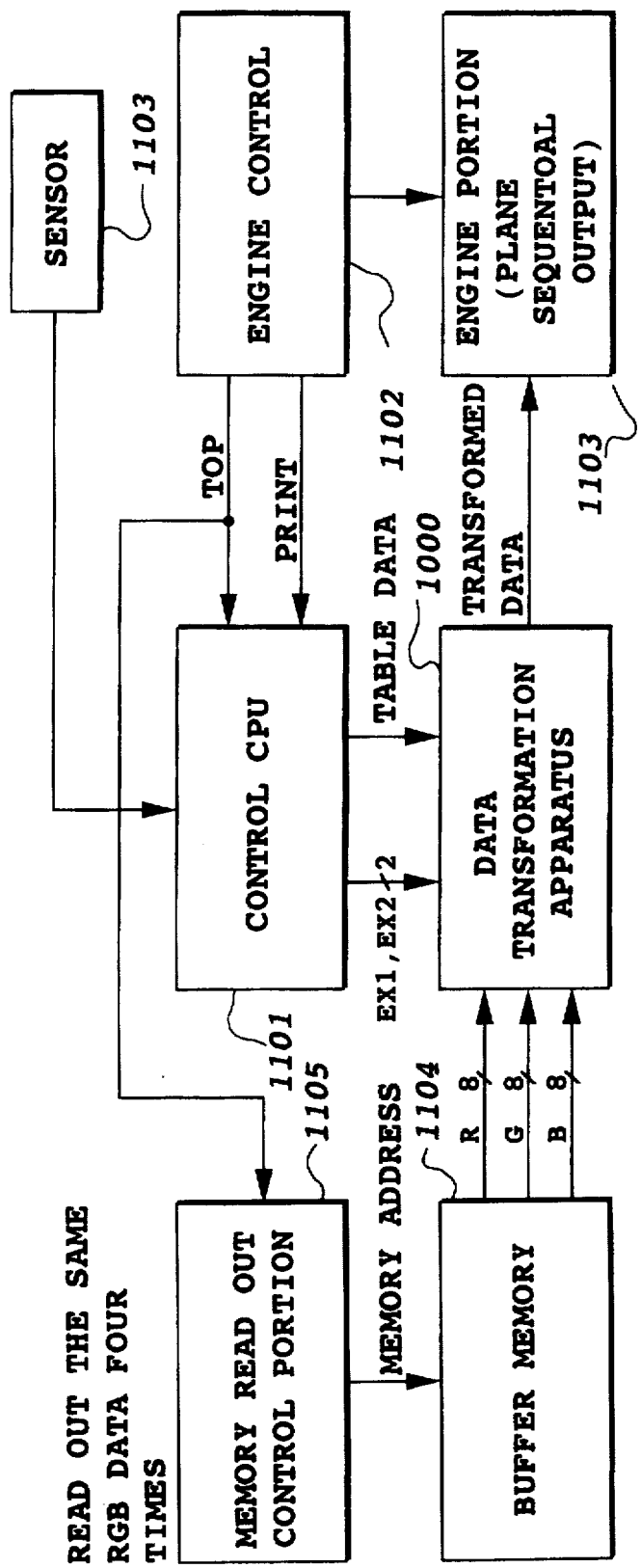
FIG. 69 is a block diagram showing a construction for executing the control process shown in FIG. 67.

FIG. 67 is a flowchart showing a control process in terms of a printing operation, FIG. 68 is a timing chart of various control signals and FIG. 69 is a block diagram showing a construction for the control process.

Hereinafter, the kinds of data transformation in the shown embodiment and table region switching control in the printing operation is discussed with reference to the foregoing drawings.

The shown embodiment is constructed for a printing operation of the printer or the copy machine employing a color transformation system permitting 8 kinds of data transformation while employing four LUTs as illustrated in some of the foregoing embodiments. In the initial condition, for the respective four LUTs, the following eight kinds of data are preliminarily stored in respective regions to be accessed according to switching control. More specifically, as shown at step S3101 of FIG. 67, grid point data for color transformation from R(red), G(green), B(blue) data into M(magenta) for printing on common paper as the printing medium, the grid point data for similarly transforming R, G, B data into C (cyan) for printing on common paper, and grid point data for transforming R, G, B data into M and C for printing on the OHP sheet are stored in the regions of the LUT, which is divided into four regions.

The control CPU 1101 (see FIG. 69) is responsive to a print signal PRINT (see FIG. 68) from the engine control portion 1102 (see FIG. 69) to initiate control for the printing operation at the step S3101 shown in FIG. 67. At step S3102, discrimination is made for the printing medium used for printing. This discrimination is performed on the basis of the output from the sensor 1106 (see FIG. 69) for discriminating the kind of printing medium. It should be noted that it is possible to detect a setting input made by a user of the printing and so forth for designating the printing medium instead of discriminating the kind of the printing medium. In the case that judgement is made that the printing medium to be used is common paper, the control process is advanced to the step S3103 and subsequent processes. In the series of processes started from the step S3103, formation of a latent image on a photoreceptor drum (not shown) by means of a laser beam or an analog optical system (both are not shown), and developing employing respective ones of M, C, Y. Bk toners and outputting of an image by transferring onto the common paper. In case of the electrophotographic type, with respect to each of the colors of toners of M, C, Y. Bk, image output is sequentially performed for one page (one sheet of the common paper), that is the image output is performed in a manner of a plane sequential output. Namely, formation of a latent image, development and toner image transfer are sequentially repeated for each color, therefore, the data transformations are also performed in a manner of a plane sequential output.

More specifically, when judgement is made that the printing medium is common paper, the controlling CPU 1101 sets the switching control signals to EX2=0, EX1=0, (see FIG. 68) in synchronism with the rising of the signal TOP (see FIG. 68) indicative of rising of a page leading end from the engine control portion 1102 so that the region for transforming into M(magenta) in the case of common paper is accessed in the subsequent processes. In conjunction therewith, the memory reading out control portion 1105 (see FIG. 69) sequentially provides a memory address for one page to the buffer memory 1104 (see FIG. 69) in synchronism with the signal TOP to respectively read out 8 bits of R, G, B data.

A data transforming apparatus 1000 (see FIG. 69) performs color transformation on the basis of the read out R. G.

B data to output a transformed data M (see FIG. 68) relating to M(magenta). An engine portion 1103 (see FIG. 69) performs printing operation on the basis of the transformed data M to perform outputting image relating to one page of M(magenta) (steps S3103 and S3104).

Next, at step S3105, by the construction for loading data discussed with respect to the twenty-ninth and subsequent embodiments, during an interval of the data transformation, the grid point data relating to Y of the common paper are loaded in the region to be accessed by EX1=0 (see FIG. 68). When storing of the table data is completed, at step S3106, similarly to the foregoing, in synchronism with rising of next signal TOP, the switching control signals are set to be EX1=1 (Ex2 is maintained at 0: see FIG. 68) so that the regions of the LUTs to be accessed in the subsequent process are switched. By this, in the same manner as the above, in the data transformation apparatus 1000, the R. G. B. signals are transformed into the data C relating to C(cyan). Then, on the basis of this, the image of C(cyan) is transferred on the common paper, on which the M(magenta) has already been transferred.

At step S3107, during the interval of data transformation, the grid point data for Bk on the common paper is loaded in the region to be accessed by EX1=1 (see FIG. 68). Subsequently, at step S3108, the switching control signals are set to be EX1=0 (EX2 is still maintained at 0: see FIG. 68). Thus, the region to be accessed in the subsequent process is switched for the case of the common paper and for the grid point data of Y(yellow). Then, on the basis of the R. G. B signal, data transformation accessing these regions is performed to overlay the image of Y(yellow).

Next, at step S3109, during the interval of data transformation, the grid point data for M on the common paper is loaded in the region to be accessed by EX1=0 (see FIG. 68). At a step 3110, the switching control signals are set to be EX1=1 to enable access of the region relating to Bk(black) in the case of common paper to overlay a Bk (black) image (see FIG. 68).

At the final step S3111, for preparation of the next image output, the grid point data relating to cyan (C) for printing on common paper are stored in the table region to be accessed when EX1=0, and then the process ends.

On the other hand, in the discrimination of the printing medium at the step S3102, judgement is made that the printing medium is the OHP sheet, the switching control signal is varied to be EX2=1 at step S3112. In the subsequent steps S3113 to S3120, the processes similar to the foregoing steps S3104 to S3111 are performed.

As set forth above, in synchronism with respective page leading end signal TOP, the respective switching control signals EX1 and EX2 are set, and according to this, image formation (printing) is performed for a plane sequential output.

(THIRTY-NINTH EMBODIMENT)

Figure 70B:
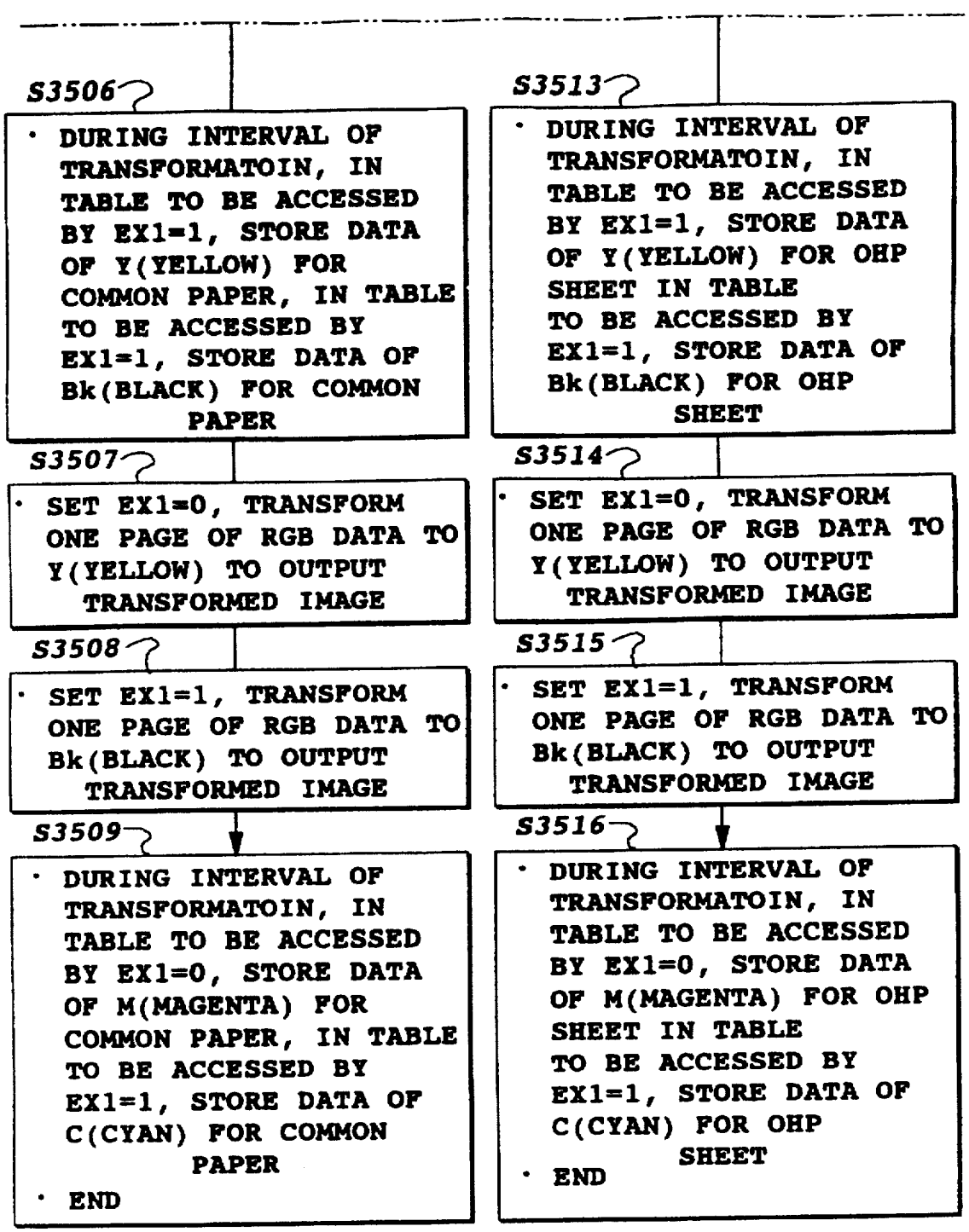
Figure 71:
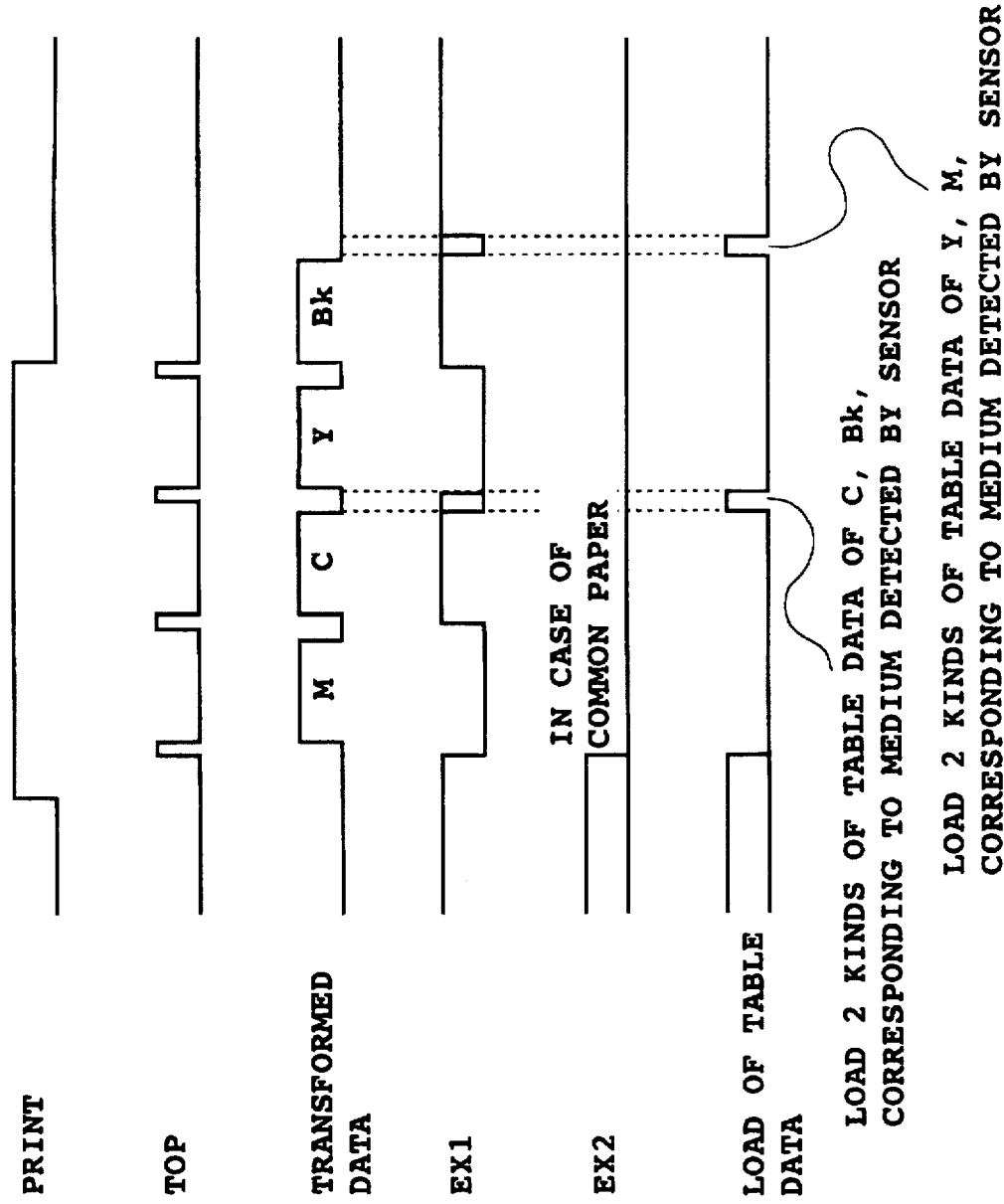
FIG. 71 is a timing chart of various signals in i the control process shown in FIG. 70.

FIGS. 70 and 71 show a flowchart and a timing chart illustrating substantially the same constriction as the foregoing thirty-eighth embodiment. The construction for control is the same as FIG. 69.

The point of difference from the thirty-eighth embodiment is that the shown embodiment permits loading for two kinds of grid point data in one loading operation. More specifically, as shown in FIG. 70, when image formation for M(magenta), C(cyan) for common paper is completed through the steps S3504 and S3505, at the step S3506, during the interval of data transformation, the grid point data for printing Y on the common paper is loaded in the table region to be accessed with EX=0 and, simultaneously, the grid point data for printing Bk on the common paper is loaded in the table region to be accessed with EX=1 (see FIG. 71). Subsequently, on the basis of the loaded table data, image formations for Y(Yellow) and Bk(Black) are performed (steps S3507, S3508). Thereafter, in the similar manner, at the step 3509, the grid point data for M(magenta) and C(cyan) for printing on the common paper are loaded.

(FORTIETH EMBODIMENT)

Figure 72B:
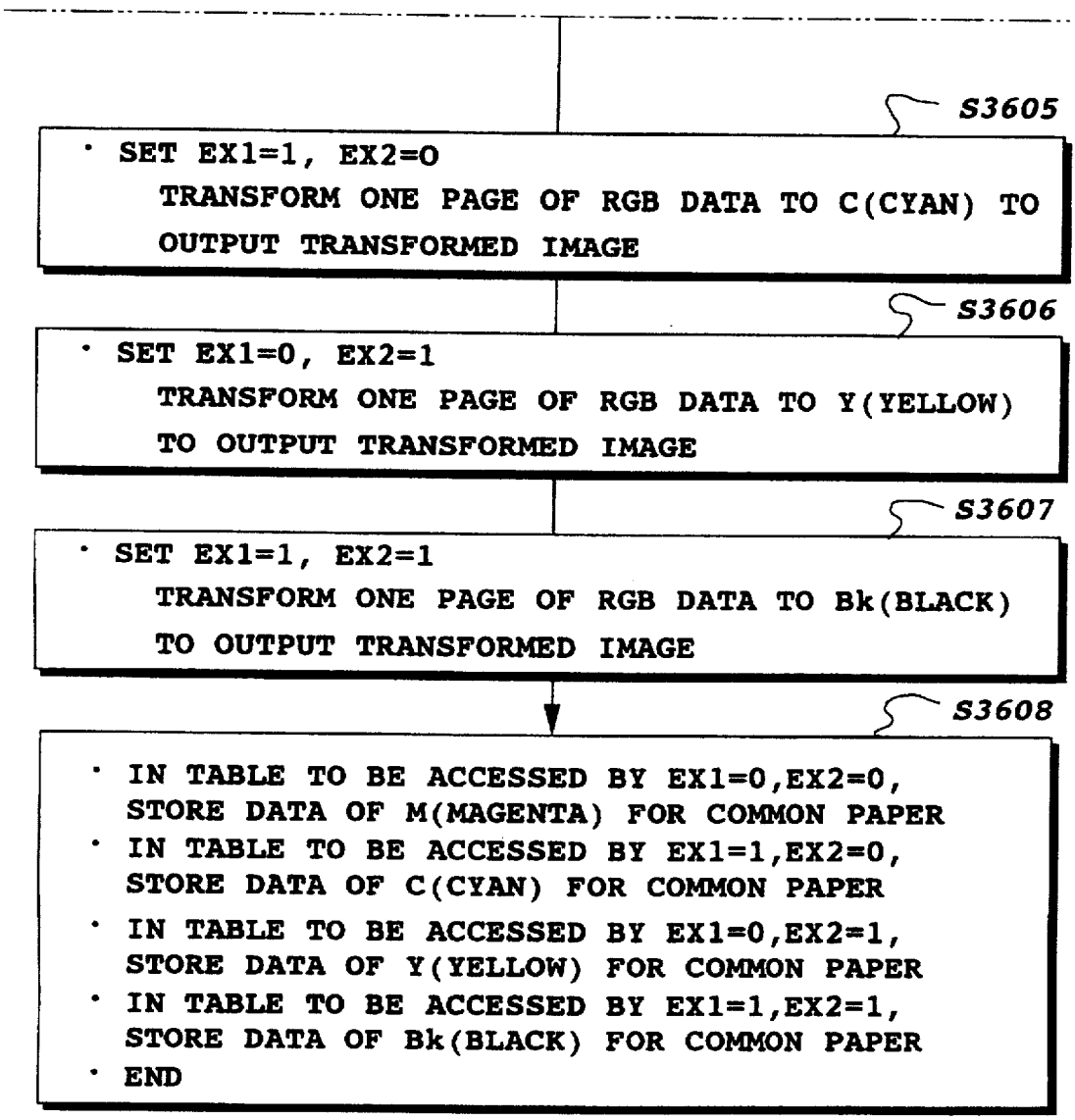
Figure 73:
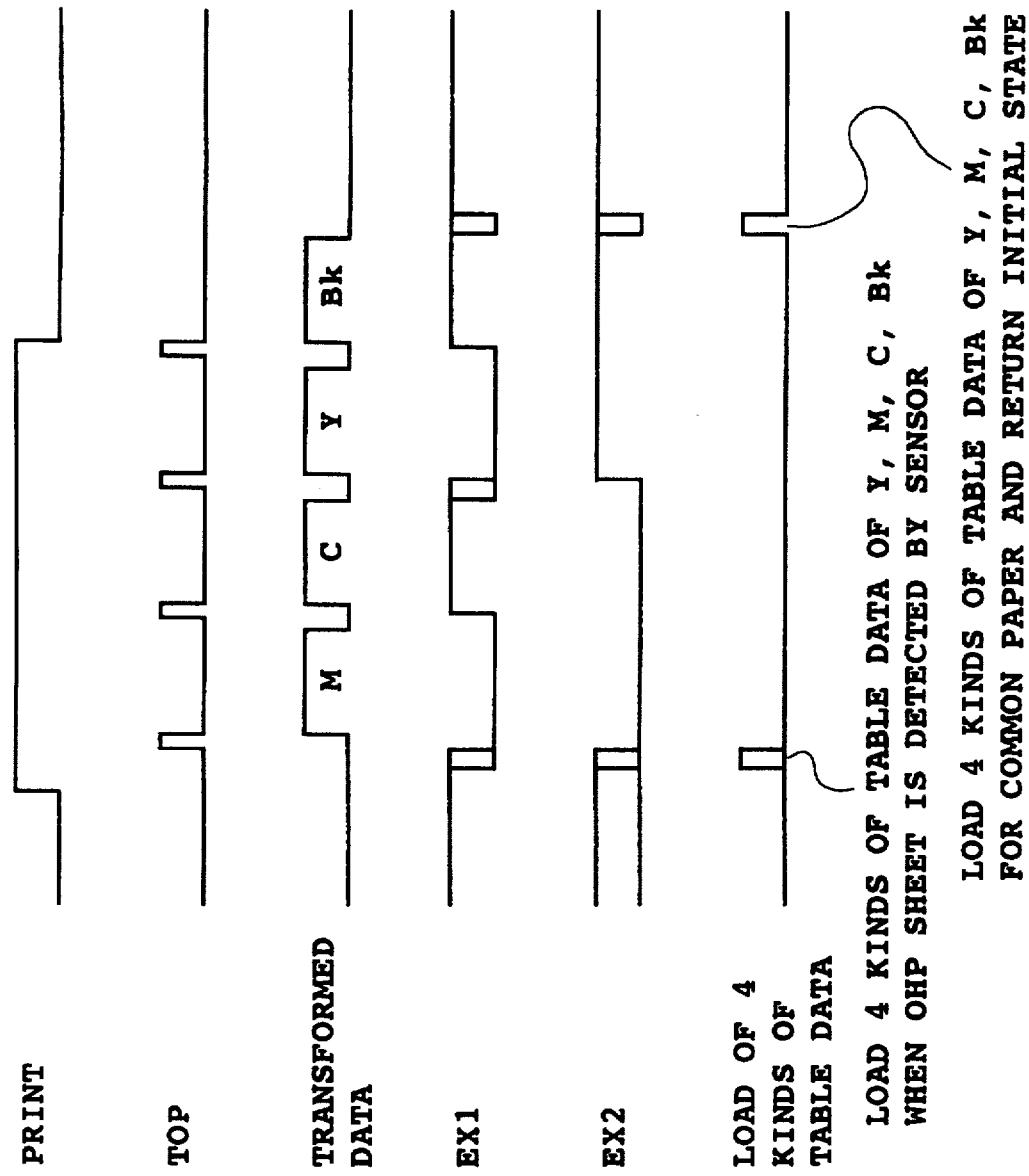
FIG. 73 is a timing chart of various signals in the control process shown in FIG. 72.

FIGS. 72 and 73 are a flowchart and a timing chart illustrating substantially the same construction as the thirty-eighth and thirty-ninth embodiments set forth above.

In the shown embodiment, in the initial state, M, C, Y. Bk data for printing on the common paper are loaded (see step S3601 of FIG. 72). Only when the OHP sheet is detected by a sensor (step S3602), the grid point data relating to M, C, Y. Bk data for printing on the OHP sheet is loaded at one loading operation (see step S3603 of FIG. 72). Then, whenever image formation is completed, the grid point data for the common paper are loaded (step S3608).

(FORTY-FIRST EMBODIMENT)

Figure 74B:
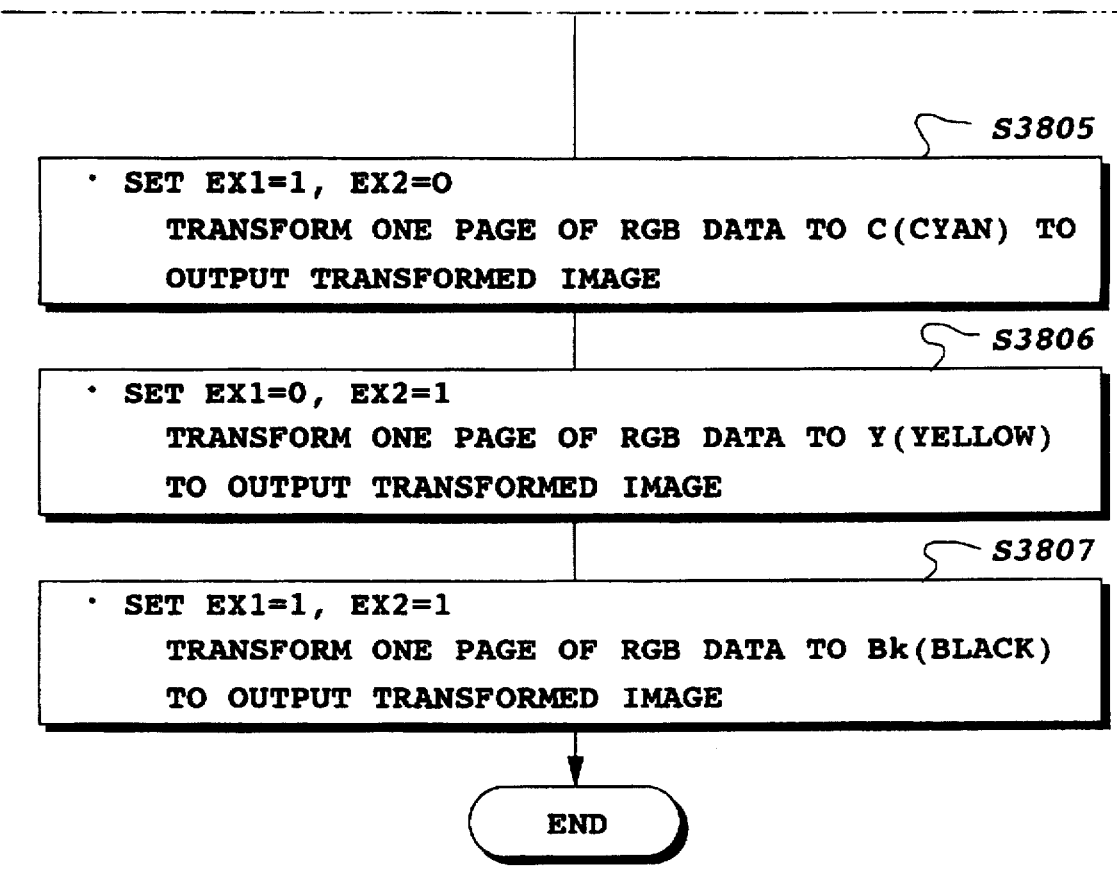
Figure 75:
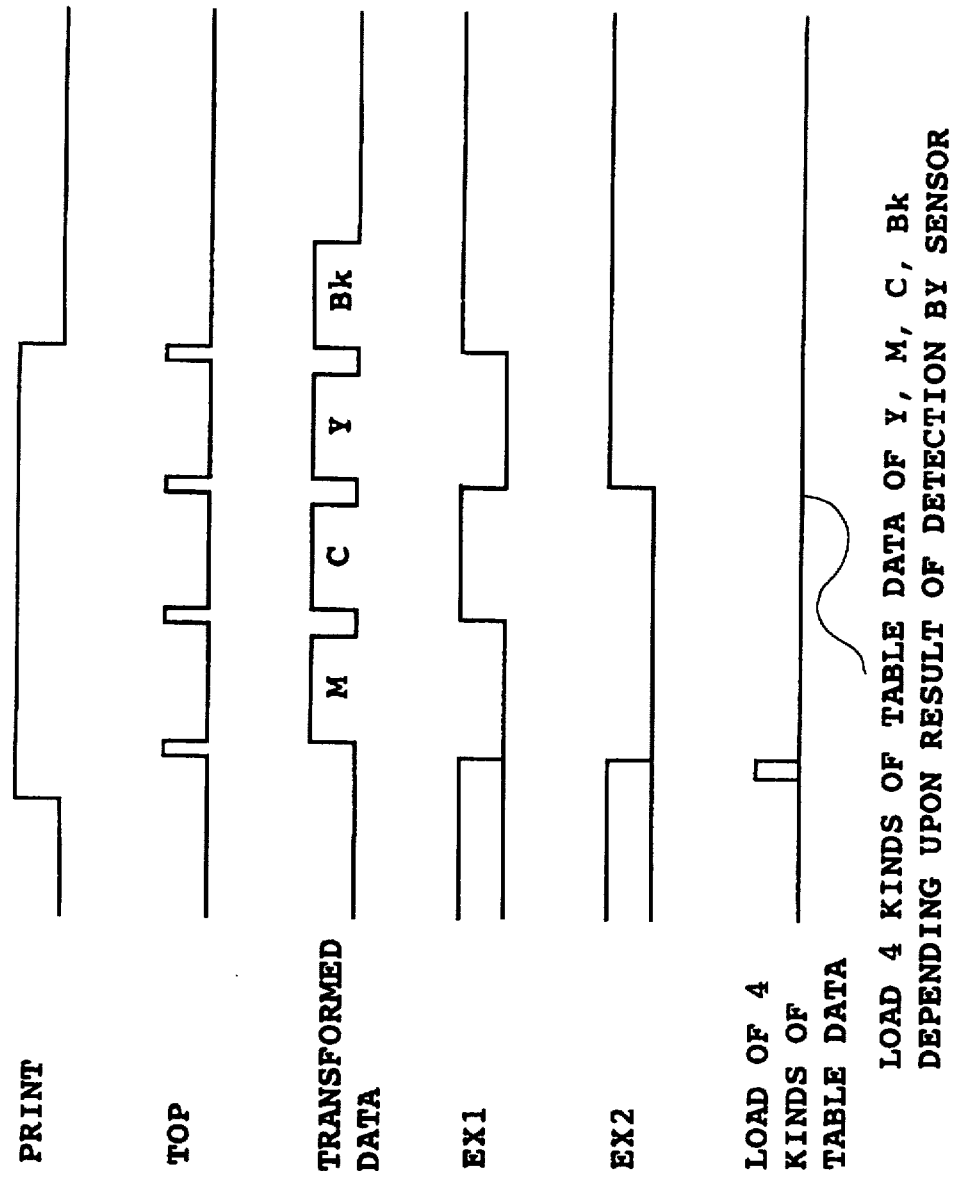
FIG. 75 is a timing chart of various signals in the control process shown in FIG. 74.

FIGS. 74 and 75 are a flowchart and a timing chart illustrating substantially the same construction to the thirty-eighth to fortieth embodiments set forth above for loading the table data.

In the shown embodiment, initially, checking of the printing medium by the sensor is performed (step S3801 of FIG. 74). Depending upon the result of detection by the sensor, the grid point data for obtaining transformed data of M(magenta), C(cyan), Y(Yellow) and Bk(Black) for printing on the common paper or the OHP sheet are loaded (steps S3802 or S3803, see FIG. 74). Then, subsequently, image output is performed in a manner of a plane sequential output in the order of M, C, Y. Bk (steps S3804 to S3807).

(FORTY-SECOND EMBODIMENT)

Figures 76, 76A:
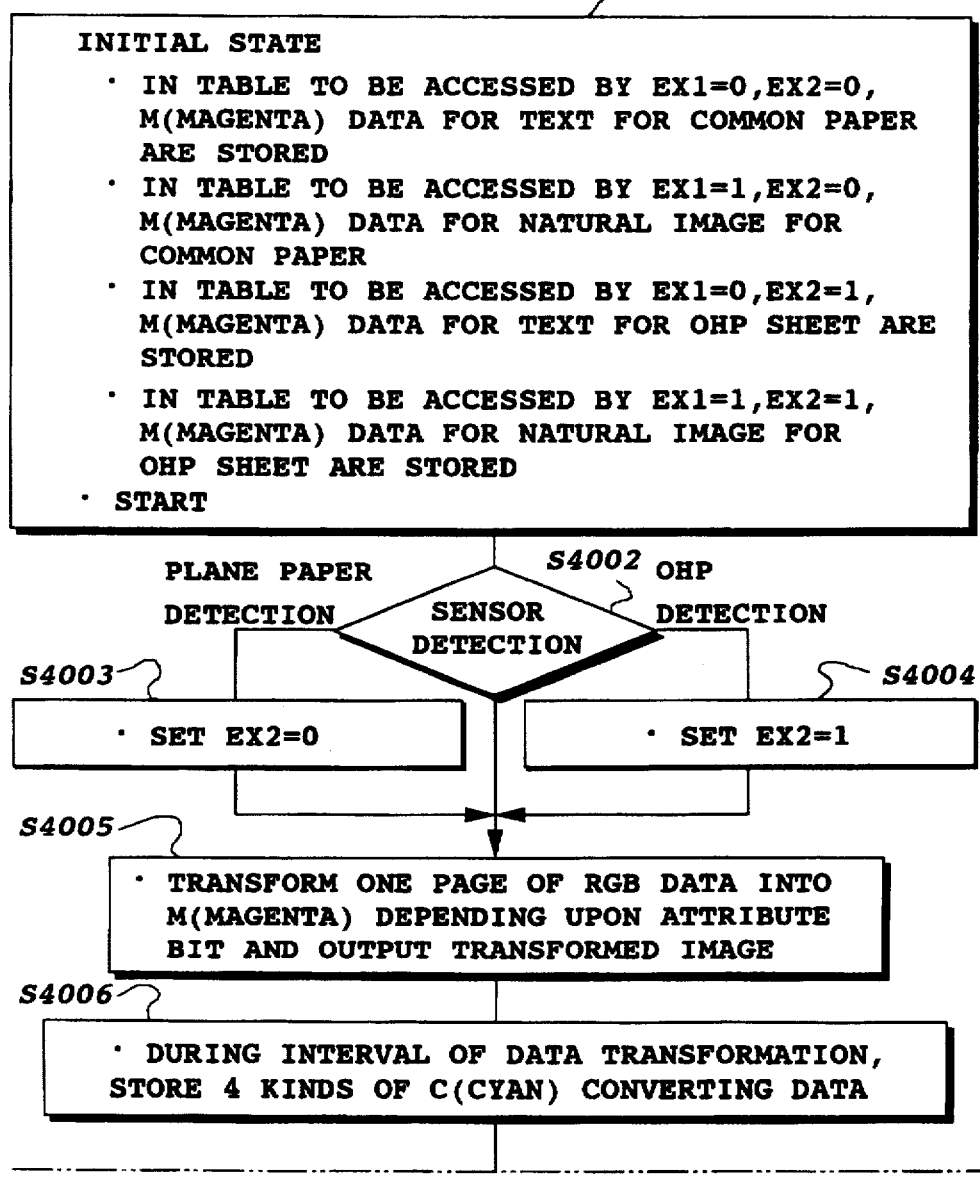
FIGS. 76A and 76B are flowcharts showing a process of an access region switching and an image output control associated therewith in a forty-second embodiment of a data transformation apparatus according to the present invention.
Figure 76B:
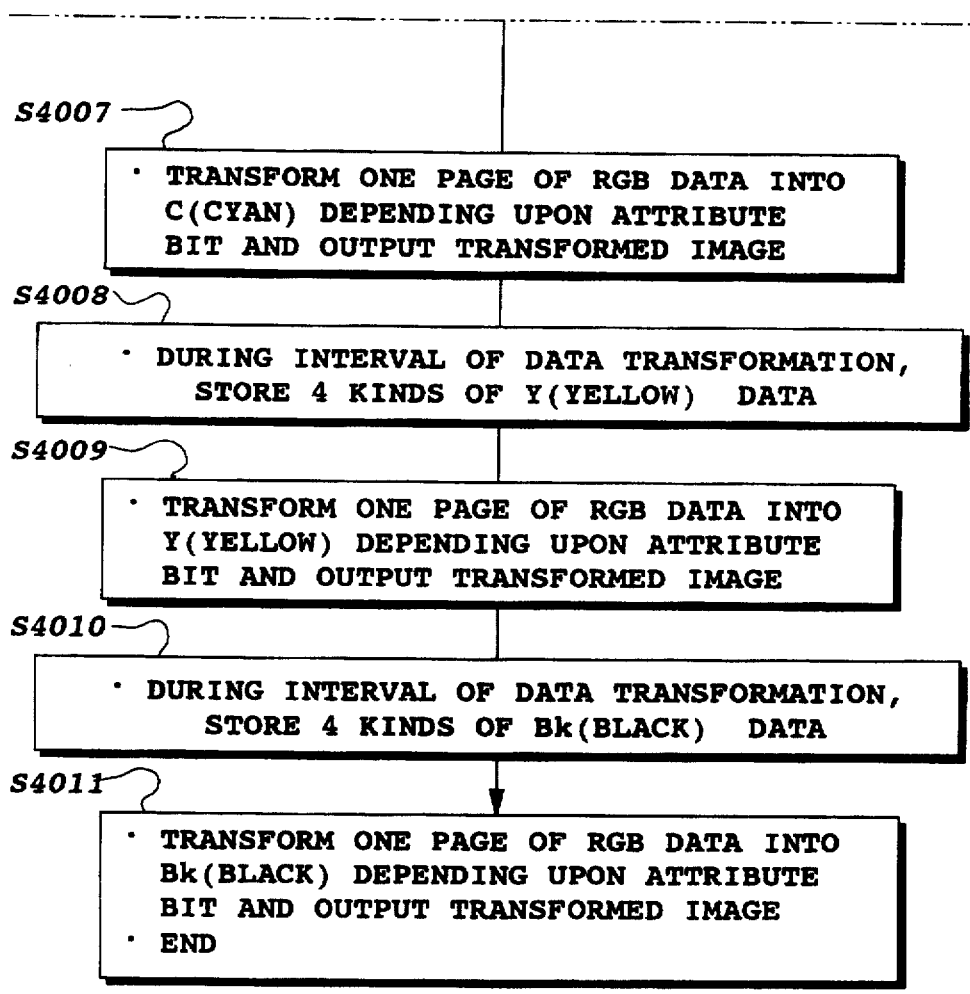
Figure 77:
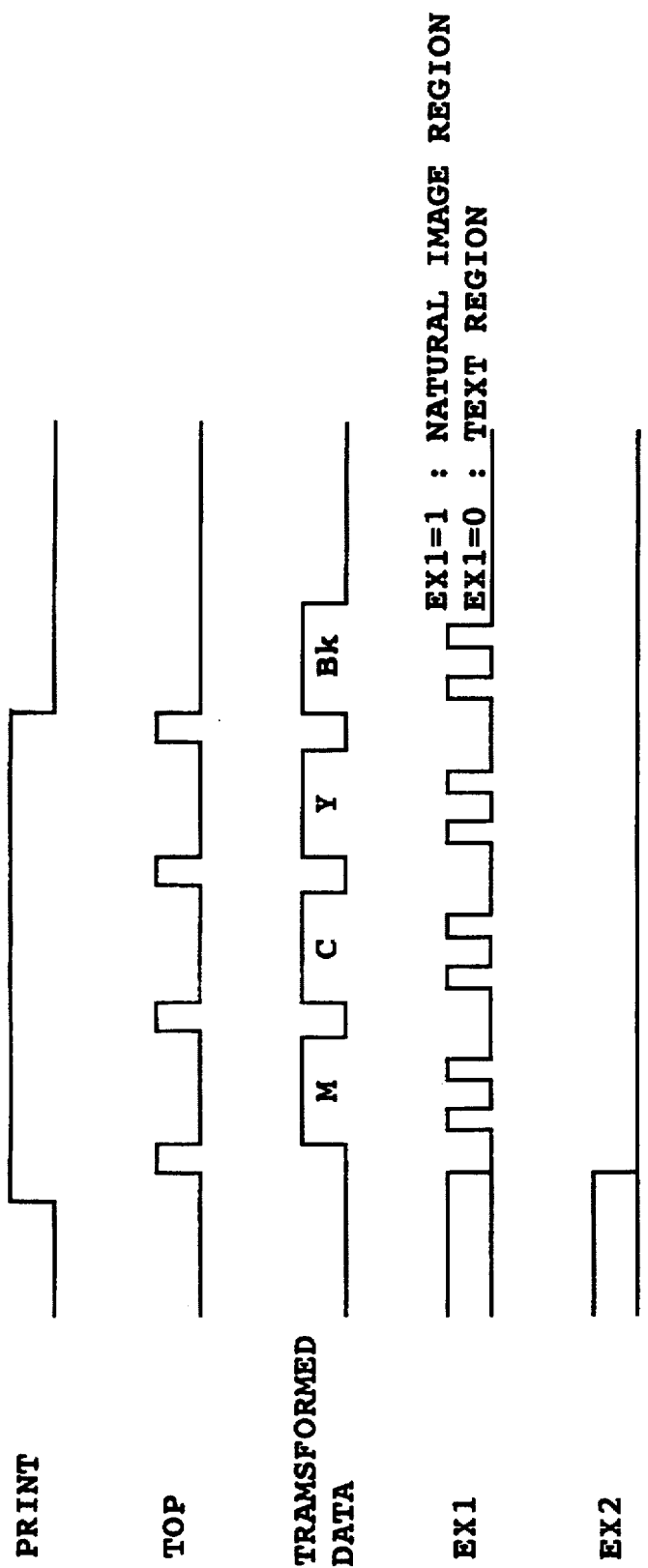
FIG. 77 is a timing chart of various signals in the control process shown in FIG. 76.
Figure 78:
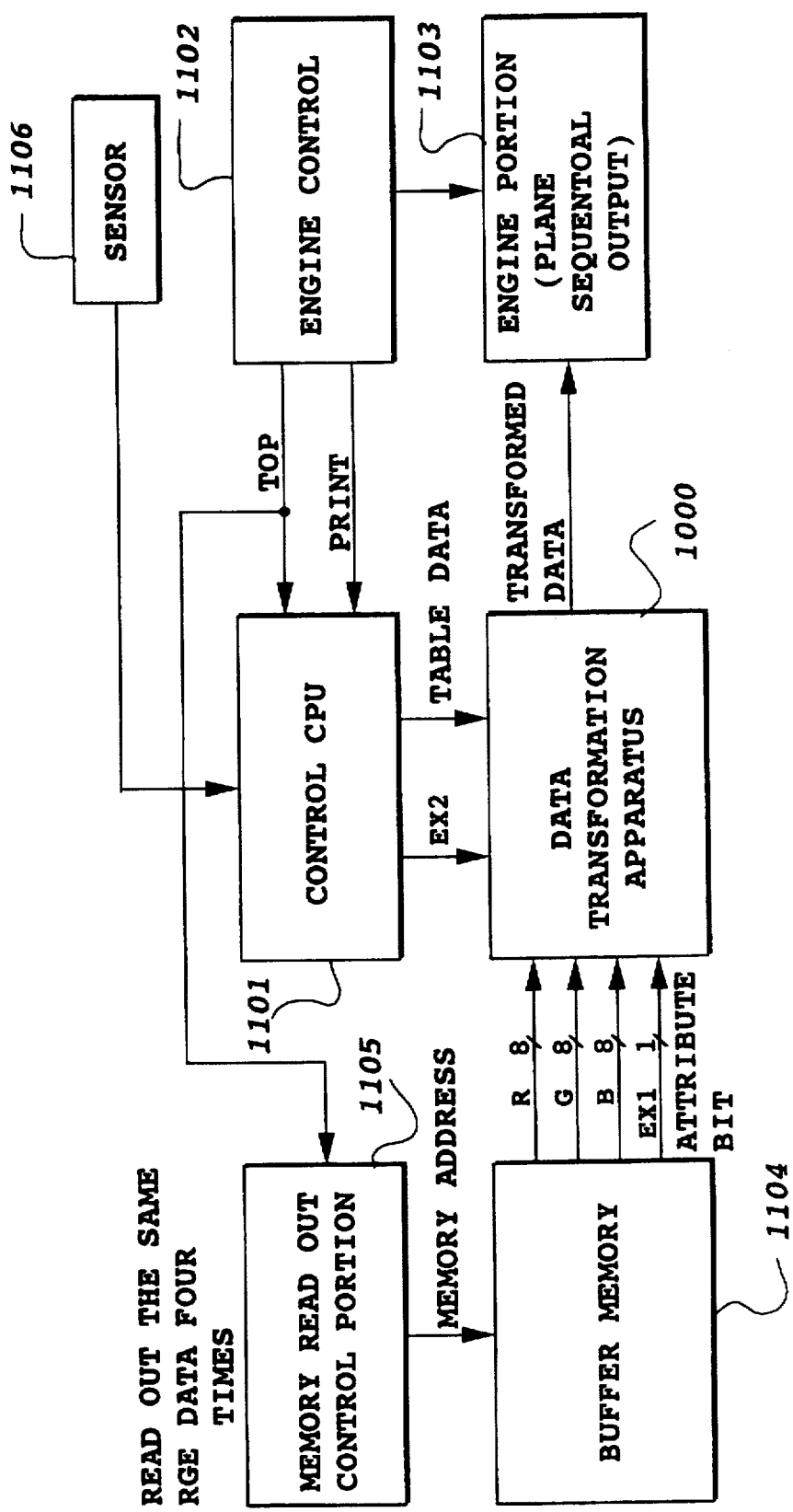
FIG. 78 is a block diagram showing a construction for executing the control process shown in FIG. 76.

FIGS. 76, 77 and 78 show the forty-second embodiment of the data transformation apparatus according to the present invention.

The shown embodiment is adapted to perform data transformation adapted while employing a transformation table corresponding to two kinds of images and two kinds in the case where "text" and "natural image" are mixedly present in one page of an image as shown in FIG. 34. Therefore, for each pixel of R. G. B data read out from the buffer memory 1104 (see FIG. 78), 2 bits of attribute bits indicative of the value of the switching control signal EX1 is added. By this, R. G. B data are discriminated as to which of the two kinds of images is present.

In FIG. 76, at an initial state shown in step S4001, for the respective four kinds of tables to be selectively accessed depending upon combinations of the values of EX1 and EX2, the grid point data for obtaining the transformed data of M(magenta) for combination of 2 kinds of images, i.e. "text" and "natural image", and the OHP sheet and the common paper are stored. When the printing operation is initiated, at step 84002, discrimination for the printing medium is performed to discriminate between the OHP sheet or the common paper. Then, at step S4005, by accessing the LUT of the kind depending upon the value of the attribute bit EX1 added to R. G. B data per one pixel, the grid point data is obtained. Then, on the basis of this, an interpolating operation is performed to obtain the transformed data. Then, by performing a sequential image output, printing for one page is performed.

Next, at step S4003, during the interval of data transformation where no data transformation is performed, the grid point data for obtaining the transformed data of C(cyan) corresponding to the above-mentioned four kinds is loaded.

Subsequently, the operation of S4007 to S4011 similar to the foregoing is performed. Then, the process ends.

It should be noted that while the grid point data is stored in the LUT and image output is performed on the basis thereof in the foregoing thirty-eighth to forty-second embodiments, it is, of course, possible to perform image formation on the basis of four kinds of fixed grid point data preliminarily stored in the LUTs.

Also, while the foregoing discussion has been given for printing in a manner of a plane sequential output, it should be obvious that the present invention is equally applicable for the case where M, C, Y. Bk data are printed per one pixel, such as that of the ink-jet type printer, for example.

As set forth above, according to the twenty-first to the forty-second embodiments set forth above, the address of the look-up table to be accessed is constantly limited to a given region depending upon the sum of the address data or sum of the address data and the value of the switching control signal. By this, different kinds of transformation tables are stored in different regions in respective look-up tables. Also, by the address, a specific one of the table regions having one transformation characteristic is only accessed.

On the other hand, by varying the content of the above-mentioned switching signal, the above-mentioned region in each look-up table can be varied. By this, the table region having another kind of transformation characteristic can be accessed. Therefore, it becomes possible to perform a plurality of kinds of transformation.

As a result, the redundance of the LUTs which encounters a problem in the conventional system to perform data transformation with a plurality of LUTs, is avoided to permit 100% efficient use of the LUTs.

Also, according to the present invention, there is provided an image forming system incorporating the above-mentioned look-up table. Such image forming system can be the copy machine and printer discussed above. In addition, the data transformation system according to the present invention is equally applicable to a facsimile.

A construction for applying the data transformation system according to the present invention to the image forming system and the construction of the image forming system per ne may be known constructions. Therefore, the discussion for such constructions are omitted.

It should be noted that, in the above-mentioned printer, while it is possible to employ the ink-jet type printer, it is also possible to employ a so-called bubble-jet type printer, in which a bubble is generated in an ink utilizing thermal energy and the ink is ejected by formation of the bubble.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above, but to include all possible embodiments which fall within a scope encompassed and equivalents thereof with respect to the features set out in the appended claims.

What is claimed is:

1. A data transformation apparatus comprising:
    storing means for storing a plurality of look-up tables; and
    address exchanging means for performing an exchanging operation of transfer paths of a plurality of address data with each other, on a basis of an input data to be transformed, so as to provide the address data to one of the plurality of look-up tables which corresponds to an attribute of said address data to be provided, said exchanging operation including an operation in which the transfer paths are not exchanged with each other.

2. A data transformation apparatus as claimed in claim 1, further comprising interpolation means for performing interpolating calculation on the basis of data output from said plurality of look-up tables with respect to the address data provided by said address exchanging means.

3. A data transformation apparatus as claimed in claim 1, further comprising exchange switching means for varying a mode of exchanging of said address exchanging means on the basis of the attribute of said each of a plurality of address data.

4. A data transformation apparatus as claimed in claim 3, wherein each of said plurality of look-up tables has a plurality of table regions to which the attributes of said address data correspond depending upon the variation of exchanging mode of said address exchanging means.

5. A data transformation apparatus as claimed in claim 3, wherein said exchange switching means varies the exchanging mode of said address exchanging means on the basis of a result of exclusive logical operation of a signal indicative of the attribute of said address data and a switching control signal.

6. A data transformation apparatus as claimed in claim 1, wherein said address exchanging means includes:
    address assigning means for providing the address data based on the input data to be transformed to one of a plurality of regions in said one of a plurality of look-up tables, said one of a plurality of regions corresponding to an attribute of said address data to be provided.

7. A data transformation apparatus as claimed in claim 1, wherein said address exchanging means includes:
    address assigning means for providing the address data, which has a same number of bits as the input data, to the look-up table corresponding to an attribute of said address data to be provided.

8. A data transformation apparatus for performing a data transformation through interpolating operation employing a plurality of look-up tables, said apparatus comprising:
    address generating means for generating a plurality of address data on the basis of an input data to be transformed;
    logical operation means for performing an exclusive logic operation of a signal indicative of an attribute of each of said plurality of address data based on said input data and a switching control signal;
    address exchanging means for performing exchanging operation including non-exchanging for transfer paths of a plurality of address data on the basis of an input data to be transformed, so as to provide each of said plurality of address data to the look-up table corresponding to the attribute of said address data to be provided, said address exchanging means varying a mode of exchanging depending upon a result of operation of said logical operation means;

data exchanging means for performing exchanging operation including non-exchanging for transfer paths for transferring data output from said plurality of look-up tables with respect to the address data provided by said address exchanging means so as to establish correspondence of said data output to an interpolating coefficient corresponding to the address data provided for outputting of said data output, said data exchanging means varying a mode of exchanging depending upon said result of operation of said logic operation means; and interpolation means for performing interpolation calculation on the basis of the data output from said data exchanging means and the interpolation coefficient corresponded to output a transformed data.

9. A data transformation apparatus as claimed in claim 8, wherein each of said plurality of look up tables has a plurality of regions to which the attributes of said address data correspond, said address exchanging means provides the address data to one of said plurality of regions corresponding to said address data, and said data transformation apparatus further comprises switching control means for varying said switching control signal to vary the region of the look up table to which region said address exchanging means provides the address data.

10. A data transformation apparatus as claimed in claim 9, wherein said switching control means sequentially varies said switching control signal for sequentially performing a plurality of kinds of data transformation.

11. A data transformation apparatus as claimed in claim 9, wherein said data exchanging means is provided between said plurality of look-up tables and said interpolation means, or between said plurality of look-up tables and said interpolation means and in mid portion of said interpolation means.

12. A data transformation apparatus as claimed in claim 9, wherein said interpolation means includes coefficient generating means for generating a plurality of multiplying coefficients and a plurality of multipliers, and multiplying coefficient exchanging means is provided between said coefficient generating means and said plurality of multipliers.

13. A data transformation apparatus as claimed in claim 9, wherein said interpolation means includes coefficient generating means for generating a plurality of multiplying coefficients and one or a plurality of multipliers, the plurality of multiplying coefficient generated by said coefficient generating means are input to said multipliers after selection by a selector.

14. A data transformation apparatus as claimed in claim 9, wherein said address exchanging means has a plurality of address exchangers having two input and two output or a selector having n in number of inputs and one output.

15. A data transformation apparatus as claimed in claim 14, wherein an exchanging mode of said address exchanging means varies depending upon a result of an exclusive logical operation of a least significant bit signal of said address data and said switching control signal.

16. A data transformation apparatus as claimed in claim 15, wherein said data exchanging means has a plurality of data exchangers having two input and two output or a selector having n in number of inputs and one output.

17. A data transformation apparatus as claimed in claim 12, wherein said multiplying coefficient exchanging means includes a plurality of coefficient exchangers having two input and two output or a selector having n in number of inputs and one output, and an exchanging mode of said multiplying coefficient exchanging means is the same content to the exchanging mode of said address exchanging means.

18. A data transformation apparatus as claimed in claim 10, wherein said interpolation means performs the interpolation on the basis of data read out from said plurality of look-up tables at one time or over a plurality of times to output one transformed data.

19. A data transformation apparatus as claimed in claim 10, wherein said input data is R (red), G (green) and B (blue) color signal data and said transformed data is one of M (magenta), C (cyan), Y (yellow) or Bk (black) color signal data.

20. A data transformation apparatus as claimed in claim 19, wherein said plurality of kinds of data transformation are cases of the data transformation for printing M (magenta), C (cyan), Y (yellow), Bk (black) on a common paper or an OHP sheet, or cases of data transformation for printing M (magenta), C (cyan), Y (yellow), Bk (black) for text, video image, graphic image or scanner image.

21. A circuit board to be employed in a data transformation apparatus for performing a data transformation through interpolating operation employing a plurality of look-up tables, said circuit board comprising:

an address generating circuit for generating a plurality of address data on the basis of an input data to be transformed;

a logical operation circuit for performing exclusive logic operation of a signal data of a part of the input data and a switching control signal;

an address exchanging circuit for exchanging said plurality of address data by varying a mode of exchanging depending upon a result of operation of said logical operation circuit before said plurality of address data generated by said address generating means are applied to said plurality of look-up tables so that the address data is provided to the look-up tables corresponding to an attribute of said address data;

a data exchanging circuit for exchanging grid point data by varying a mode of exchanging depending upon a result of operation of said logical operation circuit with respect to respective grid point data output from said plurality of look-up tables so that a correspondence is established between the grid point data and an interpolation coefficient corresponding to the address data by which said grid point data is output;

an interpolating operation circuit for performing interpolating operation on the basis of said grid point data output by said data exchanging circuit; and a terminal for inputting switching control data for sequentially varying said switching control signal so as to perform a plurality of kinds of data transformation sequentially.

22. A data transformation apparatus for performing a data transformation through interpolating operation by employing a plurality of look-up tables, said apparatus comprising:

address generating means for generating address data to be corresponded to each of said plurality of look-up tables, on the basis of a part of an input data to be transformed;

address exchanging means for determining the look-up tables respectively corresponding to a plurality of address data generated by said address generating means on the basis of a residue obtained when a division of a sum of the address data generated by said address generating means and a switching control signal by a number of kinds of data transformation to be switched by said switching control signal, is performed; and interpolation means for performing exchange between data output from respective of a plurality of look-up tables on the basis of respective addresses determined by said address exchanging means, in symmetry to address exchange by said address exchanging means, and performing an interpolation on the basis of a combination of said data and an interpolation coefficient.

23. A data transformation apparatus as claimed in claim 22, wherein, when a value of said switching control signal is constant, said residue is constant with respect to each of said plurality of look-up tables.

24. A data transformation apparatus as claimed in claim 23, wherein the exchange of data in symmetry by said interpolation means is performed on the basis of said residue.

25. A data transformation apparatus as claimed in claim 24, wherein the data output from respective of said plurality of look-up tables are output from a plurality of look-up tables in one operation.

26. A data transformation apparatus as claimed in claim 24, wherein data to be output from respective of said plurality of look-up tables are output from said look-up tables in a plurality of times of operation.

27. A data transformation apparatus as claimed in claim 26, wherein by address generation by said address generating means and interpolating operation by said interpolation means, the interpolating operation for respective of a plurality of look-up tables are unified into a single interpolating operation.

28. A data transformation apparatus as claimed in claim 27, wherein said input data is R (red), G (green) and B (blue) color signal data and said transformed data is one of M (magenta), C (cyan), Y (yellow) or Bk (black) color signal data.

29. A data transformation apparatus as claimed in claim 28, wherein said plurality of kind of data transformation are cases of data transformation for printing M (magenta), C (cyan), Y (yellow), Bk (black) on a common paper or an OHP sheet, or cases of data transformation for printing M (magenta), C (cyan), Y (yellow), Bk (black) for text, video image, graphic image or scanner image.

30. A data transformation apparatus as claimed in claim 29, wherein said switching control signal is output according to operation of an image forming system.

31. A data transformation apparatus as claimed in claim 30, wherein a data stored in said plurality of look-up tables are updated by storing in respectively corresponding look-up tables to said data by said address data determined by said address exchanging means.

32. An image forming system for forming an image on the basis of data transformed by a data transformation apparatus, said system comprising:

said data transformation apparatus for performing a data transformation through interpolating operation employing a plurality of look-up tables, said apparatus including:

address generating means for generating a plurality of address data on the basis of an input data to be transformed;

logical operation means for performing an exclusive logic operation of a signal indicative of an attribute of each of said plurality of address data based on said input data and a switching control signal;

address exchanging means for performing exchanging operation including non-exchanging for transfer paths of a plurality of address data on the basis of an input data to be transformed, so as to provide each of a plurality of address data to one of a plurality of regions of each of said plurality of look-up tables, said one of regions corresponding to the attribute of said address data to be provided, said address exchanging means varying a mode of exchanging depending upon a result of operation of said logical operation means;

data exchanging means for performing exchanging operation including non-exchanging for transfer paths for transferring data output from said plurality of look-up tables with respect to the address data provided by said address exchanging means so as to establish correspondence of said data output to an interpolating coefficient corresponding to the address data provided for outputting of said data output, said data exchanging means varying a mode of exchanging depending upon said result of operation of said logic operation means;

interpolation means for performing interpolation calculation on the basis of the data output from said data exchanging means and the interpolation coefficient corresponded to output a transformed data;

switching control means for varying said switching control signal to vary the region to which address exchanging means provides address data; and control means for sequentially performing a plurality of kinds of data transformation by controlling said switching control means depending upon the operation of said image forming system to sequentially vary said switching control signal.

33. An image forming system comprising a data transformation apparatus as defined in claim 9.

34. An image forming system as claimed in claim 33, wherein said switching control means controls said address data exchanging means so as to control the address data to be provided to a plurality of look-up tables depending upon the operation of said image forming system.

35. An image forming system as claimed in claim 34, wherein said operation of said image forming system is an operation for detecting a kind of medium to which the image is formed.

36. An image forming system as claimed in claim 34, wherein said image forming system is a plane sequential output color image forming system, and said control means controls said address exchanging means adapting to a plane sequential output color image forming operation.

37. An image forming system comprising a data transformation apparatus as defined in claim 22.

38. An image forming system as claimed in claim 37, wherein said address exchanging means determines address data corresponding to said look-up table depending upon the operation of said image forming system.

39. An image forming system as claimed in claim 37, wherein said operation of said image forming system is an operation for detecting a kind of medium to which the image is formed.

40. An image forming system as claimed in claim 39, wherein said image forming system is a plane sequential output color image forming system, and said control means controls said address exchanging means adapting to a plane sequential output color image forming operation.

41. An image forming system as claimed in claim 32 being a copy machine.

42. An image forming system as claimed in claim 32 being an ink-jet printer.

43. A data storage method for storing a table data in a plurality of look-up tables, said method comprising the steps of:

generating address data for data to be stored in said plurality of look-up tables;

determining the look-up table corresponding to the address data generated on the basis of said generated address data and a number of kinds of data to be stored; and storing the table data into the determined look-up table.

44. A data transformation apparatus comprising:

storing means for storing a plurality of tables;

input means for inputting information relating to a transformation mode;

generating means for generating address data corresponding to each of said plurality of tables on a basis of the information relating to the transformation mode and an upper bit of input data;

reading means for reading output data corresponding to the address data generated by said generating means from said plurality of tables; and interpolation means for performing an interpolating calculation by using the output data read by said reading means to output transformed data corresponding to the input data.

45. A data transformation apparatus as claimed in claim 44, wherein said plurality of tables respectively store the output data corresponding to different input data.

46. A data transformation apparatus as claimed in claim 44, wherein respective regions of said plurality of tables addressed with the same address data store the output data corresponding to the different transformation modes.

47. A data transformation apparatus as claimed in claim 44, wherein said interpolation means performs n, where n is an integer, point interpolating calculations, said storing means stores n tables, the information relating to the transformation mode designates n transformation modes, and said generating means includes means for generating the address data, and control means for controlling correspondence of the address data generated by said generating means with the table on a basis of a least significant bit of the upper bit of the input data and the information relating to the transformation mode.

48. A data transformation apparatus as claimed in claim 44, wherein said interpolation means performs the interpolating calculation corresponding to a lower bit of the input data.

49. A data transformation apparatus comprising:

storing means for storing a plurality of tables each of which stores respective transformed data corresponding to different transformation modes to each other in respective different regions;

input means for inputting information relating to the transformation mode;

generating means for generating address data corresponding to each of said plurality of tables on a basis of the information relating to the transformation mode and an upper bit of input data;

reading means for reading the transformed data corresponding to the address data generated by said generating means; and interpolation means for performing an interpolating calculation by using the transformed data read by said reading means to output the transformed data corresponding to the input data.

50. A data transformation apparatus as claimed in claim 49, wherein said plurality of tables respectively store the output data corresponding to different input data.

51. A data transformation apparatus as claimed in claim 49, wherein respective regions of said plurality of tables addressed with the same address data store the output data corresponding to the different transformation modes.

52. A data transformation apparatus as claimed in claim 49, wherein said interpolation means performs n, where n is an integer, point interpolating calculations, said storing means stores n tables, the information relating to the transformation mode designates n transformation modes, and said generating means includes means for generating the address data, and control means for controlling correspondence of the address data generated by said generating means with the table on a basis of a least significant bit of the upper bit of the input data and the information relating to the transformation mode.

53. A data transformation apparatus as claimed in claim 49, wherein said interpolation means perform the interpolating calculation corresponding t a lower bit of the input data.

* * * * *

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA        Page 1 of 14

It is certified that error appears in the above-identified patent and that said Letters Patent is hereby corrected as shown below:

IN THE DRAWINGS

Sheet 23, Fig. 21, "PORTTION" should read --PORTION-- and "SEQUENTOAL" should read --SEQUENTIAL--;
Sheet 26, Fig. 24, "SEQUENTOAL" should read --SEQUENTIAL--;
Sheet 29, Fig. 27, "PORTTION" should read --PORTION-- and "SEQUENTOAL" should read --SEQUENTIAL--;
Sheet 33, Fig. 30, "PORTTION" should read --PORTION-- and "SEQUENTOAL" should read --SEQUENTIAL--;
Sheet 36, Fig. 33, "PORTTION" should read --PORTION-- and "SEQUENTOAL" should read --SEQUENTIAL--;
Sheet 41, Fig. 37, "SEQUENTOAL" should read --SEQUENTIAL--;
Sheet 78, Fig. 69, "SEQUENTOAL" should read --SEQUENTIAL--;
Sheet 80, Fig. 70B, "TRANSFORMATOIN" (all four occurrences) should read --TRANSFORMATION--; and
Sheet 91, Fig. 78, "SEQUENTOAL" should read --SEQUENTIAL--.

COLUMN 1

Line 27, "the" should read --and the--;
Line 39, "a" should be deleted;
Line 50, "Such" should read --Such a--;
Line 60, "is consisted" should read --consists of--;
Line 61, "with" should be deleted; and
Line 67, "ranging" should read --ranging from--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

Page 2 of 14

It is certified that error appears in the above-identified patent and that said Letters Patent is hereby corrected as shown below:

COLUMN 2

Line 16, "zi" should read --Zi--;
    Line 18, "0." should read --0,--;
    Line 19, "-data" should read --data--;
    Line 25, "grip" should read --grid--; and
    Line 28, "grip" should read --grid--.

COLUMN 3

Line 3, "LUT, used" should read --LUT are used--;
    Line 21, "mutually distinct six" should read
        --six mutually distinct--;
    Line 41, "is" should read --is a--;
    Line 46, "bit" should read --bits--;
    Line 48, "bits—for" should read --bits for--;
    Line 57, "grip" should read --grid--; and
    Line 61, "ciently use" should read --cient use of--.

COLUMN 4

Line 2, "a" should read --in a--;
    Line 17, "becomes" should read --become--;
    Line 19, "sub-LUT" should read --sub-LUTs--;
    Line 22, "forth.," should read --forth,--;
    Line 30, "Layed-open" should read --Laid-open--;
    Line 32, "for one kind" should read --as in--;
    Line 33, "similarly to" should be deleted; and
    Line 62, "signal" should read --signals--.

COLUMN 6

Line 35, "table" should read --tables--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

Page 3 of 14

It is certified that error appears in the above-identified patent and that said Letters Patent is hereby corrected as shown below:

COLUMN 11

Line 7, "in i" should read --in--;
    Line 41, "other instance" should read --some instances--;
    Line 48, "of" should read --of a--;
    Line 49, "Xh $2^4$" should read --Xh·$2^4$--;
    Line 55, "points" should read --point--; and
    Line 67, "denote" should read --denotes--.

COLUMN 12

Line 42, "Xn" should read --Xh--; and
    Line 67, "Xn" should read --Xh--.

COLUMN 13

Line 21, "LUT" should read --LUTs--; and
    Line 63, "to" should read --as in--.

COLUMN 14

Line 1, "constucted" should read --are constructed--;
    Line 12, "Xh $2^4$" should read --Xh·$2^4$--;
    Line 14, "after" should read --after the--;
    Line 15, "H3" should read --$H_3$--; and
    Line 48, "H3" should read --$H_3$--.

COLUMN 15

Line 55, "exchanger" should read --exchangers--;
    Line 57, "signal" (first occurrence) should read --signals--; and
    Line 64, "of" should read --or--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 16

Line 25, "region" should read --regions--;
    Line 50, "one" should read --one of--;
    Line 61, "number" should read --numbers--; and
    Line 64, "Even];" should read --Even],-- and
        "[Odd, Odd]are" should read --[Odd, Odd] are--.

COLUMN 17

Line 43, "transformation" should read --transformations--;
    Line 51, "as" should read --as in--;
    Line 52, "is employed" should be deleted;
    Line 63, "tion" should read --tions--; and
    Line 64, "$2^4D$" should read --$2^4 \cdot D$--.

COLUMN 18

Line 8, "difference" should read --the difference--;
    Line 9, "pairs of two" should read --two pairs of--;
    Line 19, "the multiplier" should read --by the multiplier--;
    Line 61, "transformation" should read --transformations--; and
    Line 64, "to be half" should read --by half--.

COLUMN 19

Line 47, "respective" should read --respective ones--; and
    Line 55, "respective" should read --respective ones--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 20

Line 6, "calculates" should read --calculate--;
    Line 8, "is" (both occurrences) should read --are--; and
    Line 27, "H5" should read --$H_5$--.

COLUMN 21

Line 4, "shifter" should read --shifters--;
    Line 12, "constriction" should read --construction--;
    Line 18, "LUT" should read --number of LUTs--;
    Line 29, "(Xi, Yi" should read --$H_5$ (Xi, Yi--;
    Line 40, "is" should read --are--;
    Line 49, "a" should be deleted;
    Line 50, "mutually distinct eight kinds" should read --eight mutually distinct kinds--; and
    Line 52, "a mutually distinct four kinds" should read --four mutually distinct kinds--.

COLUMN 22

Line 2, "to" should read --as--;
    Line 10, "be" should be deleted; and
    Line 13, "be" should be deleted.

COLUMN 23

Line 30, "$2^4 P_1$" should read --$2^4 \cdot P_1$--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

Page 6 of 14

It is certified that error appears in the above-identified patent and that said Letters Patent is hereby corrected as shown below:

COLUMN 24

Line 24, "Y." should read --Y,--;
    Line 45, "respective" should read --respective ones-- and
        "Y." should read --Y,--;
    Line 48, "Y." should read --Y,--;
    Line 62, "rising" should read --the rising--; and
    Line 63, "bits" should read --bits of--.

COLUMN 25

Line 5, "rising" should read --the rising-- and
        "next a" should read --a next--;
    Line 12, "to" should read --of--;
    Line 19, "R. G." should read --R, G,--;
    Line 30, "control" should read --controls--;
    Line 37, "shows" should read --show--;
    Line 39, "of" should be deleted;
    Line 46, "Y." should read --Y,--;
    Line 48, "Y." should read --Y,--;
    Line 53, "R. G." should read --R, G,--;
    Line 61, "built-in" should read --built into--;
    Line 63, "R. G." should read --R, G,--; and
    Line 64, "not" should be deleted.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 26

```
Line  4, "i" should be deleted;
Line 14, "signals" should read --signal--;
Line 15, " "1" " should read --"0"-- and
         " "0" " should read --"1"--;
Line 16, "C1" should read --Y1--;
Line 26, "are" should read --is--;
Line 33, "for" should read --when--;
Line 39, "Further more" should read --Furthermore--; and
Line 48, "associating" should read --associated--.
```

COLUMN 27

```
Line 16, "proceeding" should read --preceding--;
Line 28, "dada" should read --data--;
Line 42, "R. G." should read --R, G,-- and
         "Y." should read --Y,--;
Line 46, "of" should read --of two-- and
         "two" should be deleted;
Line 61, "R. G. B date" should read --R, G, B data--; and
Line 67, "plate" should be deleted.
```

COLUMN 28

```
Line 13, "Y." should read --Y,--;
Line 37, "Y." should read --Y,--;
Line 40, "R. G." should read --R, G,--;
Line 63, "respective" should read --respective ones--;
Line 64, "set" should read --store--; and
Line 67, "the" should be deleted.
```

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 29

Line 13, "R. G." should read --R, G,--;
Line 16, "R. G." should read --R, G,--;
Line 26, "R. G. B date" should read --R, G, B data--;
Line 41, "R. G." should read --R, G,--; and
Line 58, "R. G." should read --R, G,--.

COLUMN 30

Line 35, "yf'" should read --Yf-- and
  "zf" should read --Zf--;
Line 36, "represents" should read --represent--;
Line 37, "Yi." should read --Yi,-- and "represents" should read --represent--;
Line 38, "Yi" should read --Yi,--;
Line 39, "combination" should read --combinations--; and
Line 40, "$2^n-1$." should read --$2^n-1$,--.

COLUMN 31

Line 5, "becomes" should read --become--;
Line 25, "xh+x" should read --Xh+X-- and
  "MAx'" should read --MAX--;
Line 35, "signal" should read --signals--;
Line 53, "four" should read --that four--; and
Line 57, "shows" should read --show--.

COLUMN 32

Line 20, "for" should read --for the--;
Line 30, "logic" should read --logical--;
Line 32, "is" should read --are--;
Line 34, "logic" should read --logical--; and
Line 36, "logic" should read --logical--.

UNITED STATES PATENT AND TRADEMARK OFFICE
CERTIFICATE OF CORRECTION

PATENT NO. : 5,715,376
DATED : February 3, 1998
INVENTOR(S) : TADAYOSHI NAKAYAMA Page 9 of 14

It is certified that error appears in the above-identified patent and that said Letters Patent is hereby corrected as shown below:

COLUMN 33

Line 10, "Yf Zf" should read --$\overline{Yf > Zf}$--;
    Line 22, "becomes" should read --become--;
    Line 23, "as a whole of" should read --in--; and
    Line 32, "detects" should read --detect--.

COLUMN 34

Line 11, "is" should read --are--;
    Line 19, "three" should read --of three--;
    Line 46, "are" should read --is--;
    Line 55, "When" should read --when--;
    Line 56, "selector" should read --selectors--; and
    Line 60, "ZH" should read --Zh--.

COLUMN 35

Line 9, "show" should read --shown--;
    Line 15, "216" should read --2164--;
    Line 18, "are" should read --is--;
    Line 36, close up right margin;
    Line 37, close up left margin;
    Line 45, "are" should read --is--; and
    Line 64, "erwise. The" should read --erwise, the--.

COLUMN 36

Line 18, "in addition" should read --of addition--; and
    Line 41, "becomes" should read --become--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 37

Line 4, "ADr" should read --Adr--;
Line 10, "As" should be deleted; and
Line 11, "set" should read --As set--.

COLUMN 38

Line 23, "2945" should read --2445--;
Line 50, "become" should read --becomes--;
Line 53, "are" should read --is--; and
Line 56, "speed-up" should read --speed up--.

COLUMN 39

Line 47, "is" should read --to be--.

COLUMN 40

Line 22, "2594" should read --2504--;
Line 30, "made reference" should read --referred--;
Line 32, "data" should read --same data--; and
Line 34, "perform" should read --to be performed--.

COLUMN 41

Line 22, "Adr%2=1" should read --Adr%2=0--;
Line 27, "lowest," should read --lowest--;
Line 31, "a" should be deleted;
Line 39, "every other" should read --alternate--;
Line 41, "every other" should read --alternate--;
Line 46, "signification" should read --significant--; and
Line 64, "is" should read --are--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 42

Line 39, "has" should read --have--; and
    Line 62, "(QC)" should read --(OC)--.

COLUMN 43

Line 25, "generation in" should read --generation,--; and
    Line 51, "RAM s" should read --RAMs--.

COLUMN 44

Line 9, "RAM s" should read --RAMs--;
    Line 11, "twenty ninth" should read --twenty-ninth--;
    Line 35, "switch," should read --switch--; and
    Line 44, "RAM s" should read --RAMs--.

COLUMN 45

Line 16, "to input" should read --in inputting--; and
    Line 54, "apparatus-" should read --apparatus--.

COLUMN 46

Line 15, "readout" should read --read out--;
    Line 26, "similar" (first occurrence) should be deleted; and
    Line 45, "(X)" should read --(Xi--.

COLUMN 47

Line 28, "respective" should read --the respective kinds of bits.--;
    Line 29, "kinds." should be deleted; and
    Line 33, "having" should read --has--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 48

Line 5, "Xi'" should read --Xi,--;
    Line 15, "~" should read -- - --;
    Line 18, "yf" should read --Yf-- and
         "zf" should read --Zf--;
    Line 19, "0f" should read --Qf--;
    Line 20, "0f" should read --Qf--;
    Line 24, "O" should read --0--;
    Line 38, "~" should be deleted;
    Line 57, "Me1" should read --MM1--;
    Line 63, "three-dimension" should read --three dimensions--
         and "four-" should read --four--; and
    Line 64, "dimension" should read --dimensions--.

COLUMN 49

Line 50, "kind" should read --kind of--;
    Line 54, "kind" should read --kind of--; and
    Line 55, "kind" should read --kind of--.

COLUMN 50

Line 7, "selects" should read --select--; and
    Line 18, "selects" should read --select--.

COLUMN 51

Line 5, "(MAX RED)" should read --(MAX-RED)--; and
    Line 18, "is corresponded" should read --corresponds--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 52

Line 19, "R. G." should read --R, G,--;
    Line 21, "R. G." should read --R, G,--;
    Line 41, "developing employing" should read
        --developing, employing-- and
        "Y." should read--Y,--;
    Line 44, "Y." should read --Y,--; and
    Line 67, "R. G." should read --R, G,--.

COLUMN 53

Line 4, "outputting image" should read
        --image outputting--;
    Line 17, "R. G." should read --R, G,--;
    Line 29, "R." should read --R,--;
    Line 30, "G." should read --G,--; and
    Line 44, "judgement" should read --if judgement--.

COLUMN 54

Line 15, "Y." should read --Y,--;
    Line 19, "Y." should read --Y,--;
    Line 38, "Y." should read --Y,--;
    Line 50, "R. G." should read --R, G,--;
    Line 52, "is" should read --are--;
    Line 62, "84002" should read --S4002--; and
    Line 66, "R. G." should read --R, G,--.

COLUMN 55

Line 1, "is~" should read --is--;
    Line 19, "Y." should read --Y,--;
    Line 38, "encounters" should read --represents--; and
    Line 51, "ne" should read --se--.

UNITED STATES PATENT AND TRADEMARK OFFICE
CERTIFICATE OF CORRECTION

PATENT NO. : 5,715,376

DATED : February 3, 1998

INVENTOR(S) : TADAYOSHI NAKAYAMA

It is certified that error appears in the above-identified patent and that said Letters Patent is hereby corrected as shown below:

COLUMN 57

Line 15, "look up" should read --look-up--;
    Line 22, "look up" should read --look-up--;
    Line 31, "mid portion" should read --midportion--;
    Line 44, "coefficient" (first occurrence) should read --coefficients--;
    Line 49, "input" should read --inputs-- and "output" should read --outputs--;
    Line 58, "input" should read --inputs-- and "output" should read --outputs--; and
    Line 63, "input" should read --inputs-- and "output" should read --outputs--.

COLUMN 59

Line 2, "respective" should read --respective ones--;
    Line 17, "respective" should read --respective ones--;
    Line 21, "respective" should read --respective ones--;
    Line 27, "respective" should read --respective ones--; and
    Line 36, "kind" should read --kinds--.

Column 62
    Line 40, "t" should read --to--

Signed and Sealed this

Third Day of November, 1998

Attest:

BRUCE LEHMAN

Attesting Officer

Commissioner of Patents and Trademarks